US012621704B2

(12) United States Patent
Kim et al.

(10) Patent No.: US 12,621,704 B2
(45) Date of Patent: May 5, 2026

(54) WIRELESS COMMUNICATION METHOD USING MULTILINK, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 18/817,212

(22) Filed: Aug. 27, 2024

(65) Prior Publication Data

US 2024/0422613 A1     Dec. 19, 2024

Related U.S. Application Data

(63) Continuation of application No. PCT/KR2023/002824, filed on Feb. 28, 2023.

(30) Foreign Application Priority Data

Feb. 28, 2022    (KR) ........................ 10-2022-0025710
Mar. 22, 2022    (KR) ........................ 10-2022-0035546
(Continued)

(51) Int. Cl.
*H04W 28/02*          (2009.01)
*H04W 88/10*          (2009.01)

(52) U.S. Cl.
CPC ........ *H04W 28/0263* (2013.01); *H04W 88/10* (2013.01)

(58) Field of Classification Search
CPC . H04W 28/0263; H04W 88/10; H04W 76/15; H04W 76/11; H04W 52/0216; H04W 72/1263
See application file for complete search history.

(56) References Cited

U.S. PATENT DOCUMENTS

2020/0137683 A1*   4/2020   Cariou ................ H04W 74/002
2021/0144787 A1*   5/2021   Kwon ................... H04W 72/23
(Continued)

FOREIGN PATENT DOCUMENTS

EP        4 262 316        10/2023
WO      2021/167366        8/2021
(Continued)

OTHER PUBLICATIONS

International Search Report for PCT/KR2023/002824 mailed on Jun. 1, 2023 and its English translation from WIPO (now published as WO2023/163574).
(Continued)

*Primary Examiner* — Sudesh M. Patidar
(74) *Attorney, Agent, or Firm* — EIP US LLP

(57) ABSTRACT

Disclosed are: a traffic transmission method performed by a first multi-link device (MLD) comprising a plurality of stations respectively operating on a plurality of links in a wireless communication system; and an apparatus. In detail, an MLD of the present invention receives a beacon frame from a second MLD including a plurality of access points (APs) operating on the plurality of links, respectively, and transmits and receives a data unit on the basis of the beacon frame. Here, the beacon frame includes a multi-link traffic indication element indicating mapping between at least one
(Continued)

| ... | TIM element | Multi-link TIM element | ... |
|-----|-------------|------------------------|-----|

(a) TIM element and Multi-link TIM el ement in a MSDU(Beacon frame)

| ... | TIM element |   | Multi-link TIM element | ... |
|-----|-------------|---|------------------------|-----|

Fragment number = x          Fragment number = x+1

(b) TIM element and Multi-link TIM element in a fragmented MSDU traffic identifier (TID) for a buffered unit (BU) of the plurality of APs from among a plurality of TIDs and the plurality of links, according to whether or not mapping between the plurality of TIDs and the plurality of links is default mapping for downlink or bidirectional.

8 Claims, 79 Drawing Sheets

(30) Foreign Application Priority Data

| | | | |
|---|---|---|---|
| Apr. 22, 2022 | (KR) | ........................ | 10-2022-0050377 |
| Jun. 24, 2022 | (KR) | ........................ | 10-2022-0077871 |
| Jun. 29, 2022 | (KR) | ........................ | 10-2022-0079916 |

(56) References Cited

U.S. PATENT DOCUMENTS

| | | | | |
|---|---|---|---|---|
| 2021/0212150 | A1* | 7/2021 | Chu | ........................ H04W 8/24 |
| 2022/0116830 | A1* | 4/2022 | Cariou | .............. H04W 36/0027 |
| 2022/0116862 | A1* | 4/2022 | Cariou | .................. H04W 76/34 |
| 2022/0124855 | A1* | 4/2022 | Hu | ........................ H04W 76/34 |
| 2023/0308938 | A1* | 9/2023 | Sun | .................... H04W 28/0278 |
| 2023/0370533 | A1* | 11/2023 | Huang | .................. H04L 43/062 |
| 2024/0031777 | A1* | 1/2024 | Huang | .................... H04W 4/06 |
| 2024/0040428 | A1* | 2/2024 | Kim | ........................ H04L 45/24 |
| 2024/0422674 | A1* | 12/2024 | Ryu | .................... H04W 40/244 |

FOREIGN PATENT DOCUMENTS

| | | |
|---|---|---|
| WO | 2021/172919 | 9/2021 |
| WO | 2021/251901 | 12/2021 |
| WO | 2022/125421 | 6/2022 |
| WO | 2023/163574 | 8/2023 |

OTHER PUBLICATIONS

Written Opinion of the International Searching Authority for PCT/KR2023/002824 mailed on Jun. 1, 2023 and its English translation by Google Translate (now published as WO2023/163574).
Park, Minyoung: "CC36 Comment Resolution: Multi-Link Traffic Indication", doc.: IEEE 802.11-22/196r0, Feb. 1, 2022, pp. 1-19.
Monajemi, Pooya et al.: "Comment resolution for Enterprise-Grade TID Mapping", doc.: IEEE 802.11-21/1793r0, Nov. 9, 2021, pp. 1-8.
Kang, Kyumin et al.: "TID-to-Link mapping in eMLSR", doc.: IEEE 802.11-21/1747r1, Nov. 25, 2021, slides 1-9.
Japanese Office Action issued in 2024-550736, dated Sep. 2, 2025 with English Translation, 12 pgs.
Kim et al, "Issues on MLD Power Saving," IEEE 802.11-20/1402r1, Oct. 28, 2020, 13 pgs.
Park et al., "Multi-link Tim," IEEE 802.11-20/0084r1, Apr. 21, 2020, 9 pgs.
Extended European Search Report dated May 22, 2025 for European Patent Application No. 23760448.3.
Office Action for Japanese Patent Application No. 2024-550736 dated Mar. 3, 2026, 6 pgs.
Office Action for Korean Patent Application No. 10-2024-7027449 dated Mar. 26, 2026, 7 pgs.

* cited by examiner

User Interface Unit

140

Display Unit

150

Memory

160

Processor

Communication Unit

200

210

220

260

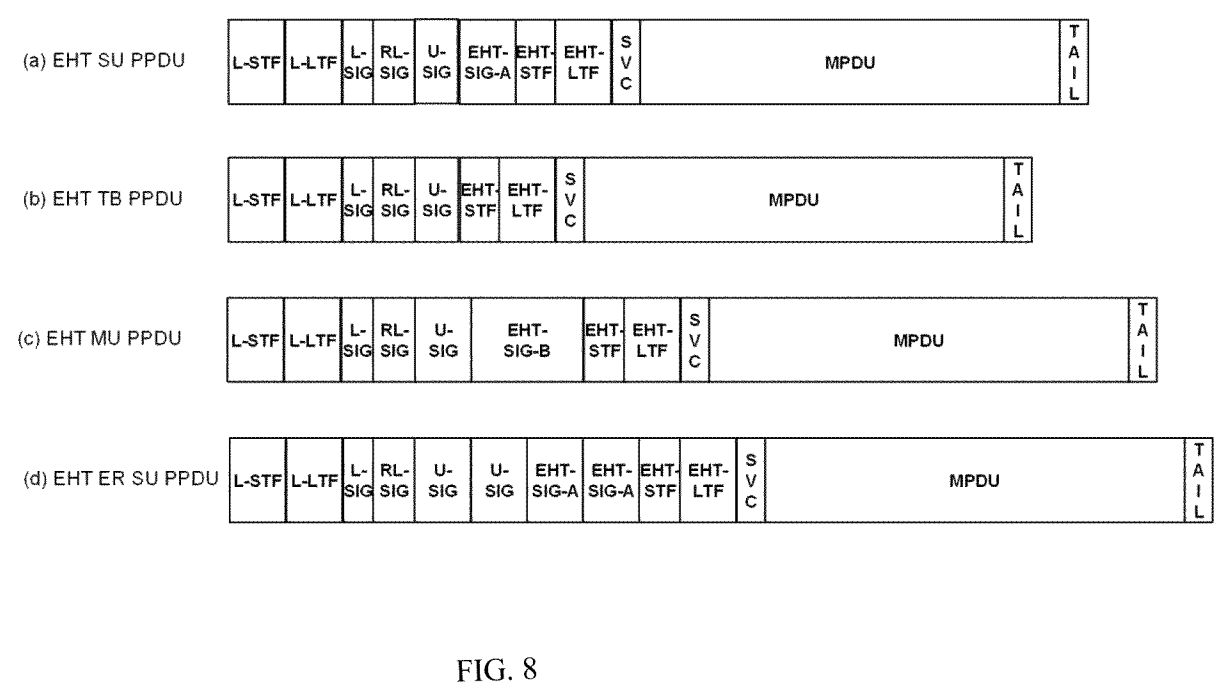

(a) EHT SU PPDU

| L-STF | L-LTF | L-SIG | RL-SIG | U-SIG | EHT-SIG-A | EHT-STF | EHT-LTF | SVC | MPDU | TAIL |

(b) EHT TB PPDU

| L-STF | L-LTF | L-SIG | RL-SIG | U-SIG | EHT-STF | EHT-LTF | SVC | MPDU | TAIL |

(c) EHT MU PPDU

| L-STF | L-LTF | L-SIG | RL-SIG | U-SIG | EHT-SIG-B | EHT-STF | EHT-LTF | SVC | MPDU | TAIL |

(d) EHT ER SU PPDU

| L-STF | L-LTF | L-SIG | RL-SIG | U-SIG | EHT-SIG-A | EHT-STF | EHT-LTF | SVC | MPDU | TAIL |

FIG. 8

(a) Continuous backoff
counting (b) Continuous backoff
counting + Tx deferring (a) Mandatory RTS / CTS exchange (b) Short Tx of initial deferred Tx FIG. 17
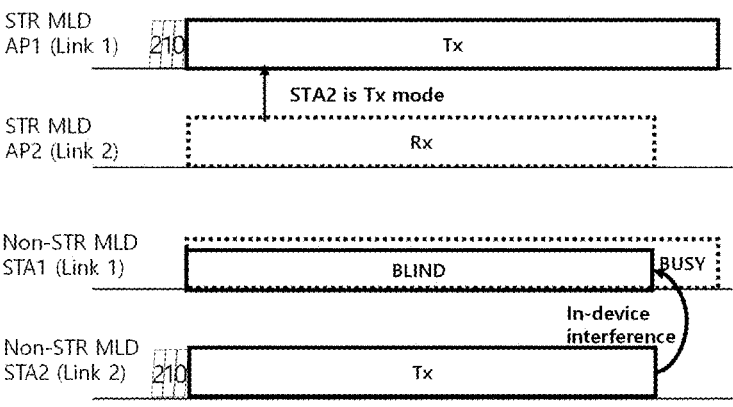
(a) Inter-link collision
(simultaneous Tx on AP1 &STA2 )
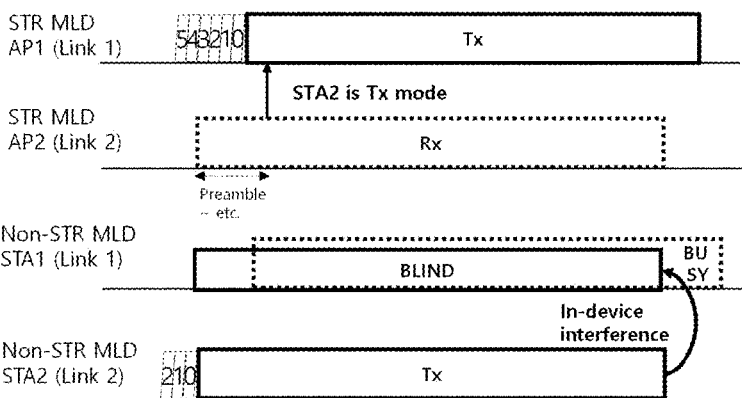
(b) Inter-link collision
(non-simultaneous Tx on AP1 &STA2 )

(a)

(b)

(a) Without TXOP $CW(x) = Contention\ windows\ at\ backoff\ stage\ x$ $CW(0) = CW\_min$ (e.g., 7, 15, 31)

$CW(x + 1) = (2 \times (CW(x) + 1)) - 1$ (b) With TXOP (a) DIFS deferral + backoff (b) EIFS deferral + backoff (c) DIFS deferral with DIFS indication

FIG. 31

| ... | Supporting Sync PPDU Tx | ... |
|---|---|---|

(a) Capability / Multi-Link element

| ... | Sync PPDU Rx Disable | Remaining TXOP Threshold ($\alpha$) | ... |
|---|---|---|---|

(b) Operation element

AP MLD
(multi-link device)

PHY layer configuration of Multi-link Single Radio MLD

(a) RF chain switching delay (b) RTS/CTS exchange to cover RF chain switching delay

FIG. 38

| ... | MIMO Rx support | Max Rx spatial stream | ... |
|-----|-----------------|------------------------|-----|

(a) Operation element

| ... | RF switching latency | ... |
|-----|----------------------|-----|

(b) Capability element

(a) NDP sounding#1

(b) NDP sounding#2

FIG. 43

| Priority | UP (Same as IEEE 802.1D user priority) | IEEE 802.1D designation | AC | Transmit queue (dot11Alternate-EDCAActivated false or not present) | Transmit queue (dot11Alternate EDCAActivated true) | Designation |
|---|---|---|---|---|---|---|
| Lowest | 1 | BK | AC_BK | BK | BK | Background |
| | 2 | --- | AC_BK | BK | BK | Background |
| | 0 | BE | AC_BE | BE | BE | Best Effort |
| | 3 | EE | AC_BE | BE | BE | Best Effort |
| | 4 | CL | AC_VI | VI | A_VI | Video (alternate) |
| | 5 | VI | AC_VI | VI | VI | Video (primary) |
| | 6 | VO | AC_VO | VO | VO | Voice (primary) |
| Highest | 7 | NC | AC_VO | VO | A_VO | Voice (alternate) |

(a) AP MLD (b) Non-AP MLD (C)TID-to-Link Mapping element

Default TID-to-Link mapping

FIG. 47
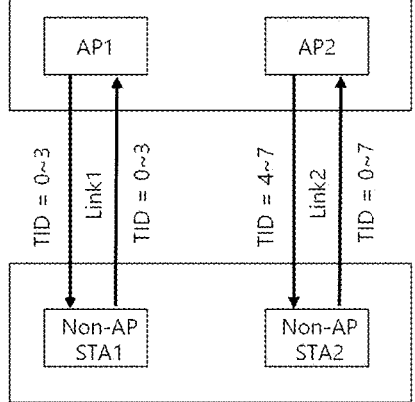
(a) Non-EMLSR mode
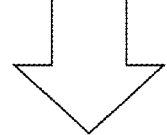
Operation mode
Change
((Re)Association)
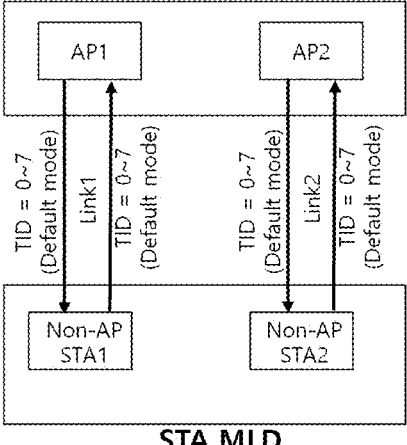
(b) EMLSR mode

Multi-Link element

(a) Non-EMLSR mode
(Negotiated TID-to-Link
mapping)

(b) EMLSR mode
(Default TID-to-Link
mapping)

(C) Non-EMLSR mode
(Auto TID-to-Link
mapping)

FIG. 50

| ... | EMLSR Delay | ... |

Multi-Link element

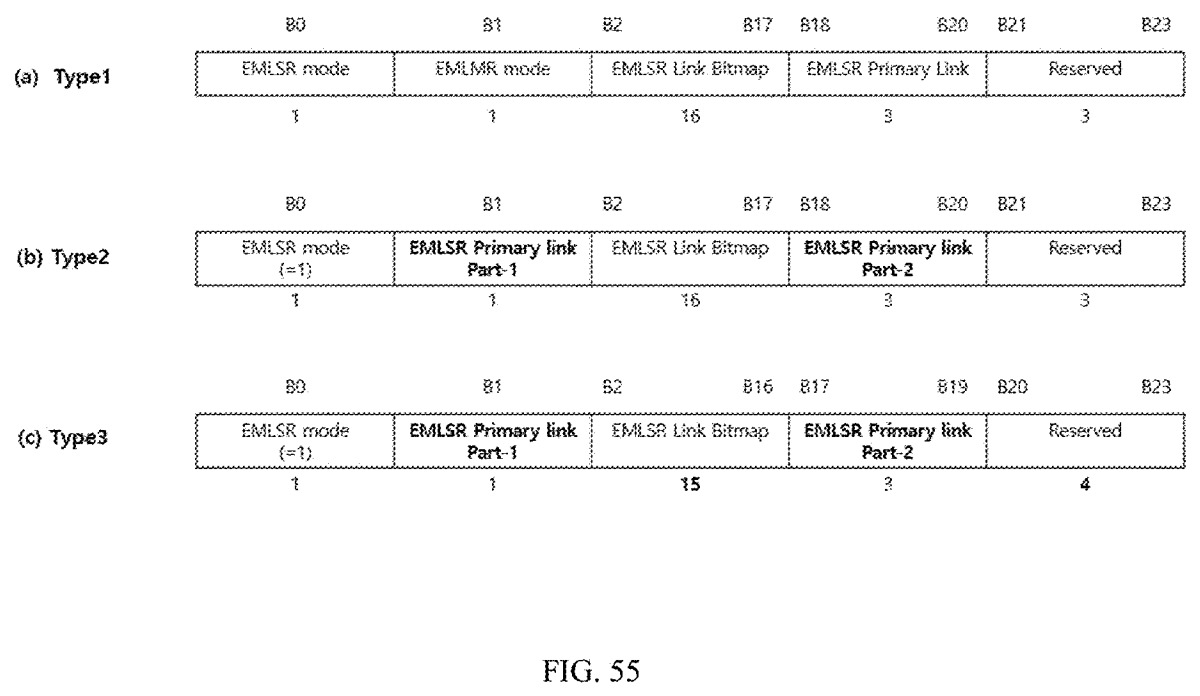

| B0 | B1 | B2 | B17 | B18 | B20 | B21 | B23 |
|---|---|---|---|---|---|---|---|
| EMLSR mode | EMLMR mode | EMLSR Link Bitmap | | EMLSR Primary Link | | Reserved | |
| 1 | 1 | 16 | | 3 | | 3 | |

(a) Type1

| B0 | B1 | B2 | B17 | B18 | B20 | B21 | B23 |
|---|---|---|---|---|---|---|---|
| EMLSR mode (=1) | EMLSR Primary link Part-1 | EMLSR Link Bitmap | | EMLSR Primary link Part-2 | | Reserved | |
| 1 | 1 | 16 | | 3 | | 3 | |

(b) Type2

| B0 | B1 | B2 | B16 | B17 | B19 | B20 | B23 |
|---|---|---|---|---|---|---|---|
| EMLSR mode (=1) | EMLSR Primary link Part-1 | EMLSR Link Bitmap | | EMLSR Primary link Part-2 | | Reserved | |
| 1 | 1 | 15 | | 2 | | 4 | |

(c) Type3

FIG. 55

(a) Initial link state                    (b) Changed link state

FIG. 59

| Transition Timeout subfield value | Transition timeout |
|---|---|
| 0 | 0 TUs |
| 1 | 128 us |
| 2 | 256 us |
| 3 | 512 us |
| 4 | 1 TU |
| 5 | 2 TUs |
| 6 | 4 TUs |
| 7 | 8 TUs |
| 8 | 16 TUs |
| 9 | 32 TUs |
| 10 | 64 TUs |
| 11 | 128 TUs |
| 12-15 | Reserved |

FIG. 61

| Link ID | TIDs info | QMF Support | ... | (QMF)Management Frame Subtype | ... |
|---------|-----------|-------------|-----|-------------------------------|-----|

TID-to-Link Mapping element

(a) TID-to-Link Mapping element example (b) QMF transmission example

FIG. 63

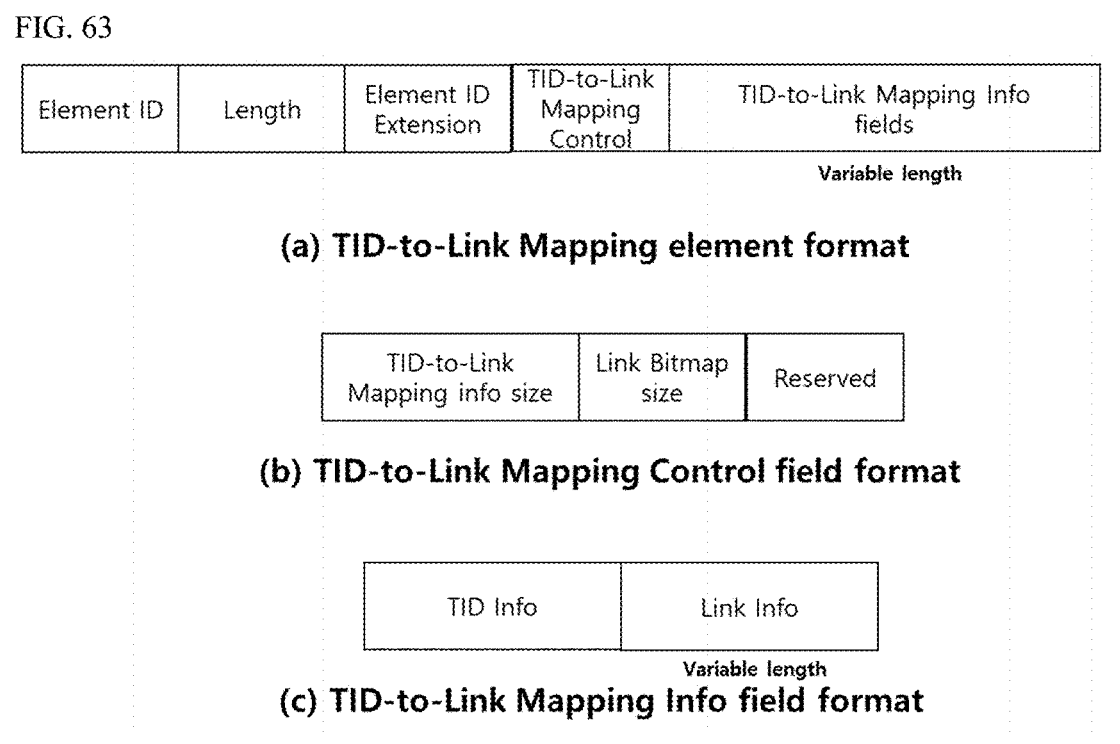

| Element ID | Length | Element ID Extension | TID-to-Link Mapping Control | TID-to-Link Mapping Info fields |
|---|---|---|---|---|

Variable length

(a) TID-to-Link Mapping element format

| TID-to-Link Mapping info size | Link Bitmap size | Reserved |
|---|---|---|

(b) TID-to-Link Mapping Control field format

| TID Info | Link Info |
|---|---|

Variable length

(c) TID-to-Link Mapping Info field format

(a) Initial TID-to-Link mapping status (default mode)

(b) TID-to-Link Mapping negotiation (c) Established TID-to-Link Mapping status

TID-to-Link Mapping procedure (example)

(a) TID-to-Link Mapping element format (b) TID-to-Link Mapping Control field format

FIG. 69

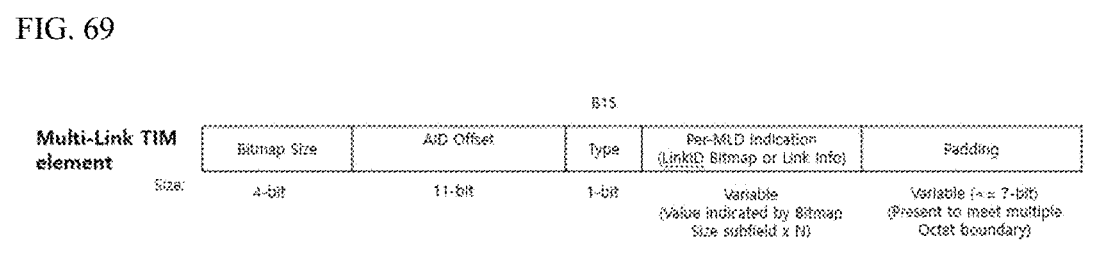

| Multi-Link TIM element | Bitmap Size | A/D Offset | Type | Per-MLD Indication (LinkID Bitmap or Link Info) | Padding |
|---|---|---|---|---|---|
| Size: | 4-bit | 11-bit | 1-bit | Variable (Value indicated by Bitmap Size subfield x N) | Variable (= ?-bit) (Present to meet multiple Octet boundary) |

| Multi-Link TIM element | Bitmap Size | AID Offset | Per-MLD indication (LinkID or TID Bitmaps) | Padding bits |
|---|---|---|---|---|
| Size. | 3-bit | 11-bit | Variable (Value indicated by Bitmap Size subfield x N) | Variable (<= 7-bit) (Present to meet multiple Octet boundary) |

(a) Multi-Link TIM element
(Bitmap size field != 0 or 7)

(b) Multi-Link TIM element
(Bitmap Size field == 7)

FIG. 74

| Multi-Link TIM element | Link Indication | AID Offset | LinkID Bitmaps | Padding |
|---|---|---|---|---|
| Size: | 15-bit or 16-bit | 11-bit | Variable (Number of '1' valued bits of the Link Indication subfield x N) | Variable (<= 7-bit) (Present to meet multiple Octet boundary) |

| ... | TIM element | Multi-link TIM element | ... |
|---|---|---|---|

(a)  TIM element and Multi-link TIM el
ement in a MSDU(Beacon frame)

Fragment number = x                Fragment number = x+1

(b) TIM element and Multi-link TIM
element in a fragmented MSDU (a) TID-to-link
mapping state (of DL)

(b) Traffic indication
according to the TID of BU

FIG. 79

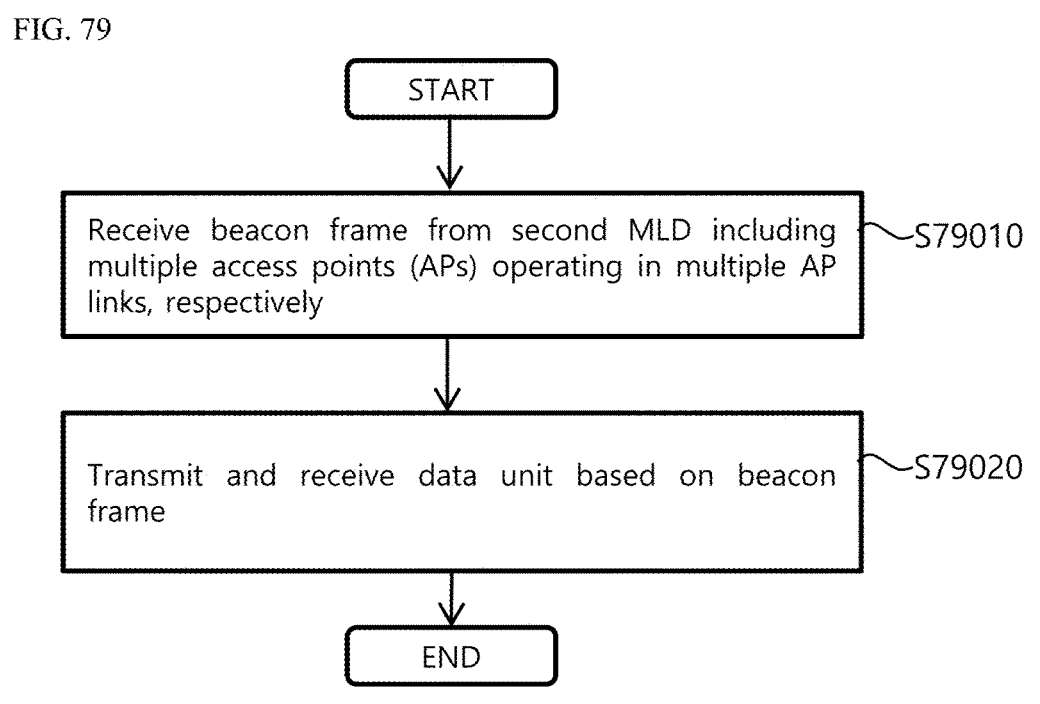

```
                    ┌──────────────┐
                    │    START     │
                    └──────┬───────┘
                           │
                           ▼
┌────────────────────────────────────────────────┐
│ Receive  beacon  frame  from  second  MLD  including │──S79010
│ multiple  access  points  (APs)  operating  in  multiple  AP │
│ links, respectively                             │
└────────────────────────┬───────────────────────┘
                         │
                         ▼
┌────────────────────────────────────────────────┐
│ Transmit  and  receive  data  unit  based  on  beacon │──S79020
│ frame                                           │
└────────────────────────┬───────────────────────┘
                         │
                         ▼
                 ┌──────────────┐
                 │     END      │
                 └──────────────┘
```

WIRELESS COMMUNICATION METHOD USING MULTILINK, AND WIRELESS COMMUNICATION TERMINAL USING SAME

This application is a continuation of International Patent Application No. PCT/KR2023/002824 filed on Feb. 28, 2023, which claims the priority to Korean Patent Application No. 10-2022-0025710 filed in the Korean Intellectual Property Office on Feb. 28, 2022, Korean Patent Application No. 10-2022-0035546 filed in the Korean Intellectual Property Office on Mar. 22, 2022, Korean Patent Application No. 10-2022-0050377 filed in the Korean Intellectual Property Office on Apr. 22, 2022, Korean Patent Application No. 10-2022-0077871 filed in the Korean Intellectual Property Office on Jun. 24, 2022, and Korean Patent Application No. 10-2022-0079916 filed in the Korean Intellectual Property Office on Jun. 29, 2022, the entire contents of which are incorporated herein by reference.

TECHNICAL FIELD

The present invention relates to a wireless communication method using a multi-link and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHZ) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHZ), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHZ, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is for providing a wireless communication method using a multi-link and a wireless communication terminal using the same.

Technical tasks to be achieved in the specification are not limited to the technical tasks mentioned above, and other technical tasks that are not mentioned may be clearly understood by those skilled in the art on the basis of the following descriptions.

Solution to Problem

A terminal (non-AP STA) for transmitting traffic in a wireless communication system according to the disclosure includes: a transceiver; and a processor, wherein the processor is configured to receive a beacon frame from a second MLD including multiple access points (APs) operating in the multiple links, respectively, and transmit and receive a data unit based on the beacon frame, and wherein the beacon frame includes a multi-link traffic indication element indicating mapping between the multiple links and one or more traffic identifiers (TIDs) for buffered units (BUs) of the multiple APs from among multiple TIDs according to whether mapping between the multiple links and the multiple TIDs is default mapping for downlink or bi-directions.

In addition, in the disclosure, the default mapping indicates a state in which the multiple TIDs are all mapped to the multiple links, respectively.

In addition, in the disclosure, if the mapping between the multiple TIDs and the multiple links is not the default mapping, the beacon frame includes the multi-link traffic indication element.

In addition, in the disclosure, if the mapping between the multiple TIDs and the multiple links is the default mapping, the beacon frame does not include the multi-link traffic indication element.

In addition, in the disclosure, if the mapping between the multiple TIDs and the multiple links is not the default mapping, and the beacon frame does not include the multi-link traffic indication element, a PS-Poll frame for reception of the data unit is transmitted to the second MLD via a link among the multiple links, the link corresponding to a specific TID among the one or more TIDs.

In addition, in the disclosure, when at least one link among the multiple links constitutes an enhanced multi-link single radio (EMLSR) link set in an EMLSR mode which supports transmission and reception only on a single link, if a specific link among the at least one link is removed, the specific link is removed from the EMLSR link set.

In addition, in the disclosure, when the specific link among the at least one link is removed, if the number of links remaining after excluding the specific link from among the at least one link is 1 or 0, the EMLSR mode is terminated.

In addition, in the disclosure, the EMLSR mode is terminated at a point in time when the specific link is removed.

In addition, in the disclosure, only one or more links mapped to the one or more TIDs among the multiple links perform a listening operation with the second MLD.

In addition, in the disclosure, if a mapping relationship between the multiple TIDs and the multiple links is not the default mapping relationship, and the one or more TIDs are all mapped to the multiple links, respectively, the beacon frame does not include the multi-link traffic indication element.

In addition, the disclosure provides a method including: receiving a beacon frame from a second MLD including multiple access points (APs) operating in the multiple links, respectively, and transmitting and receiving a data unit based on the beacon frame, wherein the beacon frame includes a multi-link traffic indication element indicating mapping between the multiple links and one or more traffic identifiers (TIDs) for buffered units (BUs) of the multiple APs from among multiple TIDs according to whether mapping between the multiple links and the multiple TIDS is default mapping for downlink or bi-directions.

Advantageous Effects of Invention

An embodiment of the present invention is provides a wireless communication method efficiently using a multi-link and a wireless communication terminal using the same.

The effects obtainable in the present disclosure are not limited to the above-mentioned effects, and other effects that are not mentioned may be clearly understood by those skilled in the art to which the present disclosure belongs, from descriptions below.

BRIEF DESCRIPTION OF DRAWINGS

FIG. 2 illustrates a wireless LAN system according to another embodiment of the present invention.

FIG. 3 illustrates a configuration of a station according to an embodiment of the present invention.

FIG. 8 illustrates an example of various extremely high throughput (EHT) physical protocol data unit (PPDU) formats and a method for indicating the same according to an embodiment of the present invention.

FIG. 17 illustrates a situation in which interference or collision between links may be generated.

FIG. 31 illustrates an element field indicating information on support of sync PPDU reception or transmission according to an embodiment of the disclosure.

FIG. 38 illustrates a capability element and an operation element used by a single radio multi-link device according to an embodiment of the present invention.

FIG. 43 illustrates a mapping relationship between a UP and an AC.

FIG. 47 illustrates that mapping between a TID and a link is changed when a multi-link device activates an EMLSR mode according to an embodiment of the present invention.

FIG. 50 illustrates a multi-link element for signaling of information relating to a duration of padding of an initial control frame according to an embodiment of the present invention.

FIG. 55 illustrates various EML control field formats according to an embodiment of the disclosure;

FIG. 59 illustrates a table of transition timeout indication values and interpretations of indicated times;

FIG. 61 illustrates an embodiment of a TID-to-link mapping element indicating a QMF which may be transmitted regardless of a link;

FIG. 63 illustrates an embodiment of a format of a TID-to-link mapping element;

FIG. 69 illustrates a first format of a multi-link TIM element according to an embodiment of the disclosure;

FIG. 72 illustrates a second format of a multi-link TIM element according to an embodiment of the disclosure;

FIG. 74 illustrates a third format of a multi-link TIM element according to an embodiment of the disclosure;

FIG. 79 illustrates an embodiment of an operation method of an MLD according to an embodiment of the disclosure.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
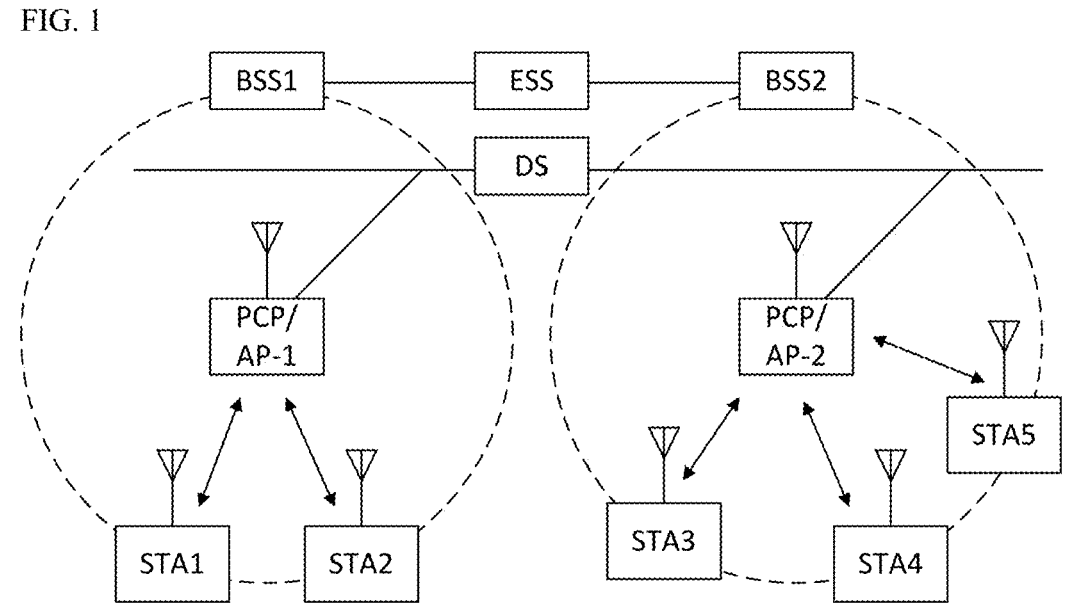
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
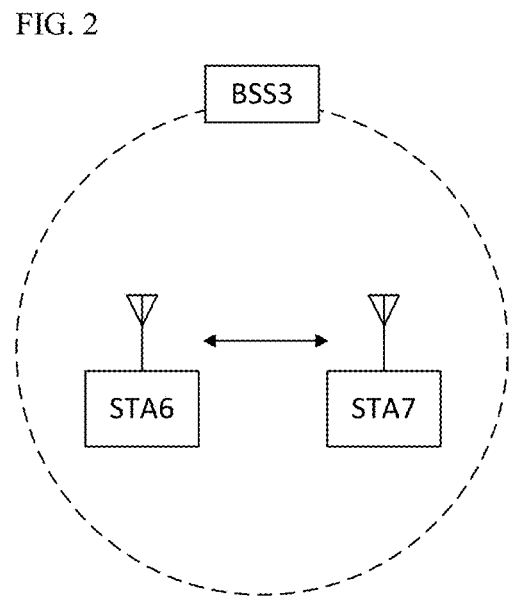

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
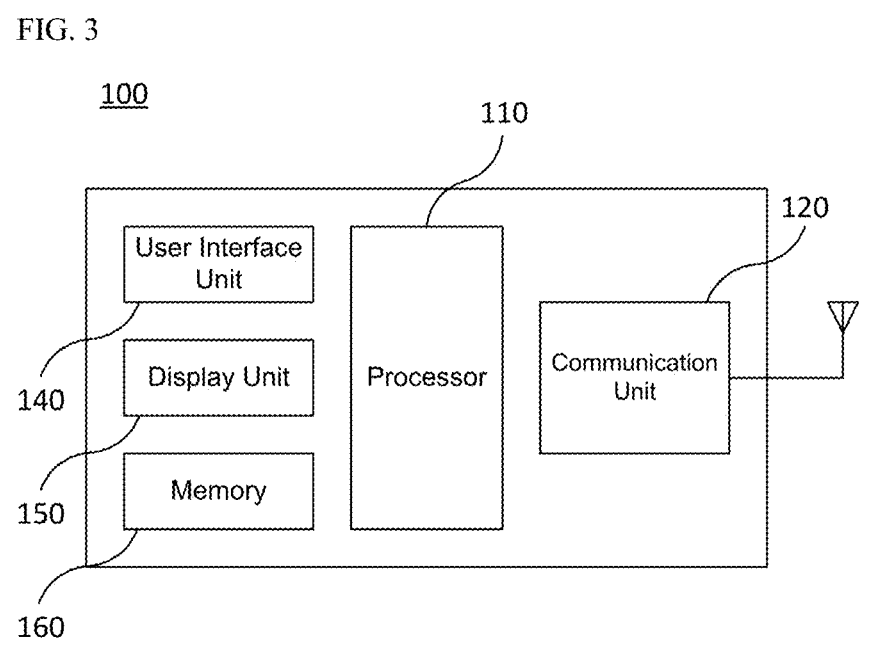

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHZ, 6 GHZ and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
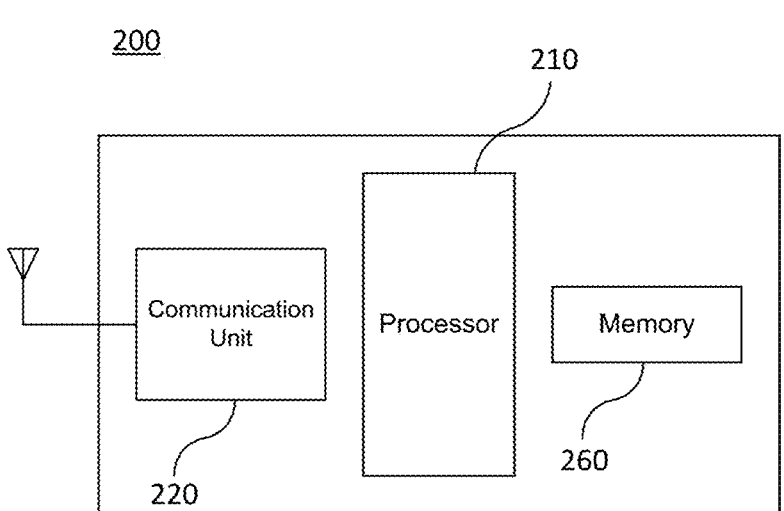
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHZ, 6 GHZ and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
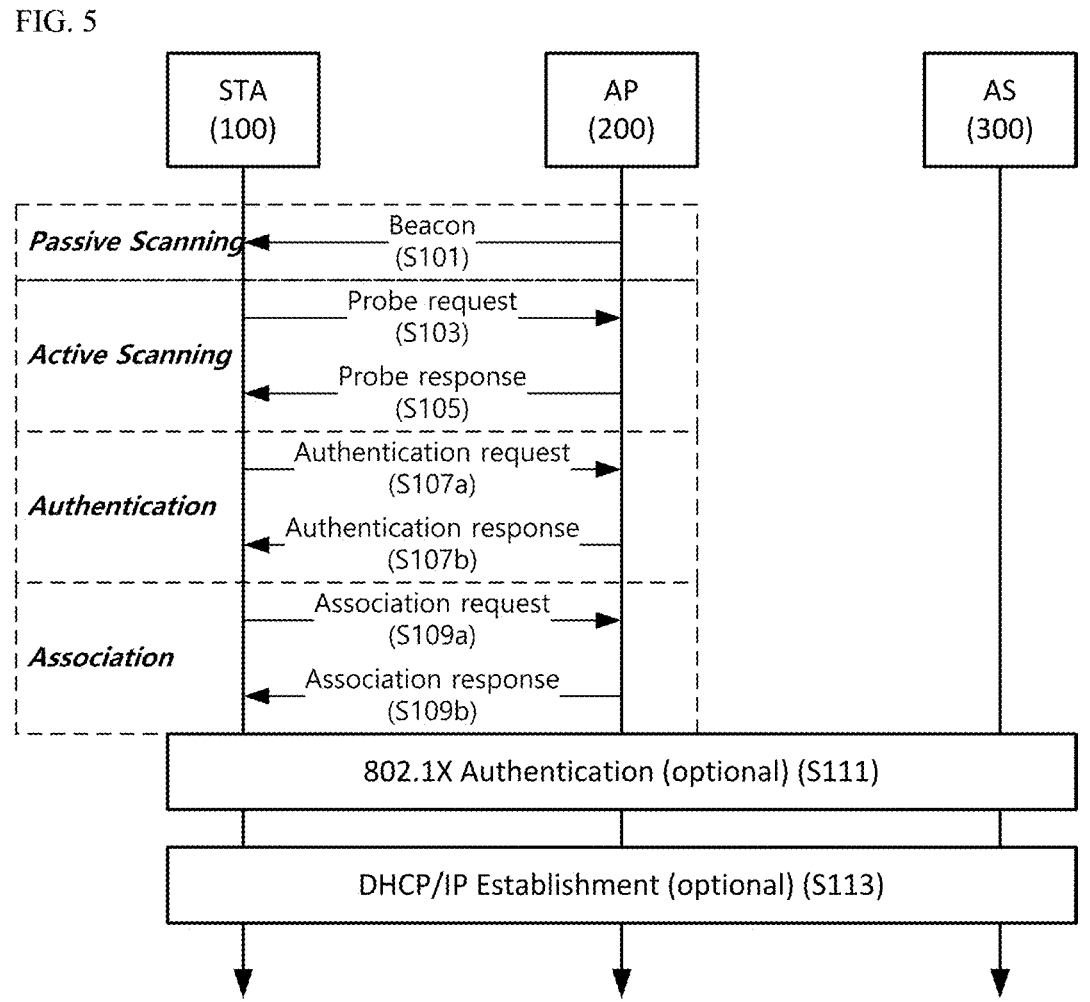
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
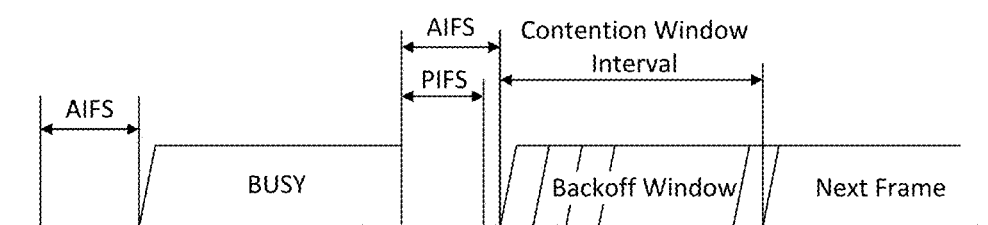
FIG. 6 illustrates a carrier sense multiple access (CSMA)/ collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this instance, a random number is referred to as a backoff counter. That is, the initial value of the backoff counter may be set by an integer number which is a random number that a UE obtains. In the case that the UE detects that a channel is idle during a slot time, the UE may decrease the backoff counter by 1. In addition, in the case that the backoff counter reaches 0, the UE may be allowed to perform channel access in a corresponding channel. Therefore, in the case that a channel is idle during an AIFS time and the slot time of the backoff counter, transmission by the UE may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Examples of Various PPDU Formats

Figure 7:
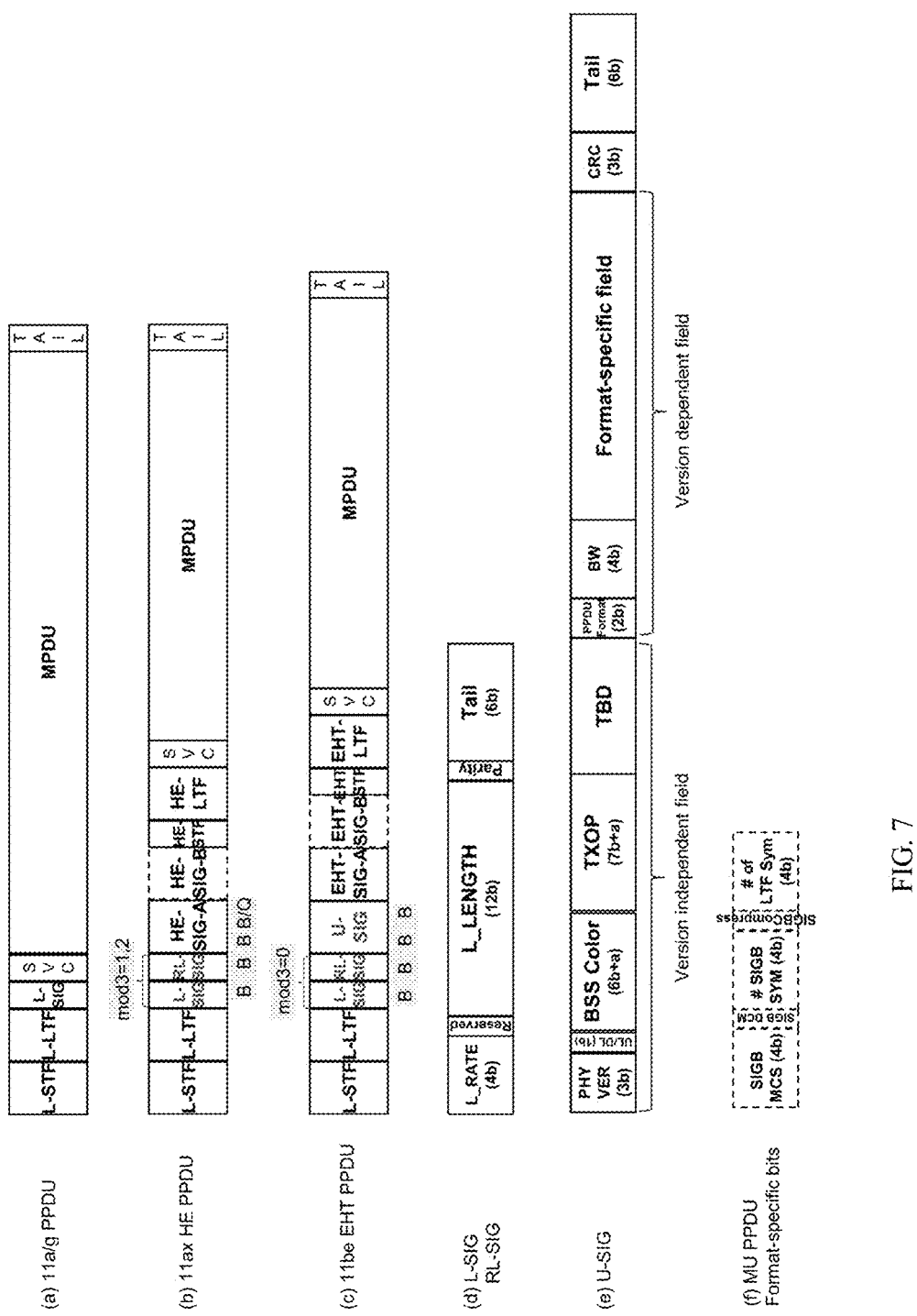
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(*a*) illustrates an embodiment of a legacy PPDU format based on 802.11a/g, FIG. 7(*b*) illustrates an embodiment of an HE PPDU format based on 802.11ax, and FIG. 7(*c*) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of Jun. 9, 2012/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left( \left\lceil \frac{L\_LENGTH + 3}{3} \right\rceil \right) \times 4 + 20 \qquad \text{[Equation 1]}$$

In this case, $\lceil x \rceil$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left( \left\lceil \frac{TXTIME - 20}{4} \right\rceil \right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$TXTIME(us) = \qquad \text{[Equation 3]}$$

$$T_{L-STF} + T_{L-LTF} + T_{L-SIG} + T_{RL-SIG} + T_{U-SIG} + (T_{EHT-SIG-A}) +$$

$$(T_{EHT-SIG-B}) + T_{EHT-STF} + N_{EHT-LTF} \cdot T_{EHT-LTF} + T_{DATA}$$

Referring to the above equations, the length of the PPDU is calculated based on a rounded up value of L_LENGTH/3. Therefore, for a random value of k, three different values of L_LENGTH={3k+1, 3k+2, 3 (k+1)} indicate the same PPDU length.

Referring to FIG. 7(c), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHZ sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHZ in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(*a*) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(*b*) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(*c*) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(*d*) shows an example of an EHT ER SU PPDU format used for single user transmission with an STA in an extended range. An EHT ER SU PPDU may be used for single user transmission with an STA of a wider range compared to the EHT SU PPDU described in FIG. 8(*a*), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, in this specification, a frame or a MAC frame may be used interchangeably with an MPDU.

When one wireless communication device communicates by using a plurality of links, the communication efficiency of the wireless communication device may be increased. In this case, the link may be a physical path, and may consist of one wireless medium that may be used to deliver a MAC service data unit (MSDU). For example, in a case where frequency band of one of the links is in use by another wireless communication device, the wireless communication device may continue to perform communication through another link. As such, the wireless communication device may usefully use a plurality of channels. In addition, when the wireless communication device performs communication simultaneously by using a plurality of links, the overall throughput may be increased. However, in the existing wireless LAN, it has been stipulated that one wireless communication device uses one link. Therefore, a WLAN operation method for using a plurality of links is required. A wireless communication method of a wireless communication device using a plurality of links will be described through FIGS. 9 to 26. First, a specific form of a wireless communication device using a plurality of links will be described through FIG. 9.

Figure 9:
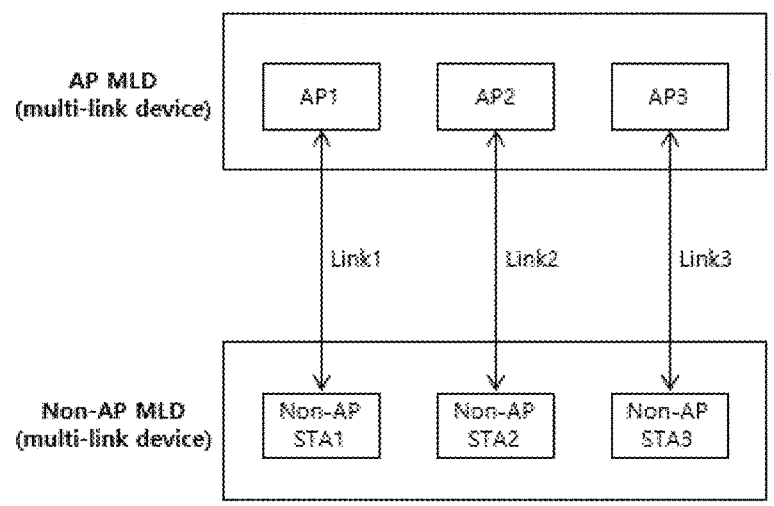
FIG. 9 illustrates a multi-link device according to an embodiment of the disclosure.

FIG. 9 illustrates a multi-link device according to an embodiment of the disclosure.

A multi-link device (MLD) may be defined for a wireless communication method using the plurality of links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to logical link control (LLC). The MLD may also have one MAC data service.

A plurality of stations included in the multi-link device may operate on a plurality of links. In addition, a plurality of stations included in the multi-link device may operate on a plurality of channels. Specifically, the plurality of stations included in the multi-link device may operate on a plurality of different links or on a plurality of different channels. For example, a plurality of stations included in the multi-link device may operate on a plurality of different channels of 2.4 GHZ, 5 GHZ, and 6 GHZ.

The operation of the multi-link device may be referred to as a multi-link operation, an MLD operation, or a multi-band operation. In addition, when the station affiliated with the multi-link device is an AP, the multi-link device may be referred to as the AP MLD. In addition, when the station affiliated with the multi-link device is a non-AP station, the multi-link device may be referred to as a non-AP MLD.

FIG. 9 illustrates an operation in which a non-AP MLD and an AP-MLD communicate. Specifically, the non-AP MLD and the AP-MLD communicate by using three links, respectively. The AP MLD includes a first AP AP1, a second AP AP2, and a third AP AP3. The non-AP MLD includes a first non-AP STA (non-AP STA1), a second non-AP STA (non-AP STA2), and a third non-AP STA (non-AP STA3). The first AP AP1 and the first non-AP STA (non-AP STA1) communicate through a first link Link1. In addition, the second AP AP2 and the second non-AP STA (non-AP STA2) communicate through a second link Link2. In addition, the third AP AP3 and the third non-AP STA (non-AP STA3) communicate through a third link Link3.

The multi-link operation may include a multi-link setup operation. The multi-link setup may correspond to an association operation of the single link operation described above and may be preceded first for frame exchange in the multi-link. The multi-link device may obtain information necessary for the multi-link setup from a multi-link setup element. Specifically, the multi-link setup element may include capability information associated with the multi-link. In this case, the capability information may include information indicating whether any one of the plurality of devices included in the multi-link device performs the transmission and simultaneously, another device may perform the reception. In addition, the capability information may include information on the links available to each station included in the MLD. In addition, the capability information may include information on the channels available to each station included in the MLD.

The multi-link setup may be set up through negotiation between peer stations. Specifically, the multi-link setup may be performed through communication between stations without communication with the AP. In addition, the multi-link setup may be set up through any one link. For example, even if the first link to the third link are set through the multi-link, the multi-link setup may be performed through the first link.

In addition, a mapping between a traffic identifier (TID) and a link may be set up. Specifically, frames corresponding to a TID of a particular value may only be interchanged through a pre-specified link. The mapping between the TID and the link may be set up with directional-based. For example, when a plurality of links is set up between the first multi-link device and the second multi-link device, the first multi-link device may be set to transmit a frame of the first TID to the plurality of first links, and the second multi-link device may be set to transmit a frame of the second TID to the first link. In addition, there may be a default setting for the mapping between the TID and the link. Specifically, in the absence of additional setup in the multi-link setup, the multi-link device may exchange frames corresponding to the TID at each link according to the default setting. In this case, the default setting may be that all the TIDs are exchanged in any one link.

A TID will be described in detail. The TID is an ID for classifying traffic and data in order to support quality of service (QOS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range of 0 to 15. A TID value to be used may be differently designated according to an access policy and a channel access or medium access method. For example, in the case that enhanced distributed channel access (EDCA) or hybrid coordination function contention based channel access (HCAF) is used, the TID may be assigned with a value in the range of 0 to 7. In the case that the EDCA is used, the TID may indicate a user priority (UP). In this instance, the UP may be designated based on a TC or a TS. The UP may be allocated in a higher layer than MAC. In addition, in the case that HCF controlled channel access (HCCA) or SPCA is used, the TID may be assigned with a value in the range of 8 to 15. In the case that the HCCA or SPCA is used, the TID may indicate a TSID. In addition, in the case that the HEMM or the SEMM is used, the TID may be assigned with a value in the range of 8 to 15. In the case that the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have a high priority. That is, 1 denotes a low priority and 7 denotes a high priority. Therefore, AC_BK, AC_BE, AC_VI, and AC_VO may have high priorities, sequentially. In addition, AC_BK, AC_BE, AC_VI, and AC_VO may correspond to an AC index (ACI) 0, 1, 2, and 3, respectively. Due to such features of a TID, a mapping between a TID and a link may indicate a mapping between an AC and a link. In addition, a mapping between a link and an AC may indicate a mapping between a TID and a link.

As described above, a TID may be mapped to each of a plurality of links. Mapping may be designating a link in which traffic corresponding to a predetermined TID or AC is capable of being exchanged. In addition, a TID or AC that is transmittable for each transmission direction in a link may be designated. As described above, there may be a default configuration for a mapping between a TID and a link. Specifically, in the case that an additional configuration does not exist for a multi-link configuration, a multi-link device may exchange a frame corresponding to a TID in each link according to the default configuration. In this instance, the default configuration may be exchanging all TIDs in any one link. Any TID or AC at any point in time may be always mapped to at least any one link. A management frame and a control frame may be transmitted in all links.

In the case that a link is mapped to a TID or an AC, only a data frame corresponding to the TID or AC mapped to the corresponding link may be transmitted in the corresponding link. Therefore, in the case that a link is mapped to a TID or an AC, a frame that does not correspond to the TID or AC mapped to the corresponding link may not be transmitted in the corresponding link. In the case that a link is mapped to a TID or an AC, an ACK may also be transmitted based on the link to which the TID or the AC is mapped. For example, a block ACK agreement may be determined based on a mapping between a TID and a link. According to another embodiment, a mapping between a TID and a link may be determined based on a block ACK agreement. Particularly, a block ACK agreement may be set for a TID mapped to a predetermined link.

A QOS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may be enabled to maintain a power-saving state during a long period of time.

Figure 10:
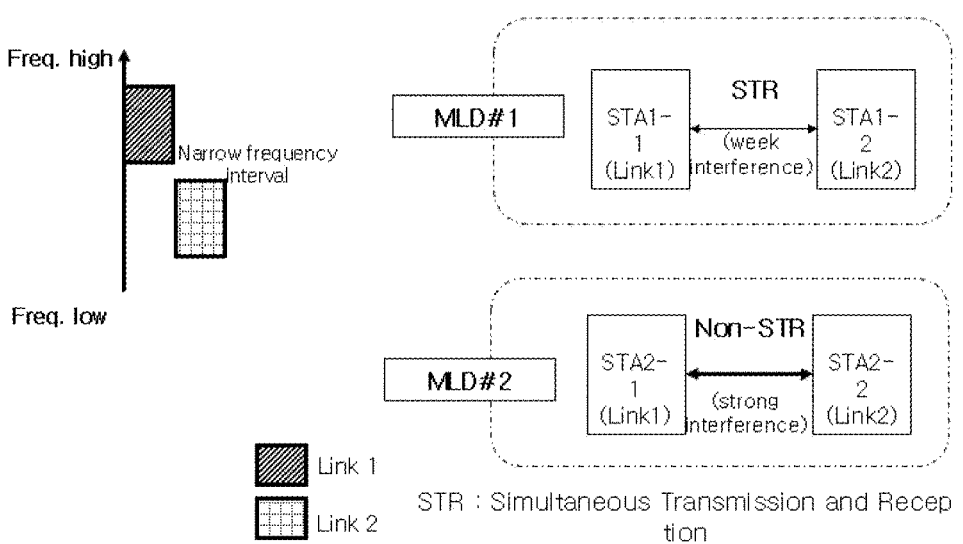
FIG. 10 illustrates simultaneous transmissions in different links in a multi-link operation according to an embodiment of the disclosure.

FIG. 10 illustrates the simultaneous performance of transmission of different links in a multi-link operation according to an embodiment of the disclosure.

According to implementation of a multi-link device, the simultaneous operation may not be supported in the multi-link. For example, simultaneous transmission in a plurality of links, simultaneous reception in a plurality of links, or transmission in one link and reception of another link by the multi-link device may be not supported. This is because reception or transmission performed in one link may influence reception or transmission performed in another link. Specifically, transmission in one link may act as interference to another link. Interference applied from one link to another link by one multi-link device may be referred to as internal leakage. As a frequency interval between links is smaller, internal leakage may become larger. When internal leakage is not very large, transmission may be performed in another link while transmission is performed in one link. When internal leakage is large, transmission cannot be performed in another link while transmission is performed in one link. As described above, simultaneously performing the operations in a plurality of links by the multi-link device may be referred to as simultaneous transmit and receive or simultaneous transmission and reception (STR). For example, simultaneous transmission in a plurality of links, transmission in one link and reception in another link at the same time, or simultaneous reception in a plurality of links by the multi-link device may be referred to as STR.

As mentioned above, the multi-link device may support STR or support the same only restrictively. Specifically, the multi-link device may support STR in a specific condition. For example, when the multi-link device operates as a single radio device, the multi-link device may not perform STR. Further, when the multi-link device operates as a single antenna, STR of the multi-link device may not be performed. When internal leakage having the size larger than or equal to a predetermined size is detected, the multi-link device may not perform STR.

A station may exchange information on an STR capability of the station with another station. Specifically, the station may exchange information on whether a capability of simultaneously performing transmission in a plurality of links or simultaneously performing reception in a plurality of links by the station is restricted with another station. Specifically, the information on whether the capability of performing transmission or reception in a plurality of links is restricted may indicate whether simultaneous transmission, simultaneous reception, or simultaneous transmission and reception can be performed in a plurality of links. The information on whether the capability of performing transmission or reception in a plurality of links is restricted may be information indicated for each step. Specifically, the information on whether the capability of performing transmission or reception in a plurality of links is restricted may be information indicating a step of representing the size of internal leakage. In a detailed embodiment, the information indicating the step of representing the size of internal leakage may be information indicating a step of representing the size of interference generated due to internal leakage. In another detailed embodiment, the information may be information indicating a step of representing a frequency interval between links that may influence internal leakage. The information indicating the step of representing the size of internal leakage may be information indicating the relation between the frequency interval between links and the size of internal leakage.

In FIG. 10, a first station (STA1) and a second station (STA2) is affiliated with one non-AP multi-link device. A first AP (AP1) and a second AP (AP2) may be affiliated with one non-AP multi-link device. A first link (link 1) is configured between the first AP (AP1) and the first station (STA1), and a second link (link 2) is configured between the second AP (AP2) and the second station (STA2). In FIG. 10, the non-AP multi-link device may restrictively perform STR. When the second station (STA2) performs transmission in the second link (link2), reception of the first station (STA1) in the first link (link1) may be disturbed by transmission performed in the second link (link2). For example, in the following case, reception of the first station (STA1) in the first link (link1) may be interrupted by transmission performed in the second link (link2). The second station (STA2) transmits first data (data 1) in the second link (link 2), and the first AP (AP1) transmits a response (ack for data1) to the first data (data1) to the first station (STA1). The second station (STA2) transmits second data (data2) in the second link (link2). At this time, a transmission time point of the second data (data2) may overlap a transmission time point of the response (ack for data1) to the first data (data1). The first link (link1) may be interfered by transmission to the second station (STA2) in the second link (link 2). Accordingly, the first station (STA1) may not receive the response (ack for data1) to the first data (data 1).

An operation in which the multi-link device performs channel access is described. The operation of the multi-link without detailed description may follow the channel access described with reference to FIG. 6.

The multi-link device may independently perform channel access in a plurality of links. At this time, the channel access may be backoff-based channel access. When the multi-link device independently performs the channel access in a plurality of links and a backoff counter reaches 0 in the plurality of links, the multi-link device may simultaneously perform transmission in the plurality of links. In a detailed embodiment, when one of the backoff counters of the multi-link reach 0 and a predetermined condition is satisfied, the multi-link device may perform channel access not only in the link in which the backoff counter reaches 0 but also in another link in which the backoff counter does not reach 0. Specifically, when one of the backoff counters of the multi-link reaches 0, the multi-link device may detect energy in another link in which the backoff counter does not reach 0. At this time, when energy having a predetermined size or larger is not detected, the multi-link device may perform channel access not only in the link in which the backoff counter reaches 0 but also in the link in which energy is detected. Accordingly, the multi-link device may simultaneously perform transmission in the plurality of links. The size of a threshold value used for energy detection may be smaller than the size of a threshold value used for determining whether to reduce the backoff counter. Further, when it is determined whether to reduce the backoff counter, the multi-link device may detect any type of signal as well as a WLAN signal. In the energy detection, the multi-link device may detect any type of signal as well as the WLAN signal. Internal leakage may not be detected by the WLAN signal. In this case, the multi-link device may sense a signal detected due to internal leakage by energy detection. Further, as described above, the size of a threshold value used for energy detection may be smaller than the size of a threshold value used for determining whether to reduce the backoff counter. Accordingly, the multi-link device may reduce the backoff counter in another link even while transmission is performed in one link.

According to a degree of interference between links used by the multi-link device, the multi-link device may determine whether the station operating in each link may independently operate. At this time, the degree of interference between links may be the size of interference detected by, when one station performs transmission in one link, another station of the multi-link device. When transmission by the first station of the multi-link device in the first link gives interference having a predetermined size or larger to the second station of the multi-link device operating in the second link, the operation of the second station may be restricted. Specifically, reception or channel access of the second station may be restricted. This is because, when interference is generated, the second station may fail in decoding of the received signal due to interference. Further, this is because, when interference is generated, the second station may determine that the channel is being used when the second station performs channel access using the backoff.

When transmission by the first station of the multi-link device in the first link gives interference having a size smaller than a predetermined size to the second station of the multi-link device operating in the second link, the first station and the second station may independently operate. Specifically, when transmission by the first station of the multi-link device in the first link gives interference having a size smaller than a predetermined size to the second station of the multi-link device operating in the second link, the first station and the second station may independently perform channel access. Further, when transmission by the first station of the multi-link device gives interference having a size smaller than a predetermined size to the second station of the multi-link device operating in the second link, the first station and the second station may independently perform transmission or reception. This is because, when interference having the size smaller than the predetermined size is generated, the second station may succeed in decoding the received signal even when the interference exists. Further, this is because, when interference having the size smaller than the predetermined size is generated, the second station may determine that the channel is idle when the second station performs channel access using the backoff.

The degree of interference generated between stations of the multi-link device may vary depending on a hardware characteristic of the multi-link device as well as the interval between frequency bands of the links in which the stations operate. For example, internal interference generated in the multi-link device including an expensive radio frequency (RF) device may be smaller than internal interference generated in the multi-link device including a cheap RF device. Accordingly, the degree of interference generated between the stations of the multi-link device may be determined based on a characteristic of the multi-link device.

FIG. 10 illustrates that the size of generated interference varies depending on the interval between frequency bands of the links and the characteristic of the multi-link device. In the embodiment of FIG. 10, a first multi-link device (MLD #1) includes a first station (STA1-1) operating in a first link (link1) and a second station (STA1-2) operating in a second link (link2). A second multi-link device (MLD #2) includes a first station (STA2-1) operating in a first link (link1) and a second station (STA2-2) operating in a second link (link2). A frequency interval between the first link (link 1) and the second link (link2) in which the first multi-link device (MLD #1) operates is the same as a frequency interval between the first link (link1) and the second link (link2) in which the second multi-link device (MLD #2) operates. However, the size of generated interference may be different due to difference between a characteristic of the first multi-link device (MLD #1) and a characteristic of the second multi-link device (MLD #2). Specifically, the size of interference generated in the first multi-link device (MLD #1) may be larger than the size of interference generated in the second multi-link device (MLD #2). As described above, the size of generated interference may vary depending on the characteristic of the multi-link device, and it may be required to exchange information on whether STR is supported when it is considered that whether STR is supported is different according to each multi-link device.

The multi-link device may signal information on whether STR is supported by the station included in the multi-link device. Specifically, an AP multi-link device and a non-AP multi-link device may exchange information on whether STR is supported by the AP included in the AP multi-link device and whether STR is supported by the STA included in the non-AP multi-link device. In such embodiments, an element indicating whether STR is supported may be used. The element indicating whether STR is supported may be referred to as an STR support element. The STR support element may indicate whether STR is supported by the station of the multi-link device transmitting the STR support element through 1 bit. Specifically, the STR support element may indicate whether STR is supported by each station included in the multi-link device transmitting the STR support element by 1 bit. At this time, a value of the bit may be 1 when the station supports STR, and the value of the bit may be 0 when the station does not support STR. When the multi-link device transmitting the STR support element includes a first station (STA1), a second station (STA2), and a third station (STA3), the first station (STA1) and the third station (STA3) support STR, and the second station (STA2) does not support STR, the STR support element may include a field having 1011b. It is assumed that stations operating in different frequency bands support STR, and the STR support element may omit signaling indicating whether STR is supported between the stations operating in different frequency bands. For example, the first station (STA1) operates in a first link of 2.4 GHz, and the second station (STA2) and the third station (STA3) operate in a second link and a third link of 5 GHZ, respectively. The STR support element may indicate that STR is supported between the second station (STA2) and the third station (STA3) by using 1 bit. Further, the STR support element may include only 1 bit when the number of stations signaled by the STR support element is 2.

In a detailed embodiment, the relation between the link located in 2.4 GHZ and the link located in 5 GHz or 6 GHz among the links of the multi-link device may be always determined to STR. Accordingly, signaling for STR of the link located in 2.4 GHz and the link located in 5 GHz or 6 GHz may be omitted.

In the above-described embodiments, an operation of a station of a multi-link device may be replaced with an operation of a multi-link device. In addition, in the above-described embodiments, an operation of an AP may be replaced with an operation of a non-AP station, and an operation of a non-AP station may be an operation of an AP. Accordingly, an operation of an AP of a non-STR multi-link device may be replaced with an operation of a non-AP station of a non-STR multi-link device, and an operation of a non-AP station of an STR multi-link device may be replaced with an operation of an AP of an STR multi-link device. In addition, an operation of a non-AP station of a non-STR multi-link device may be replaced with an operation of an AP of a non-STR multi-link device and an operation of an AP of an STR multi-link device may be replaced with an operation of a non-AP station of an STR multi-link device.

Figure 11:
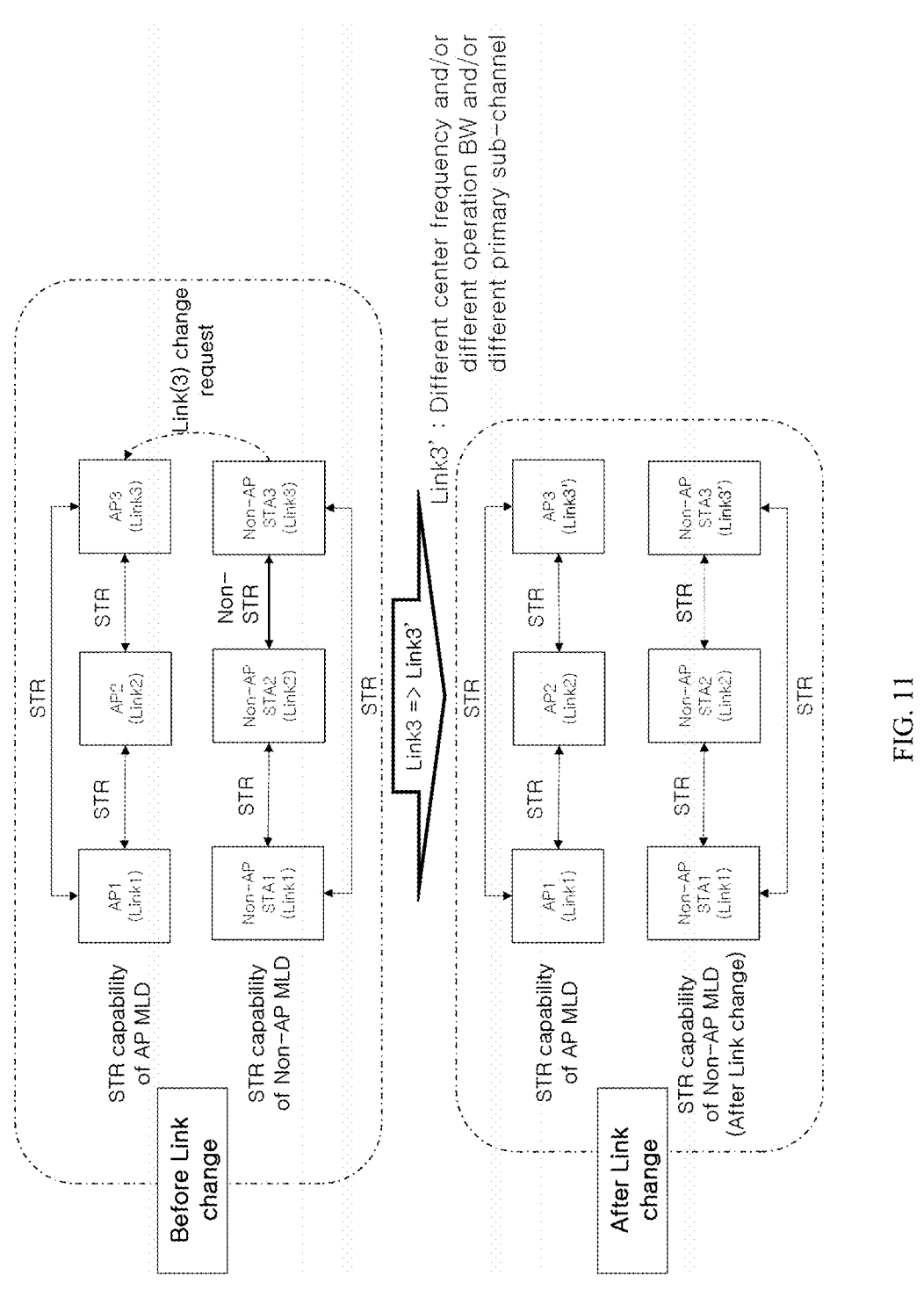
FIG. 11 illustrates an operation of a multi-link device when a link is changed according to an embodiment of the disclosure.

FIG. 11 illustrates an operation of the multi-link device when a link is changed according to an embodiment of the disclosure.

When a frequency band of a link is changed, the STR support element may be changed. As described above, this is because whether STR is supported by the station may vary depending on the distance between frequency bands of the links, and when the frequency band of the link is changed, whether STR is supported by the station may be changed. The change in the frequency band of the link may include at least one of a change in the central frequency, a change in a bandwidth of the frequency band, and a main channel of 200 MHz. The AP and the station may exchange the STR support element through a request and a response. In another detailed embodiment, when the frequency band of the link is changed, the STR support element may be exchanged without any separate request. Further, in the above-described embodiments, the change in the frequency band of the link may include a change in an operating channel of the station.

When the station of the non-AP multi-link device cannot perform STR, the station of the non-AP multi-link device may make a request for changing the link to the AP. Specifically, the station of the non-AP multi-link device may make a request for changing at least one of the central frequency, the bandwidth of the frequency band, and the main channel of 20 MHz. The link change request may be transmitted to the AP through the link requested to be changed. In another detailed embodiment, the link change request may be transmitted to the AP through a link which is not requested to be changed. At this time, the link change request may include information indicating the link requested to be changed. The information indicating the link may be a number for identifying the link. In such embodiments, the change in the link may be a change in an operating channel within one frequency band. Further, the change in the link may include information on a method of changing the link. Specifically, the link change request may indicate whether to move the central frequency of the link to a frequency higher than the current central frequency or move the central frequency of the link to a frequency lower than the current central frequency. In another detailed embodiment, the link change request may implicitly indicate a change to a frequency band farther from an adjacent link. Further, the link change request may indicate a decrease in the bandwidth. The link change request may be a request for changing the location of the main channel. Specifically, the link change request may indicate a change in the location of the main channel to a channel of a frequency band lower than the location of the main channel or a channel of a frequency band higher than the location of the main channel. The AP receiving the link change request may change the link according to the link change request. Further, in a detailed embodiment, the AP receiving the link change request may ignore the link change request.

In the embodiment of FIG. 11, the second station (STA2) and the third station (STA3) of the non-AP multi-link device cannot support STR. The non-AP multi-link device makes a request for changing a third link (link3) to the AP multi-link device. The AP multi-link device receiving the link change request changes the operating link of the third AP (AP3). At this time, the third station (STA3) operating in the third link (link3) to be changed may transmit a change request to the third AP (AP3). In another detailed embodiment, the station which does not operate in the third link (link3) may transmit a change request to the AP which does not operate in the third link (link3).

When the AP changes the link, the AP may broadcast information on the link change through a beacon frame. At this time, the information on the link change may include information on the frequency of the link. The information on the frequency of the link may include at least one of changes in the operating bandwidth and the main channel. Further, the information on the link change may include information on a link change time point. In addition, the link change may be completed when a beacon including the information on the link change is transmitted.

In FIG. 11, the link in which the third station (STA3) operates is changed and thus the third station (STA3) and the second station (STA2) may support STR. As described above, the non-AP multi-link device may transmit the STR support element to the AP multi-link device and signal information indicating a change in supporting of STR.

The link change may not be allowed, or STR may not be supported through the link change. As illustrated in the embodiment of FIG. 11, the AP multi-link device may support STR but the non-AP multi-link device may not support STR. This is because it is common to use a relatively expensive device for the AP multi-link device and use a relatively cheap device for the non-AP multi-link device. Accordingly, in communication between multi-link devices, a method of, even when one multi-link device does not support STR, performing efficient communication is needed. At this time, STR may indicate the simultaneously performance of transmission and reception. This will be described with reference to FIG. 12.

Figure 12:
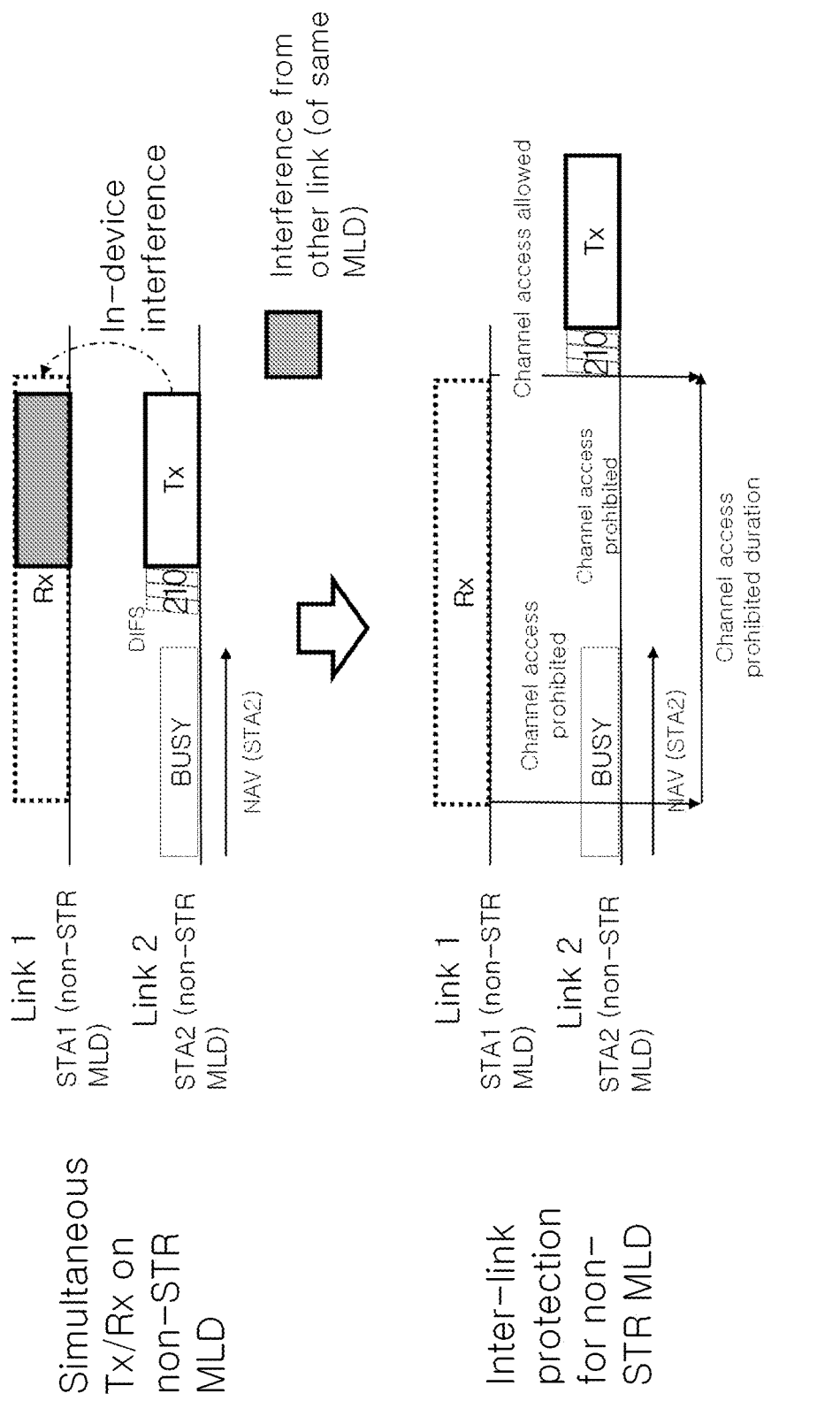
FIG. 12 illustrates prohibition of channel access of another station of a non-STR multi-link device when one station of the non-STR multi-link device performs reception according to an embodiment of the disclosure.

FIG. 12 illustrates that, when reception of one station of the non-STR multi-link device is performed, channel access of another station of the non-STR multi-link device is restricted according to an embodiment of the disclosure.

When transmission by the non-STR multi-link device is performed in one link and reception by the non-STR multi-link device is performed in another link, the reception and the transmission of the non-STR multi-link device may fail. In order to solve the problem, when reception by the non-STR multi-link device is performed in one link, channel access by the non-STR multi-link device in another link may be restricted. Specifically, when reception by the non-STR multi-link device is performed in one link, the backoff of channel access by the non-STR multi-link device in another link may be restricted. Accordingly, when reception by the non-STR multi-link device is performed in one link, the start of transmission by the non-STR multi-link device in another link may be prevented. In a detailed embodiment, when reception by the non-STR multi-link device starts in one link, the backoff of channel access by the non-STR multi-link device in another link may be restricted. It may be configured through a specific bit of the memory such as a channel access restriction flag. Whether to restrict channel access may be shared through the memory within the multi-link device. Through such an embodiment, channel access restriction may be implemented without separate frame exchange. For convenience of description, channel access restriction used in the specification indicates restriction of channel access or transmission in order to protect transmission or reception by the non-STR multi-link device unless there is a separate description.

When channel access is restricted, the station operating in the link in which the channel access is restricted cannot perform a backoff procedure regardless of the NAV and CCA result. Further, when the channel access is restricted, the station operating in the link in which the channel access is restricted cannot perform transmission regardless of the NAV and CCA result. However, even though the channel access is restricted, the station operating in the link in which the channel access is restricted can perform reception. Further, channel access restriction in the second link due to reception performed in the first link may be released based on a time point at which the reception in the first link is completed. Specifically, channel access restriction in the second link due to reception performed in the first link may be released when the reception in the first link is completed. In another detailed embodiment, channel access restriction in the second link due to reception performed in the first link may be released based on a time point at which ACK is transmitted after the reception in the first link is completed. Specifically, channel access restriction in the second link due to reception performed in the first link may be released at the time point at which ACK is transmitted after the reception in the first link is completed. In another detailed embodiment, channel access restriction in the second link due to reception performed in the first link may be released at a time point at which ACK transmission is completed after the reception in the first link is completed. Further, after the channel access restriction is released, the station may immediately reduce the backoff counter without additional sensing. At this time, the additional sensing may indicate sensing performed during a DCF interframe space (DIFS). In another detailed embodiment, when the channel is idle for a predetermined time right before the channel access restriction is released, the station may immediately reduce the backoff counter without additional sensing. At this time, the predetermined time may be one of a PCF interframe space (PIFS), a short interframe space (SIFS), and an arbitration interframe space (AIFS).

In the embodiment of FIG. 12, the non-STR multi-link device includes the first station (STA1) operating in the first link (link1) and the second station (STA2) operating in the second link (link2). When the second station (STA2) performs transmission in the second link (link2) while the first station (STA1) performs reception, intra-device interference is generated. As described above, channel access by the second station (STA2) performed in the second link (link2) is restricted while the first station (STA1) operating in the first link (link1) performs reception. After reception by the first station (STA1) in the first link (link1) is completed, channel access restriction is released. Right after the channel access restriction is released, the second station (STA2) may reduce a value of the previous backoff counter by 1 from 3 to 2 without additional sensing.

For convenience of expression, a single block (Tx solid line, Rx dotted line) is used to express Rx and Tx in the drawing used by FIG. 12, and it may be understood that the single block expresses an operation including Tx/Ack reception and Rx/Ack transmission even though a separate Ack block is not illustrated. This may be equally applied to the following drawings.

When the station identifies that a received PPDU is not a receiver intended by the station, the station may stop reception of the PPDU. In this case, the operation of releasing channel access prohibition by the multi-link device is a problem. The intended receiver in the specification is used to have the same meaning as a destination station.

Figure 13:
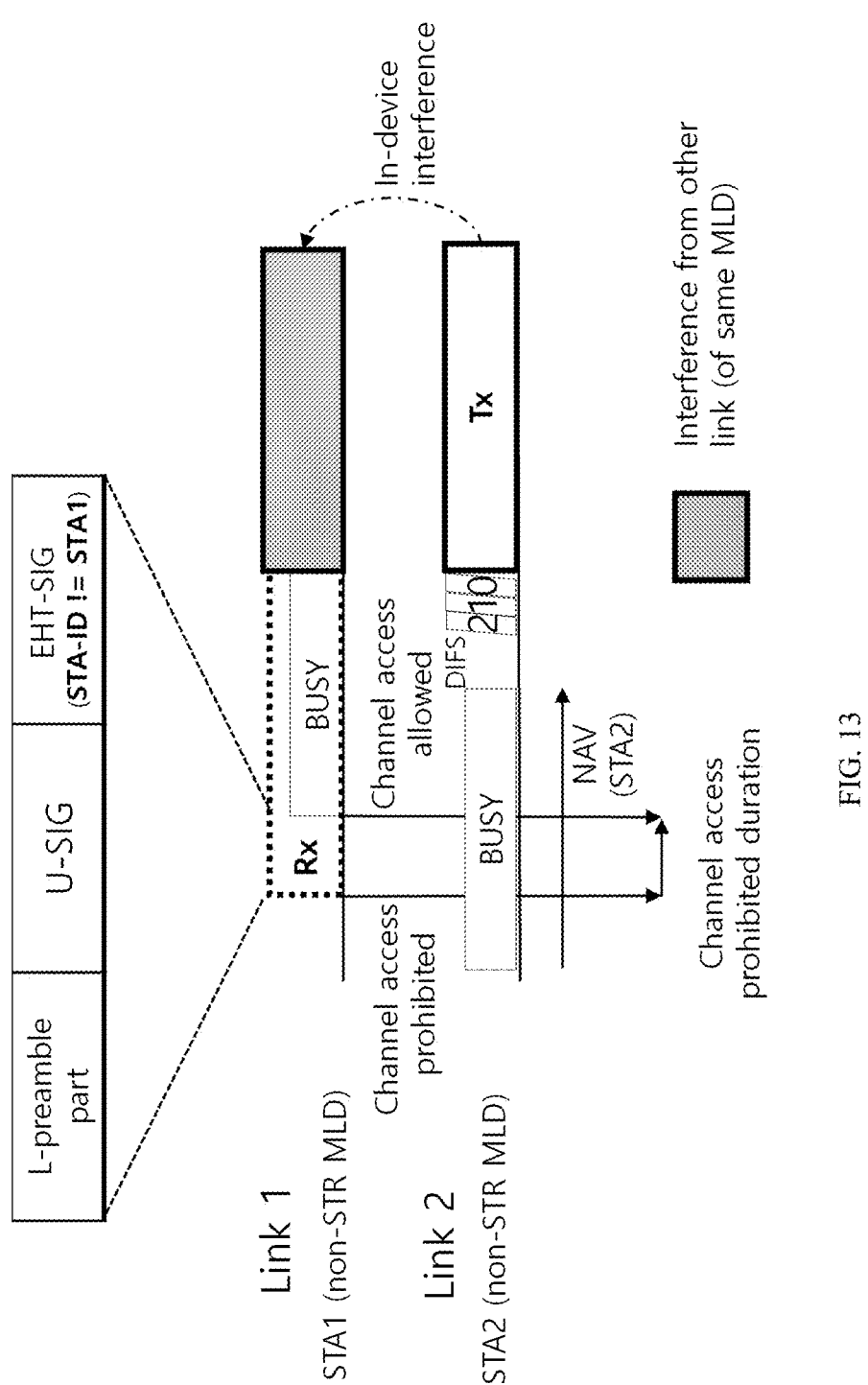
FIG. 13 illustrates an operation of releasing channel access prohibition when it is identified that an intended receiver of a PPDU received by the station of the non-STR multi-link device is not the station.

FIG. 13 illustrates the operation of releasing the channel access prohibition when it is identified that an intended receiver of a PPDU received by the station of the non-STR multi-link device is not the station according to an embodiment of the disclosure.

When the station identifies that the received PPDU is not the receiver intended by the station, the station may release channel access prohibition. The station may determine whether the station is the intended receiver of the PPDU based on information indicating a receiver address of a signaling field of the PPDU. At this time, the information indicating the receiver address of the signaling field of the PPDU may be a value of the STA-ID field of the EHT-SIG field. Specifically, the station may determine whether the STA-ID field of the EHT-SIG field indicates the station. Further, the station may determine whether the station is the intended receiver of the PPDU based on a value of an RA field of a MAC frame included in the PPDU. Specifically, the station may determine whether the RA field of the MAC frame included in the PPDU indicates the station. In FIG. 13, the non-STR multi-link device includes the first station (STA1) operating in the first link (link1) and the second station (STA2) operating in the second link (link2). The first station (STA1) receives the PPDU. The first station (STA1) determines that the intended receiver of the received PPDU is not the first station (STA1) and stops receiving the PPDU. At this time, the first station (STA1) may release channel access prohibition of the second station (STA2). Even though the channel access prohibition of the second station (STA2) is released, channel access of the second station (STA2) may be delayed according to NAV configured in the second station (STA2).

As illustrated in FIG. 13, even though the channel access prohibition is released, the station included in the non-STR multi-link device may not have the channel access opportunities more frequently than the station which is not included in the multi-link device or the station included in the STR multi-link device. Accordingly, for fair competition with other stations, a method of guaranteeing the channel access opportunities of the station included in the non-STR multi-link device may be needed. For example, after releasing the channel access prohibition, the station of which channel access is prohibited may be allowed to reduce the backoff counter by 2 or more. This will be described with reference to FIG. 14.

Figure 14:
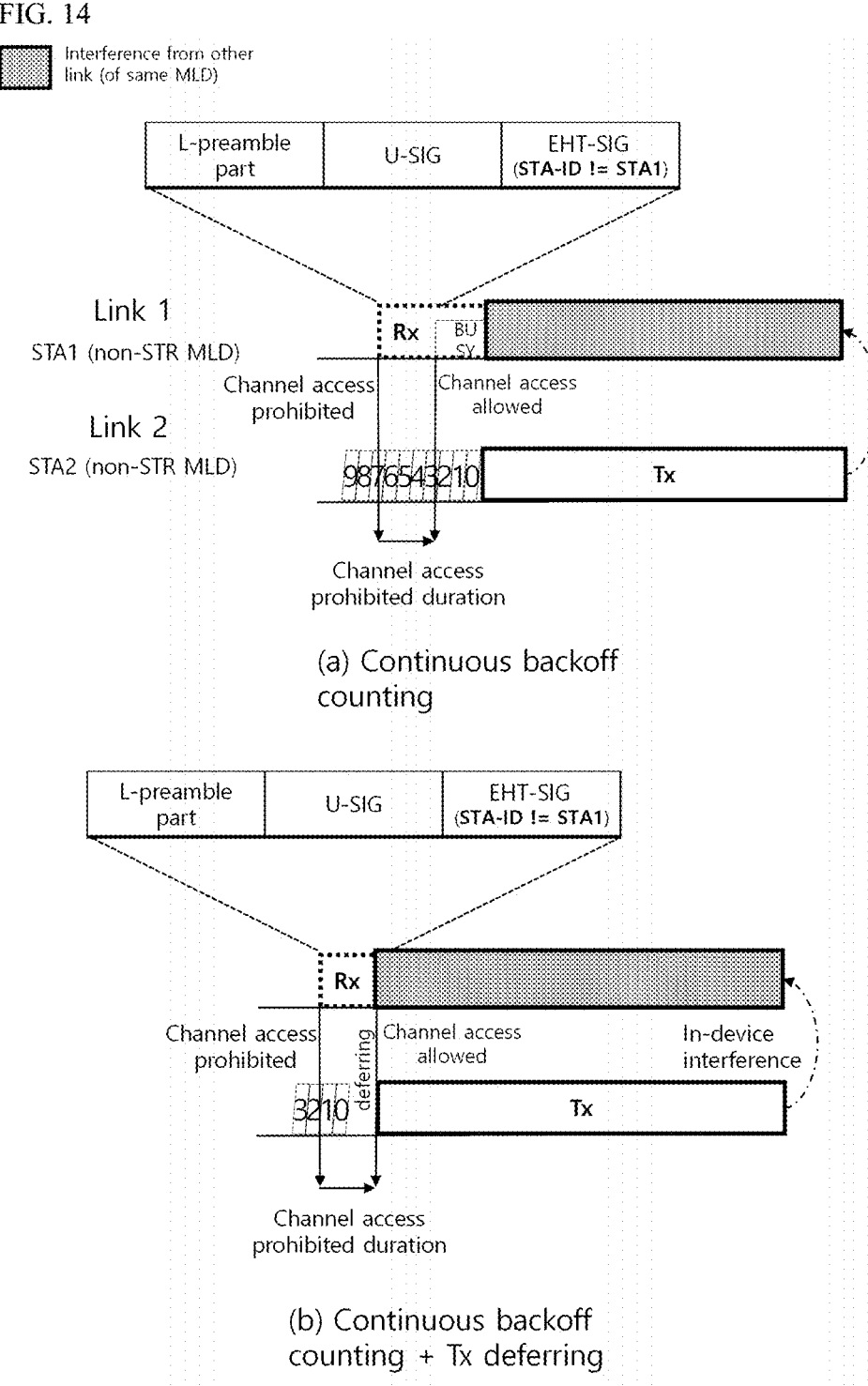
FIG. 14 illustrates the performance of channel access by the station after channel access prohibition is released according to an embodiment of the disclosure.

FIG. 14 illustrates the performance of channel access by the station after channel access prohibition is released according to an embodiment of the disclosure.

The station of which channel access prohibition is released may reduce the backoff counter by 2 or more after the channel access prohibition is released. This is to have balance of channel access opportunities with other stations since other stations perform the backoff procedure while the channel access of the station is prohibited.

In another detailed embodiment, the station of which channel access is prohibited may perform a channel access procedure of reducing CCA (CSMA) and the backoff counter while the channel access is prohibited. In FIG. 14, the non-STR multi-link device includes the first station (STA1) operating in the first link (link1) and the second station (STA2) operating in the second link (link2). In FIG. 14, channel access of the second station (STA2) is prohibited while the first station (STA1) performs reception. In FIG. 14(*a*), the second station (STA2) may perform a channel access procedure of reducing CCA (CSMA) and the backoff counter while the channel access of the second station (STA2) is prohibited. In FIG. 14(*a*), since the channel of the second link (link2) is idle while the channel access of the second station (STA2) is prohibited, the second station (STA2) reduces the backoff counter.

Further, the station of which channel access is prohibited may delay transmission without starting transmission even though the backoff counter reaches 0 while the channel access is prohibited. At this time, the station may maintain the value of the backoff counter as 0. Further, although the station delays transmission, the station may maintain the value of CW. Accordingly, it is differentiated from doubling of the value of the CW by the station since the channel accessed by the station is busy. This is because the reason of delayed transmission is not the case in which it is determined that the channel is being used. In FIG. 14(*b*), the second station (STA2) may perform a channel access procedure of reducing CCA (CSMA) and the backoff counter while the channel access of the second station (STA2) is prohibited. In FIG. 14(*b*), since the channel of the second link (link2) is idle while the channel access of the second station (STA2) is prohibited, the second station (STA2) reduces the backoff counter. The backoff counter of the second station (STA2) reaches 0 while the channel access of the second station (STA2) is prohibited. The second station (STA2) delays transmission and starts transmission after the channel access prohibition is released.

As described above, the channel access prohibition may include prohibition of transmission of the second station when the first station of the non-STR multi-link device performs transmission. Further, the channel access prohibition may include prohibition of transmission of the second station when the first station of the non-STR multi-link device performs reception.

When the number of stations of which channel access is prohibited is plural in embodiments of FIG. 14(*b*), the probability of attempt of simultaneous release of channel access prohibition of the plurality of stations and simultaneous transmission of the plurality of stations is high. Accordingly, a method of reducing a transmission collision probability is needed. This will be described with reference to FIG. 15.

Figure 15:
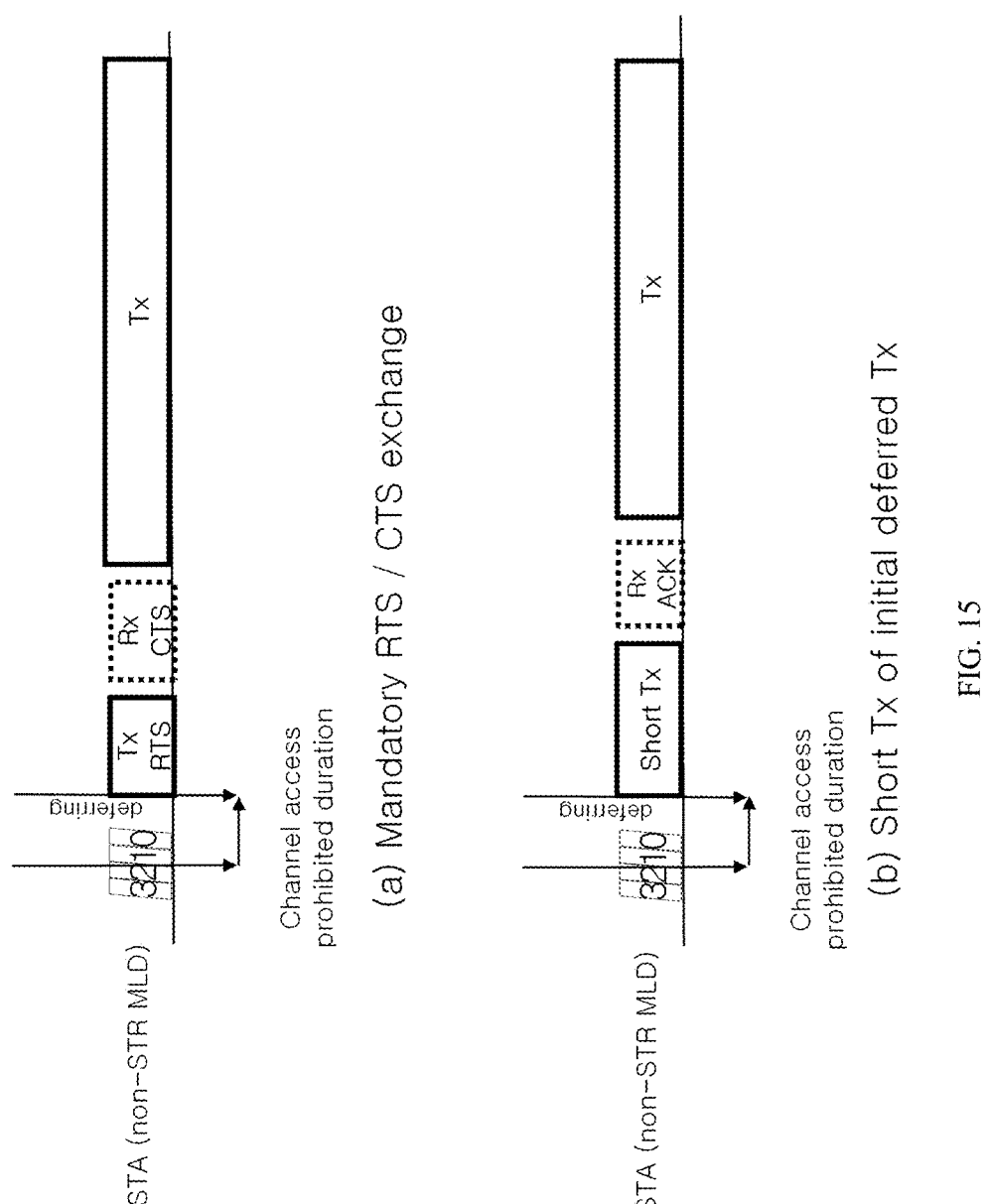
FIG. 15 illustrates an operation in which the station performs transmission after channel access prohibition is released according to an embodiment of the disclosure.

FIG. 15 illustrates an operation in which the station performs transmission after the release of channel access prohibition according to an embodiment of the disclosure.

As described above, transmission is performed in the first link among the plurality of links in which the non-STR multi-link device operates, and thus transmission may be prohibited in the second link. When the corresponding transmission is completed in the first link, transmission in the second link may start by RTS/CTS frame exchange. Accordingly, when transmission is performed in the first link among the plurality of link in which the non-STR multi-link device operates, the non-STR multi-link device may start the RTS/CTS frame exchange in the second link. After the release of channel access prohibition of the station of which transmission is delayed due to channel access prohibition, the station may start request to send (RTS)/clear to send (CTS) frame exchange before starting delayed transmission. At this time, when the station does not receive the CTS frame, the delayed transmission may not start. In the embodiment of FIG. 15(*a*), the station of which transmission is delayed due to channel access prohibition transmits the RTS frame before starting delayed transmission. The station starts delayed transmission after receiving the CTS frame in response to the RTS frame.

In another detailed embodiment, after channel access prohibition of the station of which transmission is delayed due to channel access prohibition is released, the station may transmit a frame including only some of the delayed transmission. At this time, after receiving a response to the frame including only some of the delayed transmission, for example, ACK, the station may transmit the part of the delayed transmission which has not been transmitted. When the station does not receive the response to the frame including only some of the delayed transmission, the station may not transmit the part of the delayed transmission which has not be transmitted. As described above, the station starts the RTS/CTS exchange or transmits only some of the delayed transmission by the station after the channel access prohibition is released because a collision probability of transmission after the channel access prohibition may be higher than that of general transmission. Accordingly, the above-described embodiment may be mandatorily applied to transmission performed after the release of channel access prohibition. In the conventional WLAN operation, the RTS/CTS frame was used to solve the hidden node problem and could be used based on the size of transmission data. In the above-described embodiments, the RTS/CTS frame is to prevent transmission collision with the station to perform delayed transmission in order to protect transmission or reception of the non-STR multi-link device.

As described above, when one station of the non-STR multi-link device performs reception, transmission of another station of the non-STR multi-link device may be restricted. Further, when one station of the non-STR multi-link device performs transmission, it may be difficult to accurately sense a channel state of a link in which another station of the non-STR multi-link device operates. Specifically, when the first station of the non-STR multi-link device performs transmission, the second station of the non-STR multi-link device may determine that a channel state of a link in which the second station operates is always busy. Accordingly, even though the channel of the link in which the second station operates is idle, the second station may determine that the channel is busy due to intra-device interference. As described above, when the station of which the channel state cannot be determined due to intra-device interference or when one station of the non-STR multi-link device continuously performs transmission, another station of the non-STR multi-link device is in a blind state. Due to the above-described situations, the station in the blind state may have difficulty in attempting transmission through the backoff procedure. Further, due to the above-described situations, the station in the blind state may have difficulty in starting reception of the PPDU or succeeding in decoding. Accordingly, a method of performing transmission in consideration of the station in the blind state is needed. This will be described with reference to FIG. 16.

Figure 16:
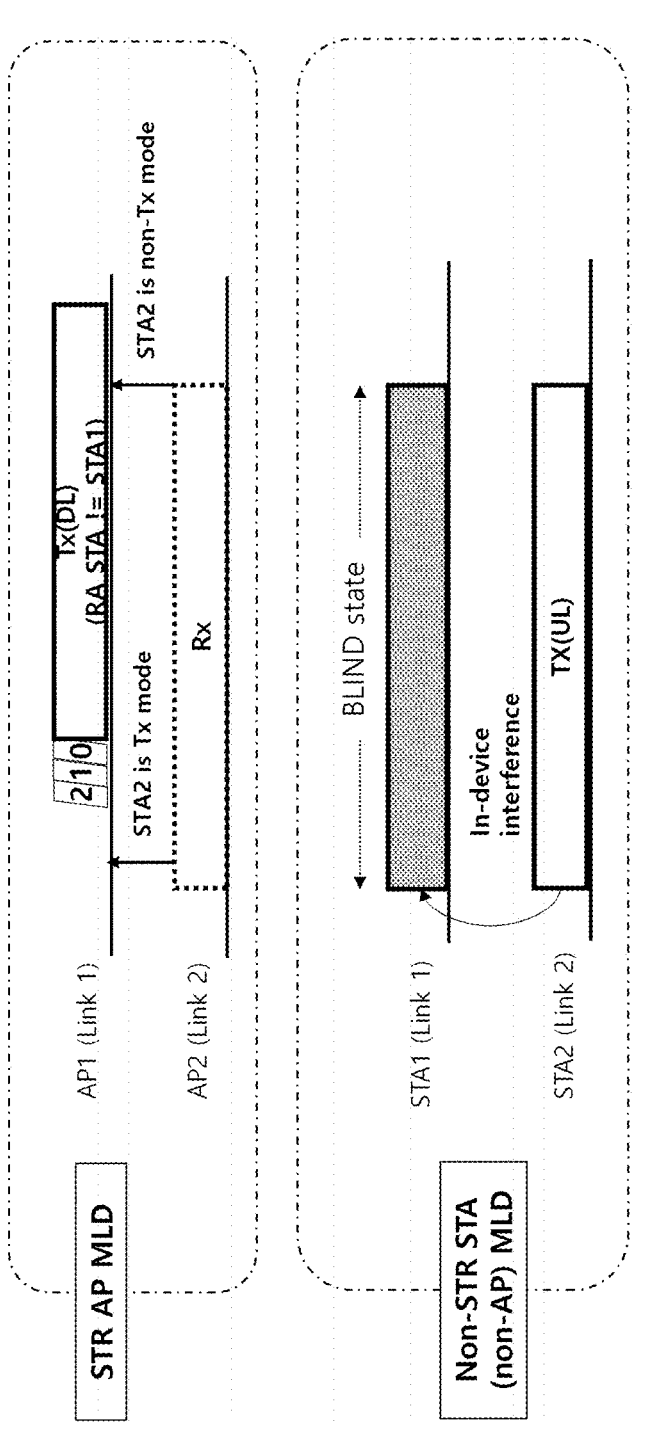
FIG. 16 illustrates transmission performed based on a state of the station within the non-STR multi-link device according to an embodiment of the disclosure.

FIG. 16 illustrates transmission performed based on a state of a station within the non-STR multi-link device according to an embodiment of the disclosure.

The station to perform transmission to the station of the non-STR multi-link device may determine whether to perform transmission according to whether the station of the non-STR multi-link device is in the blind state. At this time, the station to perform transmission to the station of the non-STR multi-link device may be a station included in the STR multi-link device. Further, the station to perform transmission to the station of the non-STR multi-link device may be an AP included in the AP multi-link device, and the non-STR multi-link device may be a non-AP multi-link device The station to perform transmission to the station of the non-STR multi-link device may determine whether the station of the non-STR multi-link device is in the blind state based on the following description. The station to perform transmission may determine whether another station of the multi-link device including the station is performing transmission to the corresponding non-STR multi-link device. When another station of the multi-link device including the station is performing reception from the corresponding non-STR multi-link device, the station may determine that the station of the non-STR multi-link device to receive transmission of the station is in the blind state. In the embodiment of FIG. 16, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). The second station (STA2) is performing transmission to the second AP (AP2). Accordingly, the second AP (AP2) may inform the first AP (AP1) that reception is being performed from the second station (STA2). Specifically, the second AP (AP2) may inform the first AP (AP1) that the entity of transmission to the second AP (AP2) is the second station (STA2). In another detailed embodiment, the second AP (AP2) may inform the first AP (AP1) that the second station (STA2) currently performs transmission. At this time, the first AP (AP1) may determine that the first station (STA1) is in the blind state based on the notification.

Stations within a multi-link device can operate via a common MAC. Therefore, the information exchange between AP1 and AP2 described above may not be performed explicitly.

That station may not perform transmission to the station in the blind state. This is because there is high probability that the station in the blind state cannot start reception or the station in the blind state cannot decode the PPDU even though transmission is performed to the station in the blind state. At this time, the station may cancel transmission to the station in the blind state and may perform transmission to another station.

When the STR multi-link device performs transmission to the non-STR multi-link device, the STR multi-link device may perform transmission to the non-STR multi-link device in a plurality of links. Specifically, when the STR multi-link device performs transmission to the non-STR multi-link device in the first link, the STR multi-link device may start transmission to the non-STR multi-link device in the second link. At this time, the STR multi-link device may determine the length of transmission performed in the second link based on the transmission corresponding to transmission to the non-STR multi-link device. Specifically, the STR multi-link device may determine the length of transmission to the non-STR multi-link device in the second link based on the length of the transmission to the non-STR multi-link device in the first link. In a detailed embodiment, the STR multi-link device may simultaneously end the transmission in the first link and the transmission in the second link. This is to prevent transmission to another station of the non-STR multi-link device while one of the stations of the non-STR multi-link device transmits a response, for example, ACK after transmission to one of the stations of the non-STR multi-link device first ends. Through the above-described embodiment, a plurality of stations of the non-STR multilink device may simultaneously transmit responses to transmission to the plurality of stations.

The STR multi-link device cannot determine states of the stations included in the non-STR multi-link device in real time. Accordingly, even though the STR multi-link device operates according to the embodiments described with reference to FIG. 16, interference or transmission collision may be generated between links in which the non-STR multi-link device operates. For example, in the embodiment of FIG. 16, the first AP (AP1) may start transmission to the first station (STA1) before recognizing that the second station (STA2) is performing transmission to the second AP (AP2). As described above, a probability of inter-link interference or collision may be higher than a probability of intra-link interference or transmission collision. This will be described in more detail with reference to FIG. 17.

FIG. 17 illustrates a situation in which inter-link interference or collision is generated.

When transmission to the second AP of the STR AP multi-link device by the second station of the non-STR station multi-link device and transmission to the first station of the non-STR multi-link device by the first AP of the STR AP multi-link device simultaneously start, transmission collision may be generated between links. FIG. 17(*a*) illustrates the same. This is because, as described above, the STR multi-link device cannot determine the states of the stations included in the non-STR multi-link device in real time.

Further, even when transmission to the second AP of the STR AP multi-link device by the second station of the non-STR multi-link device starts earlier than transmission to the first station of the non-STR multi-link device by the first AP of the STR-AP multi-link device, transmission collision may be generated between links. FIG. 17(*b*) illustrates the same. This is because it takes time for the second AP (AP2) to inform the first AP (AP1) that the second station (STA2) is performing transmission. As described above, since transmission collision is generated between stations starting transmission at different time points, the probability of inter-link interference or transmission collision may be higher than the probability of intra-link interference or collision. Further, as the time spent for identifying a transmitter of the PPDU received by the AP of the STR multi-link device is delayed, the probability of interference or transmission collision between links may be higher. Accordingly, a method of solving the problem is needed. When one of the stations of the STR multi-link device performs reception, another station of the STR multi-link device may not perform channel access. However, when the channel access is prohibited, the meaning of implementation of the STR function may disappear. Accordingly, an operation method other than the channel access prohibition of the STR multi-link device is required. This will be described with reference to FIG. 18.

As described above, it may be important for a multi-link device to promptly determine a station performing transmission to the multi-link device. A user field of EHT-SIG of an EHT UL PPDU may indicate an identifier (STA-ID) of a station transmitting the EHT UL PPDU. Specifically, when a DL/UL field of a signaling field of an EHT PPDU indicates that the EHT PPDU is a UL PPDU, the user field of EHT-SIG of the EHT PPDU may indicate an identifier of a station transmitting the EHT UL PPDU. A multi-link device receiving the EHT PPDU may identify a station transmitting the EHT PPDU, based on the user field of EHT-SIG of the EHT UL PPDU. Through this, an AP multi-link device may determine the station transmitting the EHT UL PPDU, and the AP multi-link device may determine a transmission destination device. Specifically, the AP multi-link device may determine whether there is high possibility that transmission to be performed fails due to an inter-link conflict. In addition, if there is high possibility that transmission to be performed by the AP multi-link device fails, the AP multi-link device may delay the transmission to be performed, and perform another transmission.

Figure 18:
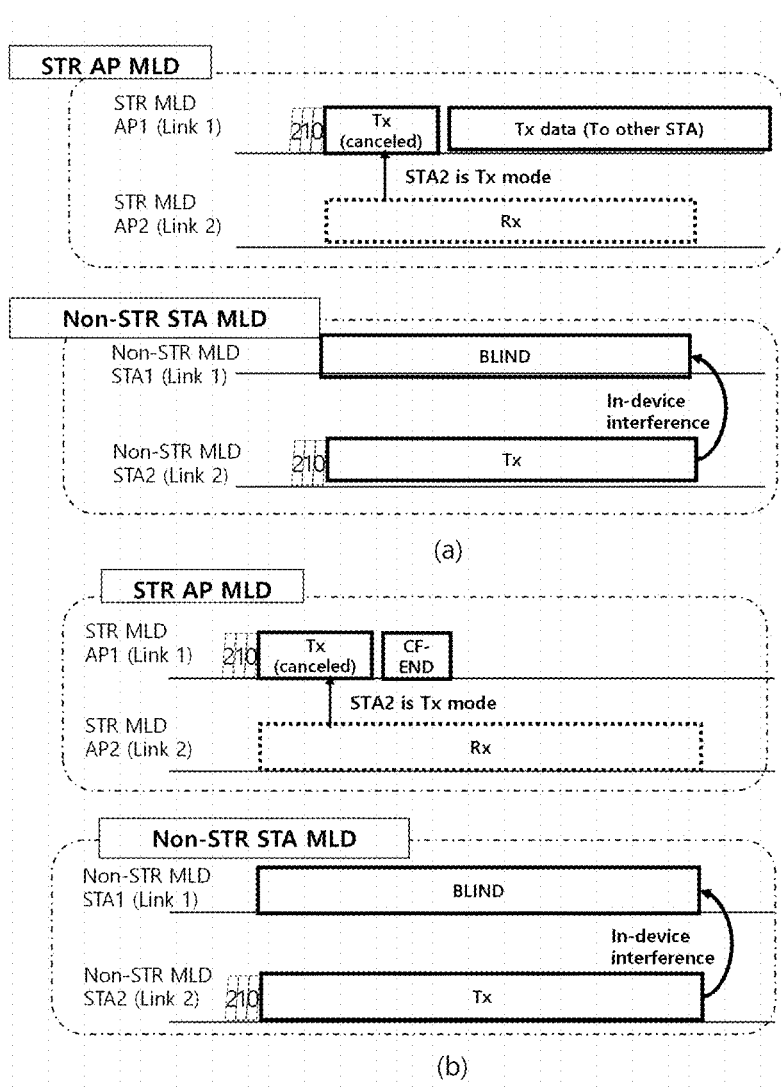
FIG. 18 illustrates an operation in which the STR multi-link device stops transmission to the non-STR multi-link device according to an embodiment of the disclosure.

FIG. 18 illustrates an operation in which the STR multi-link device stops transmission to the non-STR multi-link device according to an embodiment of the disclosure.

When the station of the STR multi-link device determines that the station of the non-STR multi-link device is in the blind state during transmission to the station of the non-STR multi-link device, the STR multi-link device may stop transmission to the station of the non-STR multi-link device in the blind state. Specifically, the STR multi-link device may determine whether the station of the non-STR multi-link device is in the blind state based on a value indicated by an STA (AID)-ID in a signaling field of the received PPDU or a transmitting address (TA) field of a MAC frame included in the received PPDU. At this time, the STA-ID may be a value indicating the station transmitting a UL PPDU. In a detailed embodiment, when the value indicated by the STA (AID)-ID in the signaling field of the received PPDU indicates the first station included in the non-STR multi-link device, the STR multi-link device may determine that the second station included in the non-STR multi-link device is in the blind state. Further, when the TA field of the MAC frame included in the received PPDU indicates the first station included in the non-STR multi-link device, the STR multi-link device may determine that the second station included in the non-STR multi-link device is in the blind state. Specifically, when a station having transmitted the PPDU, indicated by the signaling field of the PPDU, is the first station, or a TA field of the MAC frame included in the PPDU is the first station, the STR multi-link device may determine that the second station included in the non-STR multi-link device is in a blind state. Accordingly, the STR multi-link device may identify that a station of the non-STR multi-link device performs transmission, and determine that another station of the non-STR multi-link device is in a blind state. An operation of the station after cancelling of transmission is first described.

When a TXOP configured in the station of the non-STR multi-link device is left, the station cancelling the transmission to the station of the non-STR multi-link device may attempt transmission to a station different from the station of the non-STR multi-link device. At this time, the station cancelling the transmission to the station of the non-STR multi-link device may perform transmission to the station different from the station of the non-STR multi-link device without a separate backoff procedure. In a detailed embodiment, when it is detected that a channel is idle during a predetermined time interval without a separate backoff procedure after transmission to the station of the non-STR multi-link device is cancelled, the station cancelling the transmission to the station of the non-STR multi-link device may perform transmission to the station different from the station of the non-STR multi-link device. At this time, the predetermined time interval may be one of SIFS, PDIF, and DIFS.

When performing transmission to the station different from the station of the non-STR multi-link device, the station cancelling the transmission to the station of the non-STR multi-link device may transmit traffic having a priority equal to or higher than that of traffic of the cancelled transmission. This is because, transmission of traffic having the priority lower than that of traffic used for channel access for the cancelled transmission is not fair. In the above-described embodiments, the station of the STR multi-link device may be an AP.

The station cancelling transmission to the station of the non-STR multi-link device may initialize the configured TXOP. Specifically, the station cancelling the transmission to the station of the non-STR multi-link device may transmit a CF-End frame after cancelling the transmission. It may allow another station operating in the link in which transmission is scheduled to use the link.

In FIG. 18, the STR AP multi-link device includes the first AP (AP1) operating in the first link (link1) and the second AP (AP2) operating in the second link (link2). The non-STR non-AP multi-link device includes the first station (STA1) operating in the first link (link 1) and the second station (STA2) operating in the second link (link2). The second station (STA2) is performing transmission to the second AP (AP2). The first AP (AP1) determines that the first station (STA1) is in the blind state during transmission to the first station (STA1). Accordingly, the first AP (AP1) stops transmission to the first station (STA1). In FIG. 18(*a*), after stopping transmission to the first station (STA1), the first AP (AP1) performs transmission to a station different from the first station (STA1) as mentioned in the first described embodiment. In FIG. 18(*b*), after stopping transmission to the first station (STA1), the first AP (AP1) transmits a CF-END frame as mentioned in the later described embodiment.

When the station stops transmission, the station may transmit a fragment, which is being transmitted, and then may not transmit the following fragment. In a detailed embodiment, the station may immediately stop transmission of a packet which is being transmitted.

In the above-described embodiments, when stopping transmission to the station of the non-STR multi-link device in the blind state and performing transmission to the station different from the station of the non-STR multi-link device, the STR multi-link device is required to inform another station that transmission to another station can be performed for stable reception thereof. A method therefor is described. For convenience of description, a station different from the station of the non-STR multi-link device in the blind state is referred to as a different station.

The station of the STR multi-link device may insert an address of the different station into the MAC frame. Specifically, the station of the STR multi-link device may insert an address of an intended receiver of the MAC frame into a receiving address (RA) of the MAC frame and insert an address of the different station into a separate field. In a detailed embodiment, the station of the device may insert the address of the different station into EHT-SIG. Specifically, the station of the STR multi-link device may insert the address of the intended receiver of the PPDU and the address of the different station into a user field of the signaling field of the PPDU. At this time, the address of the different station may be inserted after the address of the intended receiver of the PPDU in the user field of the signaling field of the PPDU. In another detailed embodiment, the station may monitor reception of the PPDU during a predetermined time after recognizing that the intended receiver of the PPDU is not the station. Specifically, the station may monitor whether PPDU reception continues for a predetermined time after recognizing that the intended receiver of the received PPDU is not the station. Accordingly, the station may determine whether to stop transmission of the PPDU and start transmission to the station. In the embodiments, when it is determined that PPDU transmission continues for a predetermined time, the station may enter a doze state. When it is determined that the PPDU transmission does not continue for the predetermined time, the station may maintain a wake-up state. At this time, when the station receives a new PPDU, the station may decode the PPDU.

In another detailed embodiment, the station transmitting the PPDU may insert information signaling that PPDU transmission can be stopped into the PPDU. The information signaling that the PPDU transmission can be stopped may be a sub field of 1 bit. For example, when a value of the sub field signaling that PPDU transmission can be stopped is 1, the station receiving the PPDU may determine that the PPDU transmission can be stopped before a time point indicated by a length field of the signaling field of the PPDU and a duration field of the MAC frame. When the station determines that the PPDU transmission can be stopped before a time point indicated by a length field of the signaling field of the PPDU and a duration field of the MAC frame, the station may postpone entering into the doze state. Further, the station transmitting the PPDU may insert the information signaling that the transmission can be stopped into a reserved field of the PPDU.

As described above, it is possible to prevent unnecessary channel occupation through transmission cancel or transmission stop.

When transmission is stopped or delayed due to transmission collision between links, a value of CW used for channel access may be doubled like general transmission failure. When transmission is stopped or delayed due to transmission collision between links, a value of CW used for channel access may not be doubled unlike general transmission failure. That is, the station may maintain the value of CW used for channel access. Doubling the value of CW is to reduce the probability of transmission collision by increasing a range of numbers which can be the value of backoff counter. When the station can be clearly recognize transmission collision between links, such a need may be low. Further, when transmission is stopped or delayed due to transmission collision between links, doubling of a value of CW by the station may delay the transmission. However, when inter-link transmission collision and intra-link collision are simultaneously generated, the station needs to double the value of CW. This will be described with reference to FIG. 19.

Figure 19:
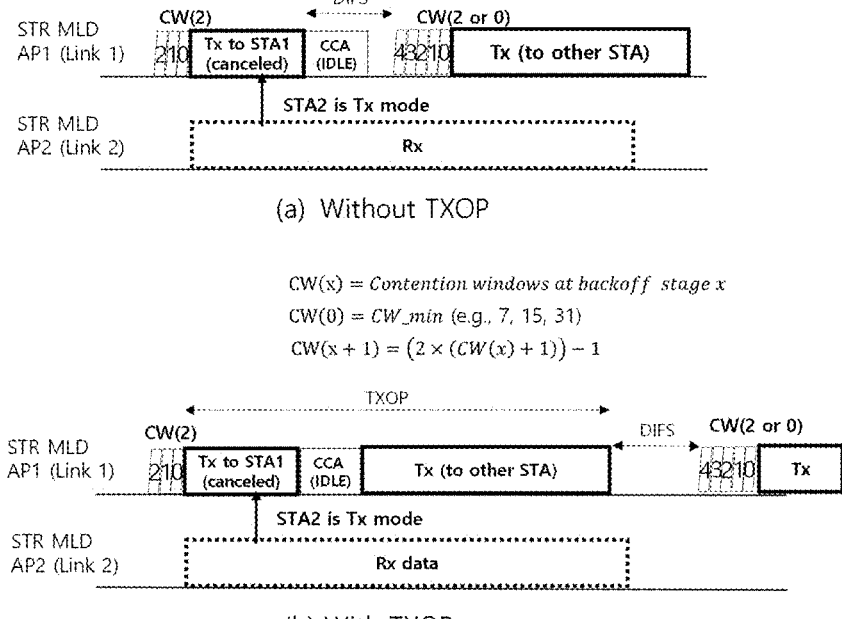
FIG. 19 illustrates processing of a value of a CW when the STR multi-link device recognize transmission collision between links according to an embodiment of the disclosure.

FIG. 19 illustrates processing of the value of CW when the STR multi-link device recognizes transmission collision between links according to an embodiment of the disclosure.

As described in the embodiments, when the station cancels transmission due to transmission performed by the non-STR multi-link device, the station may sense the channel state after cancelling the transmission. When it is sensed that the channel is not idle, the station may double the value of CW. At this time, doubling may follow the embodiment described with reference to FIG. 6. Further, when it is sensed that the channel is idle, the station may maintain the value of CW. The embodiment is to, since the possibility of transmission collision within the link is low even though it is sensed that the channel is idle, handle the case to be different from transmission success. Specifically, when an AP of an AP multi-link device fails to perform transmission to a station of the non-STR multi-link device, the AP of the AP multi-link device may not increase a CW and acquire a backoff counter within the CW. In this case, the non-STR multi-link device of the AP multi-link device fails to perform transmission for a first station and a second station of the non-STR multi-link device performs transmission, the AP of the AP multi-link device may not increase a CW and acquire a backoff counter within the CW. As described above, the AP multi-link device may determine whether the second station of the non-STR multi-link device performs transmission, based on a PPDU transmission station indicated by a signaling field of a PPDU or a station indicated by a TA field of a MAC frame included in the PPDU. In the above-described embodiments, when EDA is applied, procedures of CW adaptation and backoff counter generation may be performed for each AC.

In another specific embodiment, the STR multi-link device may determine whether PPDU transmission has failed, based on whether a response to a PPDU has been received. In this case, the STR multi-link device may not consider whether a station receiving a PPDU is included in the non-STR multi-link device. For example, even in a case where a first station receiving a PPDU is included in a non-STR multi-link device and the first station cannot transmit a response to the PPDU because a second station of the corresponding non-STR multi-link device performs transmission, the STR multi-link device may determine that PPDU transmission has failed. In addition, when the PPDU transmission of the STR multi-link device has failed, the STR multi-link device may increase a value of the CW to the next largest value among values of the CW. When the value of the CW is a maximum value, the STR multi-link device may maintain the value of the CW as the same value.

In another detailed embodiment, when it is sensed that the channel is idle, the station may configure the value of CW as a minimum value (CW_min) of CW. The embodiment is to, since the possibility of transmission collision within the link is low when it is sensed that the channel is idle, handle the case to be the same as transmission success. The station may apply the above-described embodiments to CW of the AC of traffic included in the cancelled transmission.

Further, when the transmission is cancelled according to the above-described embodiments, the station may not increase a retry counter. At this time, the retry counter may include at least one of a long retry counter and a short try counter.

In the embodiment, cancelling transmission may include at least one of stopping transmission or delaying transmission before starting the transmission.

When the station cancels transmission after transmitting a CTS-to-Self frame before attempting the transmission, the station may not start RTS/CTS frame exchange before attempting the transmission after cancelling the transmission. This is because NAV is configured through the CTS-to-Self frame. Further, when a TXOP is left when the station attempts transmission again after cancelling the transmission, the station may attempt the transmission without any backoff procedure.

In FIG. 19, the STR AP multi-link device includes the first AP (AP1) operating in the first link (link1) and the second AP (AP2) operating in the second link (link2). The non-STR multi-link device includes the first station (STA1) operating in the first link (link 1) and the second station (STA2) operating in the second link (link2). The second station (STA2) is performing transmission to the second AP (AP2). The first AP (AP1) determines that the first station (STA1) is in the blind state during transmission to the first station (STA1). Accordingly, the first AP (AP1) stops transmission to the first station (STA1). In FIG. 19(a), the first AP (AP1) determines that the channel of the first link (link 1) is idle. At this time, since the TXOP is not left, the first AP (AP1) accesses the channel through the backoff procedure. In FIG. 19(b), the first AP (AP1) determines that the channel of the first link (link1) is not idle. At this time, since the TXOP is left, the first AP (AP1) attempts transmission without the backoff procedure.

In the above-described embodiments, when it is detected that a channel is idle during a predetermined time interval without a separate backoff procedure after transmission to the station of the non-STR multi-link device is cancelled, the station cancelling the transmission to the station of the non-STR multi-link device may perform transmission to the station different from the station of the non-STR multi-link device. At this time, duration of the predetermined time interval may be a problem. The station receiving the PPDU of which transmission is cancelled may fail in decoding the PPDU. At this time, when it is sensed that the channel is idle by an extended interframe space (EIFS), the station failing in decoding the PPDU may start the backoff procedure. Accordingly, it is a problem whether to configure the predetermined time interval to be longer than or equal to the EIFS. This will be described with reference to FIG. 20.

Figure 20:
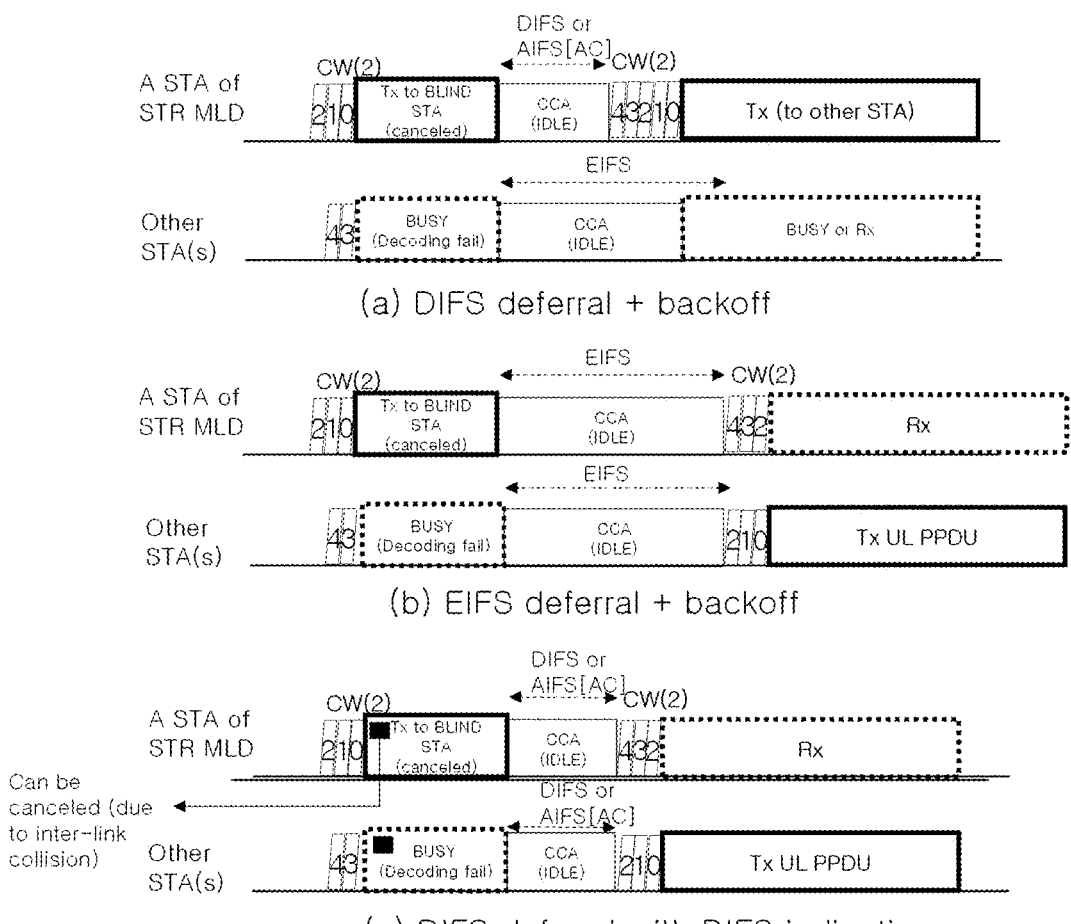
FIG. 20 illustrates an operation in which the STR multi-link device stops transmission to the non-STR multi-link device and then performs channel access again according to an embodiment of the disclosure.

FIG. 20 illustrates an operation in which the STR multi-link device performs channel access again after stopping transmission to the non-STR multi-link device according to an embodiment of the disclosure.

As illustrated in FIG. 20(a), the predetermined time interval may be DIFS. This considers that the station of the STR multi-link device acquires a channel access opportunity through a competition procedure and loses the acquired channel access opportunity due to transmission collision between links. That is, since the station of the STR multi-link device acquires the channel access opportunity through the competition procedure, a higher priority to perform channel access is provided to the station than other stations. When EDCA is applied, DIFS may be replaced with AIFS [AC].

In another detailed embodiment, the predetermined time interval may be EIFS as illustrated in FIG. 20(b). This considers that the STR multi-link device can be considered to already exhaust the transmission opportunities and considers fairness with other stations.

In another detailed embodiment, as illustrated in FIG. 20(c), when information in the signaling field of the PPDU indicating that transmission can be stopped is signaled, the predetermined time interval may be DIFS. Further, when the station receiving the PPDU detects the stop of PPDU transmission, the station may sense whether the channel is idle during DIFS rather than EIFS. At this time, it is sensed that the channel is idle during DIFS, the corresponding station may start the backoff procedure. Through the embodiment, it is possible to improve the performance of overall networks and guarantee fairness between stations. When EDCA is applied, DIFS may be replaced with AIFS [AC].

As described above, the STR multi-link device may recognize that transmission collision between links may be generated. Specifically, when the first station of the STR multi-link device completes the backoff procedure, the second station of the STR multi-link device may be receiving the PPDU. At this time, when the second station has not completed decoding of the signaling field of the PPDU, the first station may determine that the transmission collision between links cannot be recognized but there is a possibility thereof. At this time, the first station may insert information indicating that transmission can be stopped into the transmitted PPDU as described above. Further, for stable and efficient transmission, the NSTR multi-link device may transmit the CTS-to-Self frame before transmission to the non-STR multi-link device. This will be described with reference to FIG. 21.

Figure 21:
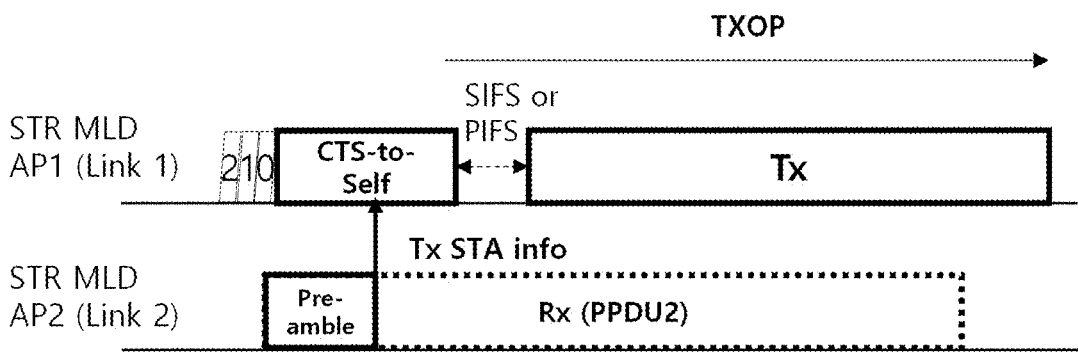
FIG. 21 illustrates an operation in which the STR multi-link device transmits a CTS-to-Self frame before transmission to the non-STR multi-link device according to an embodiment of the disclosure.

FIG. 21 illustrates an operation in which the STR multi-link device transmits the CTS-to-Self frame before transmission to the non-STR multi-link device according to an embodiment of the disclosure.

The station of the STR multi-link device may transmit the CTS-to-Self frame before transmission to the non-STR multi-link device. Specifically, when the second station of the STR multi-link device attempts transmission to the non-STR multi-link device while the first station of the STR multi-link device performs reception, the second station of the STR multi-link device may transmit the CTS-to-Self frame before transmission to the non-STR multi-link device. Accordingly, the second station may secure the TXOP for transmission to the non-STR multi-link device. Further, before performing transmission to the non-STR multi-link device, the second station may determine whether transmission to the first station is performed from the corresponding non-STR multi-link device. The second station may determine a destination station of the transmission according to whether the transmission to the first station is performed from the corresponding non-STR multi-link device. Specifically, when the transmission to the first station is not performed from the corresponding non-STR multi-link device, the second station may perform transmission to the corresponding non-STR multi-link device. When the transmission to the first station is performed from the corresponding non-STR multi-link device, the second station may perform transmission to the station which is not included in the corresponding non-STR multi-link device. For example, when the first station plans transmission of an SU-PPDU for the station of the non-STR multi-link device, an MU-PPDU including data for the station of the non-STR multi-link device, or a PPDU including a trigger frame for triggering transmission of the station of the non-STR multi-link device, the first station may cancel the planned transmission. At this time, the first station may attempt transmission of an SU-PPDU for a station which is not the station of the non-STR multi-link device, an MU-PPDU that does not include the data for the station of the non-STR multi-link device, or a PPDU including a trigger frame that does not trigger transmission of the station of the non-STR multi-link device. At this time, the first station may start transmission after a time longer than SIFS from the transmission of the CTS-to-Self frame. Specifically, the first station may start transmission after PIFS from the transmission of the CTS-to-Self frame. The station transmitting the CTS-to-Self frame should start transmission after SIFS from the transmission of the CTS-to-Self frame. When the planned transmission is cancelled and new transmission is attempted as described in the embodiments, a processing time of the STR multi-link device for generating the MPDU to be newly transmitted is needed. Accordingly, exception may be applied to rules for the time interval between the CTS-to-Self frame and the transmission. In the embodiments, the second station exceeds the TXOP acquired by CTS-to-Self and thus cannot perform transmission in principle.

In FIG. 21, the STR multi-link device includes the first AP (AP1) operating in the first link (link 1) and the second AP (AP2) operating in the second link (link2). Since the second AP (AP2) performs reception and the first AP (AP1) plans transmission to the station of the non-STR multi-link device, the first AP (AP1) transmits the CTS-to-Self frame before the planed transmission. As described above, the first AP (AP1) determines the destination station of the transmission based on the determination for the station transmitting the PPDU received by the second AP (AP2). Further, the first AP (AP1) performs transmission after SIFS or PIFS from the transmission of the CTS-to-Self frame.

The second station may start the RTS/CTS frame exchange procedure by transmitting the RTS frame instead of transmitting the CTS-to-Self frame. Accordingly, the second station may acquire an effect similar to the transmission of the CTS-to-Self frame. In the case of the RTS/CTS frame exchange, the second station may acquire the TXOP only when the destination station of transmission is not in the blind state.

Figure 22:
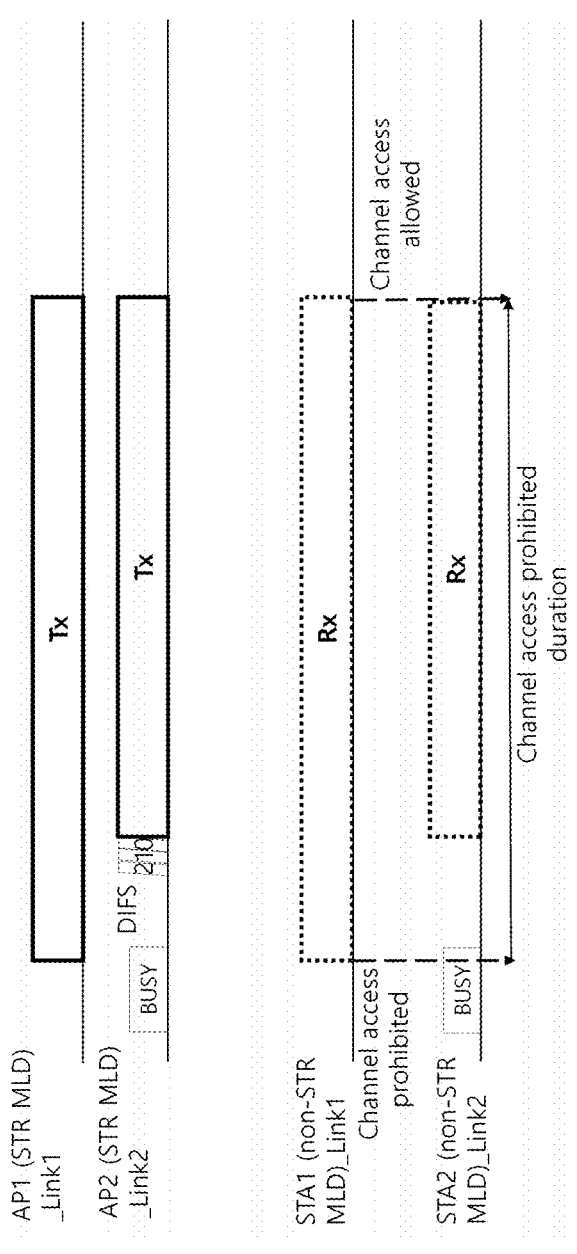
FIG. 22 illustrates the performance of transmission to a plurality of stations included in one non-STR multi-link device by a plurality of APs included in the STR multi-link device according to an embodiment of the disclosure.

FIG. 22 illustrates the performance of transmission to a plurality of stations included in one non-STR multi-link device b a plurality of APs included in the STR multi-link device according to an embodiment of the disclosure.

The plurality of stations included in one non-STR multi-link device may simultaneously perform reception. This is because simultaneous reception by a plurality of stations may cause only small interference. FIG. 22 illustrates the performance of simultaneous reception by a plurality of stations included in one non-STR multi-link device. At this time, for the stable operation of the non-STR multi-link device, a plurality of APs included in the STR multi-link device may perform a plurality of transmissions of which the transmission ends are synchronized to a plurality of stations included in one non-STR multi-link device. This will be described with reference to FIG. 23.

Figure 23:
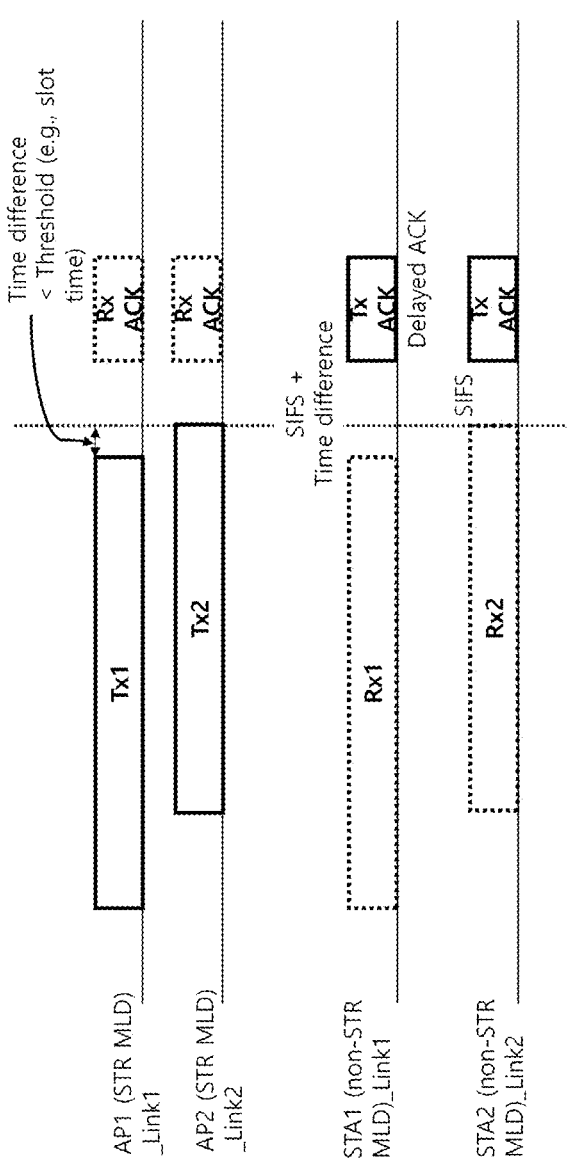
FIG. 23 illustrates the performance of a plurality of transmissions of which transmission ends are synchronized to a plurality of stations included in one non-STR multi-link device by a plurality of APs included in the STR multi-link device according to an embodiment of the disclosure.

FIG. 23 illustrates the performance of a plurality of transmissions of which the transmission ends are synchronized to a plurality of stations included in one non-STRU multi-link device by a plurality of APs included in the STR multi-link device according to an embodiment of the disclosure.

When the multi-link device performs transmission in one of the non-STR links, the multi-link device may simplify the channel access procedure for transmission performed in another link. Specifically, when the first station of the multi-link device completes the backoff channel access procedure in the first link, if the channel is idle during a predetermined time interval within the link of the second station of the STR multi-link device, the second station of the STR multi-link device may start transmission in the second link.

In a detailed embodiment, when one station of the STR multi-link device performs transmission to one station of the non-STR multi-link device, the channel access procedure of another station of the STR multi-link device may be simplified. Specifically, when the first station of the STR multi-link device completes the backoff channel access procedure of transmission to the first station of the non-STR multi-link device, if the channel is idle during a predetermined time interval within the link of the second station of the STR multi-link device, the second station of the STR multi-link device may start transmission to the second station of the non-STR multi-link device. At this time, the predetermined time interval may be PIFS. Such an operation may be applied when the first station and the second station of the STR multi-link device perform transmission to stations included in one non-STR multi-link device. In the embodiments, the first station and the second station may start transmission with a difference within a predetermined time interval. The predetermined time interval may be a slot time.

Further, when the first station and the second station of the STR multi-link device perform transmission to stations included in one non-STR multi-link device, transmission ends of the first station and the second station may be synchronized. At this time, synchronization of the transmission ends of the first station and the second station may indicate the end of the first station and the end of the second station with a difference within a first predetermined time interval. The first predetermined time interval may indicate the inside of a slot boundary or a symbol boundary.

The plurality of stations of the non-STR multi-link device receiving the synchronized transmission ends may simultaneously perform the following transmission, for example, responses. At this time, the responses may include ACK. In the conventional WLAN, the transmission following reception is performed after SIFS from the reception. However, with respect to a plurality of transmissions having ended with a slight time difference, performing the following transmissions with a slight time difference may make implementation more complicated compared to performing the following transmissions at the same time. Accordingly, as described above, the plurality of stations of the non-STR multi-link device receiving the synchronized transmission ends may simultaneously perform the following transmissions. At this time, an interval between transmissions following at least one of the plurality of transmissions of which the transmission ends are synchronized may be a sum of SIFS and time within a predetermined time interval. Specifically, transmission following the transmission that first ends among the plurality of transmissions of which the transmission ends are synchronized may be performed at an interval obtained by adding the SIFS and the time within the predetermined time interval from the transmission. At this time, the predetermined time interval may be one of a slot time or a symbol length. Further, a difference within the predetermined time interval may be a difference between the end of transmission that last ends among the plurality of transmissions of which the transmission ends are synchronized and transmission that first ends among the plurality of transmissions of which the transmission ends are synchronized.

In another detailed embodiment, when the plurality of transmissions end with a time difference within the first predetermined time interval, a plurality of stations receiving the transmissions may perform the synchronized following transmissions. The plurality of following transmissions of which the transmission ends are synchronized may indicate a plurality of following transmissions performed with a time difference within a second predetermined time interval. Further, a difference within the second predetermined time interval may be a difference between the end of transmission that last ends among the plurality of synchronized transmissions and transmission that first ends among the plurality of transmissions of which the transmission ends are synchronized. At this time, the second predetermined time interval may be smaller than the first predetermined time interval. PPDUs of which transmission ends are synchronized may be referred to as sync PPDUs.

In FIG. 23, the STR AP multi-link device includes the first AP (AP1) operating in the first link (link1) and the second AP (AP2) operating in the second link (link2). The non-STR multi-link device includes the first station (STA1) operating in the first link (link 1) and the second station (STA2) operating in the second link (link2). Each of the first AP (AP1) and the second AP (AP2) synchronize ends of transmission to the first station (STA1) and the second station (STA2). That is, after the first station (STA1) ends transmission, the second station (STA2) ends transmission within a predetermined time interval from the first station (STA1). The first station (STA1) and the second station (STA2) simultaneously transmit ACK. At this time, the first station (STA1) transmits ACK after SIFS and difference between the end of transmission of the first station and the end of transmission to the second station (STA2) from the end of transmission to the first station (STA1).

The embodiments may be applied to transmission in which an ACK policy is not configured as No ACK. Specifically, the ACK policy may be applied to the case other than an immediate response. In a detailed embodiment, when a plurality of stations of the multi-link device receive transmissions of which transmission ends are synchronized, the plurality of stations of the multi-link device may simultaneously receive an ACK request and transmit ACK according to the ACK request. The plurality of stations of the multi-link device receiving transmission in which the ACK policy is configured as a value other than No ACK within a predetermined time may simultaneously start ACK.

When there is a non-STR multi-link device, the non-STR multi-link device should be considered during an operation of configuring the TXOP by transmitting the RTS/CTS frame and the CTS-to-Self frame. This will be described with reference to FIGS. 24 to 29.

Figure 24:
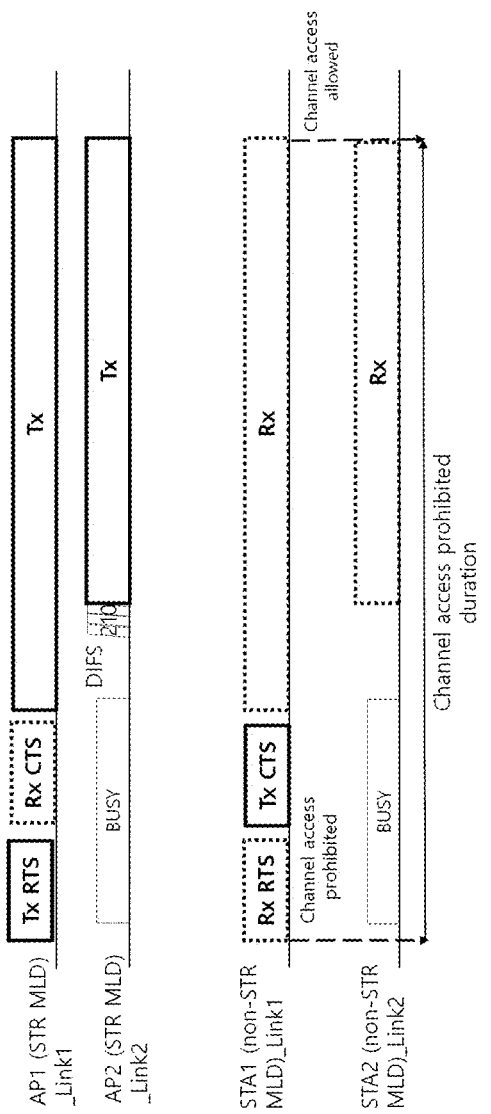
FIG. 24 illustrates an exchange of an RTS/CTS frame by the multi-link device according to an embodiment of the disclosure.

FIG. 24 illustrates an exchange of RTS/CTS frames by the multi-link device according to an embodiment of the disclosure.

Even when there is the non-STR multi-link device, the RTS/CTS frame exchange procedure may follow the procedure defined in the conventional WLAN.

The RTS/CTS frames may be used to configure NAV of the station operating in another link. Specifically, the station receiving the RTS/CTS frames may operate in a link different from the link in which the corresponding station operates and transfer the RTS/CTS frames to another station included in the multi-link device including the corresponding station.

However, as described in the above embodiments, when there is the non-STR multi-link device, channel access or transmission may be restricted. Accordingly, as illustrated in FIG. 24, RTS/CTS may not be transmitted. That is, the station planning transmission to the first station of the non-STR multi-link device may not attempt the RTS/CTS frame exchange if the second station of the non-STR multi-link device is performing reception.

In FIG. 24, the STR AP multi-link device includes the first AP (AP1) operating in the first link (link1) and the second AP (AP2) operating in the second link (link2). The non-STR multi-link device includes the first station (STA1) operating in the first link (link 1) and the second station (STA2) operating in the second link (link2). When the first AP (AP1) transmits the RTS frame to the first station (STA1), channel access of the second station (STA2) is prohibited. The second AP (AP2) may determine that channel access of the second station (STA2) is prohibited. Accordingly, the second AP (AP2) does not attempt the RTX/CTS frame exchange with the second station (STA2). In the embodiment, a hidden node problem may occur. This will be described with reference to FIG. 25.

Figure 25:
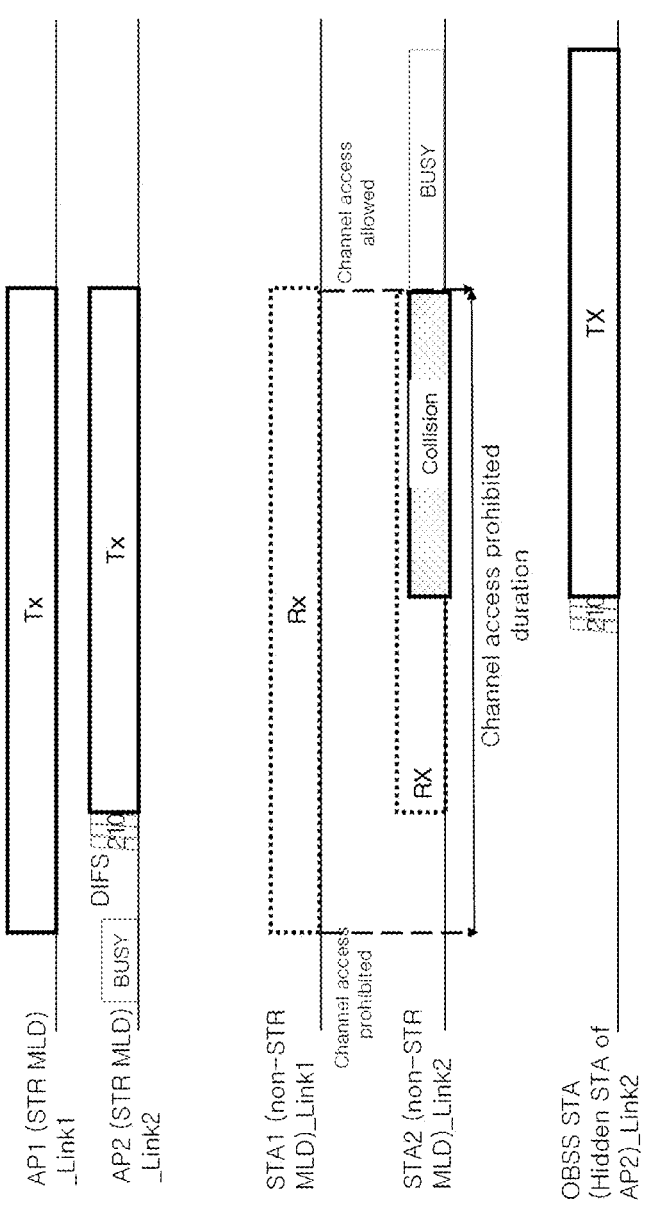
FIG. 25 illustrates a hidden node problem occurring in an RTS/CTS frame exchange procedure according to an embodiment of the disclosure described with reference to FIG. 24.

FIG. 25 illustrates the hidden node problem occurring in the RTS/CTS frame exchange procedure according to the embodiment described with reference to FIG. 24.

The station performing transmission to the station of the non-STR multi-link device may perform transmission without the CTS/RTS exchange as described above. At this time, since the TXOP is not configured in another station, another station may attempt transmission and thus the station of the non-STR multi-link device may fail in receiving transmission. In the embodiment of FIG. 25, the STR AP multi-link device includes a first AP (AP1) operating in a first link (link1) and a second AP (AP2) operating in a second link (link2). The non-STR multi-link device includes the first station (STA1) operating in the first link (link 1) and the second station (STA2) operating in the second link (link2). Due to transmission to the first station (STA1) of the first AP (AP1), the second AP (AP2) could not transmit the RTS frame before transmission. Accordingly, the TXOP for transmission of the second AP (AP2) is not configured in the station operating in the second link (link2). Therefore, when the second AP (AP2) performs transmission to the second station (STA2), a station of another BSS (OBSS STA) performs transmission in the second link (link2). According thereto, the second station (STA2) fails in receiving transmission of the second AP (AP2). In order to solve the hidden node problem, the following embodiments may be applied.

In a detailed embodiment, when one station of the non-STR multi-link device performs reception, the station is not allowed to perform transmission to any station of the non-STR multi-link device. In another detailed embodiment, when the second station of the non-STR multi-link device performs reception while the station performs transmission to the first station of the non-STR multi-link device, the station may simultaneously perform the transmission and the transmission to the second station. When the second station of the non-STR multi-link device performs reception while the station performs transmission to the first station of the non-STR multi-link device, the station may synchronize the end of transmission to the first station and the end of transmission to the second station. Specifically, when the second station of the non-STR multi-link device performs reception while the station performs transmission to the first station of the non-STR multi-link device, the station may simultaneously end the transmission to the first station and the transmission to the second station. In the embodiments, transmission to the second station may be performed by another station of the multi-link device including the station.

Figure 26:
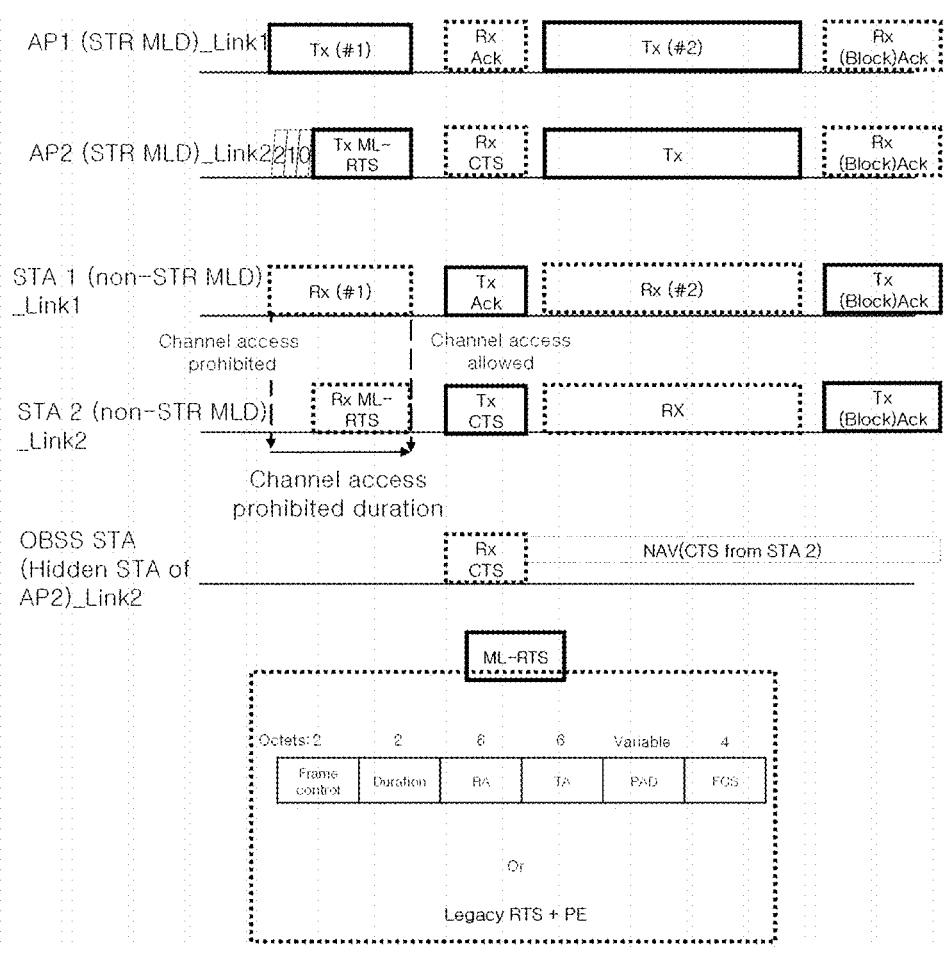
FIG. 26 illustrates the RTS/CTS frame exchange by the multi-link device according to an embodiment of the disclosure.

FIG. 26 illustrates an RTS/CTS frame exchange by the multi-link device according to an embodiment of the disclosure.

In another embodiment of the disclosure, when the second station of the multi-link device transmits an RTS frame to a fourth station of the non-STR multi-link device while the first station of the multi-link device continues to perform transmission to a third station of the non-STR multi-link device, the first station may end the transmission to the third station before a time point at which the fourth station transmits the RTS frame. Accordingly, the fourth station may transmit a CTS frame to the second station. Therefore, a TXOP for the frame exchange between the second station and the fourth station may be configured. However, it may be difficult to implement the end of transmission before the time point at which the first station transmits the RTS frame to the fourth station.

In another embodiment of the disclosure, when the second station of the multi-link device transmits an RTS frame to a fourth station of the non-STR multi-link device while the first station of the multi-link device continues to perform transmission to a third station of the non-STR multi-link device, the second station may transmit the RTS frame to the fourth station in time for the end of transmission to the third station by the first station. To this end, the second station may insert padding into the RTS frame. At this time, the RTS frame may be an RTS frame format for flexibly controlling the transmission length. For convenience of description, the RTS frame format is referred to as a multilink (ML)-RTS frame. The ML-RTS frame may include a pad field for padding. For example, the ML-RTS frame format may be the same as the RTS frame format illustrated in FIG. 26.

Further, the first station may insert padding into transmission to the third station in time to comply with the transmission end with the RTS frame.

In the embodiment of FIG. 26, the STR AP multi-link device includes a first AP (AP1) operating in a first link (link 1) and a second AP (AP2) operating in a second link (link2). The non-STR multi-link device includes the first station (STA1) operating in the first link (link 1) and the second station (STA2) operating in the second link (link2). The second AP (AP2) transmits the ML-RTS frame to the second STA (STA2) in time for the end of transmission to the first station (STA1) of the first AP (AP1). Thereafter, when the first station (STA1) transmits ACK to the first AP (AP1), the second station (STA2) transmits ACK to the second AP (AP2). Accordingly, a TXOP for the frame exchange between the second AP (AP2) and the second station (STA2) is configured in stations operating in the channel of the second link.

In another detailed embodiment, another frame for configuring NAV may be exchanged instead of the RTS/CTS frame. In the above-described embodiments, an ACK request frame may be transmitted instead of the RTS frame. The ACK request frame may include duration information related to the transmission end time point. Further, a frame including ACK transmitted in response to the ACK request may also include duration information. At this time, duration information of the frame including ACK may be configured according to duration information of the ACK request frame.

The above-described embodiments have been described for the RTS/CTS frame exchange, but may be used for a control frame exchange as well as the RTS/CTS frame. At this time, the control frame exchange may include an exchange between a PS-Poll frame and a response frame of the PS-Poll.

Figure 27:
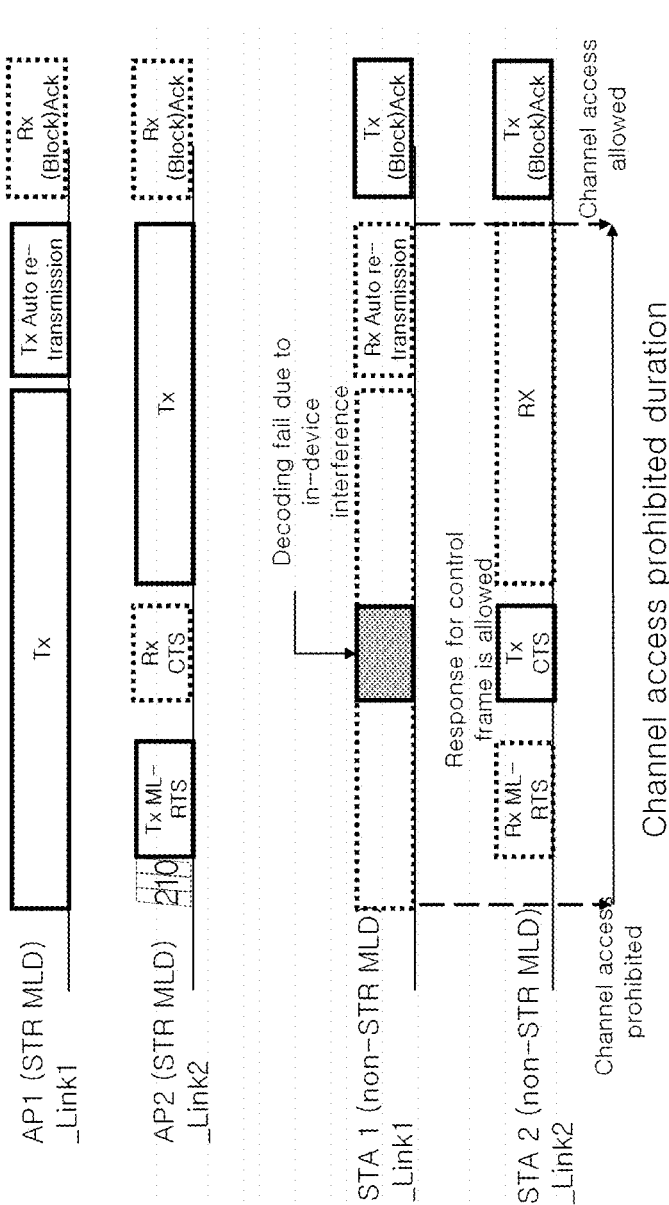
FIG. 27 illustrates transmission of a response to a control frame by the multi-link device exceptionally even in the case in which channel access is prohibited according to an embodiment of the disclosure.

FIG. 27 illustrates exceptional transmission of a response to a control frame by the multi-link device in the case in which channel access is prohibited according to an embodiment of the disclosure.

As described in the above embodiments, when the non-STR multi-link device exists, channel access of some stations may be prohibited. Even though channel access of the station is prohibited, the station may transmit a response to the control frame. Specifically, even though channel access of the station is prohibited, the station may transmit a CTS frame in response to the RTS frame.

As described above, when the response to the control frame is transmitted as the exception of channel access prohibition, the following embodiment may be applied. The first station transmits the response to the control frame as the exception of channel access prohibition. When the first station transmits the response to the control frame, the third station performs transmission to the second station included in the multi-link device including the first station. In this case, the third station may perform retransmission to the first station. This is because the third station can expect failure of transmission to the second station.

In the embodiment of FIG. 27, the STR AP multi-link device includes a first AP (AP1) operating in a first link (link 1) and a second AP (AP2) operating in a second link (link2). The non-STR multi-link device includes the first station (STA1) operating in the first link (link 1) and the second station (STA2) operating in the second link (link2). The first AP (AP) performs transmission to the first station (STA1). The second AP (AP2) transmits the RTS frame to the second station (STA2). Since the first station (STA1) performs reception, channel access of the second station (STA2) is prohibited. However, the second station (STA2) transmits the CTS frame to the second AP (AP2) as the exception of channel access prohibition. The first AP (AP1) may determine that a possibility of failure of transmission of the first AP (AP1) is high due to transmission of the CTS frame by the second station (STA2). Accordingly, the first AP (AP1) performs retransmission to the first station (STA1). A retransmission method will be described in more detail with reference to FIG. 28.

Figure 28:
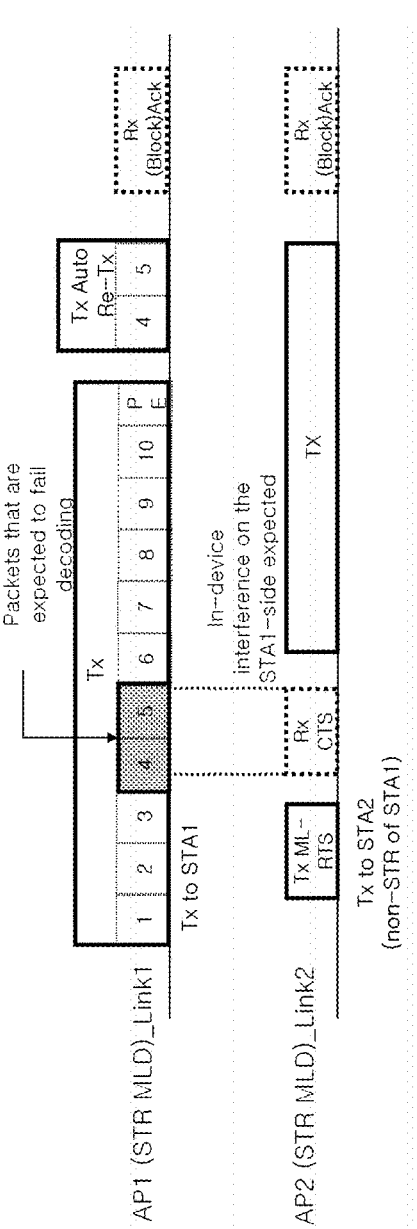
FIG. 28 illustrates retransmission of the transmission to the station of the non-STR multi-link device.

FIG. 28 illustrates retransmission of the transmission to the station of the non-STR multi-link device.

In the retransmission described with reference to FIG. 27, only some of the packets included in the initial transmission may be retransmitted. Specifically, the station performing retransmission may retransmit only some of the packets included in the initial transmission. The station performing retransmission may determine some of the packets included in the initial transmission as packets to be retransmitted based on a time interval in which the station performing retransmission receives the CTS frame. Specifically, the station performing retransmission may determine packets transmitted in a time interval including the time interval in which the station performing retransmission receives the CTS frame among the packets included in the initial transmission as the packets to be retransmitted. At this time, the station performing retransmission may retransmit the packets transmitted in the time interval including the time interval in which the station performing retransmission receives the CTS frame based on a propagation delay. In another detailed embodiment, the station performing retransmission may retransmit all packets included in the initial transmission.

Further, the station performing retransmission may perform retransmission before receiving ACK for the transmission. At this time, the station performing retransmission may receive Block ACK indicating whether initial transmission and retransmission are received after the retransmission. To this end, the station performing retransmission may perform retransmission before SIFS after the initial transmission. In another detailed embodiment, the station failing in reception due to the control frame transmitted as the exception of channel access prohibition may wait for receiving retransmission without transmitting ACK.

In the embodiment of FIG. 28, the first AP (AP1) retransmits a fourth packet and a fifth packet in consideration of the interval in which the second AP (AP2) receives the CTS frame and a transmission delay. The first AP (AP1) receives ACK including whether retransmission is received after the retransmission.

Figure 29:
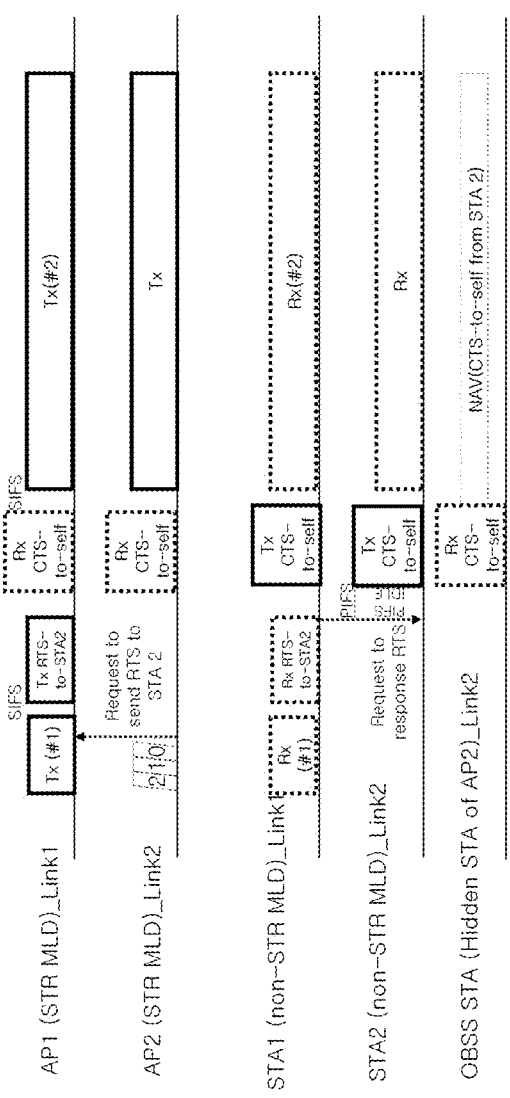
FIG. 29 illustrates transmission of the control frame through the link in which the station of which channel access is not prohibited operates rather than the link in which the station of which channel access is prohibited operates according to an embodiment of the disclosure.

FIG. 29 illustrates transmission of the control frame through a link in which the station of which channel access is not prohibited operates rather than a link in which the station of which channel access is prohibited operates according to an embodiment of the disclosure.

As described in the embodiment illustrated in FIG. 26, ends of transmission to the plurality of stations of the non-STR multi-link device may be synchronized. However, this needs to control of the already generated MPDU or to generate the MPDU again, and thus may cause implementation to be difficult. Accordingly, the multi-link device may transmit the control frame through the link in which the station of which channel access is not prohibited operates rather than the link in which the station of which channel access is prohibited operates. Specifically, the multi-link device may transmit the control frame through the link in which reception from the multi-link device is currently performed among stations of the non-STR multi-link device. At this time, the control frame may be the RTS frame.

In the embodiment of FIG. 29, the STR AP multi-link device includes the first AP (AP1) operating in the first link (link 1) and the second AP (AP2) operating in the second link (link2). The non-STR multi-link device includes the first station (STA1) operating in the first link (link1) and the second station (STA2) operating in the second link (link2). The first AP (AP1) performs transmission to the first station (STA1). Even though the second AP (AP2) succeeds the backoff procedure, the first station (STA1) is receiving the transmission from the first AP (AP1) and thus the second AP (AP2) cannot perform transmission to the second station (STA2). At this time, the second AP (AP2) makes a request for transmitting the RTS frame with the second station (STA2) as a receiver to the first AP (AP1). The first AP (AP1) may insert the RTS frame with the second station (STA2) as the receiver into transmission being performed by the first AP (AP1). In another detailed embodiment, after the first AP (AP1) ends transmission being performed by the first AP (AP1), the first AP (AP1) may transmit the RTS frame with the second station (STA2) as the receiver in the first link (link 1) after SIFS from the corresponding transmission. The first station (STA1) receives the RTS frame with the second station (STA2) as the receiver and transfers the received RTS frame to the second station (STA2). The second station (STA2) performs CCA during PIFS. When the channel is idle during PIFS, the second station (STA2) transmits the CTS-to-Self frame. The first AP (AP1) may stop transmission to the first station (STA1) during a time interval in which it is expected for the second station (STA2) to transmit a response to the RTS frame. Further, the first station (STA1) may transmit ACK for the received transmission while the second station (STA2) transmits a response to the RTS frame. In another detailed embodiment, the first station STA1) may also transmit the response to the RTS frame while the second station (STA2) transmits the response to the RTS frame. FIG. 29 is to help for understanding of description and may be used for transmission of the control frame as well as the RTS frame and the CTS-to-Self frame. Further, another time interval other than PIFS may be used.

Figure 30:
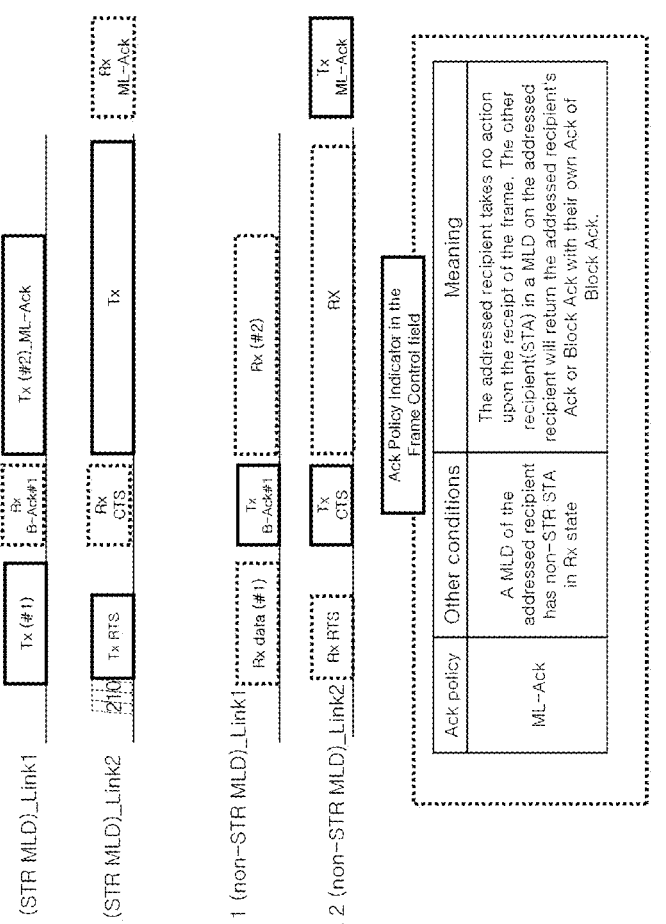
FIG. 30 illustrates transmission of ACK by the multi-link device according to an embodiment of the disclosure.

FIG. 30 illustrates transmission of ACK by the multi-link device according to an embodiment of the disclosure.

The station of the multi-link device may make a request for a link to transmit ACK to the station of the no-STR multi-link device. Specifically, the station of the multi-link device may make a request for transmitting ACK in a link different from the link in which transmission has been performed. In the embodiment of FIG. 28, the first AP (AP1) of the STR multi-link device performs transmission (Tx (#2)) to the first station (STA1) of the non-STR multi-link device. At this time, the first AP (AP1) makes a request for transmitting ACK for transmission (Tx (#2)) through the second link (link2). This is because it is determined that transmission of ACK for the transmission (Tx (#2)) of the first AP (AP1) is difficulty since the transmission (Tx (#2)) of the first AP (AP1) ends earlier than transmission to the second station (STA2) by the second AP (AP2).

Further, for the ACK transmission, the station may configure an ACK policy as an implicit BAR in order not to transmit an immediate response to transmission. In another detailed embodiment, the station may configure the ACK policy for transmission as BlockAckReq. However, in order to transmit Block ACK, BlockAckReq should be transmitted, and thus channel access burden and a transmission delay may be generated. Accordingly, a new ACK policy for the multi-link device may be needed.

One station of the multi-link device may also transmit ACK for transmission received by another station included in the multi-link device, which is the same as ACK for transmission received by the station. The ACK transmission may be referred to as multilink (ML)-ACK. Further, ML-ACK may be configured as the ACK policy. In the embodiment of FIG. 30, the first AP (AP1) configures ML-ACK as the ACK policy of transmission (Tx (#2)). The first station (STA1) does not transmit ACK to the first AP (AP1) after receiving transmission (Tx (#2)). The second station (STA2) completes reception of the transmission from the second AP (AP2) and transmits ACK for transmission from the first AP (AP1) and transmission from the second AP (AP2) together. The non-STR multi-link device may include not only the first station (STA1) and the second station (STA2) but also a third station (STA3), and the STR multi-link device may include not only the first AP (AP1) and the second AP (AP2) but also a third AP (AP3). At this time, ML-ACK may be configured as the ACK policy of transmission to the second station (STA2) from the second AP (AP2). When transmission from the third AP (AP3) to the third station (STA3) is completed later than transmission from the second AP (AP2) to the second station (STA2), the third station (STA3) may transmit ACK for transmission from the first AP (AP1) to the first station (STA1), ACK from the second AP (AP2) to the second station (STA2), and ACK for transmission from the third AP (AP3) to the third station (STA3) to the third AP (AP3).

Through the embodiments, even though transmissions to the stations of the non-STR multi-link device are not simultaneously completed, it is possible to prevent interference between links that may be generated due to ACK transmission. In the above-described embodiment, the ACK policy may be configured as BlockAck instead of ML-ACK. In another detailed embodiment, the ACK policy may be configured as No Ack instead of ML-ACK.

The number of links acquiring transmission opportunities may increase while the multi-link device performs traffic transmission. At this time, through the link acquiring the transmission opportunity later, the multi-link device may transmit traffic, which the multi-link device is scheduled to transmit through the link acquiring the transmission opportunity first. At this time, NAV configured in the link acquiring the transmission opportunity first by the multi-link device may be configured to be larger than NAV required for transmitting traffic. When the NAV is configured to be larger than NAV required for transmitting traffic in the link acquiring the transmission opportunity first by the multi-link device, the multi-link device may transmit a CF-END frame after completing transmission in the link acquiring the transmission opportunity first, so as to reset NAV.

Reception of the sync PPDU and signaling related to the reception of the sync PPDU are described with reference to FIGS. 31 to 34.

In order to receive the sync PPDU, the first station of the non-STR multi-link device should determine whether the second station having the non-STR relation with the first station starts receiving the sync PPDU. Further, the first station should continuously perform preamble detection (PD). When it is considered that channel access of the first station receiving the sync PPDU is prohibited by reception of another station of the non-STR multi-link device, such an operation of the first station may be irrational. Accordingly, the first station may enter a doze state in a predetermined condition. The sync PPDU may be transmitted within the conventionally configured TXOP. Accordingly, a performance gain that can be obtained by reception of the sync PPDU may be determined according to the length of the remaining TXOP. Therefore, the first station may determine whether to give up reception of the sync PPDU based on the length of the sync PPDU. When the first station gives up reception of the sync PPDU, the first station may enter the doze state. Such a power-saving operation may be referred to as inter-link TXOP power save (PS). In the inter-link TXOP PS, the station entering the doze state may wake up from the doze state in order to receive frames periodically transmitted from the AP, for example, a beacon frame, a TIM frame, and a DTIM frame. Further, when the TXOP ends, for example, when a CF-END frame is transmitted, the station entering the doze state in the inter-link TXOP PS may wake up from the doze state.

The TXOP may be changed to a period indicated through a length field of the signaling field of the PPDU or a duration field of the MAC frame. Specifically, in the above-described embodiment, the station may determine a time of occupation of the PPDU based on the period indicated through the length field or the duration field of the MAC frame.

The non-AP multi-link device may signal information on whether the sync PPDU is received and sync PPDU support conditions to the AP multi-link device. Further, the AP multi-link device may signal information on whether the AP multi-link device supports PPDU transmission to the non-AP multi-link device. At this time, the multi-link device may signal information on whether the sync PPDU is supported for each multi-link device. For example, the AP multi-link device may signal information on whether sync PPDU transmission is supported for each AP multi-link device. In another detailed embodiment, the multi-link device may signal information on whether the sync PPDU is supported for each station. Specifically, the AP multi-link device may signal information on whether sync PPDU transmission is supported for each AP included in the AP multi-link device. For example, the AP multi-link device including the first AP, the second AP, and the third AP may indicate that the first AP supports sync PPDU transmission, and the second AP and the third AP do not support sync PPDU transmission.

When information indicating that the AP multi-link device associated with the non-AP multi-link device does not support sync PPDU transmission, the station of the non-AP multi-link device may enter the doze state of the inter-link PS while another station of the non-AP multi-link device performs reception. This is because, the AP multi-link device associated with the non-AP multi-link device cannot transmit the sync PPDU. At this time, the station of the non-AP multi-link device may determine the length of time to maintain the doze state based on the length of the PPDU received by another station of the non-AP multi-link device.

Whether the sync PPDU transmission or reception is supported may be determined according to an operation policy as well as the hardware performance. Accordingly, whether the sync PPDU transmission or reception is supported may be signaled not only through information on the performance but also through information on an operating mode. A method of signaling the support of sync PPDU transmission or reception will be described in detail with reference to FIG. 31.

FIG. 31 illustrates an element field indicating information on support of sync PPDU reception or transmission according to an embodiment of the disclosure.

As described above, the information indicating whether the sync PPDU transmission is supported may be included in an element indicating a capability of the station. For convenience of description, the element indicating the capability of the station is referred to as a capability element. Further, in the capability element, a field of information indicating whether sync PPDU transmission is supported is referred to as a Supporting Sync PPDU Tx sub field. At this time, the capability element may be a multi-link element which is an element indicating a capability of a multi-link. Further, the capability element may be an EHT capability element indicating a capability related to EHT. FIG. 31(a) illustrates an example of the capability element.

When a value of the Supporting Sync PPDU Tx sub field is 1, Supporting Sync PPDU Tx may indicate that the station or the multi-link device indicated by the Supporting Sync PPDU Tx sub field supports sync PPDU transmission. When a value of the Supporting Sync PPDU Tx sub field is 0, Supporting Sync PPDU Tx may indicate that the station or the multi-link device indicated by the Supporting Sync PPDU Tx sub field does not support sync PPDU transmission. Further, when a station which is not included in the multi-link device transmits the capability element, Supporting Sync PPDU Tx sub field may signal information that is not information irrelevant to whether sync PPDU transmission is supported or may be used as a reserved field.

As described above, the information indicating whether sync PPDU reception is supported may be included in an element indicating information related to the operation of the station. For convenience of description, the element indicating the information related to the operation of the station is referred to as an operation element. Further, in the operation element, a field of information indicating whether sync PPDU reception is supported is referred to as a Supporting Sync PPDU Rx Disable sub field. FIG. 31(b) illustrates an example of the operation element. When a value of the Supporting Sync PPDU Rx Disabled sub field is 1, it may indicate that sync PPDU reception is not supported. Specifically, when the value of the Supporting Sync PPDU Rx Disabled sub field is 1, the Supporting Sync PPDU Rx Disabled sub field may indicate that the station transmitting the Supporting Sync PPDU Rx Disabled sub field does not want to wait for receiving the sync PPDU. In the multi-link device configuring the value of the Supporting Sync PPDU Rx Disabled sub field as 1, the second station of the multi-link device may not perform PD and CCA while the first station of the multi-link device performs reception. The AP multi-link device associated with the multi-link device transmitting the Supporting Sync PPDU Rx Disabled sub field does not simultaneously transmit PPDUs to a plurality of stations of the multi-link device transmitting the Supporting Sync PPDU Rx Disabled sub field. The PPDU may be an SU PPDU, a full BW MU PPDU, or an OFDMA MU PPDU transmitted through one of a non-HT PPDU format, an HT PPDU format, a VHT PPDU format, an HE PPDU format, and an EHT PPDU format. At this time, the AP multi-link device should not transmit a frame making a request for a response, for example, an immediate response. The frame making a request for a response may include at least one of RTS, multi-user (MU)-RTS, a trigger frame, and a block ack request (BAR).

Further, the operation element may include information related to the minimum length of the sync PPDU which can be received by the station or the multi-link device transmitting the operation element. At this time, a sub field indicating the information related to the minimum length of the sync PPDU is referred to as a Remaining TXOP Threshold sub field. The Remaining TXOP Threshold sub field may indicate a time. Further, the Remaining TXOP Threshold sub field may be expressed in units of us, ms, or symbols. The multi-link device associated with the multi-link device transmitting the Remaining TXOP Threshold sub field may not be allowed to transmit a sync PPDU shorter than the length indicated by the Remaining TXOP Threshold sub field to the multi-link device or the station transmitting the Remaining TXOP Threshold sub field.

Further, when the Remaining TXOP Threshold sub field is configured as a predetermined value, it may indicate that the multi-link device or the station transmitting the Remaining TXOP Threshold sub field does not support sync PPDU reception. The predetermined value may be a value indicating a time longer than the maximum time that can be expressed by the Remaining TXOP Threshold sub field. In another detailed embodiment, the predetermined value may be 0. When the embodiments are applied, the Sync PPDU Rx Disable sub field may be omitted in the operation field.

Further, in the above embodiments, it has been described that the Sync PPDU Rx Disable sub field and the Remaining TXOP Threshold sub field can be signaled through the operation element. The Sync PPDU Rx Disable sub field and the Remaining TXOP Threshold sub field may be signaled through an element other than the operation element or signaling information. An embodiment of implementing the inter-link TXOP power saving mode according to the signaling described with reference to FIG. 31 is described with reference to FIGS. 32 to 34.

Figure 32:
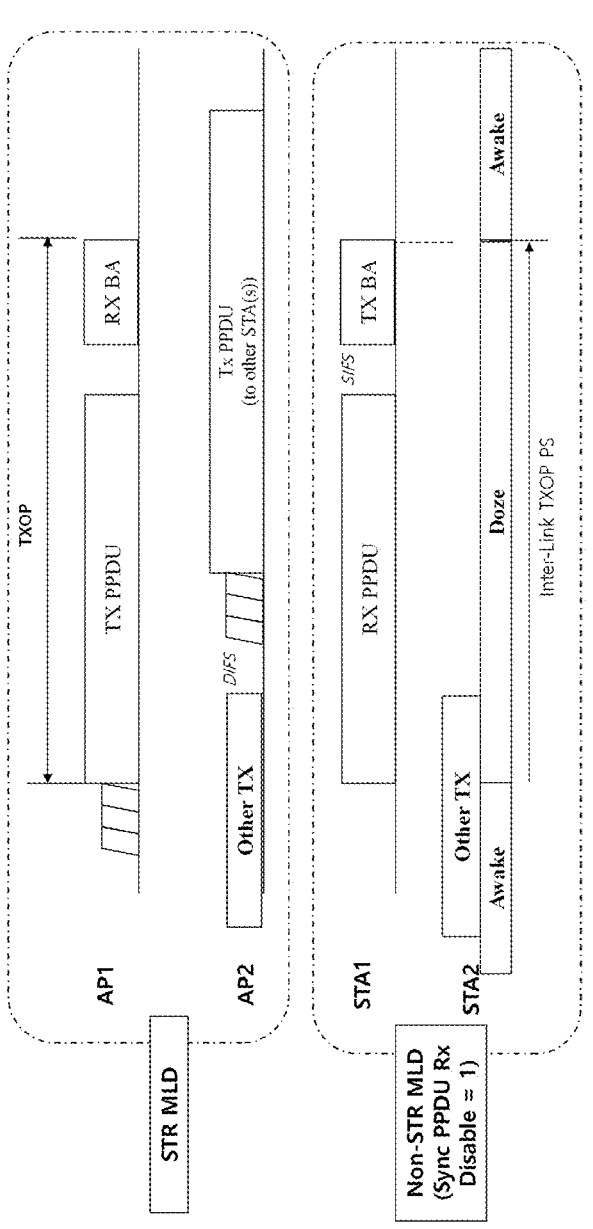
FIG. 32 illustrates the performance of an inter-link TXOP power saving mode operation by the non-STR multi-link device according to an embodiment of the disclosure.

FIG. 32 illustrates the performance of an inter-link TXOP power saving mode operation by the non-STR multi-link device according to an embodiment of the disclosure.

When information indicating that the non-STR multi-link device does not support sync PPDU reception is signaled, the second station of the non-STR multi-link device may enter the doze state while the first station of the non-STR multi-link device performs reception. At this time, the second station may maintain the doze state until the end time point of the TXOP indicated by the PPDU received by the first station. As described above, the time point at which the second station expects reception of the frame periodically transmitted from the AP may be before the time point at which the TXOP indicated by the PPDU received by the first station ends. At this time, the second station may wake up from the doze state before the time point at which the TXOP indicated by the PPDU received by the first station ends. As described above, the frame periodically transmitted from the AP may include at least one of the beacon frame, the TIM frame, and the DTIM frame.

The second station may maintain the doze state even after the time point at which the TXOP indicated by the PPDU received by the first station ends. Specifically, the second station may maintain the doze state even after the time point at which the TXOP indicated by the PPDU received by the first station ends based on information received from the AP associated with the second station. At this time, the information received from the AP associated with the second station may be NAV-related information. Further, the information received from the AP associated with the second station may be operation information of the AP associated with the first station. When NAV configured by the second AP of the AP multi-link device performing transmission to the second station of the non-AP multi-link device does not expire, the first AP of the AP multi-link device may transmit information on an expected time point at which transmission or reception of the first AP and an expected time point at which NAV expires to the first station of the non-AP multi-link device signaling information indicating that the first AP of the AP multi-link device does not want to receive the sync PPDU. When NAV configured by the second AP of the AP multi-link device performing transmission to the second station of the non-AP multi-link device does not expire, it may include transmission or reception of PPDU by the second AP from one station. When NAV configured by the second AP of the AP multi-link device performing transmission to the second station of the non-AP multi-link device does not expire, it may include a configuration of NAV in the second AP by the PPDU which is not transmitted by the second station.

In the embodiment of FIG. 32, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The non-STR non-AP multi-link device signals information indicating that reception of the sync PPDU is not desired. The first AP (AP1) performs transmission to the first station (STA1). At this time, the second station (STA2) maintains the doze station until the time point at which the TXOP indicated by the PPDU which the first AP (AP1) transmits to the first station (STA1) ends.

Figure 33:
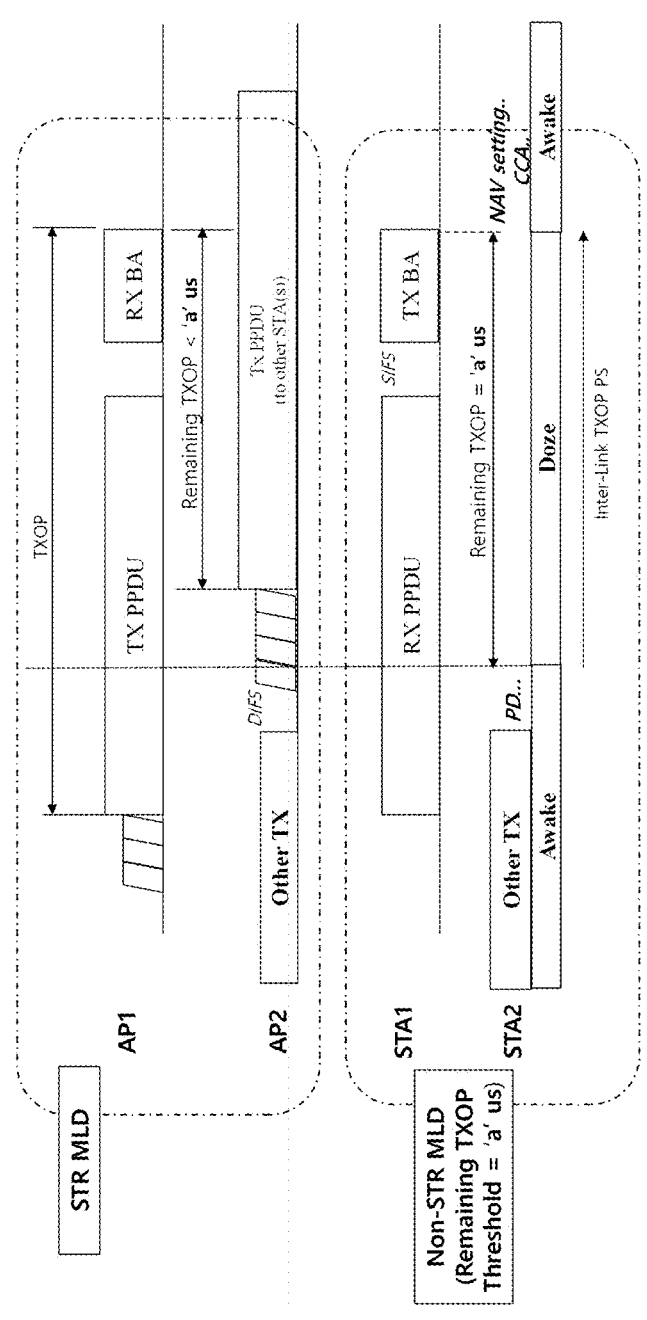
FIG. 33 illustrates entry of the station of the non-STR multi-link device into a doze state from sync PPDU reception standby according to an embodiment of the disclosure.

FIG. 33 illustrates entry of the station of the non-STR multi-link device into the doze state from sync PPDU reception standby according to an embodiment of the disclosure.

When the remaining duration of the TXOP indicated by the PPDU being received by the first station of the non-STR multi-link device is shorter than or equal to the length indicated by the Remaining TXOP Threshold sub field transmitted by the non-STR multi-link device, the first station of the non-STR multi-link device may enter the doze state of the inter-link TXOP. At this time, when the remaining duration of the TXOP indicated by the PPDU being received by the first station is longer than the length indicated by the Remaining TXOP Threshold sub field transmitted by the non-STR multi-link device, the second station may receive the sync PPDU transmitted to the second station before entering the doze state. At this time, the second station may receive the sync PPDU. To this end, the second station may perform PD and determine whether an intended receiver of the received PPDU is the second station. Specifically, the second station may determine whether an AID indicated by the signaling field of the PPDU or an RA of the MAC frame included in the PPDU indicates the second station.

In the embodiment of FIG. 33, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The non-STR non-AP multi-link device signals information indicating that reception of the sync PPDU is desired. At this time, the non-AP multi-link device also signals 'a' that is the minimum length of the TXOP required for sync PPDU reception. The first AP (AP1) performs transmission to the first station (STA1) and the second station (STA2) waits for receiving the sync PPDU. When the TXOP of the PPDU which the first AP (AP1) transmits to the first station (STA1) is equal to or shorter than 'a', the second station (STA2) enters the inter-link TXOP power saving state.

Figure 34:
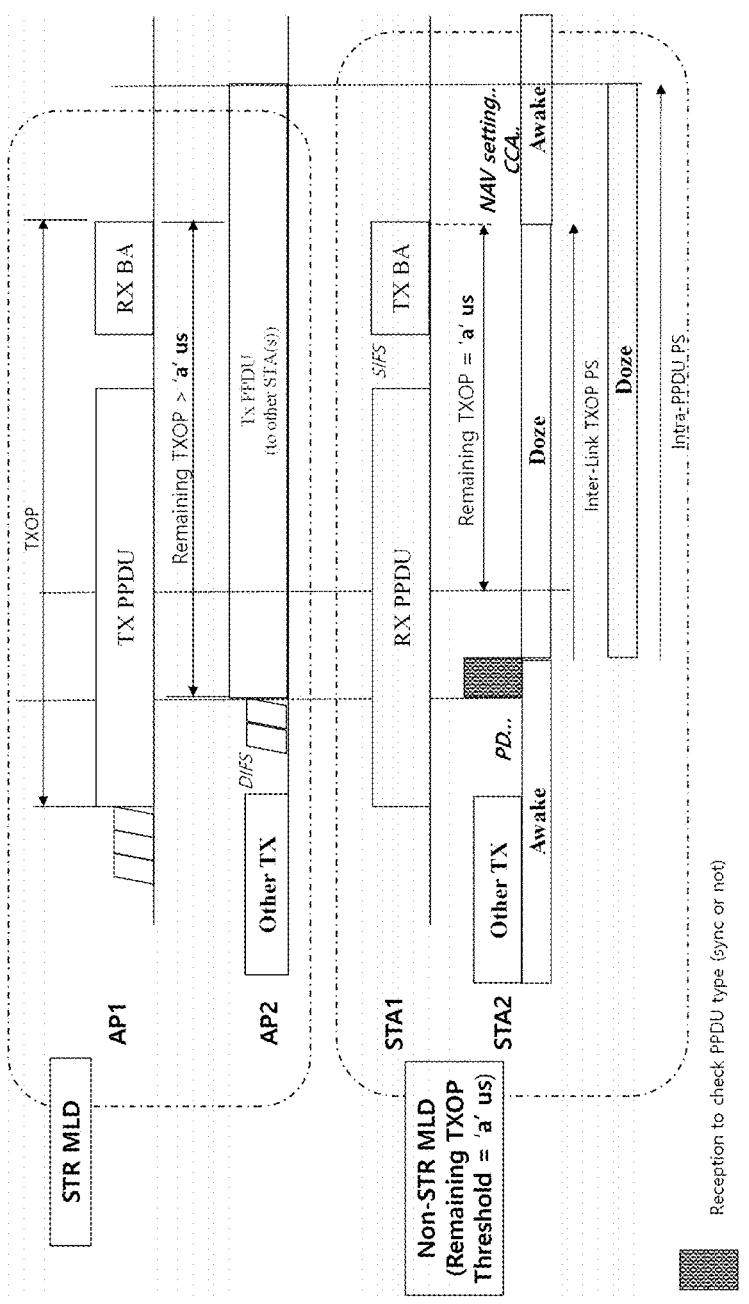
FIG. 34 illustrates entry of the station of the non-STR multi-link device into doze state from sync PPDU reception standby according to another embodiment of the disclosure.

FIG. 34 illustrates entry of the station of the non-STR multi-link device into the doze state from sync PPDU reception standby according to another embodiment of the disclosure.

When transmission of the PPDU which is not the sync PPDU is detected in the BSS operated by the AP associated with the station of the non-STR multi-link device while the station of the non-STR multi-link device waits for receiving the sync PPDU, the station of the non-STR multi-link device may enter the inter-link TXOP power saving state. At this time, the station may determine that the PPDU with the intended receiver, which is not the station, is not the sync PPDU. Further, when transmission of the PPDU, which is the not the sync PPDU, is detected in the BSS operated by the AP associated with the station of the non-STR multi-link device in the doze state even though the minimum TXOP signaled by the station is left, the station of the non-STR multi-link device may enter the inter-link TXOP power saving state.

In the embodiment of FIG. 34, the STR AP multi-link device includes the first AP (AP1) operating in the first link (link1) and the second AP (AP2) operating in the second link (link2). The non-STR multi-link device includes the first station (STA1) operating in the first link (link1) and the second station (STA2) operating in the second link (link2). The non-STR non-AP multi-link device signals information indicating that reception of the sync PPDU is desired. At this time, the non-AP multi-link device also signals 'a' that is the minimum length of the TXOP required for sync PPDU reception. The first AP (AP1) performs transmission to the first station (STA1) and the second station (STA2) waits for receiving the sync PPDU. The second station (STA2) detects transmission of the PPDU, which is not the sync PPDU, in the BSS to which the second station belongs. The TXOP of the PPDU which the first AP (AP1) transmits to the first station (STA1) is larger than 'a', but the second station (STA2) enters the inter-link TXOP power saving state.

<Multi-Link Single Radio Multi-Link Device Service Procedure>

As described above, a multi-link device may adaptively operate in consideration that a first station of a non-STR multi-link device performs transmission and the state of a second station becomes a blind state. Specifically, when the multi-link device determines that a station of the non-STR multi-link device is in a blind state, the multi-link device may stop performing transmission for the station of the non-STR multi-link device. In addition, the station of the non-STR multi-link device may enter a doze state based on an operation, for example, transmission and reception, of another station of the non-STR multi-link device. Through this, a problem which may occur when, due to an operation of one station of the non-STR multi-link device, an operation of another station is restricted can be solved.

As described above, with respect to the non-STR multi-link device, different stations included in the non-STR multi-link device cannot simultaneously perform reception and transmission due to interference in the device. In addition, due to the limitations on hardware configuration of the non-STR multi-link device, different stations included in the non-STR multi-link device cannot simultaneously perform reception and transmission. Specifically, when a first station of the non-STR multi-link device performs transmission or reception, a second station of the non-STR multi-link device may be restricted to use a transceiver. For example, the non-STR multi-link device may support processing of only one PPDU. In this case, when the first station of the non-STR multi-link device performs transmission or reception, the second station may the non-STR multi-link device cannot perform transmission or reception. As such, a multi-link device which includes multiple stations operating on multiple links, respectively, but does not support simultaneous transmission or reception by the multiple stations is referred to as a single radio multi-link device. Accordingly, when one station of a single radio multi-link device performs transmission or reception, another station of the single radio multi-link device cannot perform transmission or reception. The multi-link device may operate as a single radio multi-link device according to the hardware limitations or operation mode definition as described above. Accordingly, in the present specification, a single radio multi-device may refer to not only a multi-link device in which an operation of a station is restricted due to the hardware limitations, but also a multi-link device in which an operation of a station is restricted according to the operation mode definition. Therefore, the single radio multi-link device in the present specification may include a multi-link device which supports simultaneous transmission or reception by multiple stations of the multi-link device, but does not support simultaneous transmission or reception by multiple stations of the multi-link device in a specific condition. In this case, the specific condition may include a specific time point.

Specifically, a multi-link device may operate as a single radio multi-link device according to an operation mode. For example, when a specific mode is deactivated, the multi-link device may perform transmission or reception in multiple links, and when a specific mode is activated, the multi-link device may perform transmission or reception only in a single link among the multiple links in a specific time interval. In this case, when the specific mode is deactivated, the multi-link device may perform transmission or reception in multiple stations, and when the specific mode is activated, the multi-link device may perform transmission or reception only in a single station among the multiple stations in a specific time interval. In this case, the specific time interval may include a time for the multi-link device to perform frame exchange in one link. Specifically, the specific time interval may correspond to an interval from a time point at which the multi-link device receives an initial control frame for initiating frame exchange in one link to an end time point of the corresponding frame exchange. When a multi-link device uses a single radio in a single link in a specific time interval in a specific mode, the specific mode may be referred to as an enhanced multi-link single radio (EMLSR) mode. While a multi-link device performs frame exchange in a first link of EMLSR links corresponding to multiple links to which the EMLSR mode is applied, the multi-link device does not perform transmission and reception in a second link of the EMLSR links. In addition, when another station of a multi-link device performs transmission or reception by using a part of an RF chain used by a specific station of the multi-link device in a specific time interval in a specific mode, the specific mode may be referred to as an enhanced multi-link multi-radio (EMLMR) mode. Specifically, when a station of a multi-link device performs transmission or reception by using an RF chain of another station of the multi-link device in an EMLMR mode, an operation of the multi-link device may be identical to a multi-link operation in the EMLSR mode. In addition, even though the multi-link device operates in the EMLSR mode, some links of the multiple links in which the multi-link device operates may be operated without restriction by the EMLSR mode. When a multi-link device operates in the EMLSR mode, a link to which the EMLSR mode is applied may be a part of links in which the multi-link device operates. For example, when the multi-link device operates in a first link to a third link, the EMLSR mode or the EMLMR mode may be applied only to the first link and the second link. Accordingly, when a multi-link device performs transmission or reception in a first link in a specific time interval in the EMSLR mode, the multi-link device cannot perform transmission or reception in a second link. In this case, the multi-link device may perform transmission or reception in a third link without restriction by the EMLSR mode. For convenience of description, a link to which the EMLSR mode is applicable, such as the first link and the second link, is referred to as an EMLSR link, and a link to which the EMLMR mode is applicable is referred to as an EMLMR link. Performing transmission or reception by using an RF chain of a specific station in the EMLSR mode or the EMLMR mode brings switching of transmission, reception, or monitoring capability in a link in which the specific station operates. Accordingly, in the following description, the same embodiment of the present invention, which is applied in relation to the EMLSR mode, is also applicable in relation to the EMLMR mode, without specific recitation.

The above-described embodiments relating to an operation of a non-STR multi-link device may be also applied to an operation of a single radio multi-link device. In addition, the above-described embodiments relating to an operation of a station performing transmission or reception with a station of a non-STR multi-link device may be also applied to an operation of a station perform transmission or reception with a station of a single radio multi-link device. For example, when a station determines that transmission of a single radio multi-link device has failed on a first link due to transmission or reception of the single radio multi-link device on a second link, the station may not increase a CW of channel access performed on the first link. Specifically, the embodiment described through FIG. 14 is applicable. In this case, a method for determining, by the station, that transmission of the single radio multi-link device has failed on a first link due to transmission or reception of the single radio multi-link device on the second link may be similar to the method for determining, by the station, whether transmission of the station of the non-STR multi-link device has failed due to restriction on the operation of the non-STR multi-link device.

Figure 35:
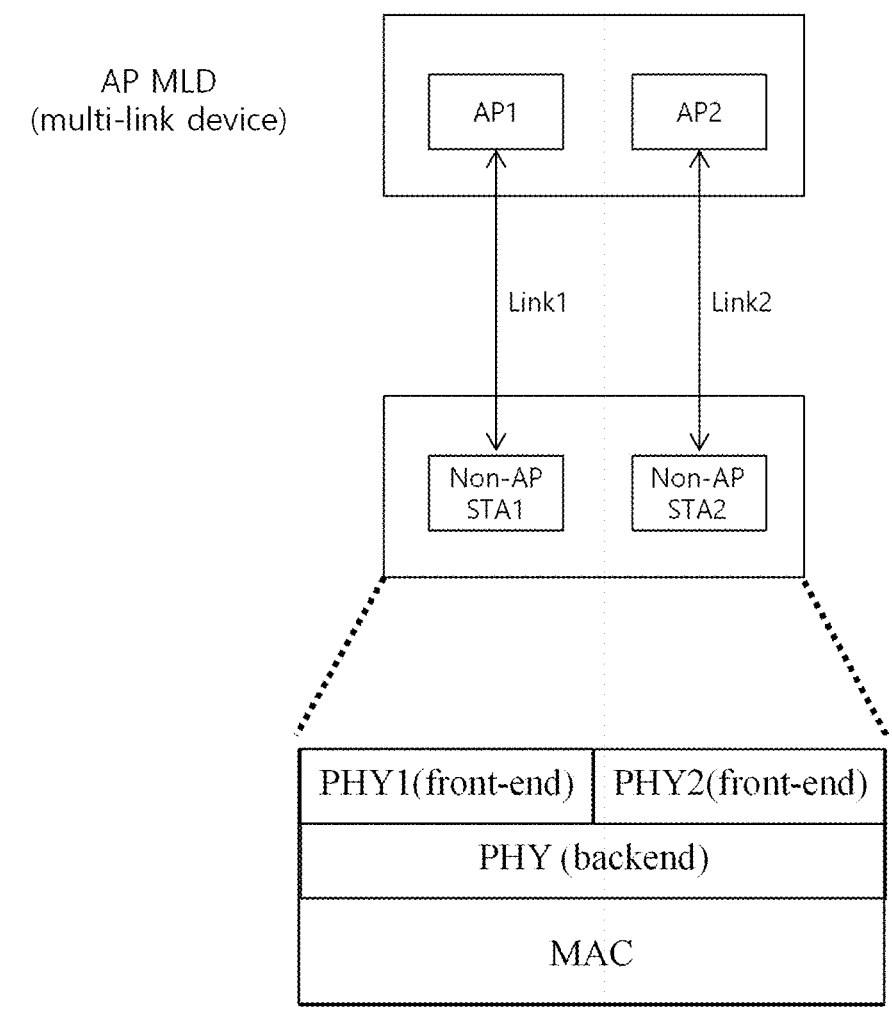
FIG. 35 illustrates connection between a single radio multi-link device and an AP multi-link device according to an embodiment of the present invention.

FIG. 35 illustrates connection between a single radio multi-link device and an AP multi-link device according to an embodiment of the present invention.

In the present specification, a PHY back end refers to a physical layer digital processor including a processor for encoding and decoding a PPDU. In addition, a PHY front end refers to an analog baseband circuit including an RF chain.

Multiple stations of a single radio multi-link device operate on multiple links. The multiple stations may share the PHY back end. In this case, when one station transmits a PPDU, the PHY back end is used for encoding of the PPDU. Accordingly, in this case, the remaining stations of the multiple stations cannot use the PHY back end. Accordingly, the single radio multi-link device may include multiple stations operating on different links, but perform transmission or reception on only one link at a time.

However, the single radio multi-link device may perform channel access on multiple links. Specifically, the single radio multi-link device may perform monitoring on multiple links. Accordingly, the single radio multi-link device may perform channel access on multiple links. In this case, the monitoring may include channel sensing. In addition, the channel sensing may include at least one of clear channel assessment (CCA) and preamble detection (PD). Through this, the single radio multi-link device can reduce a channel access delay. Specifically, even though a first station of the single radio multi-link device fails to perform channel access due to channel occupancy by another wireless communion device, performed on a first link, a second station of the single radio multi-link device may perform a backoff procedure on a second link. In such embodiments, the single radio multi-link device may correspond to a multi-link device operating in an EMLSR mode, as described above.

To support such embodiments, the PHY front end of the single radio multi-link device may support channel monitoring independently from the PHY back end for PD. In addition, the PHY front end of the single radio multi-link device may support decoding of a preamble of a PPDU, independently from the PHY back end. In addition, the PHY front end of the single radio multi-link device may support reception of a frame transmitted through a low MCS, independently from the PHY back end. In this case, the frame transmitted through the low MCS may include at least one an RTS frame and an MU-RTS frame. Accordingly, the PHY front end may include a MAC processor. In addition, through such an embodiment, processing power of the PHY back end can be utilized focusing on encoding and decoding of a data frame.

In the embodiment of FIG. 35, an AP multi-link device includes a first AP (AP1) and a second AP (AP2). A single radio multi-link device includes a first non-AP station (non-AP STA1) and a second non-AP station (non-AP STA2). The first AP (AP1) is connected to the first non-AP station (non-AP STA1) on a first link (link1), and the second AP (AP2) is connected to the second non-AP station (non-AP STA2) on a second link (link2). As described in the embodiments above, each of the first non-AP station (non-AP STA1) and the second non-AP station (non-AP STA2) independently performs channel access by using a PHY front end.

The single radio multi-link device may use an RF chain of a station not participating in transmission or reception for MIMO transmission. Specifically, when a first station of the single radio multi-link device acquires a channel access opportunity, the first station may perform MIMO transmission by using not only an RF chain used by the first station but also an RF chain used by a second station. A description thereof is made through FIG. 36.

Figure 36:
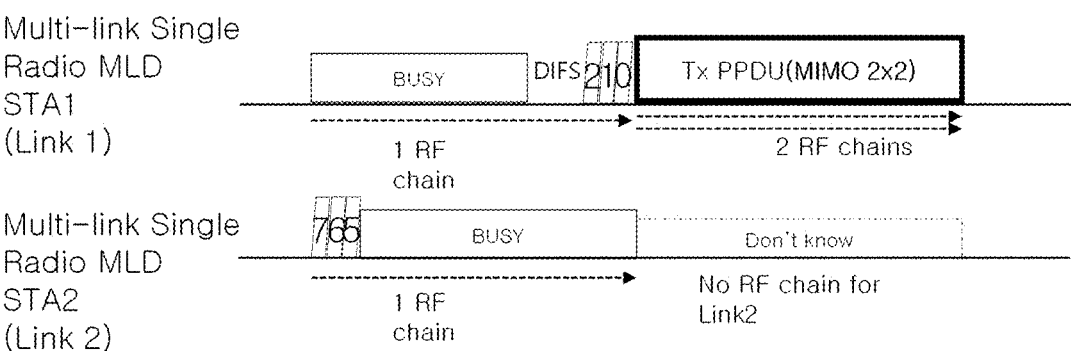
FIG. 36 illustrates MIMO transmission performed by a single radio multi-link device according to an embodiment of the present invention.

FIG. 36 illustrates MIMO transmission performed by a single radio multi-link device according to an embodiment of the present invention.

In an embodiment of FIG. 36, a first station (STA1) of a single radio multi-link device operates on a first link (Link 1), and a second station (STA2) of a single radio multi-link device operates on a second link (Link 2). The first station (STA1) performs channel access on the first link (Link 1), and the second station (STA2) performs channel access on the second link (Link 2). When the first station (STA1) successfully performs channel access on the first link (Link 1), the first station (STA1) performs 2×2 MIMO transmission on the first link (Link 1) by using not only an RF chain used in channel access on the first link but also an RF chain used by the second station (STA2) in channel access on the second link.

Accordingly, an RF chain operating in a second link is switched to operate in a first link, a single radio multi-link device cannot perform monitoring and channel access in the second link. In addition, an RF chain, which has operated in the second link and then has been switched to operate in the first link, operates in the second link again, the single radio multi-link device may stand by for a predetermined time interval, and then perform channel access in the second link. As such, when the RF chain operating on the first link is switched to operate on the second link, the single radio multi-link device cannot perform monitoring and channel access on the first link. In addition, when the corresponding RF chain operates on the second link again, the single radio multi-link device may perform channel access on the second link after waiting a predetermined time interval. In this case, for a predetermined time interval from completion of RF switching, channel access by the single radio multi-link device may be restricted on the second link. Specifically, the single radio multi-link device may perform channel access on the second link after waiting a predetermined time interval from completion of RF switching. In this case, the channel access may include a backoff procedure. In addition, the predetermined time interval may correspond to a predetermined time interval applied when restriction on channel access is required due to a time interval for which channel monitoring is impossible. Specifically, the predetermined time interval may be NAVSyncdelay. Specifically, the single radio multi-link device may perform a backoff procedure after waiting NAVSyncdelay. This is because there is high probability that transmission of another wireless communication terminal, performed on the second link, fails to be detected due to a time period for which the single radio multi-link device has failed to perform channel monitoring. In addition, when a link on which an RF chain operates is switched, a delay for starting an operation of an RF chain may be required. Accordingly, in consideration of a RF chain switching delay, the single radio multi-link device may perform channel access. A description thereof is made through FIG. 37. In addition, for convenience of description, switching of an RF chain operating on one link to operate on another link is referred to as RF chain switching. In addition, switching of a link may indicate switching of an RF chain supported on the link. Specifically, a case where use of multiple chains is supported and then use of one RF chain is supported on a first link, or a case where use of even one RF chain is not supported and then use of one RF chain is supported on the second link, may be referred to as RF chain switching.

When a multi-link device operates in the above-described EMLSR mode or EMLMR mode, transmission, reception, or monitoring capability may be switched in a link to which the EMLSR mode or the EMLMR mode is applied. Accordingly, an RF chain of the link to which the EMLSR mode or the EMLMR mode is applied may be configured again. Accordingly, even in a case of link switching in the EMLSR mode or the EMLMR mode, the above-described channel access restriction may be applied. When link switching is performed in the link to which the EMLSR mode or the EMLMR mode is applied, channel access of a station to which mode switching is applied among stations of the multi-link device may be restricted for a predetermined time from a reconfiguration time point. The predetermined time may be NAVSyncDelay or MediumSyncDelay. Even though the predetermined time has not elapsed, the channel access restriction of the multi-link device may be released when a frame enabling an NAV setup is received. In addition, the predetermined time may be a time indicated by an NAVSyncDelay parameter. In such embodiments, even before the predetermined time elapses from a link switching completion time point, i.e., a time point at which the monitoring capability is recovered, the station may transmit a control frame for setting up an NAV and start frame exchange. The control frame for setting up an NAV may be at least one of an RTS frame and an MU-RTS frame. Hereinafter, link switching may include recovery after loss of all or a part of transmission, reception, or monitoring capability of a link.

In this case, a case of switching of transmission, reception, or monitoring capability of a link to which the EMLSR mode or the EMLMR mode is applied may include a case of switching of a frequency band or a center frequency of an RF chain.

In addition, the channel access restriction of the multi-link device may correspond to a case where transmission by the multi-link device is prohibited and the multi-link device performs CCA.

A station communicating with a single radio multi-link device by using MIMO may be a station of a multi-link device. Specifically, a station communication with a single radio multi-link device by using MIMO may be an AP included in a multi-link device. Unless there is no specific description, a station communicating with a single radio multi-link device by using MIMO in the present specification may correspond to a station included in a multi-link device. In this case, the station included in the multi-link device may be an AP. In addition, in the present specification, a description made as an operation of a station of a multi-link device may correspond to a representation of an operation of a multi-link device.

Figure 37:
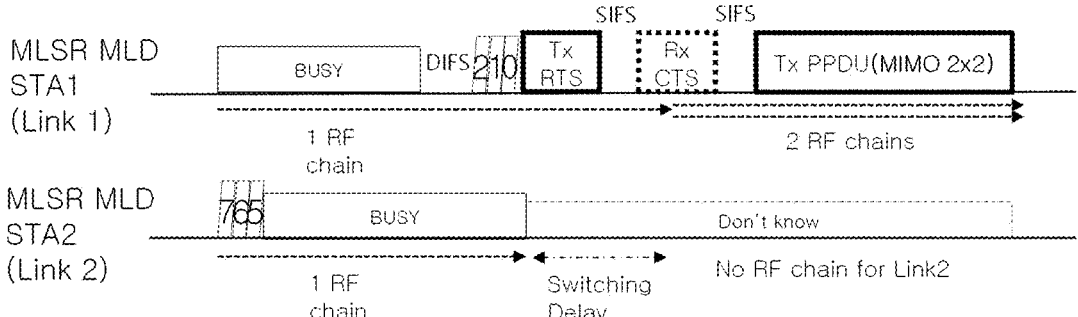
FIG. 37 illustrates an operation of performing channel access by a single radio multi-link device in consideration of a radio frequency (RF) chain switching delay according to an embodiment of the present invention.

FIG. 37 illustrates an operation of performing channel access by a single radio multi-link device in consideration of an RF chain switching delay according to an embodiment of the present invention.

A single radio multi-link device may perform RF chain switching before a time point at which successful channel access is expected to be successfully performed. Specifically, the single radio multi-link device may perform RF chain switching before a time interval configured based on RF chain switching delay from the time point at which channel access is expected to be successfully performed. For example, the single radio multi-link device may perform RF chain switching at a time point earlier by the RF change switching delay from the time point at which channel access is expected to be successfully performed.

In an embodiment of FIG. 37, a first station (STA1) of a single radio multi-link device operates on first link (Link 1), and a second station (STA2) of a single radio multi-link device operates on a second link (Link 2). The first station (STA1) performs channel access on the first link (Link 1), and the second station (STA2) performs channel access on the second link (Link 2). When the first station (STA1) has successfully performed channel access on the first link (Link 1), the first station (STA1) performs 2×2 MIMO transmission by using not only an RF chain used for channel access on the first link (Link 1) but also an RF chain used for channel access by the second station (STA2) on the second link (Link 2). In an embodiment of part (a) of FIG. 37, a single radio multi-link device performs RF chain switching at a time point earlier by an RF chain switching delay from a time (expected Tx time) at which channel access is expected to be successfully performed.

In another specific embodiment, a single radio multi-link device may start an RTS frame/CTS frame exchange at the start of transmission after RF chain switching. In another specific embodiment, a single radio multi-link device may transmit a CTS-to-self frame at the start of transmission after RF chain switching. In addition, the single radio multi-link device may transmit a frame having a relatively shorter length, instead of the CTS-to-self frame. Through such embodiments, the single radio multi-link device may acquire a time required until completion of the RF chain switching. In addition, unlike the above-described embodiments, in these embodiments, a problem may not occur even when channel access fails to be successfully performed at an expected time point.

In an embodiment of part (b) of FIG. 37, a single radio multi-link device starts transmission through an RTS frame/CTS frame exchange on a first link (Link 1).

Figure 38:
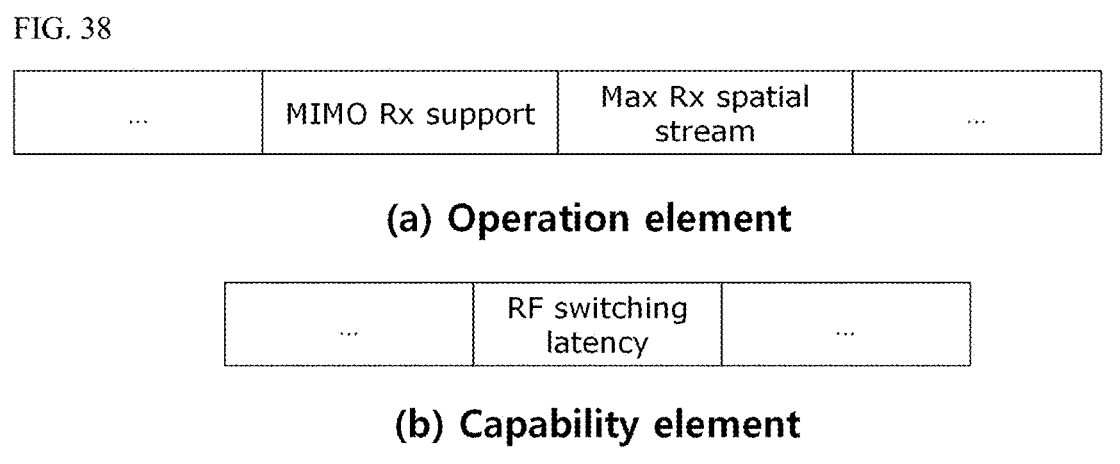

FIG. 38 illustrates a capability element and an operation element used by a single radio multi-link device according to an embodiment of the present invention.

The single radio multi-link device may perform transmission or reception by perform RF chain switching as described through FIGS. 36 and 37. In addition, the single radio multi-link device may perform transmission or reception without performing RF chain switching. The single radio multi-link device may select whether to perform RF chain switching.

When performing MIMO communication in a corresponding link in a MIMO Rx support subfield of an operation element, the single radio multi-device may indicate whether to use an RF chain of another link. For example, when the single radio multi-link device configures a value of the MIMO Rx support subfield of the operation element as 1, the MIMO Rx support subfield may indicate that MIMP reception can be performed by using many spatial streams as the number equal to or greater than the value of a Max Rx spatial stream subfield of the operation element. In this case, a station performing MIMO transmission to the single radio multi-link device needs to perform the MIMO transmission by using many spatial streams as the number equal to or smaller than a value the Max Rx spatial stream subfield of the operation element. In a specific embodiment, a format of the operation element may be as shown in part (a) of FIG. 38.

In addition, the single radio multi-link device may signal a time required for RF chain switching in a capability element. In this case, a switching latency subfield of the capability element may indicate the time required for RF chain switching. A station performing MIMO transmission to the single radio multi-link device needs to perform the MIMO transmission in consideration of the time required for RF chain switching. Specifically, the station performing the MIMO transmission to the single radio multi-link device may start the MIMO transmission after a time required for RF chain switching elapses from initial transmission for the single radio multi-link device. In a specific embodiment, a format of the capability element may be as shown in part (a) of FIG. 38.

When the single radio multi-link device performs transmission or reception on a first link, a station which is to perform transmission to the single radio multi-link device may not be allowed to perform the transmission on a link other than the first link. This is because the single radio multi-link device cannot perform reception on a link other than the first link while transmission or reception is performed on the first link. Specifically, a station which is to perform transmission to the single radio multi-link device may not be allowed to perform the transmission on a link other than the link not only while a frame exchange is performed on the first link but also until a predetermined time elapses from a time point at which the single radio multi-link device completes a frame exchange sequence. Specifically, the completion of the frame exchange sequence may be determined based on reception or transmission of a last frame of the frame exchange sequence. In this case, the frame exchange sequence may be performed on a link on which multiple RF chains are available. Specifically, the frame exchange sequence may be performed using MIMO. The predetermined time may be determined based on a time required for RF chain switching. Specifically, the predetermined time may be a time required for RF chain switching.

When an EMLSR mode of a multi-link device is activated, transmission and reception are possible only in a specific link among multiple links to which the EMLSR mode of the corresponding multi-link device is applied in a specific time interval. In addition, when an EMLMR mode of a multi-link device is activated, transmission and reception are possible only in a specific link among multiple links to which the EMLMR mode of the corresponding multi-link device is applied in a specific time interval. In addition, as described above, in a case of switching of transmission, reception, or monitoring capability of a link to which the EMLSR mode or the EMLMR mode is applied, an RF chain may be reconfigured. This is for recovery of monitoring capability in a link, the part or of all of the transmission, reception, or monitoring capability of which has been lost in the EMLMR mode or the EMLSR mode. That is, the reconfiguration of the RF chain is for recovery of monitoring, transmission, or reception capability of a link to which the EMLMR mode or the EMLSR mode is applied. Accordingly, a station which is to perform transmission to a station operating in a link, the transmission, reception, or monitoring capability of which is recovered, for example, a link in which frame exchange is not performed in the EMLSR mode, among stations of the multi-link device, cannot perform frame exchange with a multi-link device in the EMLMR link or the EMLSR link for a predetermined time interval from a time point at which the transmission, reception, or monitoring capability of the link is reconfigured. In this case, the EMLMR link or the EMLSR link may be restricted to a link in which link switching is performed, for example, a link in which an RF chain is reconfigured. In this case, the predetermined time may be a delay time for link switching. In this case, the link switching may indicate an operation performed to recover monitoring capability in a link which has lost the monitoring capability. Specifically, the predetermined time may be configured based on a time required to perform link switching, for example, RF chain switching. To this end, a multi-link device or a station for performing frame exchange with the multi-link device needs to determine a link switching time point. As described above, the station or the multi-link device may determine an end time point of an EMLMR mode or an EMLSR mode, but in the following description of an embodiment of an end time point determination method, for convenience of description, the station is described as an entity for performing the determination. For convenience of description, the EMLMR mode and the EMLSR mode are collectively referred to as an EML mode. In addition, the EMLMR link and the EMLSR link are collective referred to as an EML link.

When performing frame exchange in a first link corresponding to one of EML links, a station may configure a timer for a frame exchange end time point in a second link corresponding to one of the EML links. For convenience of description, the timer is collectively referred to as an end time point timer. In this case, the station may configure the end time point timer based on a duration/ID field of a frame received from a multi-link device entering into an EML mode. The station may determine a time point at which the end time point timer expires, as an end time point of frame exchange corresponding to the timer. In addition, the multi-link device to which the EML mode is applied may also configure a timer for an end time point. In this case, the multi-link device may synchronize the end time point timer with the end time point timer of the station. The multi-link device may configure the end time point timer based on a duration/ID field of a frame received from an AP.

A frame exchange end time point may be a time point at which frame exchange is completed in the EML mode. In another specific embodiment, the frame exchange end time point may be an end time point of a TXOP configured for protection of the frame exchange in the EMLMR mode or the EMLSR mode.

Accordingly, the station may determine an end time point of a TXOP configured for a frame exchanged when the EML mode is applied, as a frame exchange end time point. In this case, the end of the TXOP may include a case where a TXOP is terminated to invoke a new backoff procedure before the completion of the TXOP. When neither TXOP holders nor TXOP responders occupy a channel for (aSIFSTime+aSlot-Time) within the TXOP, a new backoff procedure needs to be invoked. The aSIFSTime indicates an SIFS defined in 802.11, i.e., 16 us, and the aSlotTime indicates a unit time for channel sensing in EDCA and DCF, i.e., 9 us. Hereinafter, when the aSIFSTime and the aSlotTime are used, the aSIFSTime and the aSlotTime have such meanings unless separately described. Specifically, the station may determine a time point at which a period indicated by a duration/ID field of a frame transmitted in the EML link in the EML mode elapses, as a frame exchange end time point.

In addition, the station may determine, as a frame exchange end time point, a time point at which after a response frame is transmitted to the multi-link device in the EML link in which frame exchange is performed in the EML mode, the corresponding link is detected to be idle for a predetermined time. The station may receive, from the multi-link device, a frame requiring no immediate response frame. In this case, the station may not transmit a response frame. Accordingly, the station may determine, as a frame exchange end time point, a time point at which from a time point of reception of a frame requiring no response frame from the multi-link device in the EML link in which frame exchange is performed in the EML mode, the corresponding link is detected to be idle for a predetermined. In addition, when the station receives a frame requesting a response frame, the station may determine, as a frame exchange end time point, a time point at which after a response frame is transmitted to the multi-link device in the EML link in which frame exchange is performed in the EML mode, the corresponding link is detected to be idle for a predetermined time. In such embodiments, the predetermined time may be PIFS+aRXPHYStartDelay. The PIFS may be aSIFSTime+aSlot-Time. In addition, the aRXPHYStartDelay may be a delay time related to a time required until the MAC recognizes a fact that the PHY initiates an Rx operation after the initiation. In this case, the station may determine a time point at which a response frame is transmitted, as a time point at which the PHY-TXEND.confirm primitive for the responding frame is generated. In addition, a time point at which the station receives a frame requiring no response frame may be a time point at which the PHY-RXEND.indication primitive is generated. Such embodiments consider a case where a condition that a TXOP holder can transmit consecutive frames within a TXOP in the conventional WLAN fails to be satisfied. That is, such embodiments correspond to an embodiment of determining that frame exchange ends when the TXOP holder fails to perform transmission and needs to attempt a backoff procedure again. In a specific embodiment, the TXOP may end as follows.

When an ack policy of a frame included in a received PPDU is "HETP ack", a multi-link device in the EML mode needs to successfully receive a TRS control field or a trigger frame included in the PPDU to perform an ack response. The multi-link device in the EML mode fails to successfully receive the trigger frame or the TRS control field, the multi-link device may fail to transmit a response even though the multi-link device has received a frame requesting a response frame. In this case, unless the station retransmits a frame requiring an immediate response, the TXOP ends.

An AP multi-link device is not allowed to transmit an initial control frame to a multi-link device to which the EML mode is applied, for an RF switching change time of the multi-link device to which the EML mode is applied from a time point of a TXOP configured for protection of a frame exchanged in the EML mode. That is, the AP multi-link device may transmit an initial control frame to the multi-link device to which the EML mode is applied after the RF switching change time of the multi-link device to which the EML mode is applied from a TXOP configured for protection of a frame exchanged in the EML mode.

In addition, the station may determine, as a frame exchange end time point, a time point of receiving a CF-end frame in the EML link in which the frame exchange is performed in the EML mode. In this case, the station may determine that the CF-end frame is received at a time point at which the PHY-RXSTART.indication primitive is generated due to the CF-end frame. In another specific embodiment, the station may determine that the CF-end frame is received at a time point at which the PHY-RXEND.indication primitive is generated due to the CF-end frame. In another specific embodiment, the station may determine a time point before the aSIFSTime from a time point at which the CF-end frame is received, as a frame exchange end time point. In this case, the station may determine that the CF-end frame is received at a time point at which the PHY-RXSTART.indication primitive is generated due to the CF-end frame. In another specific embodiment, the station may determine that the CF-end frame is received at a time point at which the PHY-RXEND.indication primitive is generated due to the CF-end frame.

It is described above that the station may configure the end time point timer. When the station receives a CF-end frame, the station may reset the end time point timer, i.e., may set the timer to 0. In another specific embodiment, when the station receives a CF-end frame, the station may set the end time point timer to a value smaller than 0. In this case, the value smaller than 0 may be a time corresponding to a transmission time (air time) of the CF-end frame. In this case, a station which is to perform frame exchange with the multi-link device to which the EML mode is applied may immediately start new frame exchange when receiving the CF-end frame.

The above-described transmission restriction due to the link switching is applicable only to a link which has lost the transmission, reception, or monitoring capability in the EML mode, for example, a link in which no frame exchange is performed in the EMLSR mode. That is, the transmission restriction due to the link switching may not be applied to a link which has not lost the transmission, reception, or monitoring capability in the EML mode, for example, a link in which frame exchange is performed in the EMLSR mode. For example, when EML links include a first link and a second link, frame exchange is performed in the first link in the EML mode, and the frame exchange in the first link ends, the transmission restriction is applicable only to the second link. In addition, when link switching is performed, the transmission restriction may not be applied to the first link.

When the embodiment above is applied, a multi-link device having performed link switching may need to recover monitoring for a link which has lost the transmission, reception, or monitoring capability in the EML mode within a predetermined time from a frame exchange end time point, for example, a link in which the frame exchange has not been performed in the EMLSR mode. In addition, the station, for example, an AP of the AP multi-link device, may start frame exchange for the multi-link device to which the EML mode is applied in a link which has lost the transmission, reception, or monitoring capability in the EML mode after a predetermined time from a frame exchange end time point, for example, an EML link in which the frame exchange has not be performed in the EMLSR mode.

The station to which the EML mode is applied may transmit a frame indicating the end of frame exchange. In this, the frame indicating the end of frame exchange may be a CF-end frame. For example, the station having completed the frame exchange in the EML mode may transmit the CF-end frame before the TXOP configured for frame exchange ends. In this case, the multi-link device having received the CF-end frame may determine that the multi-link device having transmitted the CF-end frame has completed frame exchange in the EMLSR mode or the EMLMR mode. Accordingly, frame exchange in the link in which transmission and reception are restricted due to link switching can be advanced.

In addition, a station which is to perform transmission to the single radio multi-link device in the frame exchange sequence immediately after RF chain switching may determine a format of a PPDU initially transmitted in the frame exchange sequence, based on the time required for RF chain switching by the single radio multi-link device. In addition, a station which is to perform transmission to the single radio multi-link device in a first frame exchange sequence after RF chain switching may determine the length of padding used for transmission of a PPDU initially transmitted in the frame exchange sequence, based on the time required for RF chain switching by the single radio multi-link device. In this case, the padding may be one of physical layer padding and MAC layer padding. Specifically, the station may configure a shorter length of padding of a packet transmitted to a single radio multi-link device requiring a relatively shorter time for RF chain switching than padding of a packet transmitted to a single radio multi-link device requiring a relatively longer time for RF chain switching.

In another specific embodiment, padding may be inserted into an initial control frame corresponding to a control frame transmitted first in frame exchange in the EMLSR mode. In this case, a padding duration may be determined based on a time required for link switching. Specifically, the multi-link device may insert, into an initial control frame, padding having the duration equal to or longer than that of padding corresponding to a time equal to or greater than a difference between (2×SIFS+CTS_time) and the time required for link switching. In this case, the CTS_time indicates a time (air time) required to transmit a CTS frame. That is, the multi-link device may insert, into the initial control frame, padding having a duration equal to or longer than that of padding corresponding to a time obtained after subtracting (2×SIFS+ CTS_time) from the link switching time. In another specific embodiment, the multi-link device may insert, into the initial control frame, padding having a duration equal to or longer than that of padding corresponding to a time equal to or greater than a difference between the link switching time and an SIFS. The multi-link device may insert, into the initial control frame, padding having a duration equal to or longer than that of padding corresponding to a time obtained by subtracting an SIFS from the link switching time.

In such embodiments, the multi-link device supporting the EMLSR mode may perform signaling of a padding duration of the initial control frame to the counterpart multi-link device. For example, in the above-described embodiments, the multi-link device supporting the EMLSR mode may perform signaling of a padding duration of the initial control frame, instead of the link switching time. In this case, the counterpart multi-link device may insert, into the initial control frame, padding corresponding to a time longer than the signaled padding duration. For example, the counter multi-link device may insert the padding having the signaled padding duration into the initial control frame.

Through such embodiments, while padding of the initial control frame is transmitted, the multi-link device may secure a time for configuring an RF chain.

Figure 39:
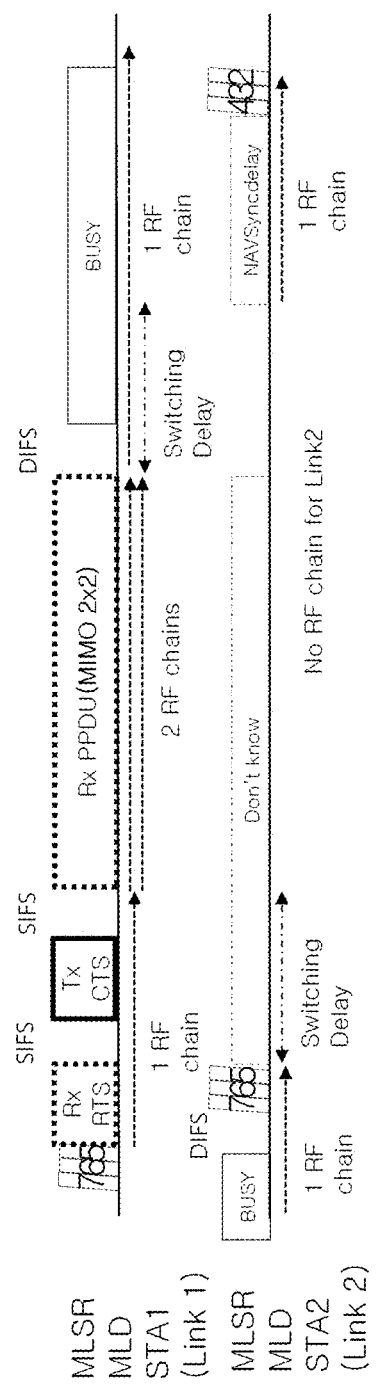
FIG. 39 illustrates transmission of a PPDU by using MIMO by a single radio multi-link device according to an embodiment of the present invention.

FIG. 39 illustrates transmission of a PPDU by using MIMO by a single radio multi-link device according to an embodiment of the present invention.

A station which is to perform MIMO transmission to a single radio multi-link device may start a RTS frame/CTS frame exchange at a start of the transmission after RF chain switching. In this case, an RTS frame may secure a time for RF chain switching, and protect a frame exchange thereafter. When it is determined that RF chain switching has failed to be completed even after the RTS frame/CTS frame exchange, a station which is to perform MIMO transmission to the single radio multi-link device may not perform the MIMO transmission. In this case, the station which is to perform the MIMO transmission to the single radio multi-link device may perform the transmission by using a single spatial stream.

When the single radio multi-link device is to perform transmission or reception on a certain link, the single radio multi-link device cannot perform transmission or reception on a link other than the corresponding certain link. Accordingly, when the single radio multi-link device performs transmission or reception on a certain link, it may be considered that a station operating on a link other than the corresponding certain link is in a blind state. Accordingly, when the single radio multi-link is to perform transmission or reception on a certain link, an AP which is to perform transmission to the single radio multi-link device may not perform transmission to a station operating on a link other than the corresponding certain link. In this case, the AP which is to perform transmission to the single radio multi-link device may stop performing transmission that is being performed for the station operating on a link other than the corresponding certain link.

When the single radio multi-link device performs transmission or reception on a certain link, the AP having performed or having stopped performing the transmission to the station of the single radio multi-link device may not increase a CW of a backoff procedure, used for channel access for transmission. Thereafter, when the single radio multi-link device attempts to perform transmission again to the corresponding station, the single radio multi-link device may acquire a backoff counter within the previously used CW. Accordingly, when a predetermined condition is satisfied, the station having performed or having stopped performing transmission to the station of the single radio multi-link device may not increase the CW of the backoff procedure, used for channel access. According the above-described embodiment, the predetermined condition corresponds to a case where a station determines that one of stations of a single multi-link device performs transmission or reception. Specifically, it is determined that a station having transmitted a PPDU received by another station of a multi-link device including a station is included in a single radio multi-link device, the station may determine that one of stations of the single radio multi-link device performs transmission. In this case, the station may determine a station transmitting the PPDU, based on an identifier of a station transmitting the PPDU, indicated by a signaling field of the PPDU. In this case, the station may determine whether an STA-ID of a user field of a HE PPDU indicates one of stations of the single radio multi-link device. In addition, the station may determine whether an STA-ID of a user field of an EHT PPDU indicates one of stations of a single radio multi-link device. In addition, the station may determine whether a TA field of a MAC frame included in a PPDU indicates one of stations of the single radio multi-link device. The MAC frame may be one of an MSDU, an MPDU, and an A-MPDU. This may be similar to the embodiments applied to transmission for the non-STR multi-link device described through FIG. 19 above. In addition, in a case of a channel access procedure to which EDCA is applied, the above-described CW may indicate a CW of an AC, used for channel access.

In addition, when due to transmission or reception by one of stations of the single radio multi-link device, transmission for another station of the single radio multi-link device fails, a station having performed transmission to another station of the single radio multi-link device may not increase a retry counter. In this case, the retry counter may include at least one of a long retry counter and a short retry counter.

In addition, when a station transmits an MU PPDU to multiple stations including a station of the single radio multi-link device, the above-described embodiment relating to maintaining the size of the CW may not be applied. Specifically, when a station fails to receive a response from any one of multiple stations after transmitting an MU PPDU to the multiple stations including the station of the single radio multi-link device, the station having transmitted the MU PPDU may increase the size of the CW. In this case, the station having transmitted the MU PPDU may increase a value of the CW to the next largest value among values of the CW. When the value of the CW is a maximum value, the station having transmitted the MU PPDU may maintain the value of the CW as the same value.

In the embodiment of FIG. 39, a single radio multi-link device includes a first station (STA1) operating on a first link (Link 1), and a second station (STA2) operating on a second link (Link 2). A station which is to perform transmission to the first station (STA1) by using MIMO successfully performs channel access on the first link (Link 1) and then transmits an RTS frame to the first station (STA1). The first station (STA1) transmits a CTS frame as a response to the RTS frame. A PPDU is received by using 2×2 MIMO after completion of RF chain switching by the single radio multi-link device. After the first station (STA1) received the PPDU, the single radio multi-link device performs RF chain switching, and the second station (STA2) starts channel access on the second link (Link 2) after waiting NAVSyncdelay from the RF chain switching.

<Null Data Packet (NDP) Transmission Procedure for Single Radio Multi-Link Device>

As described above, a single radio multi-link device may perform MIMO by switching a link on which an RF chain operates. When a link on which the RF chain operates is switched, learning RF characteristics of a switched link is required before MIMO communication.

Since learning of channel characteristics of the RF chain is not performed, closed-loop multiple-antenna technology (beamforming) cannot be utilized. Accordingly, channel estimation may be required. Specifically, a single radio multi-link device may perform channel estimation by using an NDP sounding protocol. A beamformer in an explicit NDP sounding sequence transmits an NDP announcement (NDPA) and then transmits an NDP. In this case, an interval between the NDPA and the NDP is an SIFS. A station having received the NDPA receives the NDP and then transmits, to the beam former, channel state information (CSI) feedback measured at the time of the reception of the NDP when an STA user info list field of the NDPA indicates the station.

In this case, before the NDP sounding protocol is performed, an RTS frame/CTS frame exchange may be performed. Specifically, a station which is to start the NDP sounding protocol with a single radio multi-link device may transmit an RTS frame before transmitting an NDPA frame. For convenience of description, the station which is to start the NDP sounding protocol with the single radio multi-link device is referred to as an NDP sounding protocol initiation station. Through the above-described embodiment, the NDP sounding protocol initiation station may protect an NDP sounding sequence. In addition, through this, a time required for RF chain switching can be secured. In addition, the NDP sounding protocol initiation station may perform an MU-RTS frame/CTS frame exchange procedure rather than the RTS frame/CTS frame exchange procedure. In addition, the NDP sounding protocol initiation station may perform an exchange of a trigger frame having a different type from that the MU-RTS frame and an exchange of a response to the trigger frame instead of performing the MU-RTS frame/CTS frame exchange procedure. In addition, in such an embodiment, the NDP sounding protocol initiation station may transmit an MU-RTS frame, a trigger frame having a different type from that of the MU-RTS frame, and an NDPA frame in a predetermined PPDU format. Specifically, the predetermined PPDU format may be at least one of a non-HT format and an HT format. In addition, the NDP sounding protocol initiation station may transmit the MU-RTS frame, the trigger frame having a different type from that of the MU-RTS frame, and the NDPA frame at a data rate equal to or lower than a predetermined data rate.

The NDP sounding protocol initiation station may adjust the length of an NDP sounding sequence based on a time required for RF chain switching. The NDP sounding protocol initiation station may use a longer NDP sounding sequence in a case of exchanging an NDP sounding sequence with a single radio multi-link device requiring a relatively longer time for RF chain switching, compared to a case of exchanging an NDP sound sequence with a single radio multi-link device requiring a relatively shorter time for RF chain switching. In this case, the NDP sounding protocol initiation station may adjust the length of the NDP sounding sequence by omitting a part of the NDP sounding sequence. In addition, the NDP sounding protocol initiation station may adjust padding of a frame exchanged in the NDP sounding sequence to adjust the length of the NDP sounding sequence. In addition, the NDP sounding protocol initiation station may adjust the length of the NDP sounding sequence by transmitting an additional frame in the NDP sounding sequence. In this case, the padding may be physical layer padding. In addition, the padding may be MAC layer padding. Accordingly, in embodiments to be described below, the padding may be physical layer padding or MAC layer padding.

In addition, when the NDP sounding protocol initiation station performs an NDP sounding protocol with multiple single radio multi-link devices, the NDP sounding protocol initiation station may adjust the length of the NDP sounding sequence based on the longest one of times required for RF chain switching of the multiple single radio multi-link devices. A method for adjusting the length of the NDP sounding sequence is described with reference to FIGS. 40 to 42.

Figure 40:
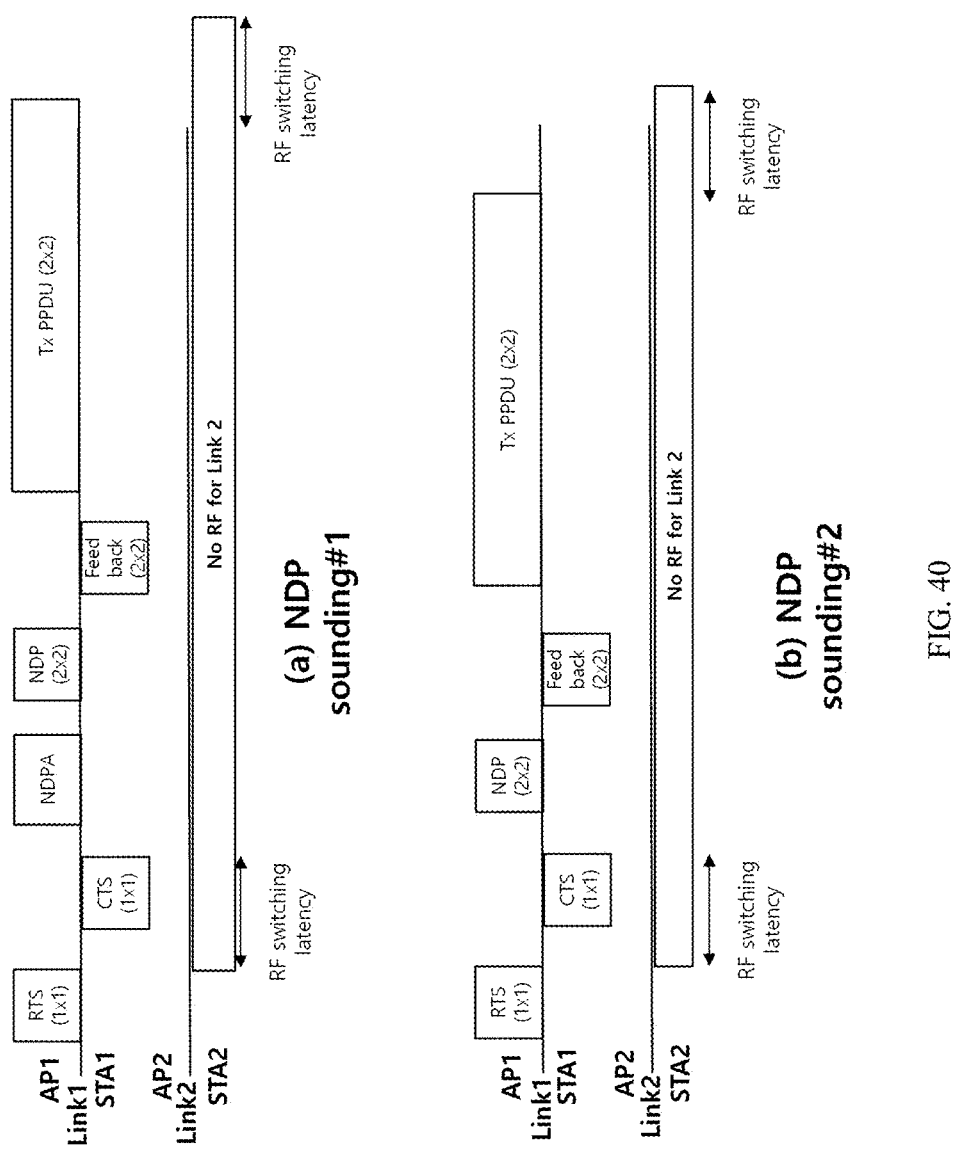
FIG. 40 illustrates an NDP sounding process performed by a station and a single radio multi-link device according to an embodiment of the present invention.

FIG. 40 illustrates an NDP sounding process performed by a station and a single radio multi-link device according to an embodiment of the present invention.

As described above, an NDP sounding protocol initiation station may adjust padding of a frame exchanged in an NDP sounding sequence to adjust the length of the NDP sounding sequence. When the NDP sounding sequence includes an RTS frame/CT frame exchange, the NDP sounding protocol initiation station may insert padding into an RTS frame to adjust the length of the NDP sounding sequence. Specifically, when the NDP sounding protocol initiation station determines that RF chain switching may fail to be completed even after the RTS frame/CTS frame exchange, the NDP sounding protocol initiation station may insert padding into the RTS frame.

In another specific embodiment, when the NDP sounding protocol initiation station determines that RF chain switching may fail to be completed even after the RTS frame/CTS frame exchange, the NDP sounding protocol initiation station may transmit an MU-RTS frame instead of the RTS frame. In this case, the NDP sounding protocol initiation station may insert padding into the MU-RTS frame.

In the above-described embodiments, the NDP sounding protocol initiation station may determine whether RF chain switching fails to be completed even after the RTS frame/CTS frame exchange, based on whether RF chain switching fails to be completed even after a time obtained by adding the length of a CTS frame and (2×SIFS) elapses from a RTS frame reception completion time point of the single radio multi-link device. In addition, the RTS reception completion time point may be one of a transmission start time point of a PPDU including the RTS frame, a time point at which a physical layer header of a PPDU completes transmission of the RTS frame, a transmission completion time point of a PPDU including the RTS frame, and a transmission completion time point of the RTS frame or an A-MPDU including the RTS frame. In addition, in the above-described embodiments using the MU-RTS frame instead of the RTS frame, the MU-RTS frame may be applied instead of the RTS frame. Part (a) of FIG. 40 illustrates an exchange of an NDPA frame, an NDP frame, and a feedback frame after the RTS frame/CTS frame exchange according to the above-described embodiment. In this case, the NDP sounding protocol initiation station performs MIMO transmission based on the received feedback frame.

In addition, the NDP sounding protocol initiation station may omit transmission of an NDPA frame in the NDP sounding sequence. In this case, the NDP sounding protocol initiation station and the single radio multi-link device may agree on performing the NDP sounding protocol without transmission of the NDPA frame. Accordingly, a station of the single radio multi-link device may wait for NDP reception without receiving the NDPA frame. Specifically, the station of the single radio multi-link device may signal that an NDP is receivable without NDPA reception, by using a capability element. In a specific embodiment, the station of the single radio multi-link device may configure an NDPA compression support subfield of the capability element as 1, so as to signal that the NDP frame is receivable without reception of the NDPA frame. In addition, the station of the single radio multi-link device may configure the NDPA compression support subfield of the capability element as 0, so as to signal that the NDP frame is not receivable without reception of the NDPA frame. The NDP sounding protocol initiation station may determine whether to omit transmission of the NDPA frame. In this case, the NDP sounding protocol initiation station may omit transmission of the NDPA frame in the NDP sounding sequence performed for the single radio multi-link device having received that the NDP frame is received without reception of the NDPA frame. In addition, the embodiment in which transmission of the NPDA frame is omitted in the NDP sounding sequence may be applied only to a case where the NDP sounding protocol initiation station transmits an NDP to one station. In this case, when the NDP sounding protocol initiation station transmits the NDP to multiple stations, transmission of the NDPA frame cannot be omitted. Part (b) of FIG. 40 illustrates an exchange of an NDP frame and a feedback frame without an NDPA frame after an RTS frame/CTS frame exchange according to the above-described embodiment. In this case, the NDP sounding protocol initiation station performs MIMO transmission based on the received feedback frame.

In the above-described embodiments, before performing the exchange of the NDPA frame, the NDP frame, and the feedback frame, a control frame exchange is included in the NDP sounding sequence, and thus excessive overhead may occur. In addition, when NDPA transmission is omitted, excessive overhead may also occur. To reduce the excessive overhead, an implicit feedback beamforming sounding sequence may be performed. A description thereof is made through FIG. 41.

Figure 41:
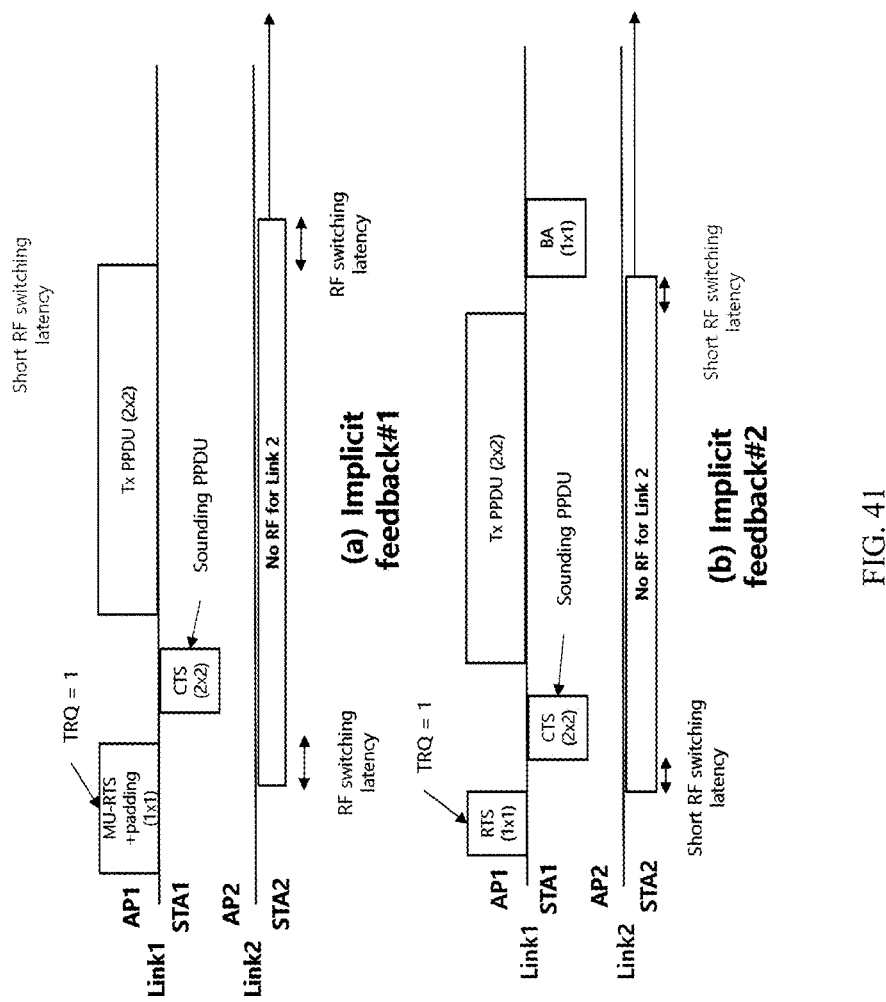
FIG. 41 illustrates a feedback beamforming sounding sequence performed by a station and a single radio multi-link device according to an embodiment of the present invention.

FIG. 41 illustrates a feedback beamforming sounding sequence performed by a station and a single radio multi-link device according to an embodiment of the present invention.

A frame exchange initiation station initiating a frame exchange may omit not only transmission of an NDPA frame but also transmission of a feedback frame. In this case, the frame exchange initiation station may receive a PPDU including a response to a control frame, for example, an RTS frame, an MU-RTS frame, a trigger frame having a different type from that of the MU-RTS frame, and measure a channel state. The frame exchange initiation station may acquire a steering matrix to be used for MIMO transmission based on the measured channel state. Specifically, the frame exchange initiation station may acquire a steering matrix based on the measured channel state. The frame exchange initiation station may perform MIMO transmission by using the acquired steering matrix.

In such embodiments, the frame exchange initiation station may insert padding into the control frame based on a time required for RF chain switching as described above. Specifically, the frame exchange initiation station may insert padding into the control frame based on a value obtained by subtracting an SIFS from the time required for RF chain switching.

In addition, the frame exchange initiation station may transmit a QoS data frame instead of the control frame. In this case, the single radio multi-link device may transmit an Ack frame or a Block Ack frame in response to the QoS data frame.

In addition, in the above-described embodiments, the frame exchange initiation station may configure a training request (TRQ) bit of the QoS data frame and the control frame as 1.

In addition, in the above-described embodiments, even in a case of a control frame, for example, a control frame which can configure multiple stations as receivers, such as an MU-RTS frame, a receiver of the control frame may be configured as one station.

In an embodiment of part (a) of FIG. 41, a frame exchange initiation station configures a TRQ field as 1 and transmits an MU-RTS frame. The frame exchange initiation station transmits a PPDU including the MU-RTS frame, and the frame exchange initiation station receives a PPDU including a CTS frame corresponding to a response to the MU-RTS frame, and measures a channel state. The frame exchange initiation station acquires a steering matrix based on the acquired channel state, and performs MIMO transmission by using the acquired steering matrix. In embodiment of part (b) of FIG. 41, the frame exchange initiation station transmits an RTS frame instead of the MU-RTS frame. This may be a case where the time required for RF chain switching is longer than the SIFS. Thereafter, the frame exchange initiation station and a station of the single radio multi-link device operate in the same manner as in the embodiment of part (a) of FIG. 41. However, in the embodiment of part (b) of FIG. 41, the station of the single radio multi-link device transmits a BA frame through single input single output (SISO).

A last frame exchange in a frame exchange sequence performed immediately after RF chain switching may be performed through single input single output (SISO) (1×1). Specifically, the station of the single radio multi-link device may transmit the last frame of the frame exchange sequence performed immediately after RF chain switching, through a SISO (1×1). In addition, if there is no frame left to perform MIMO transmission or reception in the frame exchange sequence performed immediately after RF chain switching, the station of the single radio multi-link device may perform RF chain switching. Specifically, the station of the single radio multi-link device may start performing RF chain switching before transmission of the last frame of the frame exchange sequence performed immediately after RF chain switching.

Figure 42:
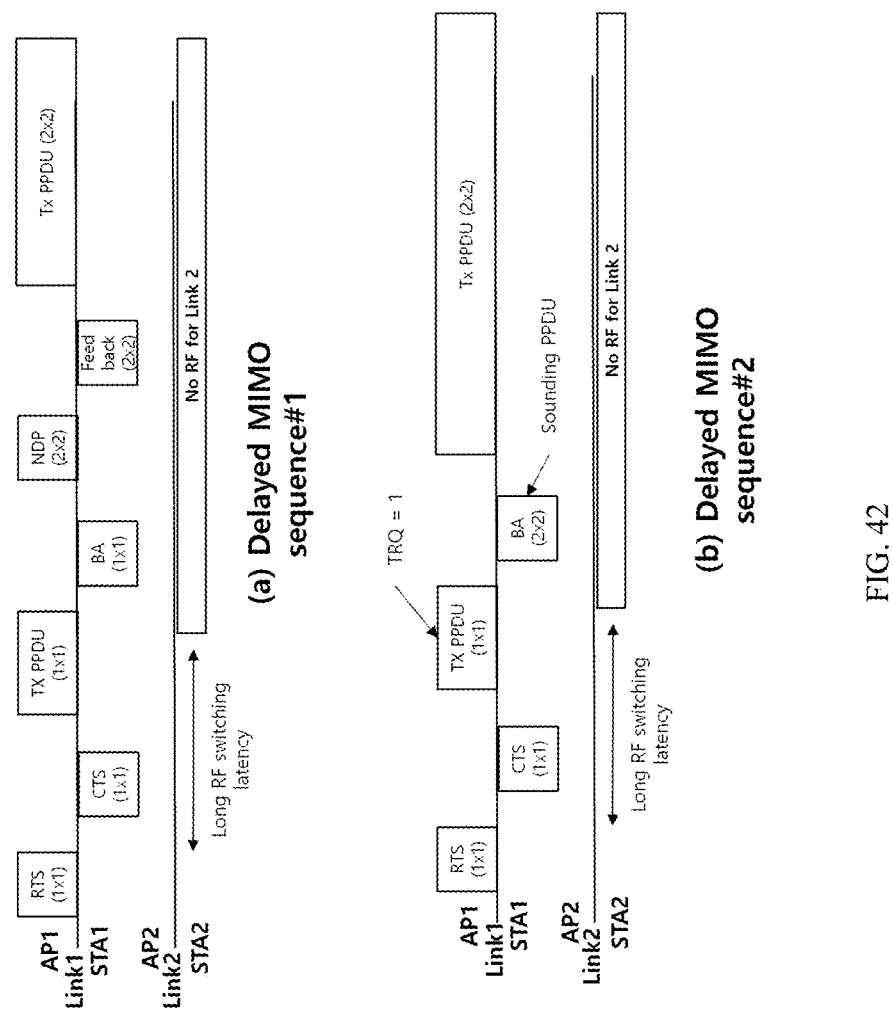
FIG. 42 illustrates an NDP sounding process performed by a station and a single radio multi-link device according to an embodiment of the present invention.

FIG. 42 illustrates an NDP sounding process performed by a station and a single radio multi-link device according to an embodiment of the present invention.

An NDP sounding protocol initiation station may determine a MIMO transmission start time point based on a time required for RF chain switching of a single radio multi-link device. Specifically, the NDP sounding protocol initiation station may delay the MIMO transmission start time point to a time point at which RF chain switching by the single radio multi-link device is completed. For example, when RF chain switching is not completed until an exchange of a control frame/a response frame to the control frame, for example, an RTS frame/CTS frame or an MU-RTS frame/CTS frame is performed, the NDP sounding protocol initiation station may delay the MIMO transmission start time point. Specifically, the NDP sounding protocol initiation station may transmit a first PPDU transmitted after the control frame/a response to the control frame, by using SISO.

As such, when RF chain switching is not completed, MIMO transmission of the NDP sounding protocol initiation station may not be allowed. In addition, the explicit and implicit NDP sounding protocols described above may not be allowed until the RF chain switching is completed.

In addition, the NDP sounding protocol initiation station may determine whether RF chain switching is to be completed during an exchange of the control frame/a response frame of the control frame, based on a time required for RF chain switching, indicated by a capability element transmitted by the single radio multi-link device.

When the single radio multi-link device performs transmission by using SISO, a station having performed a frame exchange sequence on a link in which use of multiple RF chains is supported may transmit a frame remaining in the corresponding frame exchange sequence by using SISO. For convenience of description, in the description related to the present embodiment, a station having performed the frame exchange sequence on the link in which use of multiple RF chains is supported is referred to as a frame exchange sequence performing station. That is, when the single radio multi-link device performs transmission by using SISO, the frame exchange sequence performing station may not be allowed to transmit the frame remaining in the corresponding frame exchange sequence by using MIMO. Specifically, when the single radio multi-link device transmits an ACK for the transmission of the frame exchange sequence performing station by using SISO, the frame exchange sequence performing station may transmit a frame remaining in the corresponding frame exchange sequence by using SISO. In this case, the ACK may include an ACK frame and a BA frame. Accordingly, when the single radio multi-link device transmits the ACK for the transmission of the frame exchange sequence performing station by using SISO, the frame exchange sequence performing station cannot transmit the frame remaining in the corresponding frame exchange sequence by using MIMO.

In embodiments of parts (a) and (b) of FIG. 42, RF chain switching of the single radio multi-link device has not been completed even during an exchange of an RTS frame and a CTS frame. Accordingly, in an embodiment of part (a) of FIG. 42, SISO is used until transmission of a PPDU and a BA frame is performed after the exchange of the RTS frame and the CTS frame. The NDP sounding protocol initiation station determines that RF chain switching has be completed when receiving the ACK frame. In this case, the NDP sounding protocol initiation station initiates a sounding protocol by using MIMO (2×2).

In addition, in an embodiment of part (b) of FIG. 42, SISO is used until PPDU transmission is performed after the exchange of the RTS frame and the CTS frame. After reception of the PPDU, RF chain switching is completed, and thus a first station (STA1) of the single radio multi-link device transmits the BA frame by using MIMO (2×2). The first station (STA1) of the single radio multi-link device transmits the BA frame by using MIMO (2×2), and thus the NDP sounding protocol initiation station determines that MIMO (2×2) transmission is allowed. Accordingly, after the NDP sounding protocol initiation station receives the BA frame transmitted using MIMO (2×2), the NDP sounding protocol initiation station transmits a PPDU by using MIMO (2×2).

Even with the increase of the transmission rate of the WLAN, transmission latency still remains as a problem for some services. Specifically, in a case of the WLAN operated in an unlicensed band, prediction of a time required for traffic transmission is difficult and thus a service requiring low latency transmission may not be proper to be operated. To solve such a problem, EDCA has been introduced. A station supporting the EDCA is referred to as a QoS station, an AP supporting the EDCA is referred to as a QoS AP, and a BSS supporting the EDCA is referred to as a QoS BSS. Hereinafter, for convenience of description, the QOS AP is referred to as an AP, the QoS station is referred to as a station, and the QoS BSS is referred to as a BSS. In the EDCA, traffic is divided into four access categories (ACs) according to characteristics. In this case, four ACs include AC voice (AC_VO), AC video (AC_VI), AC best effort (AC_BE), and AC background (AC_BK). In the above-described backoff procedure, a value of a parameter for a CW is determined according to the AC. In addition, a maximum value of a TXOP is determined according to the AC. In addition, a value of an AIFSN parameter may be determined according to the AC. Through this, a priority of traffic transmission for each AC may be adjusted. The traffic may be mapped to four ACs according to a traffic category (TC) or a traffic stream (TS). The traffic mapped to four ACs is managed in four queues operated for ACs, respectively.

AC_VO is an AC for traffic, such voice traffic, the absolute amount of which is not large but which is vulnerable transmission latency, and relatively small CW parameter and AIFSN parameter values are mapped thereto. However, a maximum value of the TXOP of AC_VO has a value relatively smaller than a maximum value of a TXOP of other AC. AC_VI is an AC for video traffic, which is more robust to transmission latency than the voice traffic, but requires low latency transmission and processing of a large amount of traffic. CW and AIFSN parameter values greater than those of AC_VO but smaller than those of other AC are mapped to AC_VI. A maximum value of the TXOP of AC_VO is twice as long as that of AC_VI. AC_BE is an AC for traffic that is robust to transmission latency, and most normal traffic except for voice data and streaming video data may be classified as AC_BE. Values greater than those of the CW parameter and the AIFSN parameter of AC_VO and those of the CW parameter and the AIFSN parameter of AC_VI are mapped to the CW parameter and the AIFSN parameter of AC_BE. In addition, a separate TXOP maximum value is not mapped to AC_BE. Transmission using a consecutive transmission sequence is not allowed for AC_BE. AC_BK is an AC for traffic that is robust to transmission latency, similar to AC_BE, but for traffic having the priority lower than BE traffic. The same CW parameter value for AC_BE is mapped to AC_BK, and a value greater than that of the AIFSN parameter for AC_BE is mapped as an AIFSN parameter value. In addition, a separate TXOP maximum value is not mapped to AC_BK. Transmission using a consecutive transmission sequence is not allowed for AC_BK.

The above-described four ACs are mapped to user-priory (UP) of 802.1D, and the EDCA AC is determined according to a UP value of wiredly received traffic, or a TID of the MSDU, indicated from an upper layer. In this case, when the TID of the MSDU indicates values of 0 to 7, values indicated by the TID may correspond to UPs one-to-one.

FIG. 43 illustrates a mapping relationship between a UP and an AC.

A default CW parameter (CWmin and CWmax), a default AIFSN parameter, and a default TXOP maximum value of each the four ACs are defined in the 802.11 standard. The CW parameter (CWmin and CWmax), the AIFSN parameter, and the TXOP maximum value of an AC may be changed by the AP, and different values may be used for each BSS. According to the EDCA, traffic is stored in a queue corresponding to an AC of traffic, among four queues. Channel access contention is performed among four ACs, and traffic of an AC having won the contention is transmitted. In the channel access contention, access parameters (CW [AC] and AIFSN [AC]) for each AC are used. In this case, a channel access operation is identical to a channel access operation of DCF.

As described above, a channel access parameter value varies for each AC, and thus a transmission priority may be applied for each AC.

Other than the EDCA, HCF controlled channel access (HCCA) for QoS management may be applied to an 802.11 MAC protocol. The HCCA provides a function of a centralized/hybrid coordinator utilized to secure the QoS of a traffic stream (TS) (such as voice and video) of an application to be periodically serviced. In addition, service period channel access (SPCA) function, a dynamic allocation of service period function, and the like may be used. However, the functions may be used by a DMG station only.

A QOS reinforcement method for a multi-link device may be required. An independent transmission queue may be used for each link of the multi-link device. In this case, the queue may be logically independent. When traffic is mapped for each link, the QoS of traffic can be reinforced. A description thereof is described through FIG. 44.

Figure 44:
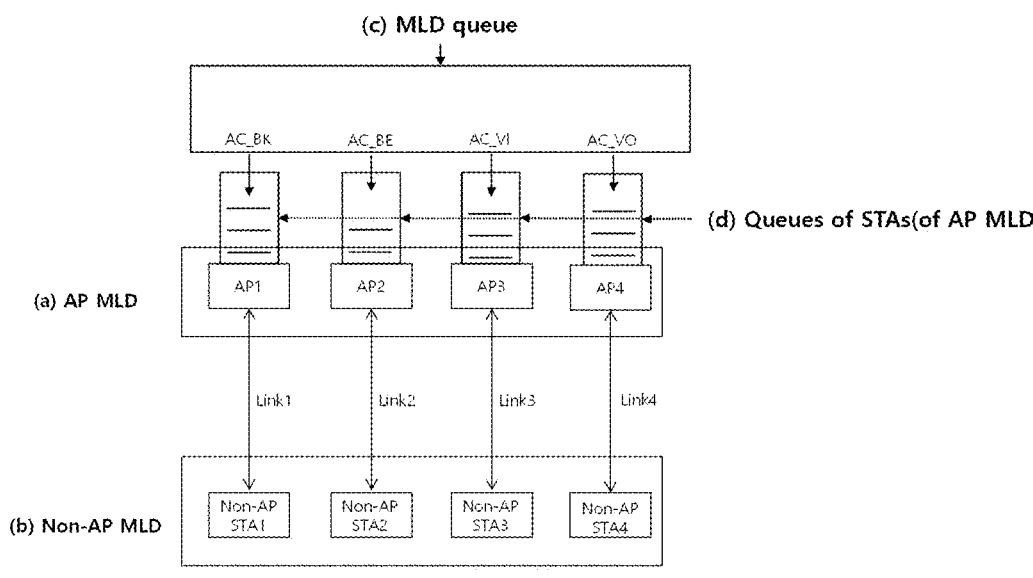
FIG. 44 illustrates that a multi-link device transmits traffic mapped for each station of the multi-link device according to an embodiment of the present invention.

FIG. 44 illustrates that a multi-link device transmits traffic mapped for each station of the multi-link device according to an embodiment of the present invention.

In FIG. 44, an AP multi-link device (AP MLD) includes (is affiliated with) a first AP (AP 1) to a fourth AP (AP 4). In addition, a non-AP multi-link device (non-AP MLD) includes a first station (non-AP STA 1) to a fourth station (non-AP STA 4). The first station (non-AP STA 1) to the fourth station (non-AP STA 4) operate in a first link (link 1) to a fourth link (link 1), respectively. The first AP (AP 1) to the fourth AP (AP 4) operate in the first link (link 1) to the fourth link (link 1), respectively. In this case, traffic is mapped to each of the first AP (AP 1) to the fourth AP (AP 4) for each AC. AC_BK is mapped to the first AP (AP 1), AC_BE is mapped to the second AP (AP 2), AC_VI is mapped to the third AP (AP 3), and AC_VO is mapped to the fourth AP (AP 4). Accordingly, in the AP multi-link device (AP MLD), traffic corresponding to AC_BK is transmitted through the first AP (AP 1), traffic corresponding to AC_BE is transmitted through the second AP (AP 2), traffic corresponding to AC_VI is transmitted through the third AP (AP 3), and traffic corresponding to AC_VO is transmitted through the fourth AP (AP 4). A channel quality and load situation of each link may vary. In addition, the performance and operation bandwidth of each station may vary. Accordingly, a bandwidth and MCS of a PPDU including traffic may vary according to traffic mapped to a link by a multi-link device and a link to which traffic is mapped by a multi-link device.

For example, when the first AP (AP 1) of the AP multi-link device (AP MLD) is operated in a 2.4 GHz band, the first AP (AP 1) may operate an operating channel of 40 MHz. When the fourth AP (AP 4) is operated in a 6 GHz band, the fourth AP (AP 4) may operate an operating channel of a maximum of 320 MHz. The AP multi-link device (AP MLD) may map traffic requiring large throughput and low latency transmission to the fourth AP (AP 4). The multi-link device may map traffic to each of multiple links in consideration of the characteristics of traffic. Accordingly, the QoS of traffic transmission can be reinforced.

To segment QoS reinforcement, a TID is mapped to each link, and in each link, transmission of traffic corresponding to the TID mapped to the corresponding link may be prioritized. A description thereof is made through FIG. 45.

Figure 45:
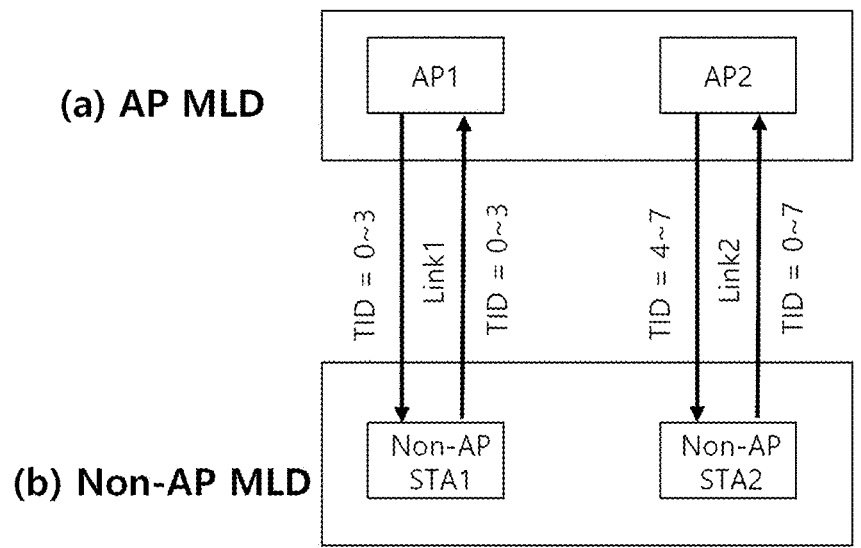
FIG. 45 illustrates that a multi-link device performs frame exchange according to TID-to-link mapping according to an embodiment of the present invention.

FIG. 45 illustrates that a multi-link device performs frame exchange according to TID-to-link mapping according to an embodiment of the present invention.

Traffic transmitted in the WLAN is identified by a TID. A MAC frame, for example, a data frame or a QoS data frame performs signaling of a TID of traffic included in the MAC frame through a TID service field. In this case, A QoS control field may include a TID service field. A TID identifies traffic included in an A-MSDU, a fragment, or an MSDU of a MAC frame. In addition, the TID corresponds to user priorities (UPs) and a traffic stream identifier (TSID). In addition, the TID service field corresponds to a field having a total of 4 bits, and may indicate a value from 0 to 15. When a value of the TID subfield is one among 0 to 7, the value of the TID subfield indicates a UP of an MSDU included in a frame body of a MAC frame including the TID subfield. The MAC frame is processed by a MAC entity by using an AC parameter corresponding to the UP according to the EDCA. When the value of the TID subfield is one among 8 to 15, the value of the TID subfield indicates a TSID of an MSDU included in a frame body of a MAC frame including the TID subfield. The MAC frame is processed by a MAC entity by using a parameter corresponding to a UP of a TSID indicated in a user priority service field of a TS info field of a TSPEC. The UP of the TSID may be indicated through a user priority field of a TCLAS. In addition, an access policy of the TSID is indicated by an access policy field of a TS info subfield. When the seventh and eight bits of the access policy subfield are 10b, the EDCA is indicated, and when the seventh and eight bits of the access policy subfield are 11b, the HCCA is indicated.

When performing mapping of a TID of a TS and a link, a multi-link device may acquire information on an alternate queue to be used for TS transmission and a UP of a TS from an intra-access priority field of an intra-access category priority element of an ADDTS request frame used when the TS is generated. The multi-link device may use the acquired information on the alternate queue and the UP when transmitting traffic corresponding to the TID of the TS.

A TID may be mapped to each of the multiple links in which the multi-link device operates. In this case, the multi-link device may perform signaling of information on a TID mapped to each link to a multi-link device associated with the multi-link device. In this case, the multi-link device having received the signaling may accept or reject TID-to-link mapping. When an agreement on the mapping between a TID and a link is not established, frame exchange may be performed in each link without TID restriction. In another specific embodiment, when an agreement on the mapping between a TID and a link is not established, frame exchange may be performed in each link according to default mapping between a TID and a link.

When a multi-link device performs mapping of a TID and a link, the multi-link device may need to perform mapping of all TIDs to one or more links. In a specific embodiment, the multi-link device may transmit, in a link, a frame including traffic corresponding to a TID mapped to the corresponding link, and transmission of a frame including traffic corresponding to the TID not mapped to the corresponding link may not be allowed. The mapping between a TID and a link may be performed for each multi-link device. In addition, the mapping between a TID and a link may be performed for each transmission direction. For example, in one link, a TID mapped to an uplink may be different from a TID mapped to a downlink. Accordingly, when a first multi-link device and a second link device are associated with a first link and a second link, respectively, the first multi-link device may map TID values 0 to 3 to the first link, and the second multi-link device may map TID values 4 to 7 to the first link.

In the specification, the mapping between a TID and a link may be replaced with mapping between an AC and a link, mapping between a UP and a link, mapping between a TC and a link, and mapping between a TS and a link.

In addition, in the mapping between the TID and the link, the other TID values that are not explicitly indicated may be mapped to the other links. For example, when signaling is made so that TID values 0 to 3 are mapped to the first link, TID values remaining after excluding TID values 0 to 3 may be mapped to the second link. In another specific embodiment, transmission of traffic corresponding to all TIDs may be allowed in the second link.

In addition, the mapping between a TID and a link may be changed not only when the multi-link device is initially associated but also when the multi-link device is being operated. When the multi-link device disassociates a station of a specific link, the multi-link device may change mapping between the TID and the link. In this case, when a station of a specific link enters into a sleep mode, the multi-link device may disassociate the station. In addition, the multi-link device may request a change of mapping between a TID and a link from a counterpart multi-link device. For example, when TID values 0 to 3 are mapped to a first link, a non-AP multi-link device may request to an AP multi-link device to map TID values 0 to 3 to a second link. Specifically, when a multi-link device has difficulty guaranteeing the QoS of traffic mapped to a link, the multi-link device may request a change of mapping between a TID and a link from a counterpart multi-link device.

In addition, when the multi-link device refuses a request for mapping between a TID and a link, it may be restricted for the multi-link device having transmitted the request for the mapping between the TID and the link to request again the same TID-to-link mapping as the TID-to-link mapping that is previously requested. This is for preventing the TID-to-link mapping from being repeatedly requested. In this case, the predetermined tie may be a time indicated by the AP. Specifically, the AP multi-link device may perform signaling of a predetermined time through a BSS operation parameter.

A method for signaling mapping between a TID and a link is described. A multi-link device may perform signaling of TID-to-link mapping by using a TID-to-link mapping element. The TID-to-link mapping element may include a link ID field. The link ID field indicates a link for signaling of a TID-to-link mapping element. In addition, the TIDs info field indicates information on a TID mapped to a link indicated by the link ID field. The TIDs info field may include a field indicating a value of the TID mapped to the link indicated by the link ID field. In this case, the TIDs info field may include a bitmap indicating a value of the TID mapped to the link indicated by the link ID field. In this case, when each bit of the bitmap is mapped to a specific TID and a bit is configured as 1, it may indicate that a TID corresponding to the bit is mapped to the link indicated by the link ID field.

In the embodiment of FIG. 45, an AP multi-link device (AP MLD) plans to transmit traffic having TIDs 0 to 3 among traffic to be transmitted to a non-AP multi-link device (non-AP MLD) in a first link (link 1). The AP multi-link device (AP MLD) transmits, to the non-AP multi-link device (non-AP MLD), signaling of mapping of TID values 0 to 3 to a first link (link 1) and mapping of TID values 4 to 7 to a second link (link 2), by using a TID-to-link mapping element. The TID-to-link mapping element includes two link ID fields indicating a first link and a second link, respectively, and includes two TIDs info fields indicating information mapped to the first link and information mapped to the second link, respectively. In addition, the TIDs info field may include 7 bits indicating 0 to 7, respectively. For example, to indicate TIDs 0 to 3, 8 bits of the TIDs info subfield may be configured as 11110000b, and to indicate TIDs 4 to 7, 8 bits of the TIDs info subfield may be configured as 00001111b.

In another specific embodiment, the TIDs info field may include a min TID field and a max TID field. The min TID field indicates a minimum value of a TID among TIDs mapped to a link corresponding to the TIDs info field, and the max TID field indicates a maximum value of a TID among TIDs mapped to a link corresponding to the TIDs info field. Each of the min TID field and the max TID field may be a 3-bit field or a 4-bit field. For example, when each of the min TID field and the max TID field is 3 bits and the TIDs info field indicates 0 to 3, the min TID field may be configured as 000, and the max TID field may be configured as 011b. As described above, the TID-to-link mapping element may perform only signaling of the TID mapped to the first link, and the TID mapped to the second link may be implicitly signaled. Specifically, the TID-to-link mapping element implicitly performs signaling that TIDs 0 to 7 are mapped to the first link, and thus the TID-to-link mapping element may implicitly perform signaling that the other TIDs are mapped to the second link.

The non-AP multi-link device accepts the TID-to-link mapping indicated by the TID-to-link mapping element.

When multiple TIDs are mapped to one link and multiple TIDs correspond to two or more ACs, the multi-link device may transmit traffic by differentiating the AC according to the EDCA. For example, when a TID corresponding to AC_VO and a TID corresponding to AC_BK are mapped to the first link, the multi-link device may transmit traffic by prioritizing traffic corresponding to AC_VO over traffic corresponding to AC_BK according to the EDCA. In addition, all TIDs need to be mapped to one or more links, and the multi-link device may not allow a request for TID-to-link mapping which corresponds to a case where none of the TIDs are mapped to any link.

Figure 46:
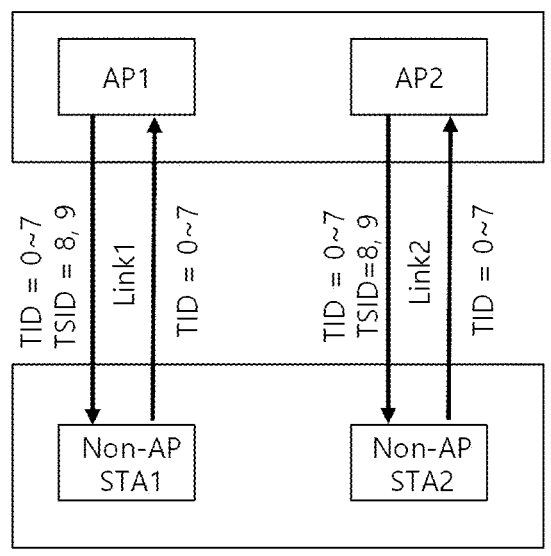
FIG. 46 illustrates that default mapping is configured between a TID and a link in an AP multi-link device and a non-AP multi-link device

FIG. 46 illustrates that default mapping is configured between a TID and a link in an AP multi-link device and a non-AP multi-link device according to an embodiment of the present invention.

As described above, when there is no separate mapping is configured between a TID and a link, default mapping is configured between the TID and the link. In the embodiment of FIG. 46, as the default mapping between the TID and the link, all TIDs and TSIDs are mapped.

In the above-described EML mode, frame exchange is performed only in one link among multiple links, and thus a QoS enhancement effect expected through the mapping between the TID and the link may not be applied to a multi-link device operating in the EML mode. Accordingly, TID-to-link mapping considering this is required. A description thereof is made through FIGS. 47 to 51.

FIG. 47 illustrates that mapping between a TID and a link is changed when a multi-link device activates an EMLSR mode according to an embodiment of the present invention.

A multi-link device to which an EML mode is applied may not allow performing mapping between a TID and a link. Default mapping between a TID and link may be applied to the multi-link device to which the EML mode is applied. In this case, the multi-link device to which the EML mode is applied cannot perform a negotiation for mapping between the TID and the link. When a multi-link device to which the EML mode is applied transmits a request for mapping between a TID and a link, a counterpart multi-link device may reject the request for the mapping between the TID and the link. In another specific embodiment, when a multi-link device to which the EML mode is applied transmits a request for mapping between a TID and a link, a counterpart multi-link device may not transmit a response to the request for the mapping between the TID and the link. In this case, the multi-link device to which the EML mode is applied may not perform mapping between the TID and the link for an EML link only. Accordingly, even the multi-link link device to which the EML mode may perform mapping between the TID and the link for a link to which the EML mode is not applied.

In addition, when a multi-link device for which the EML mode is not activated performs TID mapping for a link and an EML mode of the multi-link device is activated, default mapping between the TID and the link may be applied for an EML link among links in which the multi-link device operates. In this case, the default mapping between the TID and the link may be performed without a separate negotiation.

In addition, a multi-link device associated with a multi-link device for which the EML mode is activated may also apply the default mapping between the TID and the link for an EML link.

The multi-link device may perform association again to activate the EML mode. In this case, the multi-link device may initialize information on link operation. In this case, the multi-link device may initialize mapping between a TID and a link.

In the embodiment of FIG. 47, an AP multi-link device (AP MLD) includes (is affiliated with) a first AP (AP 1) and a second AP (AP 2), and a non-AP multi-link device (STA MLD) includes a first station (STA 1) and a second STA (STA 2). The first AP (AP 1) and the first station (STA 1) operate in a first link (link 1), and the second AP (AP 2) and the second station (STA 2) operate in a second link (link 2). The AP multi-link device (AP MLD) and the non-AP multi-link device (STA MLD) may map TID values 0 to 3 to the first link (link 1), and map TID values 4 to 7 to the second link. An EMLSR mode is activated for the non-AP multi-link device (STA MLD), and the EMLSR mode is applied to both the first link and the second link. In this case, the AP multi-link device (AP MLD) and the non-AP multi-link device (STA MLD) apply default mapping between the TID and the link. That is, the AP multi-link device (AP MLD) and the non-AP multi-link device (STA MLD) may map TID values 0 to 7 to the first link (link 1) and map TID values 0 to 7 to the second link (link 2). In this case, to activate the EMLSR mode, the non-AP multi-link device (STA MLD) may transmit a (re) association request frame. In this case, the (re) association request frame may include a multi-link element. A description of the multi-link element is made through FIG. 48.

Figure 48:
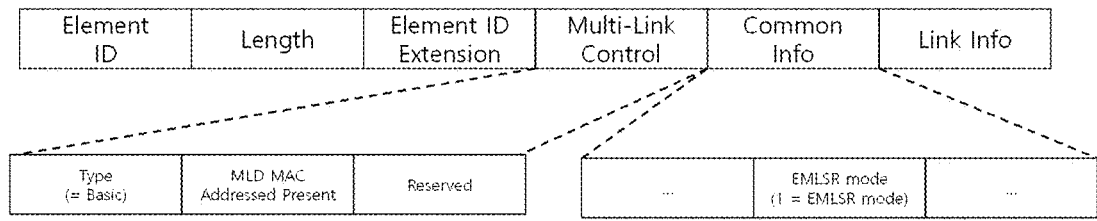
FIG. 48 illustrates a format of a multi-link element according to an embodiment of the present invention.

FIG. 48 illustrates a format of a multi-link element according to an embodiment of the present invention.

As described above, a (re) association request frame transmitted by a non-AP multi-link device for activation of the EMLSR mode may include a multi-link element. In this case, the non-AP multi-link device may configure an EMLSR mode subfield of a common info field of a multi-link element as 1. In this case, the common info field of the multi-link element may be a basic variant format. An AP multi-link device having received the multi-link element from the non-AP multi-link device may recognize that the non-AP multi-link device is to activate the EMLSR mode. In this case, the AP multi-link device and the non-AP multi-link device may activate the EMLSR mode.

Figure 49:
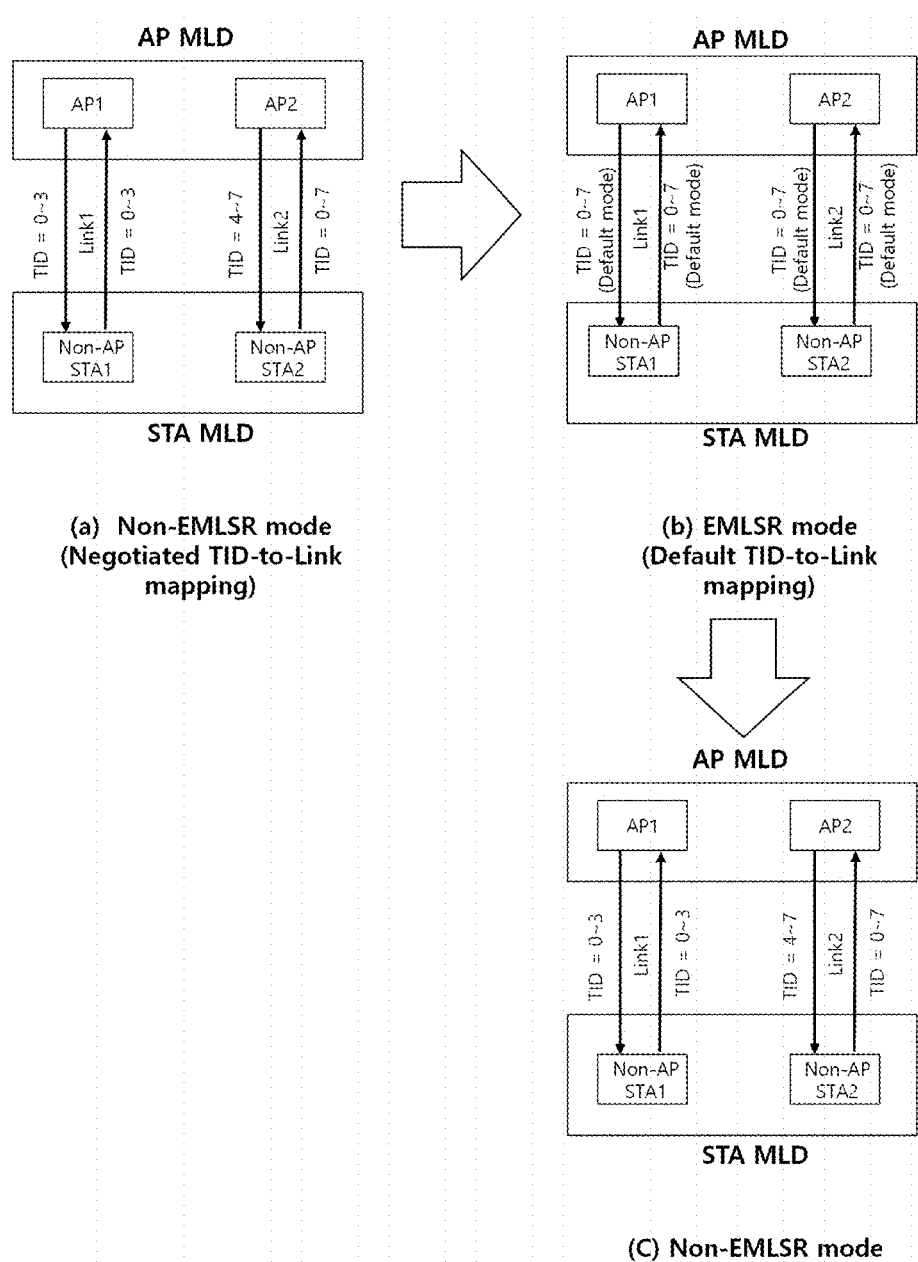
FIG. 49 illustrates that mapping between a TID and a link is changed when a multi-link device deactivates an EMLSR mode according to an embodiment of the present invention.

Through FIG. 49, a configuration of mapping between a TID and a link in a case where the EML mode is deactivated after the EML mode is activated is described.

FIG. 49 illustrates that mapping between a TID and a link is changed when a multi-link device deactivates an EMLSR mode according to an embodiment of the present invention.

When an EML mode is deactivated, TID-to-link mapping having been used before activation of the EML mode may be applied again. In this case, the multi-link device may not perform a negotiation for the TID-to-link mapping.

In the embodiment of FIG. 49, an AP multi-link device (AP MLD) includes (is affiliated with) a first AP (AP 1) and a second AP (AP 2), and a non-AP multi-link device (STA MLD) includes a first station (STA 1) and a second station (STA 2). An EMLSR mode is activated for the non-AP multi-link device (STA MLD), and the EMLSR mode is applied to both a first link (link 1) and a second link (link 2). The first AP (AP 1) and the first station (STA 1) operate in the first link (link 1), and the second AP (AP 2) and the second station (STA 2) operate in the second link (link 2). The AP multi-link device (AP MLD) and the non-AP multi-link device (STA MLD) apply default mapping between a TID and a link. That is, the AP multi-link device (AP MLD) and the non-AP multi-link device map TID values 0 to 7 to the first link (link 1), and map TID values 0 to 7 to the second link (link 2). The EMLSR mode is deactivated for the non-AP multi-link device (STA MLD). The AP multi-link device (AP MLD) and the non-AP multi-link device apply, to the first link (link 1) and the second link (link 2), TID-to-link mapping having been applied before activation of the EMLSR mode. That is, the AP multi-link device (AP MLD) and the non-AP multi-link device (STA MLD) map TID values 0 to 3 to the first link (link 1), and map TID values 4 to 7 to the second link (link 2).

As described above, an AP multi-link device may transmit an initial control frame to perform transmission to a multi-link device for which an EML mode is activated. In this case, the initial control frame may be an MU-RTS frame or a trigger frame of another variant. The trigger frame of another variant may be an ML-RTS frame corresponding to an RTS frame for multiple links. A non-AP multi-link device having received the trigger frame of another variant may transmit a response frame for the trigger frame of another variant. Specifically, the initial control frame may be a buffer status report poll (BSRP) trigger frame. In this case, a non-AP multi-link device having received the BSRP trigger frame may transmit a BSR frame as a response frame. According to the type of a trigger frame, the type of a response frame to the trigger frame may vary, and a time required for transmission of the response frame may vary. Accordingly, the non-AP multi-link device may configure the duration of the initial control frame based on the type of the initial control frame. In this case, padding may be for securing a time for reconfiguration of an RF chain, as described above.

When the initial control frame is an MU-RTS frame, the MU-RTS frame may include padding corresponding to a time equal to or longer than a time corresponding to (RF switching latency-SIFS-CTStime-SIFS). When the initial control frame is a BSRP trigger frame, the BSRP trigger frame may include padding corresponding to a time equal to or longer than a time corresponding to (RF switching latency-SIFS-BSRtime-SIFS). In this case, the BSRtime may be a time required to transmit a BSR frame, for example, an air time. In addition, the BSRtime may be a value determined on the assumption that the BSR frame is transmitted at a specific data rate. In another specific embodiment, the non-AP multi-link device may determine the duration of padding of a trigger frame based on a value of a UL length subfield of a common info field of the trigger frame. This is because a station having received the trigger frame determines the length of a PPDU including a response to the trigger frame based on the value of the UL length subfield of the common info field. Specifically, the non-AP multi-link device may include, in the trigger frame, padding corresponding to a time equal to or longer than a time corresponding to a time corresponding to (RF switching latency-SIFS-a UL length (the length of a response frame) indicated through the trigger frame-SIFS). When the initial control frame is a BSRP trigger frame, the non-AP multi-link device may determine the duration of padding of the BSRP trigger frame based on a value of a UL length subfield of a common info field of the BSRP trigger frame.

As described above, a multi-link device to which an EML mode is applied may perform signaling of a time required to change an RF chain. An AP multi-link device may determine the duration of padding of an initial control frame based on the signaled time required to change the RF chain. The AP multi-link device may include, in the initial control frame, padding corresponding to a time equal to or longer than the signaled time required to change the RF chain. In another specific embodiment, a multi-link device to which an EML mode is applied may perform signaling of the duration of padding of an initial control frame. A description thereof is made through FIG. 50.

Figure 50:
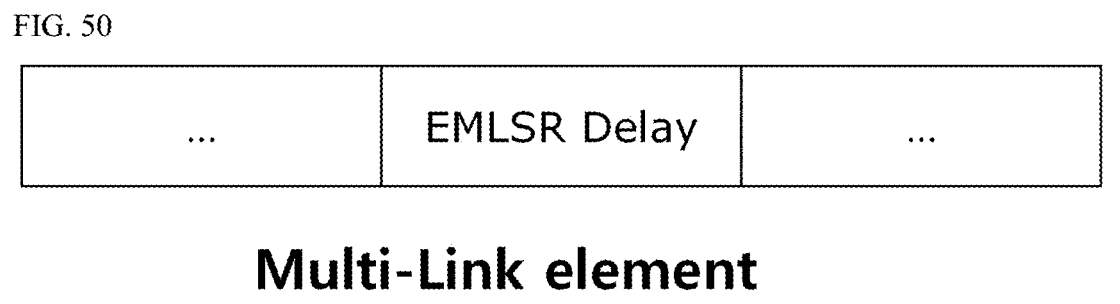

FIG. 50 illustrates a multi-link element for signaling of information relating to a duration of padding of an initial control frame according to an embodiment of the present invention.

When a multi-link device to which an EML mode is applied performs signaling of the duration of padding of an initial control frame, an AP multi-link device may determine the duration of padding of the initial control frame according to the signaled duration of padding. Specifically, the AP multi-link device may include, in the initial control frame, padding having the duration equal to or longer than the signaled duration of padding. In this case, the duration of padding may be signaled for each type of a trigger frame. In a specific embodiment, the signaled duration of padding may be the duration of padding to be included in an MU-RTS frame. In this case, when the AP multi-link device transmits the initial control frame other than the MU-RTS frame, i.e., a BSRP trigger frame, the AP multi-link device may include, in the initial control frame, padding having the duration other than the signaled duration of padding. The AP multi-link device may determine the duration of padding of the initial control frame based on the signaled duration of padding and a difference between an airtime of a CTS frame and an airtime of a response frame to the initial control frame. The AP multi-link device may insert, into the initial control frame, padding having the duration equal to or longer than a value obtained by summating the signaled duration of padding and the duration of padding corresponding to (CTStime—airtime of the response frame to the initial control frame).

In another specific embodiment, the AP multi-link device may perform an inverse operation to obtain a time required to change the RF chain based on the signaled duration of padding. In this case, the AP multi-link device may determine the duration of padding to be included in the initial control frame according to the time required to change the RF chain, obtained through the inverse operation. This is because the signaled duration of padding is a value determined based on the time required to change the RF chain.

The above-described duration of padding may be signaled through a multi-link element. In the embodiment of FIG. 50, a multi-link element includes an EMLSR delay field indicating the duration of padding of an initial control frame.

As described above, in some of EML links, transmission, reception, or monitoring capability may be lost due to link switching performed in an EML mode. In this case, the monitoring may include at least one of CCA and preamble detection (PD). In addition, even though a multi-link device performs link switching which recovers the transmission, reception, or monitoring capability in a link, the multi-link device may fail to perform the transmission, reception, or monitoring in the corresponding link for a predetermined time. Specifically, the predetermined time may be determined based on a time required to perform link switching of the multi-link device for which the EML mode is activated. In a specific embodiment, the predetermined time may include a time interval in which an RF chain of the multi-link device for which the EML mode is activated is changed. A station performing frame exchange in an EML link with a multi-link device supporting the EML mode may manage a TXOP in consideration of the frame exchange of the multi-link device in the EML mode. In addition, the multi-link device supporting the EML mode may also manage a TXOP in the EML link in consideration of frame exchange of the multi-link device in the EML mode.

Figure 51:
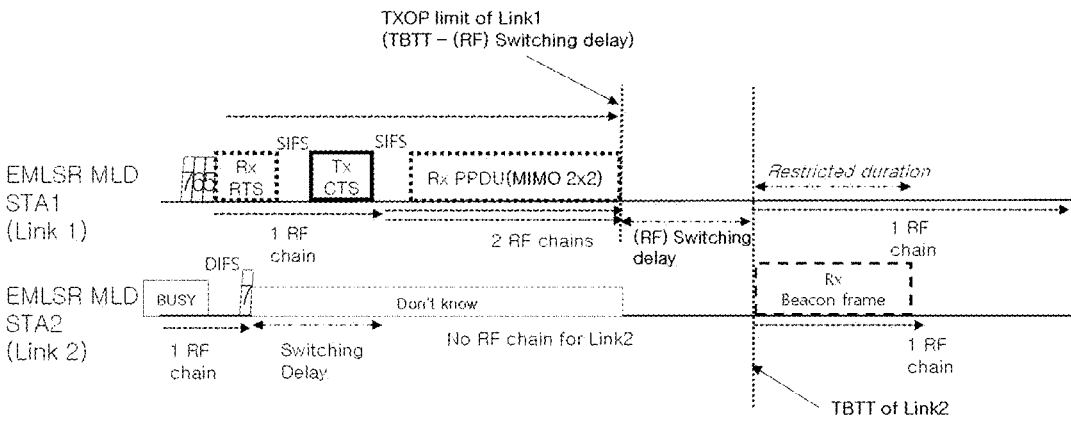
FIG. 51 illustrates that a multi-link device terminates a TXOP in a link in which frame exchange is performed in an EMLSR mode, in consideration of a DTIM beacon received in an EMLSR link in which frame exchange is not performed in the EMLSR mode according to an embodiment of the present invention.

FIG. 51 illustrates that a multi-link device ends a TXOP in a link in which frame exchange is performed in an EMLSR mode, in consideration of a DTIM beacon received in an EMLSR link in which frame exchange is not performed in the EMLSR mode according to an embodiment of the present invention.

As described above, in some of EML links, transmission, reception, or monitoring capability may be lost due to link switching performed in an EML mode. For example, when frame exchange is performed in one of EMLSR links in an EMLSR mode, a multi-link device cannot perform transmission, reception, or monitoring in the other links of the EMLSR links. In this case, the monitoring may include at least one of CCA and preamble detection (PD). In addition, even though the multi-link device performs link switching which recovers the transmission, reception, or monitoring capability in a link, the multi-link device may fail to perform transmission, reception, or monitoring in the corresponding link for a predetermined time from a link switching start time point. In this case, the predetermined time may be a delay time for link switching. Specifically, the predetermined time may include a time interval in which the RF chain of the multi-link device supporting the EML mode is changed. A station for performing frame exchange in an EML link with the multi-link device supporting the EML mode may manage a TXOP in consideration of frame exchange of the multi-link device in the EML mode. In addition, the multi-link device supporting the EML mode may also manage a TXOP in the EML link in consideration of frame exchange of the multi-link device in the EML mode.

When a multi-link device for which the EML mode is activated needs to receive a specific frame in a first link in which transmission, reception, or monitoring capability is lost, among EML links in the EML mode, for example, a first link in which frame exchange is not performed in the EMLSR mode, a multi-link device in the EML mode or a station for performing frame exchange with the multi-link device in the EML mode may terminate, based on a time point of reception of the specific frame in the first link, a TXOP for the corresponding frame exchange in a second link which is one of EML links and in which frame exchange is performed. For convenience of description, a multi-link device for which the EML mode is activated is referred to as a multi-link device, and a station for performing frame exchange with the multi-link device for which the EML mode is activated is referred to as a station. In this case, when the multi-link device is a holder of a TXOP, the station is a TXOP responder. In addition, when the multi-link device is a responder of a TXOP, the station is a TXOP holder. A TXOP in a second link in an EML mode activated state may need to be terminated before a time point a predetermined time earlier than a time point at which a multi-link device is to receive a specific frame in a first link. In this case, the predetermined time may be determined based on a link switching delay of the multi-link device. Specifically, the predetermined time may be determined based on a time required to change an RF chain of the multi-link device. In a specific embodiment, the predetermined time may be a time required to change an RF chain of the multi-link device. In this case, the specific frame may be a periodically received frame. Specifically, the specific frame may be a beacon frame. In a specific embodiment, the specific frame may be a DTIM beacon frame. In addition, a time point at which the specific frame is to be received may be a TBTT. The multi-link device or the station may terminate a TXOP for corresponding frame exchange in a second link in which the frame exchange has been performed in the EML mode, based on a time point of reception of a specific frame in a first link. In addition, when a station is a TXOP holder, the station may terminate a TXOP in a second link based on information indicating that the multi-link device will receive a specific frame in a first link. In this case, the information indicating that the multi-link device will receive the specific frame in the first link may be signaled through a method promised between the multi-link device and the station. The information indicating that the multi-link device will receive the specific frame in the first link may be information signaling that a beacon frame of the first link is a DTIM beacon frame. When a station is a TXOP holder and a beacon to be received in a first link is a DTIM beacon, the station may terminate a TXOP in a second link based on information indicating that the multi-link device will receive a specific frame in the first link.

Even though a multi-link device to which an EML mode is applied receives an initial control frame, the multi-link device may not transmit a response frame to the initial control frame. Specifically, even though a multi-link device to which an EML mode is applied receives an initial control frame in a first link among EML links, the multi-link device may not transmit a response frame to the initial control frame to receive a specific frame in a second link among EML links. For example, even though a multi-link device to which an EML mode is applied receives an initial control frame in a first link among EML links, the multi-link device may not transmit a response frame to the initial control frame in the first link when frame exchange initiated by the initial control frame is not terminated before a time point a predetermined time earlier than a time point at which a specific frame is to be received in a second link among the EML links. When frame exchange initiated by the initial control frame is terminated before a time point a predetermined time earlier than the time point at which the specific frame is to be received in the second link, the multi-link device may transmit a response frame to the initial control frame in the first link. In such embodiments, the initial control frame may be an MU-RTS frame, an ML-RTS frame, and a BSRP trigger frame, as described above. Even though the initial control frame is an MU-RTS frame or an ML-RTS frame and a multi-link device to which an EML mode is applied receives the initial control frame, the multi-link device may not transmit a CTS frame as a response to the initial control frame. Accordingly, the multi-link device may reject initiation of frame exchange. This is an exception to a case where a station needs to transmit a CTS frame when the station receives an MU-RTS frame or an RTS frame in the conventional wireless LAN operation.

Specifically, even though the multi-link device to which the EML mode is applied receives an initial control frame in a first link corresponding to one of EML links, the multi-link device may not transmit a response frame to the initial control frame, for frame exchange to be performed in a second link.

A non-AP multi-link device for which an EMLSR mode is activated includes a first station (STA 1) and a second station (STA 2). The first station (STA 1) operates in a first link (link 1), and the second station (STA 2) operates in a second link (link 2). The first station (STA 1) receives an RTS frame from a first AP in the first link (link 1), and transmits a CTS frame as a response to the RTS frame. The first station (STA 1) receives a PPDU from the first AP in the first link (link 1). In this case, the first AP terminates a TXOP at a time point a non-AP multi-link device RF change time earlier than a time point at which a beacon frame is scheduled to be received in the second link (link 2). The terminating of the TXOP at the time point the non-AP multi-link device RF change time earlier than the time point at which the beacon frame is expected to be scheduled to be received in the second link (link 2) may be applied the same to a case where the first station (STA 1) receives a TXOP, as described above.

When a multi-link device for which an EMLSR mode is activated receives a beacon frame, the EMLSR multi-link device may not change an RF chain. This is because the beacon frame is not transmitted via MIMO. When a multi-link device for which an EMLSR mode is activated receives a beacon frame in a first link, the multi-link device for which the EMLSR mode is activated may perform at least one of monitoring and channel access in a second link. In this case, even when the multi-link device has completed a channel access procedure in the second link, the multi-link device may not be allowed to perform transmission. In another specific embodiment, a multi-link device may perform at least one of transmission and reception at a predetermined data rate in a second link. In this case, the predetermined data may be one of 6 Mbps, 12 Mbps, and 24 Mbps.

In addition, a station which is to perform frame exchange with a multi-link device for which an EMLSR mode is activated may not be allowed to start a frame exchange procedure in a second link corresponding to one of EMLSR links when the multi-link device receives a specific frame in a first link corresponding to one of the EMLSR links. A station which is to perform frame exchange with a multi-link device for which an EMLSR mode is activated may not be allowed to transmit an initial control frame in a second link corresponding to one of EMLSR links when the multi-link device receives a specific frame in a first link corresponding to one of the EMLSR links. In this case, the specific frame may be a groupcast frame or a group address frame, for example, a beacon frame. Specifically, the beacon frame may be a DTIM beacon frame.

<Receiving a Beacon Frame by an EMLSR MLD>

An EMLSR MLD may not perform RF switching when receiving a beacon frame. This may be because a beacon frame is not generally transmitted with MIMO. That is, when receiving the beacon frame, the EMLSR MLD does not need to perform RF switching, and therefore, even if a beacon frame is being received in a specific link, channel access and/or monitoring (listening operation) on another link may be performed.

However, even if the EMLSR MLD performs reception (as in the example of beacon frame reception described above) without performing RF switching on a specific link, an operation and/or performance on another link may be limited while performing reception on the specific link.

For example, when the EMLSR MLD is receiving a beacon frame on a specific link, even if channel access has been completed on another link, performing channel access may be limited. Alternatively, when the EMLSR MLD is receiving a beacon frame on a specific link, transmission and/or reception on another link may be performed only using a basic rate (6, 12, or 24 Mbps).

This is because the EMLSR MLD does not perform RF switching for an operation of the specific link, and thus transmission/reception and channel access on another link may still be possible, but an operation on the another link may be restricted due to resources required for the operation on the specific link.

In addition, as described above, when the EMLSR MLD is receiving a frame (e.g., beacon frame) on a specific link, since an operation on another link may be restricted, a device (terminal) that is to initiate a packet exchange procedure with the EMLSR MLD may be restricted from initiating the packet exchange procedure when the EMLSR MLD is performing (beacon frame) reception. More specifically, when the EMLSR MLD is receiving a beacon frame (or a group cast (group addressed) frame) on a specific link, an AP MLD may not be allowed to transmit an initial control frame to the EMLSR MLD via another link. This may be a restriction applied because it is obvious that the EMLSR MLD which has received the initial control frame will not be able to perform RF switching after receiving the initial control frame (because an RF of another link is being used to receive the beacon frame). In this case, the beacon frame may be a DTIM beacon frame.

<EMLSR Operation and TXOP Management Method Considering Operation Intention of EMLSR MLD>

A TXOP management method that considers RF switching delay described above is a method considering that, when an EMLSR MLD is to receive a beacon frame/group addressed frame scheduled on a specific EMLSR link, reception on the specific EMLSR link is prepared immediately after TXOP of another link ends.

In summary, after termination of a packet exchange sequence (frame exchange or frame exchange sequence) on the specific EMLSR link, instead of transitioning to a listening operation (a state of supporting CCA, etc. for EMLSR links), it may be possible for the EMLSR MLD to directly (immediately) prepare to receive the scheduled frame (e.g., the beacon/group addressed frame) on another EMLSR link. In this case, preparing for reception on another EMLSR link after termination of frame exchange on the specific EMLSR link may refer to a series of operations for using, in the another EMLSR link, a transmission/reception function for a non-initial control frame (a frame other than an initial control frame) and at least one RF chain among RF chains used on the specific EMLSR link. This may be an application exception to an operation restriction that the EMLSR MLD needs to transition to a listening operation for EMLSR links when the frame exchange sequence that the EMLSR MLD has been performing/participating in on the EMLSR link is terminated. That is, the EMLSR MLD needs to transition to the listening operation for the EMLSR links at the termination of the frame exchange sequence that the EMLSR MLD has been performing/participating in on the specific EMLSR link, but when the EMLSR MLD is to receive a beacon/group addressed frame on another EMLSR link, the EMLSR MLD may not transition to the listening operation for the EMLSR links. In this case, the EMLSR MLD may operate for RX support on the another EMLSR link, instead of transitioning to the listening operation for the EMLSR links.

In addition, when the frame exchange sequence that the EMLSR MLD has been performing/participating in on the specific EMLSR link is terminated, if the EMLSR MLD is to receive another frame scheduled to be received on the specific EMLSR link, the EMLSR MLD may maintain a reception support state for the specific EMLSR link without transitioning to a listening operation. This is another exception to the operation restriction that transitioning to the listening operation is required, and will be described in more detail via the embodiment of the disclosure described below.

Additionally, when the frame exchange sequence that the EMLSR MLD has been performing/participating in on the specific EMLSR link is terminated, if the EMLSR MLD is to initiate a frame exchange sequence on the specific EMLSR link, the EMLSR MLD may continue to perform channel access for the specific EMLSR link without transitioning to a listening operation. This may be an additional exception to the operation restriction that transitioning to the listening operation is required.

Alternatively, the EMLSR MLD may receive an initial control frame again on the specific EMLSR link during transitioning to the listening operation after determining the termination of the frame exchange sequence that the EMLSR MLD has been performing/participating in on the specific EMLSR link. This may be a situation that can occur when the EMLSR MLD is able to support reception of the initial control frame on some EMLSR links during EMLSR transitioning. In this case, in order to support the frame exchange sequence for the specific EMLSR link on which the initial control frame has been received again, the EMLSR MLD may cancel EMLSR transitioning (transitioning to the listening operation) which was being performed. That is, the EMLSR MLD, which has received the initial control frame while performing EMLSR transitioning after determining that the frame exchange sequence has been terminated, may not transition to the listening operation.

Alternatively, the EMLSR MLD, which has received the initial control frame during transitioning to the listening operation after determining the termination of the frame exchange sequence that the EMLSR MLD has been performing/participating in on the specific EMLSR link, may not perform response to the received initial control frame. For example, the EMLSR MLD having received an MU-RTS and BSRP trigger frame that is the initial control frame may not transmit a response frame in response to the received initial control frame if the EMLSR MLD itself is transitioning to the listening operation.

In this way, since the EMLSR MLD that is transitioning to the listening operation may not respond to the initial control frame, an initial control frame transmission restriction may be applied to an AP. In other words, the AP may not be allowed to transmit the initial control frame to the EMLSR MLD that is transitioning to the listening operation. In this case, a method for the AP to determine whether a specific EMLSR MLD is transitioning to the listening operation may be based on whether a time equivalent to an EMLSR transition delay (indicated by the specific EMLSR MLD) has elapsed from a time when a frame exchange sequence performed with the specific EMLSR MLD has been terminated by the specific EMLSR MLD. More specifically, the AP may determine that the specific EMLSR MLD is transitioning to the listening operation when the time equivalent to the EMLSR transition delay has not elapsed after satisfaction of a condition that the frame exchange sequence in which the EMLSR MLD is participated has been terminated by the specific EMLSR MLD. If the time equivalent to the EMLSR transition delay has elapsed, the AP may determine that the EMLSR MLD has completed transitioning to the listening operation.

When an STA (affiliated STA) operated by the EMLSR MLD itself on the specific EMLSR link is a TXOP holder, the EMLSR MLD may, after terminating the TXOP, immediately initiate preparation for using, on another EMLSR link, resources (hardware resources, such as processing power and RF chain) which have been used on the specific EMLSR link. If the STA of the specific EMLSR link is a TXOP responder (if the AP has initiated a frame exchange procedure), when the frame exchange on the specific EMLSR link is determined to have been terminated (e.g., when a subsequent frame is not received from the AP until aSIFSTime+aSlotTime+aRxPHYStartDelay elapses after responding with a response frame), the EMLSR MLD may initiate preparation for using, on another EMLSR link, the resources which have been used on the specific EMLSR link.

Since an AP MLD is to start preparing for reception on another EMLSR link after the EMLSR MLD identifies the termination of the frame exchange sequence performed on the specific EMLSR link, the frame exchange sequence (performed on the specific EMLSR link) with the EMLSR MLD needs to be terminated at least aSIFSTime+aSlotTime+aRxPHYStartDelay+EMLSR transition delay (RF switching back latency) earlier than a beacon/group addressed frame to be transmitted on the another EMLSR link. In this case, the AP MLD may need to follow the frame exchange sequence termination rule described above only when the EMLSR MLD is expected to receive the beacon/group addressed frame to be transmitted on the another EMLSR link. In this case, aSIFSTime+aSlotTime+aRx-PHYStartDelay is a time taken for the EMLSR MLD to determine the termination of the frame exchange sequence. In this case, since the AP MLD has no knowledge of aRxPHYStartDelay of the EMLSR MLD, the AP MLD may determine a frame exchange sequence termination time point by considering that the AP MLD's own aRxPHYStartDelay and aRxPHYStartDelay of the EMLSR MLD are the same. However, since aRxPHYStartDelay usually has a small time interval of 1 us to 2 us, it is possible for the AP to ignore aRxPHYStartDelay (consider only aSIFSTime+aSlotTime+EMLSR transition delay) when determining the termination time point of the frame exchange sequence.

Figure 52:
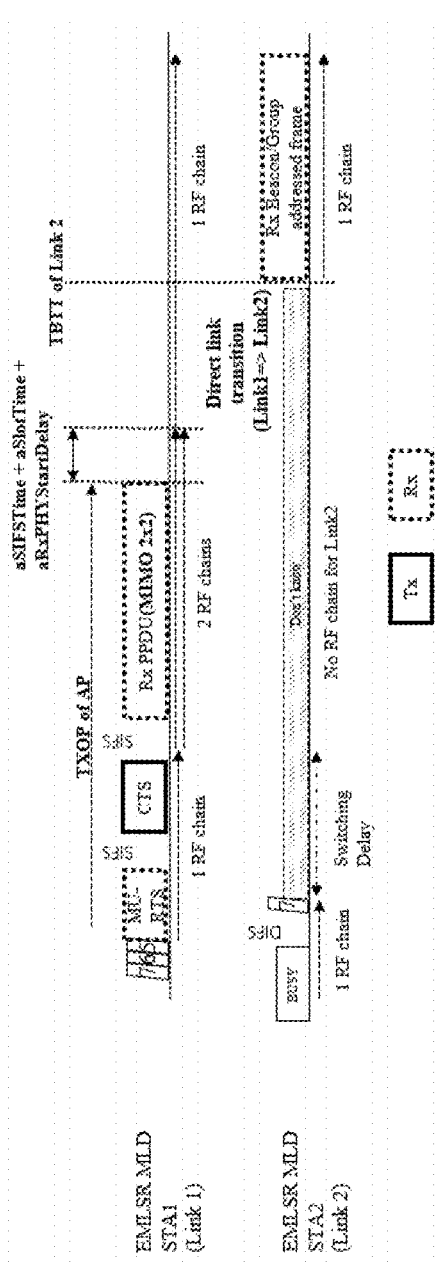
FIG. 52 illustrates an operation in which, after a frame exchange procedure is terminated on a specific EMLSR link, an EMLSR MLD changes a mode to a reception (transmission/reception) support mode for another EMLSR link according to an embodiment of the disclosure.

FIG. 52 illustrates an operation in which, after a frame exchange procedure is terminated on a specific EMLSR link, an EMLSR MLD changes a mode to a reception (transmission/reception) support mode for another EMLSR link according to an embodiment of the disclosure.

Referring to FIG. 52, an EMLSR MLD operates STA1 and STA2 on link 1 and link 2, respectively. An AP transmits an MU-RTS frame as an initial control frame on link 1, and the EMLSR MLD responds with a CTS frame via STA1 and then receives, using two RF chains, a PPDU transmitted from the AP.

After receiving the PPDU from the AP, the EMLSR MLD having identified that no additional PPDU is received during aSIFSTime+aSlotTime+aRxPHYStartDelay determines that a frame exchange sequence in link 1 has been terminated.

After the frame exchange sequence on link 1 is terminated, the EMLSR MLD switches a mode directly to a reception mode for link 2 instead of transitioning to a listening operation, in order to receive a beacon frame/group addressed frame scheduled on link 2. However, since the beacon frame/group addressed frame is not transmitted with MIMO, reception supported in link 2 may be supported using only one RF chain.

In FIG. 52, the AP MLD has predicted that the EMLSR MLD is to receive the beacon frame/group addressed frame scheduled in a TBTT of link 2, and in order to allow (induce) the EMLSR MLD to start reception support (preparation) for link 2, the AP MLD has terminated TXOP (frame exchange sequence) of link 1 earlier than the TBTT of link 2 by aSIFSTime+aSlotTime+aRxPHYStartDelay+EMLSR transition delay (RF switching back delay).

In an example, it may not be supported that the EMLSR MLD changes, while supporting a frame exchange sequence for a specific EMLSR link, an operation immediately to support a frame exchange sequence for another EMLSR link, or it may not be allowed to change a frame exchange sequence support link immediately to lower operational complexity of a non-AP MLD operating in an EMLSR mode and an AP MLD serving the non-AP MLD. In other words, when the EMLSR MLD is to support a frame exchange sequence for another EMLSR link while supporting a frame exchange sequence for a specific EMLSR link, the EMLSR MLD may first need to, after the frame exchange sequence performed on the specific EMLSR link is terminated, transition to a listening operation (a state of supporting CCA, initial control frame reception, etc.) for each EMLSR link, and then prepare frame exchange sequence support (transmission/reception support) for the another EMLSR link. Here, when the frame exchange sequence performed on the specific EMLSR link is terminated, the EMLSR MLD which is to receive a beacon/group addressed frame on another EMLSR link may switch a mode to a reception (or transmission/reception) support mode for the another EMLSR link even without receiving a separate initial control frame on the another link.

In this case, before transmitting a beacon (target beacon transmit time (TBTT) related to a corresponding beacon)/ group addressed frame scheduled on the specific link, the AP MLD needs to manage the frame exchange sequence (and/or TXOP) of the another link in consideration of both a time for the EMLSR MLD to transition to the listening operation and a time required to support reception on the specific link. Here, the AP MLD may additionally need to consider a time (e.g., aSIFSTime+aSlotTime+aRxPHYStartDelay or PIFS+ aRxPHYStartDelay or PIFS (aSIFSTime+aSlotTime)) required for the EMLSR MLD to determine termination of the frame exchange sequence. However, the AP MLD may apply the frame exchange sequence management method described above only when the EMLSR MLD is expected to receive the beacon/group addressed frame scheduled on the specific link. If the AP MLD predicts that multiple EMLSR MLDs (e.g., TXOP responders) participating in the frame exchange sequence on the another link will receive the beacon/group addressed frame scheduled on the specific link, the AP MLD needs to terminate the frame exchange sequence on the another link in consideration of an EMLSR MLD which requires (e.g., which indicates a largest value as an EMLSR transition delay (RF switching back latency)) a largest preparation time among the multiple EMLSR MLDs. As another method, the AP MLD may terminate the frame exchange sequence of the another link by considering a largest value among EMLSR transition delays of all associated EMLSR MLDs, instead of by considering a largest value among EMLSR transition delays of the multiple EMLSR MLDs. As still another method, the AP MLD may terminate the frame exchange sequence of the another link by considering a largest value among EMLSR transition delays of all EMLSR MLDs participating on the frame exchange sequence on the another link, instead of by considering the largest value among the EMLSR transition delays of the multiple EMLSR MLDs (EMLSR MLDs which have participated in the frame exchange sequence on the another link and are expected to receive the beacon/ group addressed frame scheduled on the specific link). In this case, the operations of the AP MLD described in the another method and still another method are provided to determine a termination time point of the frame exchange sequence in a simpler manner by considering operational complexity of the AP MLD.

Similarly, when the EMLSR MLD is to receive the beacon/group addressed frame scheduled on the specific link, TXOP operating in another EMLSR link needs to be terminated in advance in consideration of a time required to support frame reception of the specific EMLSR link. In this case, the EMLSR MLD needs to terminate the TXOP of the another EMLSR link by considering both a time required to support frame reception on the specific EMLSR link and a time for transitioning to a listening operation for each EMLSR link after terminating the TXOP of the another EMLSR link. For example, when the EMLSR MLD is to receive a DTIM beacon scheduled on the specific EMLSR link, the EMLSR MLD may terminate the TXOP of the another EMLSR link early at least as much as a time for transitioning to the listening operation+a time for operation transitioning to support frame reception on the specific link, based on a TBTT associated with the DTIM beacon.

However, when the frame that the EMLSR MLD is to receive on the specific EMLSR link can be received while performing the listening operation, the EMLSR MLD can terminate the TXOP of another EMLSR link early only as much as the time (RF switching back delay or EMLSR transition delay) for transitioning to the listening operation. That is, when operations that different EMLSR MLDs support in the specific EMLSR link, on which listening operation is being performed, are different, the different EMLSR MLDs may apply different criteria to the time for terminating the TXOP operating on the another EMLSR link. For example, when a first EMLSR MLD supports beacon frame reception in a link on which listening operation is being performed, the first EMLSR MLD may terminate the TXOP of the another link early by considering only the time for transitioning to listening operation, whereas, if a second EMLSR MLD does not support beacon frame reception in the link on which listening operation is being performed, the second EMLSR MLD needs to terminate the TXOP of the another link earlier by considering both the time for transitioning to listening operation and an operation change time to support beacon frame reception.

Therefore, the non-AP MLD may indicate, to the AP MLD, capability information related to whether the beacon frame (or a frame other than the initial control frame) can be received while maintaining the EMLSR link in the listening operation. In this case, the capability information related to beacon frame reception may be indicated as "supported" by indicating a specific bit of an EML capabilities subfield (included in a multi-link element) transmitted by the non-AP MLD as 1, and indicated as "not supported" by indicating the specific bit as 0.

In addition, the non-AP MLD may be able to support beacon frame (or a frame other than the initial control frame) reception during a listening operation for only one link that is previously agreed with the AP MLD among EMLSR links. This indicates that the non-AP MLD may maintain a state of supporting reception of general frames (not only the initial control frame but also other frames including beacons and group addressed frames) for one specific EMLSR link while supporting a listening operation for each EMLSR link. This may be achieved by utilizing a transmission/reception support capability for one previously agreed EMLSR link by the non-AP MLD operating in the EMLSR mode, while no frame exchange sequence is being performed on another EMLSR link.

In this case, since the non-AP MLD supports frame reception for the one previously agreed EMLSR link even during the listening operation, if a beacon/group addressed frame is to be received on the one previously agreed EMLSR link, the frame exchange sequence in progress on the another link may be terminated by considering only the time for transitioning to the listening operation. Likewise, when an EMLSR MLD is expected to receive a beacon/group addressed frame on one previously agreed link, the AP MLD may manage a frame exchange sequence of another link by considering only a time at which the EMLSR MLD transitions to the listening operation. In addition, when transmitting a group addressed frame that the EMLSR MLD needs to receive, the AP MLD is able to transmit the group addressed frame via one specific link agreed to support general frame reception during the listening operation by the EMLSR MLD.

In this case, in order to indicate, to the AP, information on a link supporting general frame reception (transmission/reception) while performing the listening operation, the non-AP MLD may indicate the information by including link ID information in the EML capabilities subfield (included in the multi-link element) transmitted to the AP MLD. For example, the EML capabilities subfield may include a link ID subfield. In this case, when a value corresponding to a specific link is indicated via the link ID subfield, the specific link may be indicated, by the non-AP, as a link supporting reception of a general frame during the listening operation.

Figure 53:
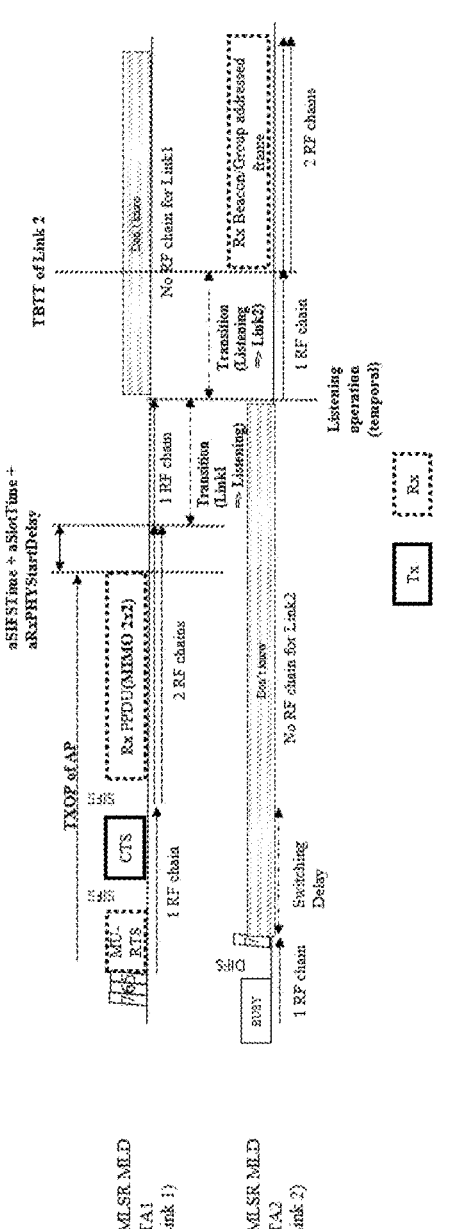
FIG. 53 illustrates a method for managing TXOP (frame exchange sequence) of an EMLSR link according to an embodiment of the disclosure.

FIG. 53 illustrates a method for managing TXOP (frame exchange sequence) of an EMLSR link according to an embodiment of the disclosure.

Referring to FIG. 53, an EMLSR MLD operates STA1 and STA2 on link 1 and link 2, respectively. An AP transmits an MU-RTS frame as an initial control frame on link 1, and the EMLSR MLD responds with a CTS frame via STA1 and then receives, using two RF chains, a PPDU transmitted from the AP.

After receiving the PPDU from the AP, the EMLSR MLD having identified that no additional PPDU is received during aSIFSTime+aSlotTime+aRxPHYStartDelay determines that a frame exchange sequence in link 1 has been terminated.

After the frame exchange sequence on link 1 is terminated, the EMLSR MLD is to receive a beacon/group addressed frame scheduled on link 2, and switches a mode to a reception (transmission/reception and frame exchange sequence) support mode for link 2 after transitioning to a listening operation in order to receive the beacon/group addressed frame on link 2. In this case, the EMLSR MLD has received no separate initial control frame on link 2, but since the EMLSR MLD is to receive the beacon/group addressed frame scheduled on link 2, the EMLSR MLD switches a mode to a reception support mode for link 2 on its own.

In FIG. 53, the AP MLD has predicted that the EMLSR MLD is to receive the beacon frame/group addressed frame scheduled in a TBTT of link 2, and in order to allow (induce) the EMLSR MLD to start reception support (preparation) for link 2, the AP MLD has terminated TXOP (frame exchange sequence) of link 1 earlier than the TBTT of link 2 by aSIFSTime+aSlotTime+aRxPHYStartDelay+EMLSR transition delay (RF switching back delay (to the listening operation))+EMLSR transition delay (RF switching delay to support RX on link 2).

There may be another exception to an operation restriction that the EMLSR MLD needs to transition to a listening operation for EMLSR links when a frame exchange sequence that the EMLSR MLD has been performing/participating in on an EMLSR link is terminated.

When a frame exchange sequence in which the EMLSR MLD has participated as a TXOP holder or a TXOP responder on a specific link is terminated, the EMLSR MLD may attempt to receive a beacon/group addressed frame scheduled on the specific link. In this case, when an expected reception time of the beacon/group addressed frame scheduled for the specific link is close enough to a termination time point of the frame exchange sequence, the EMLSR MLD may select to maintain a reception standby state on the specific link, instead of transitioning to a listening operation. In this case, a method of determining whether the EMLSR MLD is to transition to a listening operation or maintain the reception standby state (or transmission/reception enabled state) for the link on which the frame exchange sequence has been operated immediately before may be based on whether the termination time point of the frame exchange sequence (or TXOP) and the expected reception (start) time (e.g., for a beacon frame, a corresponding TBTT point) of the beacon/group addressed frame have a difference greater than an agreed/preconfigured time interval. For a more specific method, at a point in time when termination of the frame exchange sequence on the specific EMLSR link is identified, if a TBTT of the beacon frame scheduled on the specific EMLSR link is scheduled after a time interval shorter than the preconfigured time interval, the EMLSR MLD may not transition to a listening operation. If, at the point in time when the EMLSR MLD has identified termination of the frame exchange sequence on the specific EMLSR link, the TBTT of the beacon frame to be received within the preconfigured time is not scheduled, the EMLSR MLD may transition to a listening operation.

Additionally, the EMLSR MLD may attempt to initiate a new frame exchange sequence on the specific link after termination of the frame exchange sequence in which the EMLSR MLD itself has participated as a TXOP holder or TXOP responder on the specific link. In this case, if a time at which the EMLSR MLD predicts that the EMLSR MLD itself will complete channel access on the specific link is close enough to the termination time point of the frame exchange sequence in which the EMLSR MLD has participated on the specific link, the EMLSR MLD may continue channel access on the specific link instead of transitioning to a listening operation. In this case, a method of determining whether the EMLSR MLD is to transition to a listening operation or continue channel access in the link on which the frame exchange sequence has been operated immediately before may be based on whether the termination time point of the frame exchange sequence (or TXOP) and the expected completion time point (e.g., a time point at which a backoff counter is expected to reach 0 and a time point at which transmission is expected to be initiated according to channel access using EDCA) of the channel access have a difference greater than an agreed/preconfigured time interval. For a more specific method, at a point in time when termination of the frame exchange sequence on the specific EMLSR link is identified, if the time at which the EMLSR MLD itself expects to complete channel access on the specific EMLSR link is expected to be after a time interval shorter than the preconfigured time interval, the EMLSR MLD may not transition to a listening operation. If, at the point in time when the EMLSR MLD has identified termination of the frame exchange sequence on the specific EMLSR link, it is expected that the channel access on the specific EMLSR link cannot be completed within the preconfigured time, the EMLSR MLD may transition to a listening operation.

According to an embodiment of the disclosure, after termination of the frame exchange sequence on the specific EMLSR link, the EMLSR MLD may determine whether to transition to a listening operation or maintain the reception standby (transmission/reception support) state for the specific EMLSR link, based on whether the expected reception time point of the beacon/group addressed frame to be received is scheduled after a time interval (or after a time interval greater than EMLSR transition delay+aSIFSTime+aSlotTime+aRxPHYStartDelay) greater than the EMLSR transition delay (RF switching back delay). In this case, a reason that the EMLSR MLD makes the determination based on the EMLSR transition delay (or EMLSR transition delay+aSIFSTime+aSlotTime+aRxPHYStartDelay) may be to determine whether the expected reception time point exists before transitioning to a listening operation after termination of the frame exchange sequence on the specific link. This may be because, when transmission of the beacon/group addressed frame starts (by an AP of the another link) while the EMLSR MLD is transitioning to a listening operation (i.e., before the EMLSR transition delay elapses), the EMLSR MLD cannot support reception of the frame.

According to an embodiment of the disclosure, after termination of the frame exchange sequence on the specific EMLSR link, the EMLSR MLD may determine whether to transition to a listening operation or maintain the reception standby (transmission/reception support) state for the specific EMLSR link, based on whether the expected reception time point of the beacon/group addressed frame to be received is scheduled after a time interval (or after a time interval greater than EMLSR transition delay*2+aSIFSTime+aSlotTime+aRxPHYStartDelay) greater than twice the EMLSR transition delay. In this case, a reason that the EMLSR MLD makes the determination based on twice the EMLSR transition delay (or EMLSR transition delay*2+aSIFSTime+aSlotTime+aRxPHYStartDelay) may be to determine whether the expected reception time point exists before switching to the reception support mode for another link after termination of the frame exchange sequence on the specific link. This may be because, when transmission of the beacon/group addressed frame starts from the AP side (AP of the another link) while the EMLSR MLD is switching to the reception support state for the another link (i.e., during a change of transmission/reception support for the specific link=>a listening operation=>transmission/reception support for the another link), the EMLSR MLD cannot support reception of the frame.

According to an embodiment of the disclosure, after termination of the frame exchange sequence on the specific EMLSR link, the EMLSR MLD may determine whether to transition to a listening operation or maintain the reception standby (transmission/reception support) state for the specific EMLSR link, based on whether the expected reception time point of the beacon/group addressed frame to be received on the specific EMLSR link is scheduled after a time interval greater than the EMLSR transition delay (RF switching back delay)+MediumSyncDelay. In this case, a reason that the EMLSR MLD makes the determination based on the EMLSR transition delay may be to determine whether the expected reception time point of the beacon/group addressed frame of the specific EMLSR link arrives before expiration of a MediumSyncDelay timer of another EMLSR link, which has started after transitioning to the listening operation. In more detail, before a restriction related to channel access is released on the another EMLSR link, if additional reception is expected to be performed on the specific EMLSR link on which the frame exchange sequence has been performed, the EMLSR MLD is able to maintain the reception standby state for the specific EMLSR link without transitioning to the listening operation even if the frame exchange sequence on the specific EMLSR link is terminated.

Figure 54:
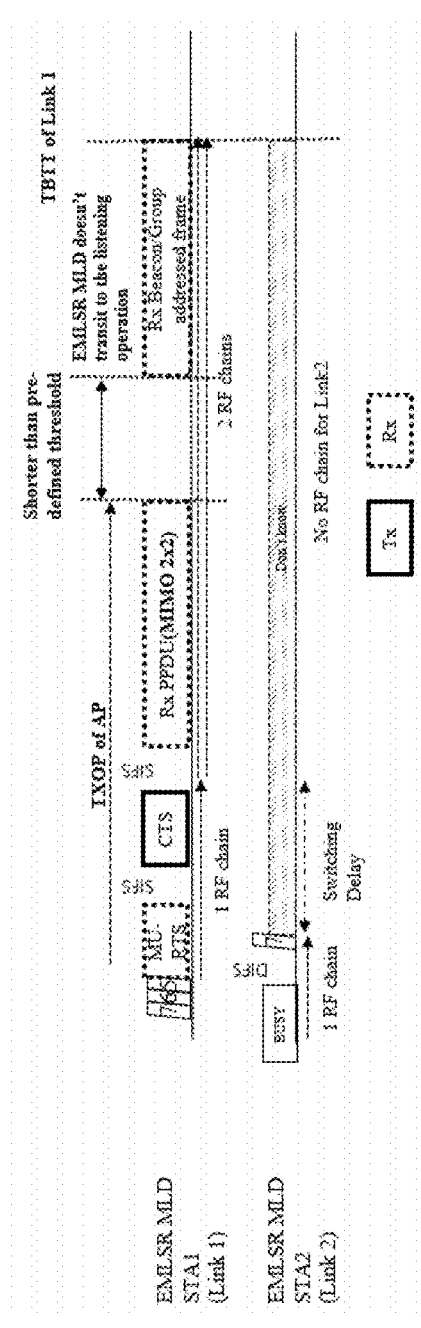
FIG. 54 illustrates an operation in which, when an EMLSR MLD is to receive a beacon/group addressed frame in an EMLSR link on which a frame exchange procedure is already being performed, transitioning to a listening operation is not performed according to an embodiment of the disclosure.

FIG. 54 illustrates an operation in which, when an EMLSR MLD is to receive a beacon/group addressed frame in an EMLSR link on which a frame exchange procedure is already being performed, transitioning to a listening operation is not performed according to an embodiment of the disclosure.

Referring to FIG. 54, an EMLSR MLD operates STA1 and STA2 on link 1 and link 2, respectively. An AP transmits an MU-RTS frame as an initial control frame on link 1, and the EMLSR MLD responds with a CTS frame via STA1 and then receives, using two RF chains, a PPDU transmitted from the AP.

After receiving the PPDU from the AP, the EMLSR MLD having identified that no additional PPDU is received during aSIFSTime+aSlotTime+aRxPHYStartDelay determines that a frame exchange sequence in link 1 has been terminated.

After termination of a frame exchange sequence that is already being performed on link 1, the EMLSR MLD is to receive a beacon/group addressed frame scheduled on the same link (link 1 in FIG. 54), and therefore, even if termination of the frame exchange sequence on link 1 has been identified, the EMLSR MLD maintains a reception standby state (transmission/reception enabled state) in link 1 without transitioning to a listening operation. In this case, based on that a termination time point of the frame exchange sequence previously performed on link 1 and an expected reception time of the beacon/group addressed frame of link 1, which the EMLSR MLD is to receive, have values smaller than a preconfigured threshold value, the EMLSR MLD may have determined to maintain the reception standby state on link 1 instead of transitioning to the listening operation.

In FIG. 54, an AP MLD may have predicted that the EMLSR MLD is to receive the beacon frame/group addressed frame scheduled to be transmitted on link 1, and may consider that the EMLSR MLD does not need a separate preparation time to receive the beacon/group addressed frame. This may be determinations of the AP MLD, which are based on that the EMLSR MLD will maintain a state of supporting transmission/reception on the link (link 1) on which the EMLSR MLD itself is to receive the beacon/group addressed frame. Therefore, the AP MLD may not terminate the frame exchange sequence procedure (TXOP), which is already being performed on link 1, earlier than a transmission time point (TBTT) of the beacon/group addressed frame to be transmitted on link 1 by an EMLSR transition delay (indicated by the EMLSR MLD).

<EMLSR/EMLMR mode Configuration>

As described above, EMLSR/EMLMR may be an operation mode of an MLD, which is other than a characteristic determined based on capability of the MLD. Therefore, the MLD, while being associated with a counterpart MLD, may switch to an EMLSR/EMLMR mode or may terminate (release) the EMLSR/EMLMR mode that is being operated. The MLD which is to perform switching to the EMLSR/

EMLMR mode or terminate the EMLSR/EMLMR mode that is being operated needs to indicate, to the counterpart MLD, that the MLD will change its own state related to the EMLSR/EMLMR mode. In this case, a method by which the MLD indicates its own state change related to the EMLSR/EMLMR mode to the counterpart MLD may include transmitting an EMLSR mode subfield and an EML control field including the EMLSR mode subfield. When an EMLSR mode subfield of an EML control field transmitted by a specific MLD is configured to be 1, this indicates that the specific MLD operates in the EMLSR mode (having an STA operating in the EMLSR mode or having an EMLSR link set), and when the EMLSR mode subfield is configured to be 0, this indicates that the specific MLD does not operate in the EMLSR mode. Interpretation of the EMLMR mode subfield is the same as interpretation of the EMLSR mode subfield (operating in the EMLMR mode when the EMLMR mode subfield is 1, and not operating in the EMLMR mode when the EMLMR mode subfield is 0).

However, it is not allowed for the specific MLD to operate in the EMLSR mode and the EMLMR mode at the same time, so that, when the EMLSR mode subfield is configured to be 1, the EMLMR mode subfield cannot be configured to be 1. Similarly, when the EMLMR mode subfield is configured to be 1, the EMLSR mode subfield cannot be configured to be 1.

In addition, since the AP MLD does not operate the AP operated thereby in the EMLSR and EMLMR modes, the AP MLD cannot transmit the EML control field with the EMLSR mode subfield or EMLMR mode subfield configured to be 1. Furthermore, a restriction that the EML control field cannot be transmitted may be applied to the AP MLD.

For example, the MLD which is to perform switching to the EMLSR mode may configure the EMLSR mode subfield of the EML control field transmitted to the counterpart MLD to be 1. If a non-AP MLD transmits the EMLSR mode subfield of the EML control field, which is configured to be 1, the AP MLD that receives the same may recognize that the non-AP MLD will operate based on the EML control field. If an EMLSR mode value of the EML control field previously received from the non-AP MLD by the AP MLD is 1, and an EMLSR mode value of a newly received EML control field is 0, the AP MLD may recognize that the non-AP MLD will not operate in the EMLSR mode after transition timeout. Conversely, if the EMLSR mode value of the EML control field previously received from the non-AP MLD by the AP MLD is 0, and the EMLSR mode value of the newly received EML control field is 1, the AP MLD may recognize that the non-AP MLD will operate in the EMLSR mode after the transition timeout has elapsed. In this case, the transition timeout may indicate a mode change time required to switch to the EMLSR mode or to release (terminate) the EMLSR mode, and a corresponding delay value is EMLSR-related capability information indicated to the AP MLD by the non-AP MLD.

<EMLSR Link Set Configuration>

As described above, an MLD may operate, in the EMLSR/EMLMR mode, only some of STAs operated thereby. In this case, among STAs operated by a specific MLD, a link of an STA operating in the EMLSR/EMLMR mode may be referred to as an EMLSR/EMLMR link. That is, the MLD may have an EMLSR/EMLMR link set (pair), and it may be understood that an STA operated on the EMLSR/EMLMR link is operated in the EMLSR/EMLMR mode.

Specifically, the MLD may configure the EMLSR/EMLMR mode and the EMLSR/EMLMR link set for at least one STA and at least one corresponding link among multiple STAs and multiple corresponding links constituting the MLD. In this case, whether the EMLSR/EMLMR mode is used may be indicated by a specific field included in a frame. In this case, when the non-AP MLD is in the EMLSR/EMLMR mode, if the AP MLD is to start frame exchange via a link included in the EMLSR/EMLMR set, the AP MLD needs to transmit the initial control frame.

These EMLSR/EMLMR STAs and links may be configured by negotiation between the AP MLD and the non-AP MLD, and some STAs (non-AP STAs, AP STAs) and some links among the links configured to be in the EMLSR/EMLMR mode may be removed from the EMLSR/EMLMR mode. For example, when an AP affiliated to the AP MLD is removed, if a link associated with the removed AP is one of EMLSR links or EMLMR links for the non-AP MLDs, the AP MLD needs to remove the corresponding link from the EMLSR/EMLMR links that constitute the EMLSR link set for the non-AP MLDs. In this case, signal exchange between the AP MLD and the non-AP MLDs, which is to inform of the removed link, may not be necessary. That is, when an AP is removed from the AP-MLD, thereby a corresponding EMLSR/EMLMR link among the EMLSR/EMLMR links is removed, non-AP MLDs may recognize that the link corresponding to the removed AP has been removed from the EMLSR/EMLMR links constituting the EMLSR/EMLMR link set even without a specific notification. In this case, the removal of the AP may be notified to the non-AP MLDs by the AP MLD.

In this case, some of the EMLSR/EMLMR links that constitute the EMLSR/EMLMR link sets of the non-AP MLD may be deleted due to deletion of the AP in the EMLSR/EMLMR mode by the AP MLD.

In this case, if the number of EMLSR/EMLMR links is "0" or "1" due to the deleted link, the EMLSR/EMLMR mode of the AP MLD and the non-AP MLD may be terminated. In other words, if the number of the EMLSR/EMLMR links becomes "0" or "1", and thus there is no need to operate in the EMLSR/EMLMR mode, the EMLSR/EMLMR mode of the non-AP MLDs may be terminated without a specific negotiation procedure.

In this way, a specific MLD having an EMLSR/EMLMR link set may need to indicate, to a counterpart MLD, information on a link that the specific MLD itself operates as EMLSR or EMLMR, and the counterpart MLD may determine whether to manage TXOP and whether to perform transmission when performing communication on the EMLSR link set, based on the EMLSR/EMLMR link set information indicated by the specific MLD. In this case, since the method of TXOP management and determining whether to perform transmission related to EMLSR/EMLMR has been described via the aforementioned embodiments of the disclosure, a detailed description thereof will be omitted. (see the embodiments of FIG. 51 to FIG. 54)

In addition, for brevity of descriptions, the following descriptions and embodiments are mainly based on the EMLSR mode, but the same disclosure may be applied to the EMLMR mode as well.

An MLD that is to operate an EMLSR link set (i.e., an MLD that is to operate, in the EMLSR mode, all or some of STAs operated thereby) may perform signaling to a counterpart MLD by adding EMLSR link information to the EML control field. For example, a non-AP MLD that is to operate an EMLSR link set may transmit a frame including an EML control field to an AP MLD to indicate the EMLSR link set.

The EMLSR link set may be indicated using an EMLSR link bitmap subfield included in the EML control field. The EMLSR link bitmap subfield is a subfield having a 16-bit (2-octet) size, where a first bit corresponds to link 0, a second bit corresponds to link 1, and a fifteenth bit corresponds to link 14, respectively. If each bit of the EMLSR link bitmap subfield is configured to be 1, this indicates that an STA of a corresponding link operates in the EMLSR mode. That is, the link corresponding to the bit indicated as 1 in the EMLSR link bitmap subfield is a link included in the EMLSR link set. If the non-AP MLD configures the first bit and the second bit of the EMLSR link bitmap subfield to be 1, the non-AP MLD indicates link O and link 1 as the EMLSR link set, and if there is an additional STA operating in another link, the additional STA is an STA that is not operated in the EMLSR mode. In this case, the EMLSR link bitmap subfield may be meaningful only when the EMLSR mode subfield is indicated as 1. That is, the EMLSR link bitmap subfield of the EML control field where the EMLSR mode subfield is indicated as 0 may be reserved. (All respective bits may be configured to be 0 or 1) However, since a total number of links on which the MLD may operate an STA is limited to 15, the EMLSR link bitmap subfield may be configured to be 15 bits instead of 16 bits. A more detailed EMLSR link bitmap subfield configuration method will be described via embodiments of FIG. 55 below.

<EMLSR Primary Link Configuration>

As described above, links (STAs) operating in the EMLSR mode may support transmission/reception on only one link at a time. Due to such a performance restriction, an STA (e.g., an AP of an AP MLD) performing transmission to an STA (e.g., a non-AP STA of a non-AP MLD) in the EMLSR mode determines whether to perform transmission to the STA in the EMLSR mode by considering whether another STA in the same EMLSR link pair as the STA in the EMLSR mode is performing transmission/reception. In addition, when it is predicted that the another STA operating in the same EMLSR link pair as the STA in the EMLSR mode is to receive a beacon frame and/or a group addressed frame, an STA performing frame exchange with the STA in the EMLSR mode needs to terminate the frame exchange before a transmission time point of the beacon frame and/or group addressed frame (more specifically, a frame transmission time point-before the EMLSR transition delay). In this case, a method of predicting that the STA in the EMLSR mode is to receive the beacon frame and/or group addressed frame is not determined by specifications, but may depend on implementation of an MLD associated with the MLD in the EMLSR mode.

However, the MLD operating the STA in the EMLSR mode may indicate information on a link, on which the MLD itself is to receive the beacon frame/group addressed frame, to a counterpart MLD, thereby assisting the counterpart MLD to predict the reception intention (intention of receiving the beacon frame and/or group addressed frame) of the MLD itself more accurately. That is, when the MLD operating the STA in the EMLSR mode indicates a specific link on which the MLD is to receive the beacon/group addressed frame, the counterpart MLD may predict that the MLD in the EMLSR mode is to receive the beacon/group addressed frame transmitted on the specific link. In this case, TXOP in which a specific STA of the EMLSR MLD is a TXOP holder or a TXOP responder, may need to be terminated before (target beacon transmission time (TBTT)-RF switching back delay) corresponding to a (DTIM) beacon frame of a link indicated as a primary link by the EMLSR MLD. A TXOP management method of the AP MLD and the EMLSR MLD for performing such TXOP management has been described via the embodiments of FIG. 51 to FIG. 54, so that a detailed description thereof will be omitted.

For example, if the non-AP MLD operates link 1 and link 2 in the EMLSR mode and indicates having an intention to receive a beacon/group addressed frame on link 1, the AP MLD may predict that the non-AP MLD will receive the beacon frame on link 1, thereby terminating frame exchange on link 2 before transmitting the beacon frame on link 1. On the other hand, when the AP MLD is to transmit a beacon frame on link 2, the AP MLD may predict that the non-AP MLD will not receive the beacon frame transmitted on link 2 so that the AP MLD may not terminate frame exchange that has been performed on link 1.

In this way, the non-AP MLD may indicate information on the link on which the non-AP MLD itself is to receive the beacon/group addressed frame, in addition to the information (EMLSR link set information) on the link operating in the EMLSR mode. In this case, the link on which the beacon/group addressed frame is to be received may be referred to as a primary link of the EMLSR link set. That is, the primary link is given a higher priority in transmission/reception support compared to other EMLSR links.

The primary link may be indicated using an EMLSR primary link subfield, and the EMLSR primary link subfield may be configured using 4 bits in consideration that a number of a link that may be indicated as the primary link includes link 0 to link 14 (a total of 15).

When indicating the primary link via the EMLSR primary link subfield, the non-AP MLD needs to indicate only a link indicated as an EMLSR link via the EMLSR link bitmap subfield of the same EMLSR control field. In other words, the non-AP MLD needs to indicate, via the EMLSR primary link subfield, only a link ID of a link corresponding to a bit indicated as 1 in the EMLSR link bitmap subfield. That is, only an EMLSR link may be indicated as a primary link. For example, if the non-AP MLD has configured the EMLSR link bitmap subfield of 2 octets to be 1110 0000 0000 0000 (indicating link 0, link 1, and link 2 as EMLSR link set), only 0, 1, or 2 (1, 2, or 3) should be indicated via the EMLSR primary link subfield.

In addition, like the EMLSR link bitmap subfield described above, the EMLSR primary link subfield may be meaningful only when the EMLSR mode subfield is indicated as 1. That is, the EMLSR primary link subfield of the EML control field in which the EMLSR mode subfield is indicated as 0 may be reserved (may be configured to be 0 or a preconfigured value (e.g., 15)).

When the non-AP MLD indicates the EMLSR primary link, this indicates that the non-AP MLD itself intends to receive a beacon/group addressed frame on the primary link, and therefore the non-AP MLD may always need to keep the link indicated as the primary link in an awake state (non-doze state due to power saving). In other words, the non-AP MLD may not be allowed to perform power saving on the STA of the primary link.

In addition, since the meaning of the non-AP MLD indicating the primary link includes the meaning that the non-AP MLD will preferentially support transmission/reception of the link indicated as the primary link over other EMLSR links, the non-AP MLD should not indicate a disabled link (link in which TID is not mapped by TID-to-link mapping) as the primary link.

Another applicable restriction may be that the non-AP MLD needs to operate the primary link in a default mapping status. To be more specific, the non-AP MLD may need to map all TIDs (both DL/UL direction, all of TID 0 to TID 7)

to the primary link. This may be understood as a TID-to-link mapping restriction to ensure that the primary link remains in a state where all types of frame transmission/reception are supportable. However, transmission/reception of the primary link is restricted while transmission/reception is being performed on another EMLSR link.

An MLD may have an STA operating in the EMLSR mode, but may not operate/indicate a primary link separately. In this case, the MLD may not indicate primary link information via the EMLSR primary link subfield even though the EMLSR mode subfield of the EML control field has been configured to be 1. In this case, a method of not indicating the EMLSR primary link information may include configuring the EMLSR primary link subfield to be 15. This may be an available method of not performing primary link indication because there is no link corresponding to link ID 15. Therefore, when the MLD does not attempt to configure a separate primary link in the EMLSR link set, the EMLSR primary link subfield of the EML control field may be configured to be 15. If the EML control field in which the EMLSR mode subfield is indicated as 1 is received from the MLD, and the EMLSR primary link subfield of the same EML control field is indicated as 15, the AP MLD should interpret that the MLD having transmitted the EML control field has indicated no separate primary link.

<Restrictions on EMLSR Primary Link Configuration>

In the above, it has been shown that, by selecting/indicating a primary link in an EMLSR link set, an MLD is able to assist a counterpart MLD to more accurately predict an intention (intention of receiving a beacon frame and/or group addressed frame) of the MLD itself.

However, even if a specific MLD does not indicate a primary link in an EMLSR link set, there is a case where a counterpart MLD is able to clearly identify a reception intention of the specific MLD, or a case where there is no need to identify a link in the EMLSR link set, on which the specific MLD intends to receive a beacon/group addressed frame.

For example, if the specific MLD additionally operates an STA other than an STA operating in the EMLSR mode, the counterpart MLD is able to predict that the specific MLD will receive a beacon/group addressed frame via the STA other than the STA operating in the EMLSR mode.

In another example, if the specific MLD additionally operates an STA other than an STA operating in the EMLSR mode, a counterpart MLD operates without considering whether the specific MLD will receive a beacon/group addressed frame to be transmitted on a specific link. That is, the counterpart MLD may neither terminate transmission that is already being performed nor postpone a transmission start time in consideration of transmission of a beacon/group addressed frame, and the specific MLD is able to receive a beacon/group addressed frame via the STA operating in the EMLSR mode or the STA other than that in the EMLSR mode.

In this way, if the MLD is additionally operating another STA that is not in the EMLSR mode, it may not be necessary to indicate a primary link to the counterpart MLD, and therefore, if there is an additional STA that is not in the EMLSR mode, the MLD may be restricted from indicating a primary link via the EML control field. That is, the MLD that is associated with the counterpart MLD via another STA that is not in the EMLSR mode may not be allowed to indicate a primary link via the EML control field.

More specifically, if a bit of the EMLSR link bitmap subfield, which corresponds to at least one link among links associated with the AP MLD, is not configured to be 1, the non-AP MLD transmitting the EML control field may not be allowed to indicate a primary link via the EMLSR primary link subfield of the same EML control field. In this case, a method of not indicating a primary link via the EMLSR primary link may include configuring the EMLSR primary link subfield to a previously agreed value.

Alternatively, when the EMLSR link bitmap subfield of the EML control field received from the non-AP MLD does not indicate at least one associated link as an EMLSR link set (i.e., when a bit corresponding to at least one associated link is indicated as 0), the AP MLD may ignore the EMLSR primary link subfield. In this case, the ignoring of the EMLSR primary link subfield may include considering the subfield as "reserved".

However, when all STAs other than those operating in the EMLSR mode are in a doze state due to power saving, transmission of the EML control field may be allowed for the MLD, wherein the EML control field indicates, as a primary link, one of links of the STAs operating in the EMLSR mode. Similarly, when all STAs other than those operating in the EMLSR mode are disabled by TID-to-link mapping (when there is no TID mapped to a link on which the other STAs operate), transmission of the EML control field which indicates, as a primary link, one of links of the STAs operating in the EMLSR mode may be allowed.

In the same context, even if the EMLSR link bitmap subfield of the EML control field received from the non-AP MLD does not indicate at least one associated link as the EMLSR link set, when non-AP STAs (STAs of the non-AP MLD) of the associated links are all in the doze state due to power saving, the AP MLD may need to recognize a primary link of the non-AP MLD, based on a value indicated in the EMLSR primary link subfield of the EML control field. Similarly, even if the EMLSR link bitmap subfield of the EML control field received from the non-AP MLD does not indicate at least one associated link as the EMLSR link set, when links on which non-AP STAs of the associated links are disabled, the AP MLD may need to recognize a primary link of the non-AP MLD, based on a value indicated in the EMLSR primary link subfield of the EML control field.

When the non-AP MLD transmits a specific EML control field, if an unassociated link is additionally associated (via re-setup between the non-AP MLD and the AP MLD), a primary link indicated via the specific EML control field may be released. In this case, the primary link may be released as described above only when the non-AP STA of the additionally associated link does not operate in the EMLSR mode. This may be understood that, as previously considered, because the non-AP MLD has changed its state to have an associated STA other than the STA operating in the EMLSR mode, information on the previously indicated/configured primary link is no longer valid.

Embodiment of EML Control Field Format

An EML control field may have a configuration including the EMLSR mode, EMLMR mode, EMLSR link bitmap, and EMLSR primary link subfield described above. The EML control field may be transmitted for operation in the EMLSR/EMLMR mode or for releasing the EMLSR/EMLMR mode that is being operated, and may be transmitted by being included in an EML operating mode notification frame that is an EHT action frame. The EML operating mode notification frame is a type of an EHT action frame, and is a frame distinguished by indication of 1 that is an EHT action field value of the EHT action frame. The EML operating mode notification frame is the EHT action frame including a category field (configured to a value of 36), an EHT action field (configured to a value of 1), a dialog token field (configured to a value other than 0), and an EML control field. The configuration of the EML operating mode notification frame is not relevant to the EML control field format configuration method that the disclosed intends to provide, so that a detailed description thereof will be omitted.

FIG. 55 illustrates various EML control field formats according to an embodiment of the disclosure.

Referring to (a) of FIG. 55, an EML control field may have a 3-octet size format including an EMLSR mode subfield (1 bit), an EMLMR mode subfield (1 bit), an EMLSR link bitmap subfield (16 bits), an EMLSR primary link subfield (3 bits), and reserved (3 bits).

The EMLSR mode subfield may be configured to be 1 and transmitted when an MLD transmitting the EML control field wants to operate in the EMLSR mode, and configured to be 0 and transmitted when the MLD does not want to operate in the EMLSR mode. That is, a non-AP MLD may configure the EMLSR mode subfield to be 1 or 0 to indicate whether to operate in the EMLSR mode. If an EMLSR mode subfield received from a specific non-AP MLD is indicated as 1, an AP MLD needs to determine, when the specific non-AP MLD performs frame exchange via a specific link of an EMLSR link set (indicated via an EMLSR link bitmap subfield) operated in the EMLSR mode, initiation/termination of the frame exchange, etc. by considering an operation performed or to be performed on another EMLSR link of the EMLSR link set. (see FIG. 51 to FIG. 54)

The EMLMR mode subfield may be configured to be 1 and transmitted when an MLD transmitting the EML control field wants to operate in the EMLMR mode, and configured to be 0 and transmitted when the MLD does not want to operate in the EMLMR mode. That is, a non-AP MLD may configure the EMLMR mode subfield to be 1 or 0 to indicate whether to operate in the EMLMR mode.

The EMLSR link bitmap subfield is a subfield having a 16-bit (2-octet) size, where a first bit corresponds to link 0, a second bit corresponds to link 1, and a fifteenth bit corresponds to link 14, respectively. If each bit of the EMLSR link bitmap subfield is configured to be 1, this indicates that an STA of a corresponding link operates in the EMLSR mode. In this case, the EMLSR link bitmap subfield may be meaningful only when the EMLSR mode subfield is indicated as 1. That is, the EMLSR link bitmap subfield of the EML control field where the EMLSR mode subfield is indicated as 0 may be reserved. (All may be configured to be 0 or 1)

The EMLSR primary link subfield includes 3 bits and may indicate an ID of a link to be operated as a primary link. For example, if the EMLSR primary link subfield is configured to be 1, a link corresponding to link ID 1 is indicated as a primary link. Therefore, the non-AP MLD may indicate, as a primary link, a link matching a corresponding link ID, wherein the EMLSR primary link subfield is configured to have one of values 0 to 7. However, the link indicated as the primary link via the EMLSR primary link subfield should be a link corresponding to a bit indicated as 1 in the EMLSR link bitmap subfield of the same EML control field. In addition, the values that can be indicated via the EMLSR primary link subfield having a 3-bit size are limited to 0 to 7, and therefore the non-AP MLD needs to determine/select/indicate one of the links corresponding to link ID 0 to link ID 7 as the primary link.

Referring to (b) of FIG. 55, an EML control field may have a 3-octet size format including an EMLSR mode subfield (1 bit), an EMLSR primary link part-1 subfield (1 bit), an EMLSR link bitmap subfield (16 bits), an EMLSR primary link part-2 subfield (3 bits), and reserved (3 bits).

Methods of configuring and interpreting subfields having the same sizes as those in (a) of FIG. 55 will be omitted.

In the aforementioned descriptions of the EMLSR/ EMLMR mode subfield, it has been mentioned that, if the EMLSR mode subfield is configured to be 1, the EMLMR mode subfield should be configured to be 0. This is an operational restriction of a non-AP MLD, which indicates that the EMLSR mode and the EMLMR mode cannot be operated simultaneously, and therefore, the EMLSR mode subfield and EMLMR mode subfield included in a single EML control field cannot be both configured to be 1. Therefore, when the EMLSR mode subfield is configured to be 1, an EML control field format in which the EMLMR mode subfield is omitted may be used. In more detail, when the EMLSR mode subfield is configured to be 1, a bit (B1 in FIG. 55) originally used as the EMLMR mode subfield may be used for a purpose other than its original purpose.

In the above format embodiment of FIG. 55A, due to the 3-bit limitation on the size of the EMLSR primary link subfield, there has been a problem that the link ID that can be indicated as a primary link is limited to 7 or less, and therefore, a method of additionally using the bit (B1), which is used for the EMLMR mode subfield, to indicate a primary link may be considered. That is, in the EML control field in which the EMLSR mode subfield is configured to be 1, it is possible that the EMLSR primary link part-1 subfield is indicated instead of the EMLMR mode subfield, and the EMLSR primary link part-1 subfield is combined with the EMLSR primary link part-2 subfield so as to indicate a value corresponding to link 1 to link 15. In this case, the non-AP MLD may indicate an ID of a link that the non-AP MLD is to indicate as a primary link by using both the EMLSR primary link part-1 and EMLSR primary link part-2. Likewise, when the EMLSR mode subfield (B0) of the EML control field received from the non-AP MLD is indicated as 1, the AP MLD may interpret a second bit (B1 in FIG. 55) of the EMLSR control field as the EMLSR primary link part-1 subfield, and may recognize the ID of the link, which has been indicated as the primary link by the non-AP MLD, based on the EMLSR primary link part-1 subfield and the EMLSR primary link part-2 subfield.

In this case, a method of indicating/interpreting the EMLSR primary link part-1 subfield and the EMLSR primary link part-2 subfield may include considering that the bit of the EMLSR primary link part-1 subfield is a most significant bit (MSB) and considering that the bit of the EMLSR primary link part-2 subfield is a remaining bit (B20 in FIG. 55B is a least significant bit (LSB)). Alternatively, a method of indicating/interpreting the EMLSR primary link part-1 subfield and the EMLSR primary link part-2 subfield may include considering that the bit of the EMLSR primary link part-1 subfield is a least significant bit (LSB) and considering that the bit of the EMLSR primary link part-2 subfield is a remaining bit (B20 in FIG. 55B is a most significant bit (MSB)). The number indicated by combining the EMLSR primary link part-1 and part-2 is the ID of the link indicated as the primary link by the non-AP MLD.

In this case, the method of using, as the EMLSR primary link part-1 subfield, the bit used for the EMLMR mode subfield in FIG. 55A is a format modification method using the fact that the EMLMR mode subfield is a subfield that should always be indicated as 0 when the EMLSR mode subfield is 1. More specifically, the above method is a method of, only when the EMLSR mode subfield is indicated as 1, omitting the EMLMR mode subfield which should always be indicated as 0, and using the bit assigned to the EMLMR mode subfield for the purpose of indicating the EMLSR primary link. In summary, the format of the EML control subfield considered in the disclosure has different forms when the EMLSR mode subfield is indicated as 0 and when the EMLSR mode subfield is indicated as 1, and the bit of the EMLMR mode subfield, which is omitted due to the EMLSR mode subfield being indicated as 1, is used to indicate EMLSR primary link information.

Referring to (c) of FIG. 55, an EML control field may have a 3-octet size format including an EMLSR mode subfield (1 bit), an EMLSR primary link part-1 subfield (1 bit), an EMLSR link bitmap subfield (15 bits), an EMLSR primary link part-2 subfield (3 bits), and reserved (4 bits).

Methods of configuring and interpreting subfields having the same sizes and positions as those in (a) and (b) of FIG. 55 will be omitted.

For reference, an MLD may operate STAs on up to 15 links, and therefore, IDs of links on which an AP MLD operates APs have values corresponding to link 0 to link 14. The number of links limited to 15 is the number of links determined by considering the scalability, signaling overhead, and complexity for EHT (11be) and subsequent generation standards, and is not a value due to limitations/issues, which should necessarily be determined to be 15. Signaling of many MLD unit operations defined in EHT includes a link bitmap or a link ID subfield to indicate a link associated with signaling information exchanged between MLDs. In this case, a generally considered size of each subfield is 4-bit for the link ID subfield and 2-octet (16 bits) for the link bitmap subfield. Among these, a reason that the link bitmap subfield includes a 2-octet size is because the octet including the number of bits closest to the number (15) of links that the MLD may have is 2 octets (16 bits), and in most MLD unit signaling, the link bitmap subfield (including subfields with different names, which have bits corresponding to respective links) is defined to have 2 octets. However, for the EML control field having a 3-octet size, only 3 bits (as in FIGS. 55A and 55B) remain as reserved bits, excluding the EMLSR/EMLSR mode subfield, the EMLSR link bitmap subfield, and the EMLSR primary link subfield. In this case, if, in the subsequent generation standards, additional signaling is performed using only the 3 bits, the usability may be reduced due to the limited number of bits.

Therefore, in the EML control field, one additional bit may be secured as a reserved bit by considering that the EMLSR link bitmap subfield has a 15-bit size. In this case, due to reduction of the size of the EMLSR link bitmap by 1 bit, the EMLSR primary link part-2 subfield may be indicated using B17 to B19 of the EML control field, and B20 to B23 may be the reserved subfield. Alternatively, as another method, it is possible that the EMLSR primary link part-2 is indicated via B18 to B20, B17 is a first reserved subfield, and B21 to B23 are a second reserved subfield. (see FIG. 55C)

The aforementioned restriction that the link which may be indicated using the EMLSR primary link should not be a disabled (a state where no TID mapped by TID-to-link mapping exists) link may be a restriction that applies to overall EMLSR links. In other words, it is possible that the EMLSR link is restricted to a link that is not in a disabled state, that is, a link in an enabled state. Therefore, the non-AP MLD may need to indicate/configure, to be 1, only bits corresponding to enabled links among the bits of the EMLSR link bitmap subfield transmitted by the non-AP MLD itself. When considering that the non-AP MLD does not perform frame exchange via a disabled link, the restriction may be considered as obvious EMLSR link configuration restriction.

<TID-to-Link Mapping Management Method Related to EMLSR Operation>

In some embodiments of the disclosure described above, it has been restricted that a non-AP MLD operating in the EMLSR mode needs to apply a default TID-to-link mapping status to EMLSR links.

However, since the operation of the EMLSR mode and TID-to-link mapping provide independent functions, respectively, a non-AP MLD operating a non-AP STA in the EMLSR mode may still be allowed to perform TID-to-link mapping negotiation. That is, the non-AP MLD may be allowed to perform TID-to-link mapping negotiation with an AP MLD without applying the default TID-to-link mapping status to EMLSR links so as to map different TIDs to the respective EMLSR links.

However, even if TID-to-link mapping negotiation for the EMLSR link is performed between the AP MLD and the non-AP MLD, the restriction that a disabled link cannot be the EMLSR link may still be applied. There may be two MLD operation methods considering the restriction: 1. a method of prioritizing an EMLSR link configuration; and 2. a method of prioritizing TID-to-link mapping.

The MLD operation method of prioritizing an EMLSR link configuration, which is the first method, may include restricting TID-to-link mapping negotiation so that the EMLSR link of the non-AP MLD is not switched to disabled when the non-AP MLD and the AP MLD perform TID-to-link mapping negotiation.

An MLD that transmits a TID-to-link mapping request/response frame needs to propose a TID-to-link mapping in which each EMLSR link is not disabled. In more detail, an MLD that transmits a TID-to-link mapping element to a counterpart MLD needs to transmit a TID-to-link mapping element in which at least one TID is mapped to each EMLSR link of the counterpart MLD and/or of the MLD itself. In this case, the TID-to-link mapping element is an element that may be included in a TID-to-link mapping request/response frame and an association request/response frame, and is an element including link information to be mapped to each TID.

In addition, even if TID-to-link mapping negotiation between the two MLDs is completed, if a result of the completed negotiation changes at least one EMLSR link to be disabled, the completed negotiation may be invalid. In this case, completion of the TID-to-link mapping negotiation indicates that the MLD having transmitted a TID-to-link mapping response frame has accepted a TID-to-link mapping status requested by the counterpart MLD. In this case, the acceptance may be identified by a status code being configured to be accepted, wherein the status code is included in the included in the TID-to-link mapping response frame. In this case, for the negotiation performed using the association request frame, the proposed TID-to-link mapping status may be accepted according to the association response frame including no TID-to-link mapping element.

That is, the MLD having performed TID-to-link mapping negotiation needs to determine that a TID-to-link mapping change is valid/successful only when each TID is mapped to at least one setup link or at least one TID is mapped to each EMLSR link.

As a result, if the MLD operates according to the first method described above, the EMLSR link being switched to be disabled due to the result of the TID-to-link mapping negotiation is prevented.

The method of prioritizing TID-to-link mapping, which is the second method, may include releasing the EMLSR mode of a link that is switched to be disabled due to a result of TID-to-link mapping negotiation performed between the two MLDs.

As described above, the MLD may configure the EMLSR/EMLMR mode for at least one STA and at least one corresponding link from among multiple STAs constituting the MLD and multiple corresponding links. In this case, whether the EMLSR/EMLMR mode is used may be indicated by a specific field included in a frame. These EMLSR/EMLMR STAs and links may be configured by negotiation between the AP MLD and the non-AP MLD, and some STAs (non-AP STAs, AP STAs) and some links among the links configured to be in the EMLSR/EMLMR mode may be removed from the EMLSR/EMLMR mode. For example, when an AP affiliated to the AP MLD is removed from the EMLSR/EMLMR mode, if a link associated with the removed AP is one of EMLSR links or EMLMR links for non-AP MLDs, the AP MLD needs to remove the corresponding link from the EMLSR links or EMLMR links for the non-AP MLDs. In this case, signal exchange between the AP MLD and the non-AP MLDs, which is to inform of the removed link, may not be necessary. That is, when an AP is removed from the EMLSR/EMLMR mode by the AP MLD, the non-AP MLDs may recognize that the link corresponding to the removed AP has been removed from the EMLSR/EMLMR links even without a specific notification. In this case, the removal of the AP may be notified to the non-AP MLDs by the AP MLD.

Specifically, the MLD may perform TID-to-link mapping with the counterpart MLD without considering whether each setup link is an EMLSR link. If a specific EMLSR link of the non-AP MLD needs to be switched (changed) to be disabled according to a result of the TID-to-link mapping negotiation performed between the two MLDs, the specific EMLSR link may be changed so as to be no longer an EMLSR link. That is, an STA of the non-AP MLD operating on the specific EMLSR link no longer operates in the EMLSR mode. As a simple example, when a non-AP MLD having three EMLSR links (link 1, link 2, and link 3) performs TID-to-link mapping negotiation with an AP MLD, and one EMLSR link (link 1) of the three EMLSR links is switched to be disabled, the non-AP MLD may operate, as EMLSR links, only two links (link 2 and link 3) remaining after excluding the link (link 1) switched to be disabled.

In addition, there is a situation where the non-AP MLD needs to terminate not only the EMLSR link switched to be disabled by TID-to-link mapping but also the EMLSR mode of other EMLSR links. More specifically, when the EMLSR mode of the EMLSR link switched to be disabled by TID-to-link mapping is released, if there is 1 or 0 remaining EMLSR link, the non-AP MLD may need to terminate the operation of the EMLSR mode. That is, the non-AP MLD needs to terminate the EMLSR mode of all EMLSR links when the number of EMLSR links changed by TID-to-link mapping is 1 or 0. As a simple example, if a non-AP MLD having two EMLSR links performs TID-to-link mapping with an AP MLD, and one link of the two EMLSR links is scheduled to be switched to be disabled, the non-AP MLD needs to terminate (release) the EMLSR mode of not only the EMLSR link switched to be disabled but also the remaining EMLSR link. This may be an EMLSR link management method that is considered because the operation of the EMLSR mode is meaningful when at least two EMLSR links exist. In more detail, if only one non-AP STA among non-AP STAs operated by the non-AP MLD operates in the EMLSR mode, an operation, such as performing MIMO using an RF of another EMLSR link, cannot be performed, and only an unnecessary initial control frame-related operation is added as a result. Therefore, the non-AP MLD does not need to operate only one EMLSR link, and furthermore, operating only one EMLSR link is unreasonable. For this reason, when the number of EMLSR links is changed (or needs to be changed) by TID-to-link mapping, if there is 1 or 0 remaining EMLSR link, the non-AP MLD should not operate in the EMLSR mode. (The non-AP MLD should not have a non-AP STA operating in the EMLSR mode.) That is, due to deletion of an AP by the AP MLD, some of EMLSR/EMLMR links constituting an EMLSR/EMLMR link set of the non-AP MLD operating in the EMLSR/EMLMR mode may be deleted. In this case, when the number of EMLSR/EMLMR links is "0" or "1" due to the deleted link, the EMLSR/EMLMR mode of the non-AP MLD may be terminated. That is, when the number of the EMLSR/EMLMR links becomes "0" or "1", and thus there is no need to operate in the EMLSR/EMLMR mode, the EMLSR/EMLMR mode of the non-AP MLDs may be terminated without a specific negotiation procedure.

Alternatively, a TID-to-link mapping restriction may be considered to prevent the EMLSR mode from being terminated. More specifically, performing of TID-to-link mapping on an EMLSR link is allowed, but TID-to-link mapping that results in only 1 or 0 EMLSR link being enabled due to a result of TID-to-link mapping negotiation may be restricted (invalid, or ignored). That is, a TID-to-link mapping change may be considered valid only when the change by TID-to-link mapping keeps at least 2 EMLSR links enabled (at least 1 TID is mapped). Therefore, when performing TID-to-link mapping, the MLD needs to perform TID-to-link mapping in which at least two of its own EMLSR links or EMLSR links of the counterpart MLD are kept enabled. That is, the MLD should not perform TID-to-link mapping in which only 0 or 1 EMLSR link is enabled.

A method by which a non-AP MLD changes an EMLSR link to be no longer an EMLSR link and a method by which a non-AP MLD terminates an EMLSR mode are described in more detail via the following embodiments.

According to an embodiment of the disclosure, when TID-to-link mapping in which an EMLSR link is switched to be disabled is performed (requested and accepted), a non-AP MLD needs to transmit, to an AP MLD, a frame for excluding the disabled link from an EMLSR link set (pair). In this case, the frame for excluding the disabled link from the EMLSR link set indicates a frame including an EMLSR link bitmap subfield in which a bit corresponding to the disabled link is configured to be 0, an EML operating mode notification frame in which an EMLSR mode subfield is configured to be 0, etc. (The following 1 to 3 describe the operations of the non-AP MLD according to an embodiment of the disclosure.)

1. In order to release the EMLSR mode of a link that is switched to be disabled, the non-AP MLD may transmit an EML operating mode notification frame, in which a bit of an EMLSR link bitmap subfield, which corresponds to the disabled link, is configured to be 0, to the AP MLD. That is, when the EMLSR link is switched to be disabled by TID-to-link mapping, the non-AP MLD may transmit, to the AP MLD, the EML operating mode notification frame indicating, as EMLSR links, only links other than the disabled link.

In this case, the non-AP MLD may need to transmit the frame for releasing the EMLSR mode of the link that is switched to be disabled and a TID-to-link mapping request/response frame transmitted to switch the link to be disabled. (The AP MLD may transmit an EML operating mode notification frame to the non-AP MLD in response to the EML operating mode notification frame received from the non-AP MLD.)

2. The non-AP MLD may transmit an EML control field, in which an EMLSR mode subfield is configured to be 0, to the AP MLD in order to release the EMLSR mode of a link that is switched to be disabled and of other EMLSR links. That is, when a specific EMLSR link is switched to be disabled by TID-to-link mapping, the non-AP MLD may operate to prevent the disabled link from becoming an EMLSR link, by releasing the EMLSR mode of the specific EMLSR link and of all other EMLSR links. In this case, the non-AP MLD may need to transmit the frame (e.g., a frame including the EML operating mode notification frame, the EML control field, etc.), in which the EMLSR mode subfield is configured to be 0, and a TID-to-link mapping request/response frame transmitted to switch the specific link to be disabled.

3. If the number of EMLSR links other than a link that is switched to be disabled is 1 or 0, the non-AP MLD needs to transmit, to the AP MLD, an EML control field in which an EMLSR mode subfield is configured to be 0. In this case, the non-AP MLD may need to transmit the frame (e.g., a frame including the EML operating mode notification frame, the EML control field, etc.), in which the EMLSR mode subfield is configured to be 0, and a TID-to-link mapping request/response frame transmitted to switch the specific link to be disabled.

According to another embodiment of the disclosure, if TID-to-link mapping negotiation, in which at least one link among EMLSR links is switched to be disabled, is performed (requested/accepted), an EMLSR link set of the non-AP MLD may be changed even if a separate EML operating mode notification frame is not exchanged between the MLDs.

This is because it may be understood that, during a procedure in which the two MLDs (the AP MLD and the non-AP MLD) perform TID-to-link mapping negotiation, the indication/acceptance (response) to terminate the EMLSR mode of the specific EMLSR link and switch the link to be disabled is exchanged between the two MLDs. That is, when the TID-to-link mapping negotiation for switching the specific EMLSR link to be disabled is completed (requested/accepted) between the two MLDs, it may be understood that the two MLDs have implicitly indicated/responded to terminate (end or disable) the EMLSR mode of the specific EMLSR link. In this case, the non-AP MLD may (re) transmit, to the AP MLD, the EML operating mode notification frame indicating, as EMLSR links, only the links other than the link switched to be disabled. This may be a non-AP MLD operation in consideration that transmission or indication of the previously transmitted EML operating mode notification frame has failed. When the AP MLD further receives, before responding to the EML operating mode notification frame received from the non-AP MLD, another EML operating mode notification frame from the non-AP MLD, the AP MLD may need to consider that only the last received EML operating mode notification frame is valid. That is, the previously received EML operating mode notification frame other than the last received EML operating mode notification frame may be ignored.

In addition, if newly performed TID-to-link mapping negotiation between the two MLDs is to keep only 1 or 0 EMLSR link enabled, the EMLSR mode of the non-AP MLD is changed even if no separate EML operating mode notification frame is exchanged between the MLDs. In this case, as a result of the change of the EMLSR mode, the non-AP MLD operates in an operation mode (a mode having no EMLSR link) other than the EMLSR mode. In this case, even if the non-AP MLD has not performed any separate indication, the AP MLD should determine that the non-AP MLD has changed to an operation mode other than the EMLSR mode, and operate accordingly. That is, when the AP MLD is to initiate a frame exchange with the non-AP MLD, there is no need to transmit an initial control frame regardless of a link on which the exchange frame is attempted.

Figure 56:
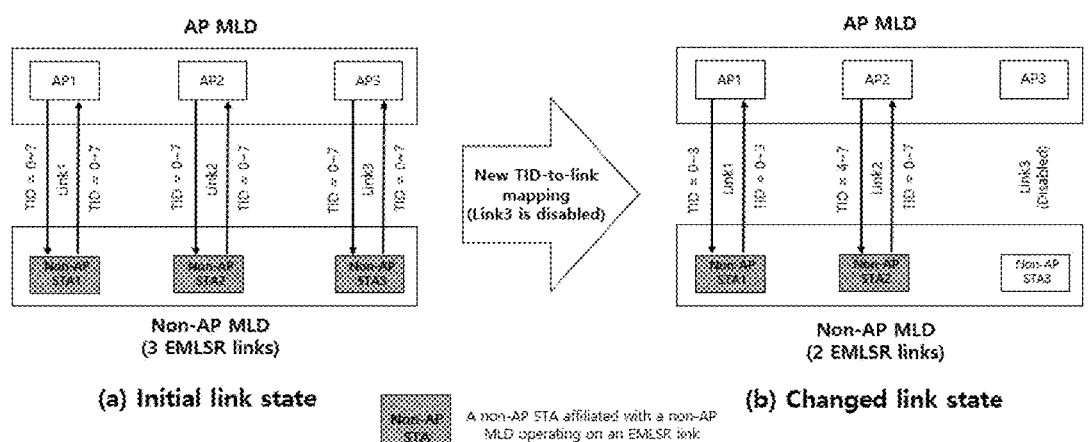
FIG. 56 illustrates a method in which an EMLSR link is removed after performing TID-to-link mapping according to an embodiment of the disclosure.

FIG. 56 illustrates a method in which an EMLSR link is removed after performing TID-to-link mapping according to an embodiment of the disclosure.

Referring to (a) of FIG. 56, a situation where a non-AP MLD is connected to an AP MLD via link 1, link 2, and link 3 is provided. That is, the non-AP MLD has completed setup (association, etc.) with the AP MLD via multi-link (re) setup on the three links. In addition, the non-AP MLD is operating, as EMLSR links, all the three links connected to the AP MLD. The AP MLD and the non-AP MLD perform a new TID-to-link mapping negotiation procedure, and link 3 is switched to be disabled when negotiated new TID-to-link mapping is applied.

Referring to (b) of FIG. 56, the non-AP MLD switches link 3 to be no longer an EMLSR link when link 3 is disabled. That is, non-AP STA3 operating on link 3 is no longer operated in the EMLSR mode. In this case, the non-AP MLD may transmit, to the AP MLD, an EML operating mode notification frame in which a bit corresponding to link 3 among bits of an EMLSR link bitmap subfield is configured to be 0 (bits corresponding to link 1 and link 2 are controlled to be 1).

However, since the AP MLD recognizes that link 3 of the non-AP MLD is disabled, even if an EML operating mode notification frame exchange between the AP MLD and the non-AP MLD is not performed, the non-AP MLD is able to release the EMLSR mode of link 3, and the AP MLD is able to perform operation in consideration that link 3 of the non-AP MLD is no longer in the EMLSR mode.

Figure 57:
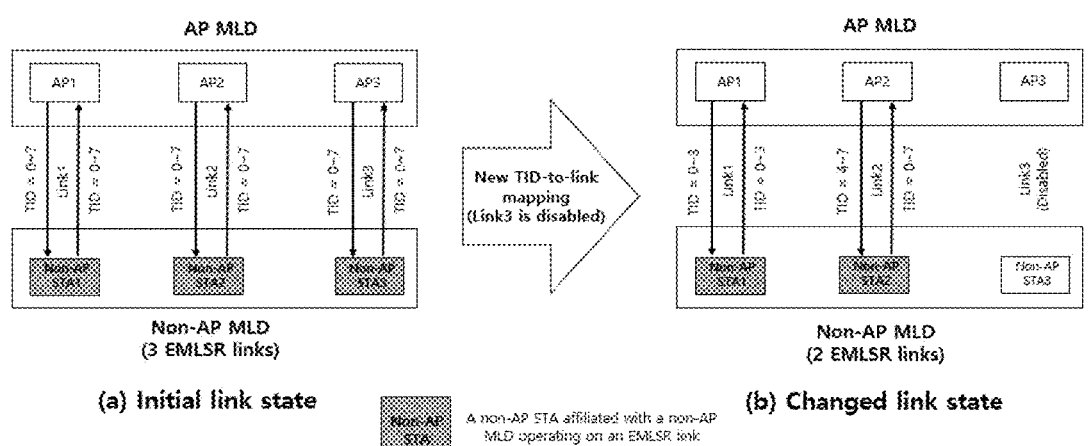
FIG. 57 illustrates a method in which an EMLSR mode of a non-AP MLD is released after performing TID-to-link mapping according to an embodiment of the disclosure.

FIG. 57 illustrates a method in which an EMLSR mode of a non-AP MLD is released after performing TID-to-link mapping according to an embodiment of the disclosure.

Referring to (a) of FIG. 57, a situation where a non-AP MLD is connected to an AP MLD via link 1, link 2, and link 3 is provided. That is, the non-AP MLD has completed setup (association, etc.) with the AP MLD via multi-link (re) setup on the three links. In addition, the non-AP MLD is operating, as EMLSR links, link 1 and link 3 among the three links connected to the AP MLD. The AP MLD and the non-AP MLD perform a new TID-to-link mapping negotiation procedure, and link 3 is switched to be disabled when negotiated new TID-to-link mapping is applied.

Referring to (b) of FIG. 57, the non-AP MLD switches link 3 to be no longer an EMLSR link when link 3 is disabled. That is, non-AP STA3 operating on link 3 is no longer operated in the EMLSR mode. In addition, by considering that there is only one EMLSR link (link 1) remaining after excluding link 3 where the EMLSR mode is released, the non-AP MLD also releases the EMLSR mode of link 1. In other words, since the non-AP MLD no longer has an EMLSR link, the EMLSR mode of the non-AP MLD is released. In this case, in order to release the EMLSR mode, the non-AP MLD may transmit, to the AP MLD, an EML operating mode notification frame in which an EMLSR mode subfield is configured to be 0.

However, since the AP MLD recognizes that link 3 of the non-AP MLD will be switched to be disabled, and that there is only one remaining EMLSR link of the non-AP MLD, even if an EML operating mode notification frame exchange between the AP MLD and the non-AP MLD is not performed, it is possible for the AP MLD to determine that the EMLSR mode of the non-AP MLD will be released. Therefore, the non-AP MLD may release the EMLSR mode on its own without transmitting the EML operating mode notification frame for releasing the EMLSR mode, and the AP MLD may perform operation in consideration that the EMLSR mode of the non-AP MLD has been released, without receiving the EML operating mode notification frame indicating the release of the EMLSR mode from the non-AP MLD.

<Method of Concurrently Performed EMLSR Link Configuration and TID-to-Link Mapping Negotiation Management>

An AP MLD and a non-AP MLD are connected via multiple links, and it is possible that a TID-to-link mapping status between the AP MLD and the non-AP MLD is changed during a time when the non-AP MLD generates and transmits an EMLSR link bitmap subfield. For example, before the non-AP MLD transmits the EMLSR link bitmap subfield via a first link, the TID-to-link mapping status between the AP MLD and the non-AP MLD may be changed due to a new TID-to-link mapping negotiation performed on another link. If the changed TID-to-link mapping status is resulted by switching, to be disabled, a link of a bit configured to be 1 in the EMLSR link bitmap subfield, the AP MLD identifies, when receiving the EMLSR link bitmap subfield, that the bit corresponding to the disabled link of the non-AP MLD is indicated as 1. This may be a phenomenon occurring because a TID-to-link mapping status before the non-AP MLD configures the EMLSR link bitmap subfield and a TID-to-link mapping status at a point in time when the AP MLD receives the EMLSR link bitmap subfield may be different.

Therefore, the AP MLD may need to interpret the received EMLSR link bitmap subfield by considering the current TID-to-link mapping status of the non-AP MLD which has transmitted the EMLSR link bitmap subfield. In this case, the current TID-to-link mapping status may refer to the TID-to-link mapping status at the point in time when the EMLSR link bitmap subfield is received.

In the simplest way, if the EMLSR link bitmap subfield received from the non-AP MLD indicate the disabled link of the non-AP MLD as an EMLSR link (if a bit of the EMLSR link bitmap subfield, which corresponds to the disabled link, is configured to be 1), the AP MLD may ignore the received EMLSR link bitmap subfield (or the EML operating mode notification frame including the EMLSR link bitmap subfield). That is, in this case, the AP MLD does not respond to the EML operating mode notification frame including the received EMLSR link bitmap subfield.

Alternatively, it is possible for the AP MLD to consider that the bit corresponding to the disabled link of the non-AP MLD among bits of the EMLSR link bitmap subfield transmitted by the non-AP MLD is reserved (ignoring the bit corresponding to the disabled link). That is, even if the EMLSR link bitmap subfield received from the non-AP MLD indicates the disabled link of the non-AP MLD as an EMLSR link, it is possible for the AP MLD to perform interpretation as if the disabled link is not indicated as an EMLSR link. In this case, the non-AP MLD may consider that, among bits that the non-AP MLD itself has indicated as 1 in the EMLSR link bitmap subfield, only links, which are enabled at the point in time when the EML operating mode notification frame is received from the AP MLD, are indicated as EMLSR links. For example, although the non-AP MLD has transmitted the EMLSR link bitmap subfield in which three bits corresponding to three links are configured to be 1, if only two of the three links are enabled at a point in time when the EML operating mode notification frame is received as a response from the AP MLD, the non-AP MLD may operate as if only the two links are indicated as EMLSR links. In this case, the AP MLD may need to operate as if only the links of the non-AP MLD, which are enabled at the point in time when the AP MLD itself has transmitted the EML operating mode notification frame to the non-AP MLD, have been indicated as EMLSR links. In other words, in the same situation as in the example above, the AP MLD may need to operate as if, among the three links indicated as EMLSR links by the non-AP MLD, only the two links remaining enabled at the point in time when the AP MLD itself has transmitted the EML operating mode notification frame are indicated as EMLSR links by the non-AP MLD. That is, the AP MLD should determine that the non-AP MLD operates only the two remaining links as EMLSR links, and operate accordingly. In this case, in the EMLSR link bitmap subfield of the EML operating mode notification frame that the AP MLD responds to the non-AP MLD, only the two bits corresponding to the two remaining links may be configured to be 1, respectively.

That is, the AP MLD may respond to the non-AP MLD with the EML operating mode notification frame in which a value different from that of the EML operating mode notification frame received from the non-AP MLD is configured. More specifically, the AP MLD may respond to the non-AP MLD with the EML operating mode notification frame indicating that only some links among the EMLSR links, which are indicated by the EMLSR operating mode notification frame received from the non-AP MLD, are indicated as EMLSR links.

Therefore, the non-AP MLD needs to operate, in the EMLSR mode, only STAs of the links indicated as EMLSR links in the EML operating mode notification frame responded by the AP MLD, instead of the EMLSR links indicated in the EML operating mode notification frame that the non-AP MLD itself has transmitted to the AP MLD.

However, if the number of EMLSR links remaining after excluding the disabled link from among the links indicated as EMLSR links by the EMLSR link bitmap subfield is less than 2 (i.e., 0 or 1), the EML operating mode notification frame including the EMLSR link bitmap subfield may be considered invalid. That is, the non-AP MLD operates as if the non-AP MLD itself has not transmitted the EML operating mode notification frame, and the AP MLD operates as if no EML operating mode notification frame has been received from the non-AP MLD. That is, in this case, an EMLSR link set (pair) of the non-AP MLD is not changed.

Figure 58:
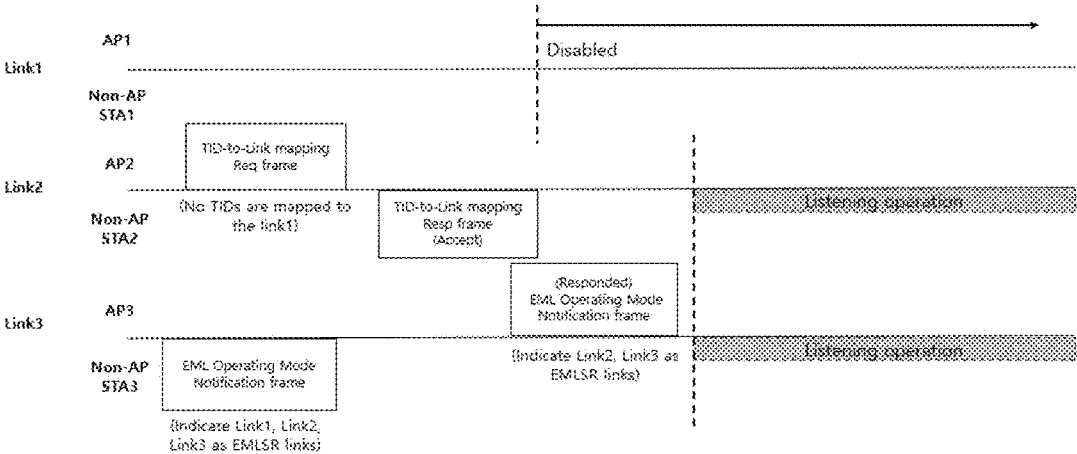
FIG. 58 illustrates operations of a non-AP MLD and an AP MLD, in which EMLSR links are established by considering changed TID-to-link mapping according to an embodiment of the disclosure.

FIG. 58 illustrates operations of a non-AP MLD and an AP MLD, in which EMLSR links are established by considering changed TID-to-link mapping according to an embodiment of the disclosure.

Referring to FIG. 58, a situation where an AP MLD and a non-AP MLD are multi-link connected via three links (link 1, link 2, and link 3) is provided. Non-AP STA3, which is an STA of the non-AP MLD operating on link 3, transmits, to the AP MLD (AP3), an EML operating mode notification frame indicating link 1, link 2, and link 3 as EMLSR links. At the same time, the AP MLD transmits, to the non-AP MLD via AP2, a TID-to-link mapping request frame for switching link 1 of the non-AP MLD to be disabled (mapping no TID to link 1). The non-AP MLD responds with a TID-to-link mapping response frame for accepting TID-to-link mapping requested by the AP MLD, and accordingly, link 1 is switched to a disabled link for the non-AP MLD.

In this case, the non-AP MLD may retransmit an EML operating mode notification frame indicating only link 2 and link 3 as EMLSR links to the AP MLD, by considering that a previous EML operating mode notification frame indicating link 1 as an EMLSR link has failed in indication. (Not shown in FIG. 58)

The AP MLD may indicate only link 2 and link 3 as EMLSR links in an EML operating mode notification frame that is transmitted as a response to the non-AP MLD, by considering that link 1, among the links indicated as EMLSR links in the EML operating mode notification frame received from the non-AP MLD, cannot be used as an EMLSR link.
<Method of EMLSR Link Management when AP MLD Link Configuration is Changed>

When the non-AP MLD performs switching to the EMLSR mode, the non-AP MLD transmits an EML operating mode notification frame to the AP MLD, and the AP MLD transmits an EML operating mode notification frame to the non-AP MLD in response to the received EML operating mode notification frame. In this case, the EML operating mode notification frame transmitted as a response by the AP MLD should be responded within a time interval indicated by the AP MLD. The time interval indicated by the AP MLD refers to a time interval indicated in a transition timeout subfield of an EML capabilities subfield transmitted by the AP MLD. For reference, the EML capabilities subfield is included in a basic multi-link element. For example, the AP MLD having indicated 1 TU via the transition timeout subfield needs to transmit the EML operating mode notification frame to the non-AP MLD within 1 TU in response to the EML operating mode notification frame received from the non-AP MLD. The transition timeout time that the AP MLD may indicate may range from 0 TU to a maximum of 128 TUs. (FIG. 59 illustrates a table of transition timeout indication values and interpretations of indicated times. See FIG. 59)

In this way, a point in time when the AP MLD transmits the EML operating mode notification frame may differ by up to 100 TUs from a point in time when the non-AP MLD transmits the EML operating mode notification frame, and therefore, a link configuration of the AP MLD may be changed before the AP MLD responds with the EML operating mode notification frame. For example, there is a situation where a link, on which an AP of the AP MLD has been operating at the point in time when the AP MLD receives the EML operating mode notification frame from the non-AP MLD, is no longer operating at the point in time when the AP MLD responds with the EML operating mode notification frame. In other words, it is possible to change/plan the link configuration, such as changing the number of links of the AP MLD before the response with the EML operating mode notification frame. In this case, a link that the non-AP MLD has attempted to switch to an EMLSR link via the EML operating mode notification frame may become a link (or a link from which an AP is planned to be removed via a reconfiguration procedure) on which the AP MLD operates no AP at the point in time when the AP MLD responds with the EML operating mode notification frame.

In the following description, when the AP MLD plans to remove a specific AP via a reconfiguration procedure, this is described by considering that the AP MLD does not have a link of the specific AP.

The AP MLD may need to perform operation by considering a link configuration difference between the point in time when the AP MLD receives the EML operating mode notification frame from the non-AP MLD and the point in time when the AP MLD responds with the EML operating mode notification frame to the non-AP MLD.

In the simplest way, if there is a link (link on which no AP is operating or from which an AP is planned to be removed), which no longer exists at the point in time when the AP MLD responds to the EML operating mode notification frame, among links (links on which APs are operating) which existed at the point in time when the EML operating mode notification frame was received from the non-AP MLD, the AP MLD may not be allowed to respond to the received EML operating mode notification frame.

Alternatively, if a link (on which an AP is operating), which existed at the point time when the EML operating mode notification frame was received from the non-AP MLD, no longer exists at the point in time when the AP MLD responds to the EML operating mode notification frame, and the link is a link that has been set up with the non-AP MLD that has transmitted the EML operating mode notification frame, the AP MLD may not be allowed to respond to the received EML operating mode notification frame.

Alternatively, if a link (on which an AP is operating), which existed at the point time when the EML operating mode notification frame was received from the non-AP MLD, no longer exists at the point in time when the AP MLD responds to the EML operating mode notification frame, and the link is a link indicated as an EMLSR link by the non-AP MLD that has transmitted the EML operating mode notification frame, the AP MLD may not be allowed to respond to the received EML operating mode notification frame.

Additionally, if two or more of the links indicated as EMLSR links by the non-AP MLD are still existing links (links on which APs are operating), the AP MLD may interpret that only the still existing links are indicated as EMLSR links, and respond with the EML operating mode notification frame to the non-AP MLD.

That is, the AP MLD may need to respond with the EML operating mode notification frame indicating, as EMLSR links, only the links still existing at the point in time when the AP MLD responds with the EML operating mode notification frame, among the links indicated as EMLSR links in the EML operating mode notification frame transmitted by the non-AP MLD.

In this case, the non-AP MLD needs to switch, to EMLSR links, only the links indicated as EMLSR links in the EML operating mode notification frame responded by the AP MLD, instead of the links that the non-AP MLD itself has indicated as EMLSR links when transmitting the EML operating mode notification frame. In this case, the method of indicating an EMLSR link in an EML operating mode notification frame may include indicating, as an EMLSR link, a link corresponding to a bit indicated as 1 among bits of a EMLSR link bitmap subfield included in the EML operating mode notification frame.

Alternatively, the non-AP MLD, which has received information related to a multi-link reconfiguration indicated by the AP MLD and recognized that a specific link will be removed, may need to (re) transmit, to the AP MLD, an EML operating mode notification frame indicating, as EMLSR links, only links other than the specific link. This may be a non-AP MLD operation in consideration that transmission or indication of the previously transmitted EML operating mode notification frame has failed. When the AP MLD further receives, before responding to the EML operating mode notification frame received from the non-AP MLD, another EML operating mode notification frame from the non-AP MLD, the AP MLD may need to consider that only the last received EML operating mode notification frame is valid. That is, the previously received EML operating mode notification frame other than the last received EML operating mode notification frame may be ignored.

In addition, the EMLSR mode operated by the non-AP MLD may be changed/terminated by the multi-link reconfiguration performed by the AP MLD. More specifically, one or more of the EMLSR links operated by the non-AP MLD may be removed by the multi-link reconfiguration performed by the AP MLD.

In this case, the non-AP MLD needs to perform operation by considering the removed link. That is, the non-AP MLD needs to transmit, to the AP MLD, an EML operating mode notification frame indicating that the removed link (removed AP link) is not an EMLSR link, or needs to consider that the removed link has been excluded from an EMLSR link set even without separate signaling.

The operation method considering the link removed by the multi-link reconfiguration is the same as the operation method considering a link that has been/is being switched to be disabled by TID-to-link mapping, so that a detailed description is omitted. The aforementioned operation in consideration of a disabled link can be equally used when the disabled link is changed to a link removed by multi-link reconfiguration. For example, the non-AP MLD operating two EMLSR links (link 1 and link 2) also needs to terminate the EMLSR mode of one remaining EMLSR link (link 2) (i.e., the non-AP MLD terminates the EMLSR mode) when one (link 1) of the two EMLSR links is removed as a result of multi-link reconfiguration performed by the AP MLD.

Figure 60:
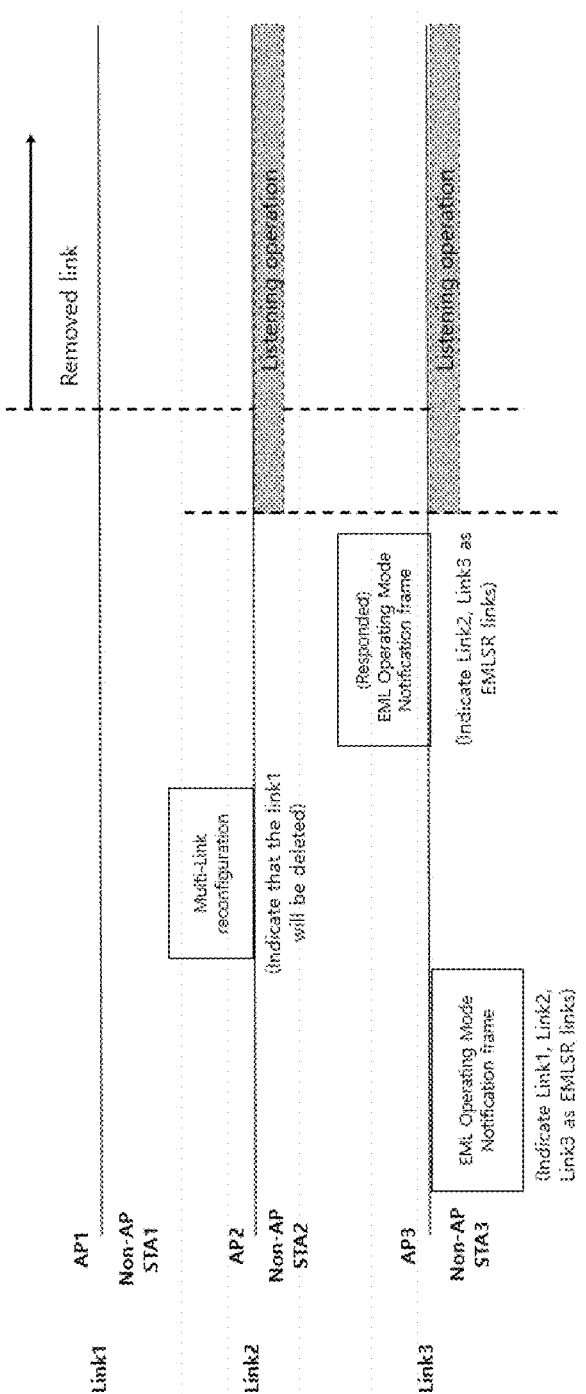
FIG. 60 illustrates operations of a non-AP MLD and an AP MLD, in which EMLSR links are established by considering a changed AP MLD link configuration according to an embodiment of the disclosure.

FIG. 60 illustrates operations of a non-AP MLD and an AP MLD, in which EMLSR links are established by considering a changed AP MLD link configuration according to an embodiment of the disclosure.

Referring to FIG. 60, a situation where an AP MLD and a non-AP MLD are multi-link connected via three links (link 1, link 2, and link 3) is provided. Non-AP STA3, which is an STA of the non-AP MLD operating on link 3, transmits, to the AP MLD (AP3), an EML operating mode notification frame indicating link 1, link 2, and link 3 as EMLSR links. The AP MLD transmits, via link 2, reconfiguration multi-link element information indicating that AP1 operating on link 1 will be removed.

In this case, the non-AP MLD may recognize that link I will be removed soon, based on the reconfiguration multi-link element information received on link 2. Therefore, the non-AP MLD may retransmit, to the AP MLD, the EML operating mode notification frame indicating only link 2 and link 3 as EMLSR links. (Not shown in FIG. 58)

The AP MLD may indicate only link 2 and link 3 as EMLSR links in an EML operating mode notification frame that is transmitted as a response to the non-AP MLD, by considering that link 1, among the links indicated as EMLSR links in the EML operating mode notification frame received from the non-AP MLD, cannot be used as an EMLSR link.
<EMLSR Mode Operation of Disabled Link>

Methods of preventing an EMLSR link from being disabled (or preventing a disabled link from being an EMLSR link) have been described via the aforementioned embodiments of the disclosure.

When a specific link of the non-AP MLD is disabled, frame exchange via the specific link is restricted, so that there is no benefit to be gained by operating the link as an EMLSR link. However, it is possible for the non-AP MLD to maintain a disabled link as an EMLSR link even when an EMLSR link is disabled. This may be an operation for operating a corresponding link as an EMLSR link again without performing separate signaling when a disabled state of the link is released.

In this case, the non-AP MLD may operate EMLSR links (links in the EMLSR mode), which the non-AP MLD itself has, in different methods by considering whether the links are enabled or disabled. First, the non-AP MLD may support reception of an initial control frame on an enabled EMLSR link and perform CCA. This is a general EMLSR mode operation. On the other hand, the non-AP MLD may not support CCA and reception of an initial control frame on a disabled EMLSR link. That is, among non-AP STAs operating in the EMLSR mode, a non-AP STA operating on a disabled link may not perform a listening operation for EMLSR mode operation.

Among the EMLSR/EMLMR links in the EMLSR/EMLMR mode, transmission and reception of an initial control frame and a CCA operation may be possible in an enabled link, but transmission and reception of an initial control frame and a CCA operation may not be possible in a disabled link. In other words, a listening operation may be performed in an enabled link, but may not be performed in a disabled link. That is, STAs constituting an MLD may suspend all wireless functions in a disabled link until the link is enabled.

In another embodiment of the disclosure, the non-AP MLD operating in EMLSR for the AP MLD supporting the EMLSR mode may perform a listening operation via a corresponding link in an awake state. In this case, the listening operation may include CCA operation and exchanging of an initial control frame with the AP MLD.

When the non-AP MLD has only one enabled EMLSR link (there may be other EMLSR links that are disabled), the AP MLD may not transmit an initial control frame when a frame exchange sequence is started on an EMSR link of the non-AP MLD. This may be an acceptable operation of the non-AP MLD because, since the non-AP MLD does not perform a listening operation on other EMLSR links (disabled links), frame exchange may be initiated directly on the enabled EMLSR link without separate RF switching (transitioning).
<Quality-of-Service Management Frame (QMF) Policy>

As mentioned above, by using TID-to-link mapping for the purpose of enhancing QoS, an MLD may perform service link differentiation in consideration of a characteristic of traffic that MAC needs to service. This may be understood as that, similar to conventional Wi-Fi differentiating ACs according to a characteristic of traffic by using the EDCA mechanism, an MLD uses each link as an access link (AL) and differentiates ALs according to a characteristic of traffic.

However, traffic that Wi-Fi MAC needs to process includes not only an MSDU requested to be processed by a higher layer, but also management frames including information for operating a BSS. In these management frames, unlike each MSDU having a TID, the management frames do not have individual TIDs.

Therefore, a QOS STA needs to determine ACs to be used when transmitting the QoS management frames, and the conventional 802.11 standard provides a default QMF policy for the QoS management frames, so as to enable the QoS STA to determine the ACs to be used when transmitting the QoS management frames (hereinafter, referred to as management frames). In this case, the QMF policy may be changed by a QoS AP operating a QoS BSS. According to an embodiment, an AC corresponding to a management frame may exist.

In addition, the AC corresponding to the management frame may be determined by the QMF policy. In this case, the AC corresponding to the management frame can be referred to as QMF access category. In addition, the type of the management frame or the QMF AC can be determined based on a type, subtype, category value, or the like corresponding to the management frame. In addition, a service in which the AC corresponding to the management frame exists or a service for channel accessing based on the AC, which is based on the QMF policy, when transmitting the management frame may be referred to as a QMF service. In addition, frame transmission based on the QMF policy can be limited to a case where both an STA transmitting a frame and an STA receiving the frame support QMF.

Table 1 below shows some examples of default QMF policies.

TABLE 1

| Description | Management Frame Subtype value | Category value | Action field | QMF access category |
|---|---|---|---|---|
| (Re)Association Request/Response | 0000-0011 | N/A | N/A | AC_VO |
| Probe Request (individually addressed) | 0100 | N/A | N/A | AC_VO |
| Probe Request (group addressed) | 0100 | N/A | N/A | AC_BE |
| Probe Response | 0101 | N/A | N/A | AC_BE |
| Timing Advertisement | 0110 | N/A | N/A | AC_BE |
| Beacon, ATIM, Disassociation, Authentication, Deauthentication | 1000-1100 | N/A | N/A | AC_VO |
| Spectrum management | 1101 | 0 | 0-3 | AC_BE |

Referring to Table 1, AC_VO is configured as a default AC for (re) association request/response, and therefore, when transmitting an association request or responding with an association response, QoS STAs may need to perform transmission using CW and AIFSN parameters of AC_VO. On the other hand, for timing advertisement, if the default AC is configured as AC_BE, and therefore, the QOS AP has not separately changed the QMF policy of the QoS BSS, when transmitting the timing advertisement, the QoS STA needs to perform transmission using CW and AIFSN parameters of AC_BE.

A reason that different QMF access categories are assigned according to types of management frames in the default QMF policy is to prevent delays, wherein, even for management frames, there are types of management frames that do not have a high processing urgency degree, and the delays occurs in other traffic and management frame services during a procedure of processing of the management frames that do not have a high urgency degree.

As described above, it is required also for management frames to differentiate ACs according to information and roles included in the management frames, and therefore, similar to differentiating ALs according to TIDs via TID-to-link mapping, the MLD may map the management frames to different links according to the types thereof.

However, the default QMF policy of the MLD may be configured to enable all QMFs to use all ACs. In other words, the default QMF policy of the MLD may configure the QMF access category to AC_Any for management frames of all subtypes.

According to an embodiment of the disclosure, when a QMF service is enabled, a management frame may be transmitted based on an access category corresponding to the management frame. However, being based on the access category may be limited to channel access. According to an embodiment of the disclosure, when transmitting a management frame when the QMF service is enabled, transmission is performed based on an access category corresponding to the management frame, but it is possible to transmit the management frame on any link regardless of TID-to-link mapping. For example, even when the AC corresponding to the management frame is not mapped to a link based on the TID-to-link mapping, it may be possible to transmit the management frame on the link.

That is, for a general frame, transmission is performed on a link mapped to an assigned TID. However, for a management frame, since a TID may not be assigned, a link for transmission may not be specified. In this case, since the management frame does not have an assigned TID, a configuration of a mapping relationship between a TID and a link may not be required. Therefore, the management frame may be transmitted regardless of mapping between a TID and a link.

<Quality-of-Service Management Frame (QMF)-to-Link Mapping>

The easiest way to perform QMF-to-link mapping may include mapping each management frame to a link to which traffic corresponding to the AC is mapped, according to the QMF access category (see Table 1) assigned to each management frame. That is, it is possible to transmit a management frame based on TID-to-link mapping.

For example, when a certain AC (or TID) is mapped to a link and an AC (or TID) corresponding to a management frame is the AC (or TID), it is possible to transmit the management frame on the link. Also, when a certain AC (or TID) is not mapped to a link and an AC (or TID) corresponding to the management frame is the AC (or TID), it is possible that the management frame cannot be transmitted on the link.

In more detail, if a specific MLD has mapped a TID indicating traffic corresponding to AC_VO to a specific link, an association req/resp management frame with a QMF access category assigned as AC_VO may be mapped to the specific link. A QOS STA may change an AC to be used when processing each management frame without following the default QMF policy, and thus may freely change a link to which each management frame is to be mapped, by changing the AC assigned to each management frame.

In this way, even for a QMF that does not have a TID, the MLD may perform QMF-to-link mapping for each QMF in a similar way to TID-to-link mapping.

However, a specific QMF may include information that needs to be exchanged between respective STAs of the MLD, instead of information that is exchanged at an MLD level like a general MSDU. In this case, if the MLD has mapped the specific QMF only to a specific link, there is a problem that an STA operating on a link other than the specific link cannot transmit the specific QMF.

That is, for a QMF, regardless of a type of an AC assigned to the QMF, there may be a QMF having a characteristic that the QMF should be able to be transmitted on all links, and therefore, the MLD may indicate a QMF that may be mapped to all links regardless of the assigned AC.

In other words, for a management frame, a specific TID is not assigned, and due to the absence of TID assignment, mapping between a TID and a link may not be applied. Therefore, a management frame may be transmitted on all links regardless of mapping between a TID and a link, wherein a link on which the management frame is transmitted may be an enabled link on which mapping between a TID and a link is configured. Here, the enabled link refers to a link on which a mapping relationship with at least one TID is configured.

In this case, if a management frame is transmitted only via an enabled link, there may be a case where a management frame cannot be transmitted when there is no enabled link, except for a broadcast management frame that is transmitted regardless of a link. Therefore, a specific management frame may be transmitted even when there is no enabled link.

Figure 61:
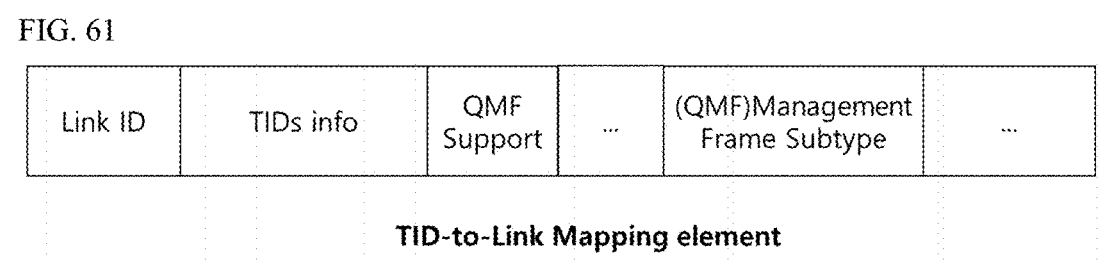

FIG. 61 illustrates an embodiment of a TID-to-link mapping element indicating a QMF which may be transmitted regardless of a link.

Referring to FIG. 61, when performing TID-to-link mapping, an MLD may indicate a QMF that may be mapped to all links regardless of an AC assigned in the QMF policy.

Specifically, information related to a management frame subtype may be indicated in a TID-to-link mapping element, and a management frame of the indicated subtype may be mapped to all links regardless of an AC (or TID) assigned to the management frame.

As illustrated in FIG. 61, the TID-to-link mapping element may have a QMF support field corresponding to each link ID. The QMF support field indicates whether all types of QMF may be mapped to a link indicated by a corresponding link ID field. In more detail, when a QMF support field corresponding to a specific link shows 1 (true), all types of QMF may be mapped to the specific link regardless of the QMF policy of each QMF.

In addition, a (QMF) management frame subtype may appear in the TID-to-link mapping element. In this case, a QMF of the subtype corresponding to a value indicated by a management frame subtype field may be mapped to all links regardless of an assigned AC. For example, if the management frame subtype field shows 0101 (probe response), a probe response frame may be mapped to all links regardless of an AC assigned (allocated/indicated) by the QMF policy.

That is, the TID-to-link mapping element may include the QMF support field to indicate whether all QMFs may be mapped to each link. In addition, the TID-to-link mapping element may include the (QMF) management frame subtype to indicate whether a management frame of a specific subtype may be mapped to all links. Alternatively, there may be signaling indicating whether to transmit a QMF based on TID-to-link mapping. That is, when transmitting a QMF on a specific link, there may be signaling that indicates determination on whether transmission is possible based on TID-to-link mapping.

That is, according to an embodiment, when the signaling indicates a preconfigured value, it is possible to transmit the QMF regardless of TID-to-link mapping. That is, even if an AC corresponding to the QMF is not mapped to a link based on TID-to-link mapping, it may be possible to transmit the QMF on the link. In another embodiment, when the signaling indicates the preconfigured value, it is possible to transmit the QMF based on TID-to-link mapping. That is, when the AC corresponding to the QMF is mapped to a link based on TID-to-link mapping, it may be possible to transmit the QMF on the link. In addition, when the AC corresponding to the QMF is not mapped to a link based on TID-to-link mapping, it may not be possible to transmit the QMF on the link.

However, when the MLD receives a QMF for requesting (soliciting) a response, such as a probe request/response, via a specific link, the MLD may respond (perform transmission) with a response QMF frame via the specific link regardless of a QMF-to-link mapping policy of the MLD. That is, when a QMF frame with a request characteristic is received on a specific link, a QMF frame with a response characteristic in response thereto may be transmitted on the specific link regardless of an AC. In addition, when a QMF frame with a request characteristic is received on a specific link, a QMF frame with a response characteristic in response thereto may be transmitted on the specific link regardless of TID-to-link mapping.

Figure 62:
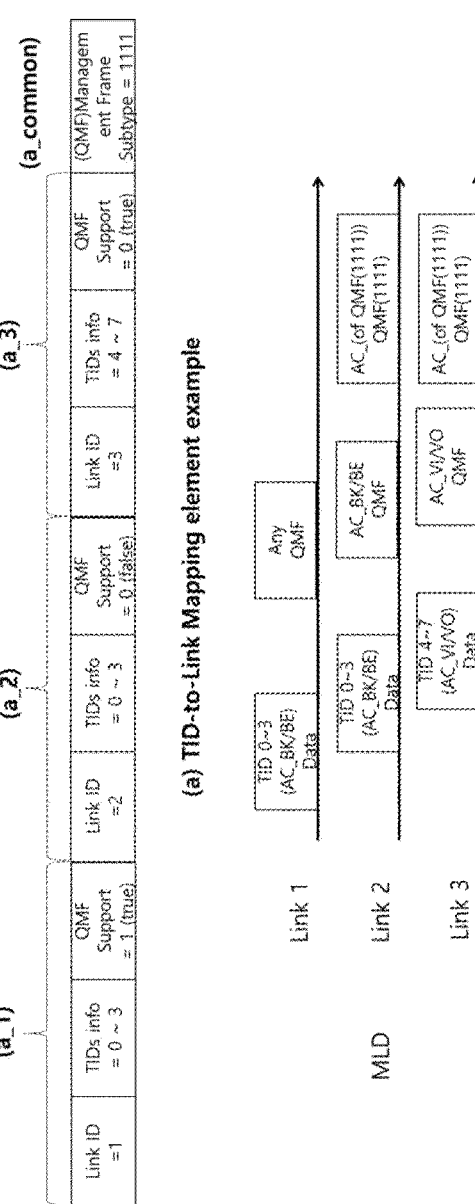
FIG. 62 illustrates an embodiment of an MLD operation in which a QMF policy is established via TID-to-link mapping.

FIG. 62 illustrates an embodiment of an MLD operation in which a QMF policy is established via TID-to-link mapping.

(a) of FIG. 62 is an example of a TID-to-link Mapping element which may be generated to perform TID-to-link mapping for three links. In this case, if an MLD having generated the element is associating with another MLD by using more than four links, a link not explicitly indicated by a link ID field of the element may be interpreted, by a reception MLD, as implicitly indicating use of default TID-to-link mapping.

In this case, if a specific MLD has generated the TID-to-link mapping element illustrated in (a) of FIG. 62, and a counterpart MLD has accepted the same, the specific MLD may transmit traffic and QMF frames in the same manner as illustrated in (b) of FIG. 14. For reference, (a_1), (a_2), and (a_3) in (a) of FIG. 14 represent subfields for link 1, link 2, and link 3, respectively, and (a_common) is inserted to represent a subfield that is commonly applied to all Links.

Referring to (b) of FIG. 62, an MLD may map and transmit traffic having TIDs 0 to 3 by using link 1, in which case, TIDs 0 to 3 may be TIDs corresponding to AC_BK (UP 1, 2) and AC_BE (UP 0, 3) among ACs. In this case, referring to (a_1) of (a) of FIG. 62, QMF support of link 1 is indicated as 1 (true), and therefore, the MLD may transmit (map) all types (subtypes) of QMF regardless of an AC assigned to each QMF via link 1.

As illustrated in (b) of FIG. 62, the MLD may transmit (map) traffic having TIDs 0 to 3 via link 2 in the same manner as link 1, but since a QMF support field corresponding to link 2 (see (a_2) in (a) of FIG. 62) is indicated as 0, only a QMF assigned with the same AC as that for a TID mapped to link 2 may be mapped to and transmitted on link 2. However, since 1111 is indicated via a (QMF) management frame subtype field ((a_common) in (a) of FIG. 16), the MLD may transmit (map) a QMF (1111) having a management frame subtype of 1111 via link 2. In this case, in order for an STA of link 2 to transmit the QMF (1111), channel access may need to be attempted by applying an AC assigned (indicated by the QMF policy) to the QMF (1111).

Traffic having TIDs 4 to 7 may be transmitted (mapped) to link 3 of the MLD, in which case, TIDs 4 to 7 may be traffic mapped to AC_VI and AC_VO. In this case, since a QMF support field corresponding to link 3 ((a_3) in (a) of FIG. 16) is indicated as 0, the MLD may transmit or map only a QMF to which AC_VI/AC_VO has been assigned via link 3. However, since 1111 is indicated via the (QMF) management frame subtype field, the MLD may transmit (map) the QMF (1111) having the management frame subtype of 1111 via link 3. In this case, in order for an STA of link 3 to transmit the QMF (1111), channel access may need to be attempted by applying an AC assigned (indicated by the QMF policy) to the QMF (1111).

<Traffic Identifier (TID)-to-Link Mapping Negotiation>

According to the aforementioned embodiments of the disclosure, MLDs may enhance QoS by mapping respective TIDs to different links by performing TID-to-link mapping. The embodiments of the disclosure described below provide a specific signaling method and negotiation process method of TID-to-link mapping performed between MLDs.

For reference, the drawing of each embodiment provided below may be shown in a form in which some immediate Ack frames are omitted for concise expression. For example, a responding MLD that receives a TID-to-link mapping request frame may transmit an immediate Ack frame (re-sponded after SIFS) as a response, which may be omitted for conciseness.

An MLD (an AP MLD or a non-AP MLD) requesting TID-to-link mapping may indicate a specific TID and a specific link by using a TID-to-link mapping element, thereby requesting to map the indicated TID to the indicated link. In this case, the TID-to-link mapping element may be used to indicate multiple TID groups and multiple link groups together.

For example, a single TID-to-link mapping element may indicate TID sets #1, #2, and #3 to correspond to link sets #1, #2, and #3, respectively. In this case, if TID set #1 is indicated to correspond to link set #1, it may be understood that mapping of TIDs corresponding to TID set #1 to links corresponding to link set #1 is attempted. In this case, the TID-to-link mapping element including information on the TIDs and links for which the mapping is desired may be transmitted via a TID-to-link mapping request frame (by being included in the TID-to-link mapping request frame). In this case, the MLD having transmitted the TID-to-link mapping request frame may be referred to as an initiating MLD or a requesting MLD.

In this way, the MLD having received the TID-to-link mapping element (TID-to-link mapping request frame) including indication information for the TIDs and the links may identify mapping information between the TIDs and the links desired by the MLD which has transmitted the TID-to-link mapping request frame. After this, the MLD having received the TID-to-link mapping request frame may need to respond with a TID-to-link mapping response frame to accept (adopt) or reject (refuse/deny) the mapping between the TID and the links requested by the initiating MLD. In this case, the MLD having received the request frame needs to respond with the TID-to-link mapping response frame, and may be thus referred to as a responding MLD.

When attempting to accept the TID-link mapping requested by the initiating MLD, the responding MLD may respond with its own TID-to-link mapping response frame including no TID-to-link mapping element. That is, if the TID-to-link mapping response frame received in response to the TID-to-link mapping request frame transmitted by the initiating MLD does not include a TID-to-link mapping element, the initiating MLD may recognize that the TID-link mapping requested by the initiating MLD itself has been accepted by the responding MLD.

That is, when the transmission/reception of the response frame that does not include a TID-to-link mapping element is completed, it may be understood that a new TID-to-link mapping negotiation has been completed between the two MLDs which have transmitted/received the response frame. In this case, the two MLDs may be delayed from performing communication for a certain period of time due to the newly negotiated TID-to-link mapping.

In this case, the delay for the certain period of time may be for managing a transmission queue of STAs of each link included in (connected to) each MLD. In more detail, after the TID-to-link mapping negotiation is completed, each of the MLDs may have a delay time to manage a transmission queue of the STAs corresponding to each link according to a negotiated TID-to-link mapping status. That is, after the delay time corresponding to the certain period of time elapses, the two MLDs that have completed TID-to-link mapping need to perform communication according to the negotiated TID-to-link mapping status. In this case, the performing communication according to the TID-to-link mapping status indicates that only traffic (frame, etc.) of the TID mapped to the corresponding link may be transmitted/received on the specific link.

On the other hand, when attempting to reject the TID-to-link mapping requested by the initiating MLD, the responding MLD may respond with its own TID-to-link mapping response frame including a TID-to-link mapping element. In this case, the TID-to-link mapping element included in the response frame may indicate a different TID and link from those indicated by the TID-to-link mapping element included in the request frame. For example, in the TID-to-link mapping element included in the request frame, TID 0 may have been indicated to correspond to link 1. In this case, if the responding MLD indicates TID 0 to correspond to link 2 in the TID-to-link mapping element included in the response frame, the initiating MLD having transmitted the request frame may recognize that its proposal to map TID 0 to link 1 has been rejected. In addition, the initiating MLD may recognize that the responding MLD wants to map TID 0 to link 2, by identifying that TID 0 is indicated to correspond to link 2 in the response frame received as a response from the responding MLD.

That is, if the initiating MLD has received the response frame including the TID-to-link mapping element from the responding MLD, the initiating MLD may need to indicate the same TID-link mapping information indicated in the received response frame when configuring a request frame to be (re) transmitted to the responding MLD.

In addition, the responding MLD may attempt to accept only a part of the TID-to-link mapping indicated (requested) by the initiating MLD via the TID-to-link mapping element. For example, the initiating MLD may request mapping of TID 0 to link 1 by indicating TID 0 to correspond to link 1, and may concurrently request mapping of TID 1 to link 2 by indicating TID 1 to correspond to link 2. Here, the responding MLD may attempt to accept only one of the two mapping requests (TID 0 to link 1 and TID 1 to link 2) requested by the initiating MLD. In this case, the responding MLD may indicate only TIDs remaining after excluding a specific TID that is to be accepted in the TID-to-link mapping element included in the response frame, thereby accepting the TID-link mapping request which is requested in relation to the specific TID. In other words, if TID-link mapping to be accepted exists in a TID-link mapping list (may be field or subfield) (included in the TID-to-link mapping element of the request frame) indicated by the initiating MLD, the responding MLD may implicitly indicate its intention to accept by not indicating the corresponding TID (the TID to be accepted) in the response frame.

Therefore, when there is a TID, which is not indicated (not counter-proposed) in the response frame of the responding MLD, among the TIDs indicated by the initiating MLD itself via the request frame, the initiating MLD may recognize (interpret) that the TID-link mapping request for the TID is accepted.

The AP MLD may transmit the TID-to-link mapping element by including the same in the beacon frame, thereby assisting the non-AP STAs (MLD), which have received the beacon frame, to recognize a TID-link mapping status preferred by the AP MLD. In this case, when transmitting an association request frame to the AP MLD, the non-AP STA MLD may request TID-to-link mapping negotiation via a TID-to-link mapping element. In this case, the non-AP STA MLD may need to configure the TID-to-link mapping element that is to be included in the association request frame transmitted by the non-AP STA MLD itself, in consideration of the preferred TID-link mapping status of the AP, which is indicated via the beacon frame. In this case, the AP MLD which includes the TID-to-link mapping element in the beacon frame may be limited to an AP MLD that supports TID-to-link mapping negotiation.

The TID-to-link mapping element may be transmitted by being included in a (re) association request/response frame, or may be transmitted via TID-to-link mapping request/response frames. In this case, the TID-to-link mapping element included in the two types of response frames may be included to propose the preferred TID-link mapping to the MLD having transmitted the request frame. Alternatively, a response frame (unsolicited response frame) transmitted without receiving the request frame including the TID-to-link mapping element may be transmitted to suggest (indicate) the preferred TID-to-link mapping status to the MLD which is a single-purpose device of the frame.

FIG. 63 illustrates an embodiment of a format of a TID-to-link mapping element.

Since a TID-to-link mapping element needs to indicate a TID-link pair, the TID-to-link mapping element may have a configuration including a subfield indicating a TID and a subfield indicating a link. In this case, the subfields indicating a TID and a link may be used to indicate a single TID and link, or may be used to indicate a TID set and a link set. In this case, a method of indicating a TID and a link and indicating a TID set and a link set may be similar to the TID indication method using a TIDs info field of an 8-bit size, described in the embodiment of FIG. 11.

That is, the 8-bit links info field may be used to indicate a link set, and each bit of the links info field may be used to indicate whether respective indexes correspond to TIDs indicated to corresponding links. For example, in a pair of a TIDs Info field and a links Info field included in a TID-to-link mapping element, if the TIDs Info field is indicated as 1111 0000, and the links Info field is indicated as 1100 0000, it may be understood that TID 0 to TID 3 are proposed/counter-proposed to be mapped to link 1 (0) to link 2 (1).

Referring to (a) of FIG. 63, a TID-to-link mapping element may have a configuration including multiple TID-to-link mapping Info fields (see (c) of FIG. 63). This indicates that mapping of a multiple TID and link pair may be proposed/counter-proposed via a single TID-to-link mapping element. That is, a TID-to-link mapping element may include mapping information indicating each mapping relationship in order to indicate mapping between one or more TIDs and one or more links. In this case, multiple TIDs may be mapped to a single link.

That is, a TID-to-link mapping element may indicate, via multiple TID-to-link mapping Info fields, different TIDs and links in the respective TID-to-link mapping Info fields. However, in a single TID-to-link mapping element, a specific TID cannot be indicated in more than one TID-to-link mapping Info field.

In other words, there may be a restriction that each TID should be indicated only once (or less than once) in a TID-to-link mapping element. For example, if TID 0 is indicated in a TID Info subfield of a first TID-to-link mapping Info field of a TID-to-link mapping element, TID 0 may not be allowed to be indicated in remaining TID-to-link mapping Info fields included in the element. In this case, TID 0 being indicated may refer to indication of TID 0 alone, or indication of a TID set including TID 0 (e.g., TID 0 to TID 3).

As illustrated in FIG. 63, formats of TID-to-link mapping elements may differ depending on the number of included TID-to-link mapping Info fields. Accordingly, a TID-to-link mapping element may be configured to include a field for indicating information related to its length.

In (a) of FIG. 63, a TID-to-link mapping control field may be indicated before a TID-to-link mapping Info field, and may indicate information related to a length of the TID-to-link mapping Info fields. In this case, the length-related information may be information related to a length (size) of each TID-to-link mapping Info field and the number of TID-to-link mapping Info fields ((c) of FIG. 63) included in the TID-to-link mapping Info fields. That is, the information on the length may be information related to the number of one or more TIDs mapped to one or more links.

Referring to (b) of FIG. 63, a TID-to-link mapping control field may be configured to include a TID-to-link mapping Info size subfield and a link bitmap size subfield. A TID-to-link mapping Info size subfield may indicate information related to the length of TID-to-link mapping Info fields included in a TID-to-link mapping element. For example, the TID-to-link mapping Info size subfield may indicate the number of TID-to-link mapping Info fields included in the TID-to-link mapping element. Alternatively, the TID-to-link mapping Info size subfield may indicate the size (in octet units, etc.) of TID-to-link mapping Info fields included in the TID-to-link mapping element.

A link bitmap size subfield may be used to indicate the size of a link Info subfield included in each TID-to-link mapping Info field. A reason that the link bitmap size subfield is required is because, unlike the number of TIDs, which is fixed to 8 (TID 0 to TID 7), the number of links in an MLD may be variable. Therefore, the link bitmap size subfield may indicate a value related to the size of the link Info subfield included in the TID-to-link mapping Info field. For example, the link bitmap size subfield includes 4 bits and may thus indicate that the Link Info subfield has a size of 1 bit (link bitmap size=0000) to 16 bits (link bitmap size=1111). Alternatively, the link bitmap size subfield includes 1 bit and may thus indicate one of preconfigured link Info subfield sizes. For example, when the link bitmap size subfield shows 0, the size of the link Info subfield may be indicated to be 8 bits, and when the link bitmap size subfield shows 1, the size of the link Info subfield may be indicated to be 16 bits.

In addition, TID-to-link mapping negotiation may be performed independently for DL and UL directions as described above (see FIG. 11). Therefore, TID-to-link mapping negotiation performed between MLDs via a TID-to-link mapping element may be performed concurrently for the DL and UL directions. That is, a single TID-to-link mapping element may concurrently indicate information for DL TID-to-link mapping and information for UL TID-to-link mapping negotiation.

In consideration of this, TID-to-link mapping Info fields may include both DL TID-to-link mapping Info field(s) and UL TID-to-link mapping Info field(s).

In addition, in order to indicate information related to a size of DL TID-to-link mapping Info field(s) and a size of UL TID-to-link mapping Info field(s), respectively, the TID-to-link mapping info size subfield may include two types of TID-to-link mapping info size subfields (DL TID-to-link mapping Info size subfield and UL TID-to-link mapping Info size subfield). However, if information on DL and UL is not separately indicated in the TID-to-link mapping element, unidirectional TID-to-link mapping information is applied to a transmission or reception direction of an MLD which has transmitted a request frame including the TID-to-link mapping element.

There may be a case where each TID is indicated more than once in the TID-to-link mapping element. For example, among two TID-to-link mapping Info fields included in the TID-to-link mapping element of the request frame, a TID set including TID 0 may be mapped to link 1 in a first of the two TID-to-link mapping Info fields, and another TID set including TID 0, again, may be mapped to link 2 and indicated in a second of the two TID-to-link mapping Info fields. In this case, an MLD (responding MLD) having received this may interpret that TID 0 is mapped to both link 1 indicated by the first TID-to-link mapping Info field and link 2 indicated by the second TID-to-link mapping Info field. Therefore, in this case, the responding MLD may complete the TID-to-link mapping negotiation by responding with a response frame including no TID-to-link mapping element, thereby mapping TID 0 to both link 1 and link 2.

<Method of Proposing/Accepting/Rejecting (Counter-Proposing) in TID-to-Link Mapping Negotiation>

As described above, TID-to-link mapping negotiation may be performed between MLDs by using a TID-to-link mapping element. An initiating MLD may indicate TID-link mapping, which the initiating MLD itself proposes (prefers), by using a TID-to-link mapping element included in a request frame (TID-to-link mapping request frame or (re) association request frame). After receiving the request frame from the initiating MLD, a responding MLD may determine whether to accept the TID-link mapping indicated in the TID-to-link mapping element. The responding MLD and the initiating MLD may use a TID-to-link mapping request frame, a TID-to-link mapping response frame, a TID-to-link mapping teardown frame, etc. to perform TID-to-link mapping negotiation.

The TID-to-link mapping req/resp/teardown frame may be frame formats corresponding to a TID-to-link mapping action frame. That is, a category field of an action field may indicate a value indicating a TID-to-link mapping action frame, and an action details field may indicate a value for distinguishing a TID-to-link mapping request frame, a TID-to-link mapping response frame, and a TID-to-link mapping teardown frame. For example, the TID-to-link mapping action frame may be indicated by a category value between 32 and 125 (e.g., 32), which remains reserved in 11 ax. In this case, the TID-to-link mapping req/resp/teardown frames may be distinguished by indication of 0, 1, and 2 in 1 octet immediately following the category field, respectively. That is, if a category field value of an action frame is indicated as 32, and an octet immediately following the category field indicates 0 (0000 0000), the action frame may be a TID-to-link mapping request frame.

If the responding MLD is to reject all or a part of a TID-link mapping method proposed by the initiating MLD, the responding MLD may respond by including a TID-to-link mapping element in a response frame (TID-to-link mapping response frame or (re) association response frame), thereby rejecting the TID-link mapping proposed by the initiating MLD. That is, when the response is performed by including the TID-to-link mapping element in the response frame, it may be understood that the TID-to-link mapping negotiation between the initiating MLD and the responding MLD is not completed. In this case, a TID-to-link mapping Info field included in the TID-to-link mapping element of the response frame may indicate TID-link mapping information that the responding MLD counter-proposes to the initiating MLD. For example, if the initiating MLD has proposed (indicated/requested) to map TID 0 to link 1 (via the request frame), and the responding MLD has indicated TID 0 and link 2 (by mapping) via the request frame, the initiating MLD may interpret that the responding MLD has (counter) proposed to map TID 0 to link 2.

In addition, by indicating (counter-proposing), via the response frame, only a part of the TID-link mapping proposed (requested) by the initiating MLD, the responding MLD may accept the link mapping request (indicated (proposed) via the request frame) for TIDs remaining after excluding the indicated TID. In other words, the TID-link mapping of the initiating MLD for the TIDs, which are not indicated via the response frame by the responding MLD, may be understood as accepted by the responding MLD. Therefore, after indicating link mapping for a specific TID in the TID-to-link mapping element of the request frame, when the specific TID is not indicated in the TID-to-link mapping element of the response frame, the initiating MLD should interpret that the link mapping request proposed for the specific TID has been accepted by the responding MLD.

As described above, by not including mapping information related to a mapping relationship for the TID in the TID-to-link mapping element included in the response frame, the responding MLD may implicitly accept the mapping relationship between the TID and link requested (or proposed) by the initiating MLD via the request frame. Similarly, the initiating MLD may implicitly suggest the mapping relationship of some TIDs and links to the responding MLD, by not including mapping information for the mapping relationship of some TIDs in the TID-to-link mapping element included in the request frame.

That is, when the initiating MLD transmits the request frame to configure mapping between TIDs and links in association with the responding MLD, the initiating MLD may not include, in the TID-to-link mapping element of the request frame, mapping information for some TIDs among the multiple TIDs for mapping to the links, thereby implicitly indicating, to the responding MLD, the mapping relationship for the some TIDs that are not included. In other words, when mapping information for a mapping relationship with a link for a specific TID is missing in the request frame, the mapping relationship with the link for the specific TID may be implicitly indicated (or suggested).

In this case, the implicit suggestion may be 1) that a previously established mapping relationship remains valid without a change, or 2) that the mapping relationship between the TID and the link is a default mapping relationship.

In this case, the default mapping relationship may be a mapping relationship in which all links are mapped to one TID.

Specifically, the implicit suggestion may be a suggestion to map a TID, which is not indicated in the TID-to-link mapping element, to all links. In other words, when the initiating MLD does not indicate a specific TID in the TID-to-link mapping element included in the request frame, the specific TID may be (implicitly) indicated/requested to be mapped to all links.

Alternatively, the implicit suggestion may be a suggestion to maintain a previously negotiated link mapping status for the TID that is not indicated in the TID-to-link mapping element. That is, when the initiating MLD does not indicate a specific TID in the TID-to-link mapping element included in the request frame, the specific TID may have been (implicitly) indicated/requested for maintaining of a TID-link mapping status that has already been established before transmission of the request frame including the TID-to-link mapping element.

That is, when the TID-link mapping requested in the previously transmitted request frame has been accepted for the specific TID, the initiating MLD may attempt to maintain the already accepted link mapping status for the specific TID without a change, by not indicating information on the specific TID in the subsequently transmitted request frame.

Alternatively, when there is a TID-to-link mapping mode (including the default TID-to-link mapping mode) that has already been negotiated, and the link mapping status for the specific TID is not desired to be changed, the initiating MLD may attempt to maintain the link mapping status for the specific TID by not indicating information on the specific TID in the request frame.

In this case, a state where there is the TID-to-link mapping mode that has been negotiated may be a state where the default TID-to-link mapping mode has been applied between the two MLDs after performing association, or a state where a most recent TID-to-link mapping response frame transmitted/received between the MLDs does not include the TID-to-link mapping element.

On the other hand, if the responding MLD is to accept all TID-link mappings proposed (explicitly/implicitly) by the initiating MLD, the responding MLD may, after receiving the TID-to-link mapping request frame from the initiating MLD, respond with a TID-to-link mapping response frame that includes no TID-to-link mapping element. In other words, the responding MLD may accept the TID-to-link mapping indicated (proposed) by the initiating MLD, by not performing counter-proposal of the TID-link mapping via the response frame. The initiating MLD may identify that the TID-to-link mapping negotiation is completed, when the TID-to-link mapping response frame including no TID-to-link mapping element is received from the responding MLD. In addition, it may be said that the TID-link mapping accepted by the responding MLD is applied from a point in time when the TID-to-link mapping negotiation is completed.

The aforementioned method of proposing/accepting/rejecting (counter-proposing) in TID-to-link mapping negotiation may be applied to TIDs for DL and UL, respectively, or may be applied to all TIDs of DL or UL at once. For example, when the initiating MLD does not indicate a TID for a DL via the TID-to-link mapping element (when a DL TID-to-link mapping Info size is indicated as 0), this may be for the initiating MLD to implicitly suggest that a TID-link mapping status for the DL will be maintained in a previously agreed state. Alternatively, the initiating MLD may not have indicated a TID for a DL in order to change a TID-to-link mapping status for the DL to the default TID-to-link mapping status.

That is, when only a TID for a UL is indicated in the TID-to-link mapping element included in the request frame by the initiating MLD, the responding MLD may interpret that the initiating MLD wants to maintain the TID-to-link mapping status for the DL in the same state as before. Alternatively, the responding MLD may interpret that the initiating MLD has requested to change the TID-to-link mapping status for the DL to the default TID-to-link mapping status.

Likewise, when the responding MLD does not perform indication for all TIDs of DL or UL in the response frame (when the DL or UL TID-to-link mapping Info size is 0), the initiating MLD may interpret that all TID-to-link mappings proposed by the initiating MLD for the unindicated DL or UL are accepted.

In this way, when the TID-to-link mapping negotiation procedure is completed between the initiating MLD and the responding MLD, the two MLDs need to perform link operation within a certain period of time according to a TID-to-link mapping status that has been negotiated. In other words, when the TID-to-link mapping negotiation procedure is completed, the two MLDs may process, when performing transmission, only traffic corresponding to TIDs mapped to corresponding links and direction (DL/UL).

In addition, when the TID-to-link mapping status that has been operated between the two MLDs is released, i.e., when switching has been performed to the default TID-to-link mapping mode, the two MLDs should be able to process traffic for all TIDs on all links within a certain period of time. For example, the MLD having performed switching to the default TID-to-link mapping mode needs to maintain a state where the BA frame response (immediate BA) for all TIDs can be performed on all links after the certain period of time. In this case, the all TIDs may refer to only TIDs for which a BA session has been established between the two MLDs. That is, when the mapping relationships between TIDs and links are formed, the MLD may transmit/receive frames and corresponding BAs to/from the counterpart MLD via the formed mapping relationships.

Figure 64:
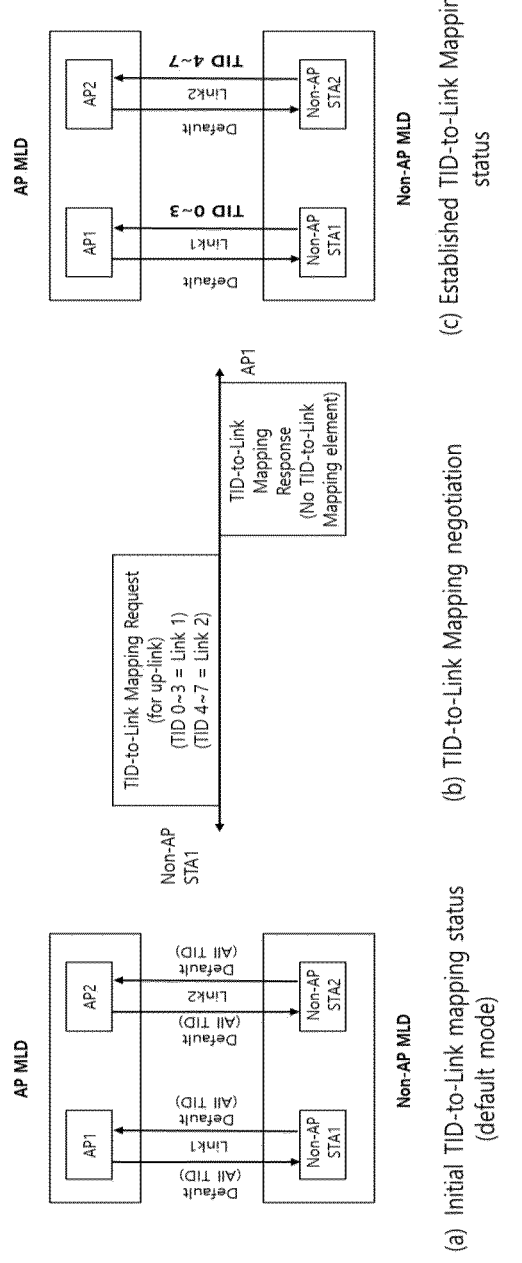
FIG. 64 illustrates a TID-to-link mapping procedure according to an embodiment of the disclosure.

FIG. 64 illustrates a TID-to-link mapping procedure according to an embodiment of the disclosure.

Referring to (a) of FIG. 64, an AP MLD and a non-AP MLD maintain a default TID-to-link mapping status. The AP MLD and the non-AP MLD are associated via two links (link 1 and link 2), and all TIDs (including TID 0 to TID 7, or TSID) are mapped to both of the two links.

The non-AP MLD may transmit a TID-to-link mapping request frame to the AP MLD as in (b) of FIG. 16 in order to perform TID-to-link mapping negotiation with the AP MLD. In this case, the non-AP MLD may, in the request frame transmitted via STA1, indicate to map UL TID 0 to TID 3 to link 1 without indicating a DL TID, and indicate to map UL TID 4 to TID 7 to link 2. In this case, the non-AP MLD may have indicated TID 0 to TID 3 in a TID Info subfield of a first UL TID-to-link mapping Info field to indicate that TID 0 to TID 3 should be mapped to link 1, and may have indicated link 1 in a link Info subfield of the UL TID-to-link mapping Info field. In this case, the non-AP MLD may have indicated TID 4 to TID 7 in a TID Info subfield of a second UL TID-to-link mapping Info field to indicate that TID 4 to TID 7 should be mapped to link 2, and may have indicated link 2 in a link Info subfield of the UL TID-to-link mapping Info field.

After receiving the TID-to-link mapping request frame from STA1 of the non-AP MLD, the AP MLD may recognize, via a TID-to-link mapping element included in the received frame, that the non-AP MLD wants to maintain the default TID-to-link mapping status for the DL TID and to map UL TID 0 to TID 3 to link 1 and UL TID 4 to TID 7 to link 2. If the AP MLD is to accept the TID-to-link mapping indicated (requested) by the non-AP MLD, the AP MLD may respond with a TID-to-link mapping response frame including no TID-to-link mapping element as shown in (b) of FIG. 64.

The non-AP MLD having received the TID-to-link mapping response frame including no TID-to-link mapping element from the AP MLD may recognize that the TID-to-link mapping negotiation has been completed. Then, a TID-to-link mapping status as in (c) of FIG. 64 is applied between the AP MLD and the non-AP MLD, the non-AP MLD may UL transmit traffic for TID 0 to TID 3 only via link 1, and UL transmit traffic for TID 4 to TID 7 only via link 2.

Figure 65:
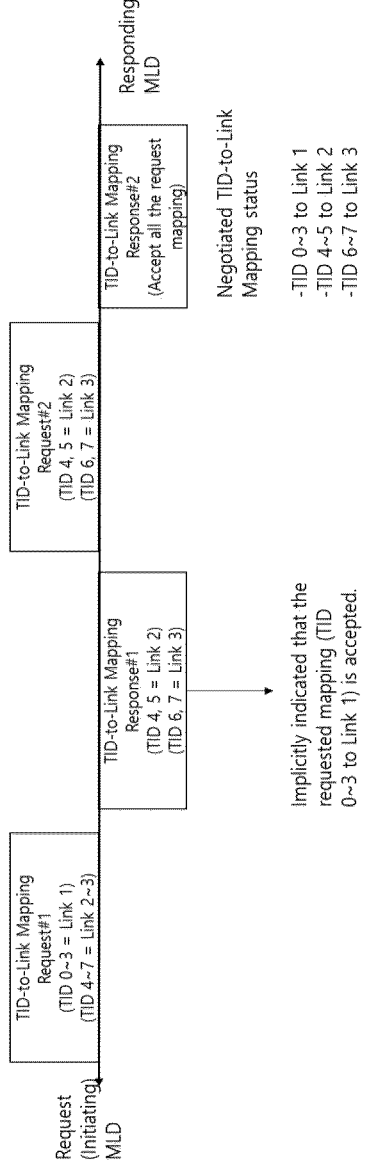
FIG. 65 illustrates an embodiment in which a response MLD selectively responds to some TIDs during TID-to-link mapping indicated (or proposed) by an initiating MLD.

FIG. 65 illustrates an embodiment in which a response MLD selectively responds to some TIDs during TID-to-link mapping indicated (or proposed) by an initiating MLD.

Referring to FIG. 65, the initiating MLD indicates (proposes), via a TID-to-link mapping element, to map TID 0 to TID 3 to link 1 and map TID 4 to TID 7 to link 2 via TID-to-link mapping request frame #1. In this case, the responding MLD may accept the proposal of the initiating MLD to map TID 0 to TID 3 to link 1, but may reject mapping TID 4 to TID 7 to link 2.

In this case, the responding MLD may transmit TID-to-link mapping response frame #1 including a TID-to-link mapping element to the initiating MLD in response to TID-to-link mapping request frame #1 received from the initiating MLD. In this case, the responding MLD may indicate (counter-propose), when configuring the TID-to-link mapping element, that TID 4 to TID 5 should be mapped to link 2 and TID 6 to TID 7 to link 3, thereby accepting link 1 mapping for TID 0 to TID 3 and rejecting link 2 mapping for TID 4 to TID 7.

The initiating MLD, which has received TID-to-link mapping response frame #1 from the responding MLD, may reconfigure TID-to-link mapping request frame #2 by considering the TID-link mapping status (TIDs 4 and 5=link 2, TIDs 6 and 7=link 3) indicated by the responding MLD via TID-to-link mapping response frame #1. In this case, the initiating MLD may transmit TID-to-link mapping request frame #2 indicating to map TID 4 and TID 5 to link 2 and map TID 6 and TID 7 to link 3 in the TID-to-link mapping element, by considering the TID-link mapping status counter-proposed by the responding MLD. The responding MLD may terminate the TID-to-link mapping negotiation procedure by responding with TID-to-link mapping response frame #2 including no TID-to-link mapping element in order to accept the TID-link mapping status indicated in TID-to-link mapping request frame #2 received from the initiating MLD.

In this case, the TID-to-link mapping status established (negotiated) between the initiating MLD and the responding MLD may be a status in which the TID-link mapping status (TIDs 0 to 3=link 1) accepted via TID-to-link mapping response frame #1 and the TID-to-link mapping status (TIDs 4 and 5=link 2, TID 6 and 7=link 3) accepted via TID-to-link mapping response frame #2 are combined. If the initiating MLD re-indicates (re-proposes), in TID-to-link mapping request frame #2, a specific TID (link mapping for a specific TID) accepted via TID-to-link mapping request frame #1, the link mapping status of the specific TID finally established (negotiated) via TID-to-link mapping response frame #2 including no TID-to-link mapping element may be the link mapping status of the specific TID indicated in TID-to-link mapping request frame #2.

<Restrictions on TID-to-Link Mapping Negotiation>

An MLD may or may not support TID-to-link mapping negotiation depending on its capability. For example, MLDs for which dot11TIDtoLinkmappingActivated is not indicated as true may be MLDs that do not support TID-to-link mapping negotiation. Therefore, an initiating MLD may need to identify whether a responding MLD supports TID-to-link mapping negotiation before initiating TID-to-link mapping negotiation. That is, the initiating MLD needs to transmit a TID-to-link mapping request frame only to MLDs for which dot11TIDtoLinkmappingActivated is indicated as true.

In addition, even for an MLD that supports TID-to-link mapping negotiation, there may be a limit to the number of link sets supporting TID-to-link mapping for each MLD. For example, an MLD, in which the number of links that may be managed by differentiating TIDs via TID-to-link mapping is 4, may not support TID-to-link mapping negotiation for more than 4 links. Therefore, when configuring a TID-to-link mapping request frame for TID-to-link mapping negotiation, the initiating MLD needs to configure the request frame by considering the number of link sets supported by the responding MLD. In addition, since the initiating MLD may attempt TID-to-link mapping negotiation for both DL/UL directions, when configuring the TID-to-link mapping request frame, the initiating MLD needs to consider not only the number of link sets supported by the responding MLD but also the number of link sets supportable by the initiating MLD itself.

Similarly, when the responding MLD receives the TID-to-link mapping request frame from the initiating MLD, and then transmits a TID-to-link mapping response frame to (counter-) propose TID-to-link mapping, the responding MLD needs to configure the response frame by considering both the number of link sets supportable by the responding MLD itself and the number of link sets supportable by the initiating MLD.

Therefore, in order to perform TID-to-link mapping negotiation between the MLDs, the MLDs need to be aware of the number of supportable link sets for each other, and to this end, a TID-to-link mapping negotiation supported subfield may be indicated in an EHT MAC capabilities information field. The TID-to-link mapping negotiation supported subfield may indicate a value related to a maximum number of link sets manageable by the MLDs via TID-to-link mapping negotiation. If a specific MLD does not support TID-to-link mapping negotiation at all (dot11TIDtoLinkMappingActivated=false), the specific MLD may indicate 0 in a TID-to-link mapping negotiation supported subfield. On the other hand, an MLD that is able to manage 4 link sets via TID-to-link mapping may indicate a value indicating 4 via a TID-to-link mapping negotiation supported subfield.

In summary, when each MLD proposes/counter-proposes a TID-link mapping status to a counterpart MLD via TID-to-link mapping request/response frames transmitted thereby, each MLD needs to perform TID-link mapping by considering a maximum number of link sets supportable by each MLD and a maximum number of link sets of the counterpart MLD, which is identified via a TID-to-link mapping supported subfield. That is, the initiating MLD which transmits a request frame should not (explicitly/implicitly) indicate link sets more than min (the number of link sets supported by the initiating MLD, the number of link sets supported by the responding MLD) via a TID-to-link mapping element of the request frame. Similarly, the responding MLD which transmits a response frame should not (explicitly/implicitly) indicate (counter-propose) link sets more than min (the number of link sets supported by the responding MLD, the number of link sets supported by the initiating MLD) via a TID-to-link mapping element of the response frame.

In addition, if TID-link mapping for a specific TID is rejected (counter-proposed) by the responding MLD, the initiating MLD should not re-request the same link mapping as the rejected TID-link mapping for a certain period of time. In this case, the period of time may be a value determined by a parameter indicated by the AP MLD. In this case, the period of time may be a time until an unsolicited response frame is received from the responding MLD. In this case, the period of time may refer to a life time.

For example, if the initiating MLD indicates (proposes/requests) to map TID 0 to link 1 via the TID-to-link mapping request frame and then receives an indication (counter-proposal) to map TID 0 to link 2 from the responding MLD, the initiating MLD should not request to map TID 0 to link 1 for a certain period of time (or a preconfigured time or a time indicated by the AP MLD). This may be a restriction to prevent frequency resources from being wasted and prevent network congestion due to repeated TID-to-link mapping request/response frame exchanges. However, the initiating MLD may make a new request to map TID 0 to link 3 without following the proposal of the responding MLD if the proposal of mapping TID 0 to link 3 has never been rejected.

<Simple TID-to-Link Mapping Negotiation Procedure>

The aforementioned TID-to-link mapping negotiation procedure is that an initiating MLD proposes mapping for TIDs and links, and a responding MLD may accept or reject a mapping status proposed by the initiating MLD. In this case, the responding MLD may accept the proposal for only some TIDs and reject the proposal for the remaining TIDs for the TID-link mapping status proposed by the initiating MLD. In this case, the responding MLD may indicate (counter-propose) a preferred link mapping status for the TIDs the proposal of which has been rejected. A point in time when TID-to-link mapping negotiation between the initiating MLD and the responding MLD is completed is limited to a time when the responding MLD responds with a TID-to-link mapping response frame including no TID-to-link mapping element.

When considering this TID-to-link mapping negotiation procedure, even if the initiating MLD, which has received a counter-proposal of a TID-link mapping status from the responding MLD, attempts to accept the (counter-) proposal of the responding MLD, there is inefficiency that a TID-to-link mapping request frame should be retransmitted. That is, in order to accept the TID-to-link mapping status counter-proposed from the responding MLD, the initiating MLD needs to retransmit a TID-to-link mapping request frame which indicates the same TID-to-link mapping status as that counter-proposed in the TID-to-link mapping element. Similarly, the responding MLD receives, again from the initiating MLD, a proposal of the same TID-link mapping as that counter-proposed by the responding MLD itself, and responding again with a TID-to-link mapping response frame including no TID-to-link mapping element, thereby completing the TID-to-link mapping negotiation procedure. In this case, the exact time for completion of the TID-to-link mapping negotiation procedure may be a point in time when an Ack response to the TID-to-link mapping response frame is performed.

In this way, although the initiating MLD intends to follow the TID-link mapping status counter-proposed from the responding MLD, if the initiating MLD needs to retransmit the request frame and the responding MLD also needs to re-respond with the response frame, the retransmitted request frame and response frame may be a TID-to-link mapping negotiation procedure that causes unnecessary overhead.

Therefore, a TID-to-link mapping negotiation procedure in which the initiating MLD accepts a (counter-) proposed TID-link mapping status from the responding MLD may be considered. That is, after the initiating MLD transmits a TID-to-link mapping request frame, if a TID-to-link mapping response frame received from the responding MLD includes a TID-to-link mapping element, the initiating MLD may accept a TID-link mapping status indicated via the TID-to-link mapping element. In this case, after receiving the TID-to-link mapping response frame from the responding MLD, the initiating MLD may (implicitly) accept a (counter-) proposal of the responding MLD for a specific TID by including no TID-to-link mapping element in a transmitted TID-to-link mapping request frame, or by not indicating the specific TID in the TID-to-link mapping element. This TID-to-link mapping request frame response method of the initiating MLD is similar to the TID-to-link mapping response frame response method of the responding MLD, so that a detailed description is omitted. In this case, the initiating MLD may accept the TID-link mapping status proposed by the responding MLD by transmitting a TID-to-link mapping response frame (including no TID-to-link mapping element) instead of a TID-to-link mapping request frame.

However, if the initiating MLD transmits a TID-to-link mapping request frame including no TID-to-link mapping element, the TID-to-link mapping negotiation procedure may be completed at a point in time when the responding MLD responds with an Ack frame to the TID-to-link mapping request frame. That is, when the TID-to-link mapping request frame including no TID-to-link mapping element is received, the responding MLD may complete the TID-to-link mapping negotiation procedure by responding with the Ack frame.

Figure 66:
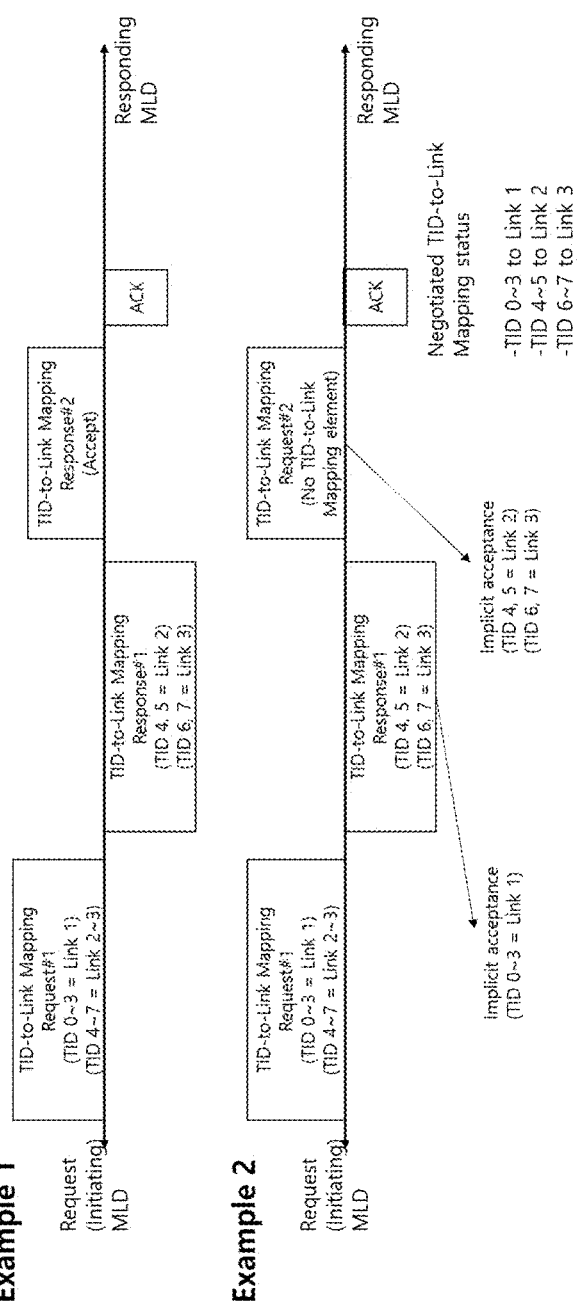
FIG. 66 illustrates an initiating MLD responding method of accepting (adopting) TID-to-link mapping counter-proposed from a response MLD.

FIG. 66 illustrates an initiating MLD responding method of accepting (adopting) TID-to-link mapping counter-proposed from a response MLD.

Referring to FIG. 66, an initiating MLD may transmit TID-to-link mapping request frame #1 to a responding MLD to initiate a TID-to-link mapping negotiation procedure, and the responding MLD may reject link mapping for TID 4 to TID 7 while performing (counter-) proposal by responding with response frame #1. In this case, the initiating MLD may request the responding MLD to determine to accept a TID-link mapping status indicated via TID-to-link mapping request frame #1 and to complete TID-to-link mapping.

In example 1 of FIG. 66, after reception of TID-to-link mapping request frame #1, the initiating MLD may transmit TID-to-link mapping response frame #2 to complete the TID-to-link mapping procedure. Strictly speaking, TID-to-link mapping response frame #2 transmitted by the initiating MLD may be an unsolicited response frame. In this case, TID-to-link mapping response frame #2 transmitted by the initiating MLD may be configured to include no TID-to-link mapping element, and the responding MLD, which has received TID-to-link mapping response frame #2 from the initiating MLD, may recognize that the initiating MLD wants to accept the TID-link mapping status counter-proposed by the responding MLD and complete TID-to-link mapping procedure. Therefore, after receiving TID-to-link mapping request frame #2, the responding MLD may complete the TID-to-link mapping negotiation procedure associated with the initiating MLD by responding with an Ack frame.

In example 2 of FIG. 66, after reception of TID-to-link mapping request frame #1, the initiating MLD may transmit TID-to-link mapping request frame #2 to complete the TID-to-link mapping procedure. In this case, TID-to-link mapping request frame #2 transmitted by the initiating MLD may be configured to include no TID-to-link mapping element, and the responding MLD, which has received TID-to-link mapping request frame #2 from the initiating MLD, may recognize that the initiating MLD wants to accept the TID-link mapping status counter-proposed by the responding MLD and complete TID-to-link mapping procedure. Therefore, after receiving TID-to-link mapping request frame #2, the responding MLD may complete the TID-to-link mapping negotiation procedure associated with the initiating MLD, by responding with an Ack frame or a TID-to-link mapping response frame including no TID-to-link mapping element.

<Using Unsolicited TID-to-Link Mapping Response Frame>

In general, a TID-to-link mapping negotiation procedure performed between MLDs is initiated by a TID-to-link mapping request frame transmitted by an initiating MLD. Such a general TID-to-link mapping negotiation is performed between an initiating MLD and a responding MLD, and request/response frames exchanged between the two MLDs may be individually addressed frames.

However, since an AP MLD needs to perform TID-to-link mapping negotiation with multiple non-AP MLDs of a BSS, performing individual TID-to-link mapping negotiation with all non-AP MLDs may be a task causing a lot of overhead. Therefore, the AP MLD may inform the non-AP MLDs of its preferred TID-link mapping configuration by transmitting a non-individually addressed TID-to-link mapping response frame. In this way, when the AP MLD informs the non-AP MLDs of its preferred TID-link mapping status, there is an advantage that the non-AP MLDs may have knowledge of the preferred TID-link mapping configuration of the AP MLD, which is the responding MLD, in advance and then start a TID-to-link mapping negotiation procedure. In other words, at a point in time when the non-AP MLD, as the initiating MLD, transmits a TID-to-link mapping request frame, the non-AP MLD may already identify preference of the responding MLD and perform operation, so that the TID-to-link mapping negotiation procedure is likely to be proceeded more smoothly.

An unsolicited TID-to-link mapping response frame transmitted by the AP MLD may have a different TID-to-link mapping element configuration from that of a general TID-to-link mapping request/response frame. In more detail, the unsolicited TID-to-link mapping response frame transmitted by the AP MLD may indicate the same TID one or more times via the TID-to-link mapping element. For example, in a specific (DL/UL) TID-to-link mapping Info field included in the TID-to-link mapping element, TID 0 and TID 1 may be mapped to link 1 and link 2 and indicated, and in another (DL/UL) TID-to-link mapping Info field, TID 0 to TID 4 may be mapped to link 1 to link 3 and indicated. Therefore, if non-AP MLDs having received the unsolicited TID-to-link mapping response frame from the AP MLD have the purpose of differentiating links of TID 0 and TID 1 and links of TID 2 and TID 3, the non-AP MLDs may select to set up link 1 or/and link 2 for TID 0 and TID 1, set up link 3 for TID 3 and TID 4, and the like. That is, the AP MLD may transmit the TID-to-link mapping element by including the same in a beacon frame transmitted thereby, so as to assist the non-AP MLDs to select setup links from an association stage. In more detail, the non-AP MLD may identify the TID-link mapping status preferred by the AP MLD via the beacon frame, so as to perform setup by selecting a link according to a TID separation method that the non-AP MLD wants.

Figure 67:
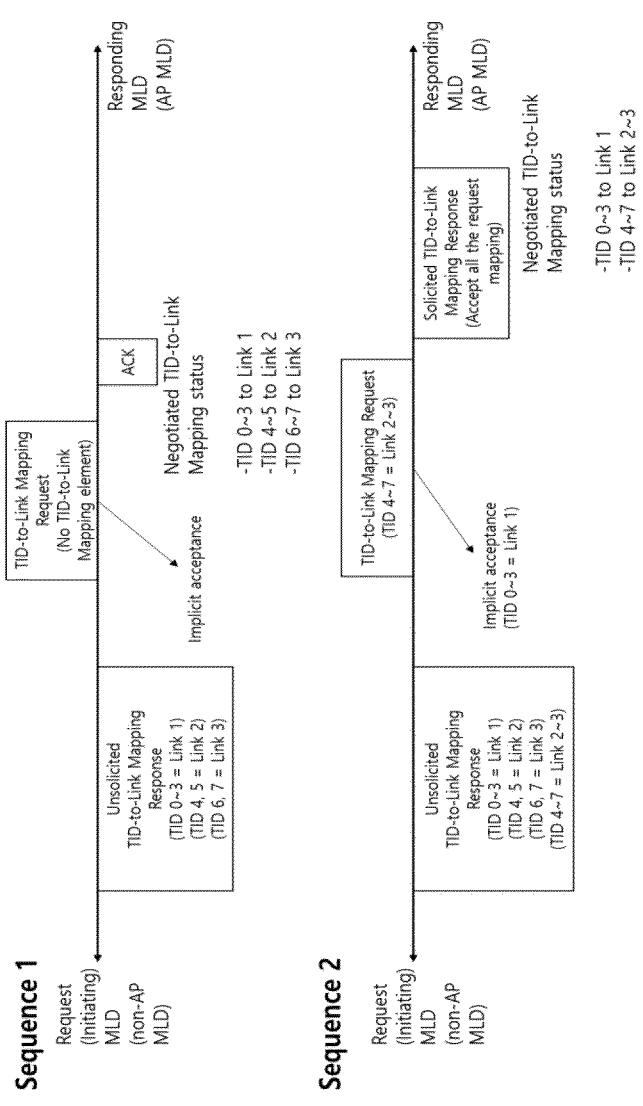
FIG. 67 illustrates an unsolicited TID-to-link mapping response frame transmitted from an AP MLD, and an embodiment of a TID-to-link mapping negotiation procedure between the AP MLD and a non-AP MLD.

FIG. 67 illustrates an unsolicited TID-to-link mapping response frame transmitted from an AP MLD, and an embodiment of a TID-to-link mapping negotiation procedure between the AP MLD and a non-AP MLD.

Referring to FIG. 67, an AP MLD may transmit an unsolicited TID-to-link mapping response frame. In this case, the unsolicited TID-to-link mapping response frame may be transmitted as a non-individually addressed frame. That is, the unsolicited TID-to-link mapping response frame transmitted by the AP MLD may be targeted at one non-AP MLD or more than one non-AP MLD.

As illustrated in FIG. 67, the AP MLD may indicate, via the unsolicited TID-to-link mapping request frame, that the AP MLD wants to map TID 0 to TID 3 to link 1, map TID 4 and TID 5 to link 2, and map TID 6 and TID 7 to link 3.

A non-AP MLD (initiating MLD) which has received the unsolicited frame may, as in sequence 1 of FIG. 67, transmit a TID-to-link mapping request frame including no TID-to-link mapping element, thereby indicating, to the AP MLD (the responding MLD), that the non-AP MLD wants to accept the TID-to-link mapping indicated via the unsolicited response frame and to perform and complete TID-to-link mapping negotiation. After receiving the TID-to-link mapping request frame including no TID-to-link mapping, the AP MLD may respond with an Ack frame thereby informing that TID-to-link mapping negotiation has been completed.

For sequence 2, a non-AP MLD (initiating MLD) may identify that there are two link mapping options for TID 4 to TID 7 among TID-link mappings indicated by an AP MLD (responding MLD) via an unsolicited TID-to-link mapping response frame. In this case, the non-AP MLD may select an option to map TID 4 to TID 7 to link 2 and link 3 and transmit a TID-to-link mapping request frame to the AP MLD. In this case, since the non-AP MLD has not indicated TID 0 to TID 3 in a TID-to-link mapping element of the request frame, it may be interpreted that the non-AP MLD has accepted the link mapping proposal (indicated via the unsolicited TID-to-link mapping response frame) of the AP MLD for TID 0 to TID 3.

<TID-to-Link Mapping Release>

TID-to-link mapping negotiation between two MLDs may be released when one of the two MLDs transmits a TID-to-link mapping teardown frame and the other MLD performs an Ack response. When TID-to-link mapping negotiation between the two MLDs is released via the TID-to-link mapping teardown frame, the two MLDs may have to operate in the default TID-to-link mapping mode. That is, all TID traffic for DL and UL may be switched to a state that is the same as being mapped to all links.

In consideration of the aforementioned TID-to-link mapping negotiation method of the disclosure, it may be seen that switching to the default TID-to-link mapping mode is also possible by indicating all TIDs and all links in a TID-to-link mapping Info field of a TID-to-link mapping element when an initiating MLD configures a TID-to-link mapping request frame. More specifically, in the DL TID-to-link mapping Info field included in the TID-to-link mapping element, if a TID Info subfield is indicated as 1111 1111

(8-bit embodiment) and a link Info subfield is indicated as 1111 1111 (8-bit embodiment), TID-to-link mapping for a DL direction may be indicated as the default mode.

Alternatively, as in the aforementioned embodiment of the disclosure, if a DL TID-to-link mapping Info size subfield of the TID-to-link mapping element is indicated as 0, the MLD having received the same may recognize that a counterpart MLD indicates (proposes) the default TID-to-link mapping mode for the DL direction. Accordingly, if the initiating MLD indicates both the DL TID-to-link mapping Info size subfield and UL TID-to-link mapping Info size subfield as 0 in the TID-to-link mapping request frame, a responding MLD may recognize that the initiating MLD indicates (proposes) the default TID-to-link mapping mode. Similarly, if the responding MLD indicates both the DL/UL TID-to-link mapping Info size fields as 0 in a TID-to-link mapping response frame, the initiating MLD may recognize that the responding MLD indicates (counter-proposes) the default TID-to-link mapping mode.

Although it is possible, as described above, to switch to the default TID-to-link mapping mode via the TID-to-link mapping request frame and the TID-to-link mapping response frame, a reason that a TID-to-link mapping teardown frame is necessary may be because a TID-to-link mapping negotiation release procedure may be completed according to intention (determination) of a specific MLD instead of being conducted via negotiation between two MLDs. That is, when a specific MLD among two MLDs wants to operate in the default TID-to-link mapping mode, a counterpart MLD may need to switch to the default TID-to-link mapping mode at a request of the specific MLD. Therefore, when the specific MLD transmits a TID-to-link mapping teardown frame, the counterpart MLD cannot perform a counter-proposal using a TID-to-link mapping response frame and needs to accept switching to the default TID-to-link mapping mode. In this case, the counterpart MLD may need to respond with an Ack frame or a TID-to-link mapping response frame including no TID-to-link mapping element to deliver its intention for acceptance.

In this case, after negotiation to change to the default TID-to-link mapping mode, the specific MLD and the counterpart MLD may need to operate respective links in the default TID-to-link mapping mode within a certain period of time. That is, both MLDs which have switched to the default TID-to-link mapping mode via the TID-to-link mapping teardown frame need to operate (switch to) in a state where the both MLDs are able to perform transmission/reception, BlockAck (BA) response, etc. for all TIDs on all links within a certain period of time. In this case, the certain period of time may be a time preconfigured by an EHT standard or BSS, or a previously agreed time between the two MLDs performing TID-to-link mapping.

For an operational purpose, the AP MLD may attempt to simultaneously (at once) release the TID-to-link mapping mode negotiated with multiple associated non-AP MLDs and switch to the default TID-to-link mapping mode. In this case, instead of transmitting a TID-to-link mapping teardown frame individually to all the associated non-AP MLDs, the AP MLD may transmit a non-individually addressed TID-to-link mapping teardown frame. In this case, the AP MLD may transmit a DTIM beacon frame, and then transmit the TID-to-link mapping teardown frame as a group addressed frame. After receiving the DTIM beacon frame, the non-AP MLDs may, during the reception of the group addressed frame, receive the TID-to-link mapping teardown frame and recognize that the TID-to-link mapping mode negotiated with the AP MLD has been switched to the default TID-to-link mapping mode.

Figure 68:
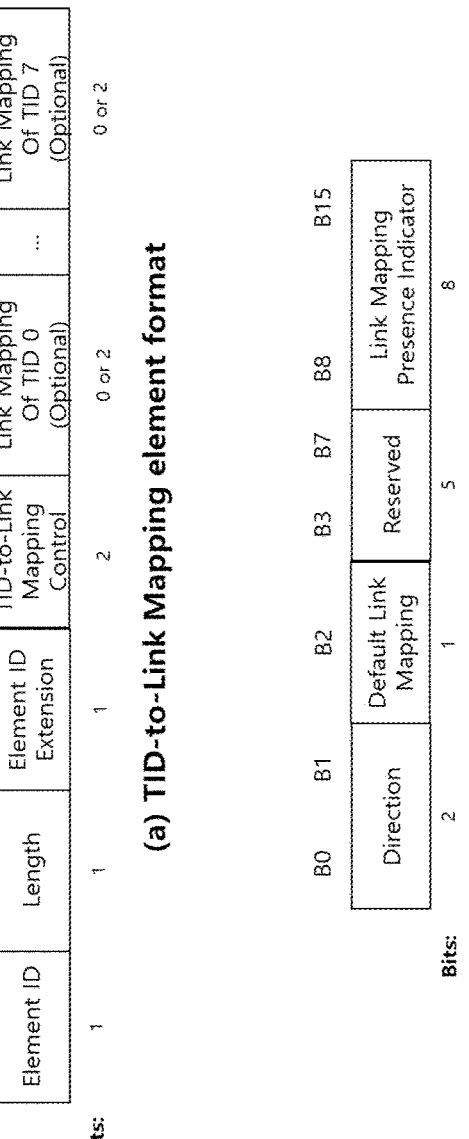
FIG. 68 illustrates a TIM element format.

In this case, the non-AP MLDs which have received the TID-to-link mapping teardown frame as the group addressed frame using the DTIM beacon frame may need to switch to the default TID-to-link mapping mode without performing a response using an Ack or a TID-to-link mapping response frame. That is, the TID-to-link mapping teardown frame transmitted by the AP MLD to the multiple non-AP MLDs may be applied directly even without acknowledgment (Ack, TID-to-link mapping response, etc.) from the responding MLDs (non-AP MLDs). This may be because the TID-to-link mapping teardown frame transmitted after DTIM is considered to have been safely received by the responding MLDs even if there was no separate response. FIG. 68 illustrates a TIM element format.

As illustrated in FIG. 68, a TIM element is configured to include element ID, length, DTIM count, DTIM period, bitmap control, and partial virtual bitmap fields. An element ID field indicates a value indicating a type of a corresponding element, and the element ID field of the TIM element is configured to be 5. A length field indicates a length of the TIM element. A DTIM count field indicates the number of beacon frames to appear until a subsequent DTIM, and when a beacon including a TIM element is a DTIM, the DTIM count field is configured to be 0. A DTIM count field of the TIM element transmitted by being included in a TIM frame is reserved. A DTIM period field indicates the number of beacon intervals in which a DTIM is transmitted, and if all beacons are DTIM beacon frames (all beacon frames include a DTIM), the DTIM period field is configured to be 1.

A bitmap control field includes a 1-bit traffic indicator (B0) and a 7-bit bitmap offset (B1 to B7) subfield. A traffic indicator subfield corresponds to AID 0, and indicates whether an AP is queuing one or more group addressed MSDUs (and MMPDUs, A-MSDUs, etc.) (whether BUs are buffered). In this case, an indication/interpretation method of a traffic indicator subfield includes indicating that a group addressed MSDU is queued on an AP side when the traffic indicator subfield is 1, and indicating that no group addressed MSDU is queued when the traffic indicator subfield is 0. That is, a non-AP STA which has received a TIM element in which a traffic indicator subfield is indicated as 1 may recognize that one or more group addressed frames are queued on an AP side. In this case, the traffic indicator subfield is interpreted as described above only in a TIM element in which a DTIM count field is configured to be 0 (i.e., a TIM element of a DTIM). A bitmap offset subfield indicates information related to a bit corresponding to an AID from which a partial virtual bitmap included in the TIM element starts. More specifically, when a part corresponding to N (even number)×8 to M×8 (here, M is a natural number greater than N) of a traffic indication virtual bitmap is included in the TIM element of the partial virtual bitmap, the bitmap offset subfield indicates a value corresponding to N/2.

Therefore, in consideration of the aforementioned conventional method of operating a power saving mode for a Wi-Fi AP and a non-AP STA, it may be seen that non-AP MLDs associated with the AP MLD via multiple links are also able to identify whether MSDUs (and A-MSDUs, etc.) that the non-AP MLDs should receive are queued on the AP MLD side, by receiving a beacon frame including the TIM element from the AP MLD. In this case, the AP MLD may configure bits of the TIM element (more specifically, bits of the partial virtual bitmap), which correspond to AIDs assigned to respective non-AP MLDs, to be 1, thereby indicating that MSDUs to be transmitted to the respective non-AP MLDs are being queued. For the non-AP MLDs, even if not all TIM elements (included in beacon frames or TIM frames) transmitted from multiple links, respectively, are received, and only a TIM element received on a specific link is received, it is possible to identify whether MSDUs that the non-AP MLDs should receive exist on the AP MLD side. That is, when the non-AP MLDs are operated in the power saving mode, it is possible for a non-AP MLD to receive a beacon frame only via a specific link, instead of the non-AP MLDs receiving beacon frames on all links associated with the AP MLD, so as to further increase power saving efficiency of STAs operating on links other than the specific link. For example, for non-AP MLDs associated with the AP MLD via two links, a TIM element is received only on one operating link among the two links, so that an STA operating on the other link may be maintained in a doze state for a longer period than a beacon interval (or DTIM interval).

In this way, the non-AP MLD may identify whether the AP MLD has an MSDU which is to be transmitted to the non-AP MLD itself, by receiving the TIM element via at least one of the links associated with the AP MLD. If the non-AP MLD recognizes, via the TIM element, that the AP MLD has an MSDU which is to be transmitted to the non-AP MLD itself, the non-AP MLD may attempt to receive the MSDU by using one of the association links. In this case, the non-AP MLD may transmit a PS-Poll frame to the AP MLD via the link on which the non-AP MLD itself is to receive the MSDU, thereby informing the AP MLD that the non-AP MLD wants to receive the MSDU on the link on which the non-AP MLD has transmitted the PS-Poll frame, and that an STA operating on the link is being maintained in an awake state. In this case, the AP MLD having received the PS-Poll frame from the non-AP MLD may transmit the MSDU destined for the non-AP MLD via the link on which the PS-Poll frame has been received, thereby completing MSDU transmission to the non-AP MLD operating in the PS mode.

As described via the simple embodiment described above, it may be seen that a non-AP STA operating in the PS mode and an AP supporting the PS mode, which are operated in conventional Wi-Fi, may be easily extended to a PS mode operation and support method of a non-AP MLD and an AP MLD. In this case, the AP MLD may inform the non-AP MLD that an MSDU to be transmitted exists, via a TIM element defined in conventional Wi-Fi, and after receiving the TIM element, the non-AP MLD may receive the MSDU by transmitting a PS-Poll frame via an STA of a link on which the MSDU is to be received, so that the PS mode support and operation of the AP MLD and non-AP MLD are possible with only the TIM element defined in conventional Wi-Fi.

<Restrictions on PS Mode Operation Due to TID-to-Link Mapping Negotiation>

As described above, TID-to-link mapping negotiation may be performed between two MLDs associated via multiple links. If TID-to-link mapping negotiation has been performed between an AP MLD and a non-AP MLD, the AP MLD may need to indicate traffic indication by considering TID-to-link mapping negotiated with the non-AP MLD. Similarly, when the traffic indication is received from the AP MLD, the non-AP MLD may also need to perform an operation for MSDU reception by considering TID-to-link mapping. A reason that the AP MLD and the non-AP MLD need to perform traffic indication and MSDU reception by considering TID-to-link mapping as above is because of traffic transmission restrictions related to TID-to-link mapping. As described above about TID-to-link mapping, when an MLD having performed TID-to-link mapping negotiation with a counterpart MLD performs transmission to the counterpart MLD, the transmission needs to be performed only via a link to which a TID of traffic to be transmitted is mapped. Therefore, if the AP MLD and the non-AP MLD have performed TID-to-link mapping in a non-default mode for a DL direction, the AP MLD, in order to transmit an MSDU being queued, needs to transmit the MSDU to the non-AP MLD only via a link to which a TID of the MSDU is mapped for the DL direction. That is, the non-AP MLD needs to transmit a PS-Poll frame only via a link on which an MSDU that the non-AP MLD is to receive can be transmitted, and if the non-AP MLD transmits a PS-Poll frame on a link to which a TID of the MSDU being queued on the AP MLD side is not mapped for the DL direction, the non-AP MLD cannot receive the MSDU from the AP MLD. In this case, the non-AP MLD switches a link, on which MSDU reception is impossible, to awake, which not only reduces PS efficiency but also causes delay in MSDU transmission, etc. making it difficult to effectively operate/support the PS mode.

Therefore, in order to prevent a problem that a queuing MSDU (BU) cannot be transmitted due to TID-to-link mapping, the AP MLD needs to indicate, to each non-AP MLD through a TIM element, whether there is a queuing MSDU to be transmitted, and additionally indicate information related to a link on which the MSDU should be transmitted. In this case, an additional indication other than whether there is a queuing MSDU may not be performed for the non-AP MLD that has performed TID-to-link mapping negotiation in which all TIDs are mapped in the DL direction (a downlink, a direction in which the AP performs transmission to the non-AP) to at least one link. This may be because the non-AP MLD, which has a link in the default TID-to-link mapping status or to which all TIDs are mapped in the DL direction, may transmit a PS-Poll frame via the link, to which all TIDs are mapped, in order to receive a queuing MSDU, thereby receiving the queuing MSDU without the problem of transmission impossibility due to TID.

A method by which the AP MLD indicates, to the non-AP MLD, information related to a link on which a corresponding MSDU (BU, queuing frame, etc.) needs to be transmitted may include transmitting an element indicating a TID or a link ID along with a TIM element. In this case, the element transmitted to indicate a TID or a link ID to the non-AP MLD may be referred to as multi-link TIM element (or multi-link traffic indication element). A multi-link TIM element indicates information related to a link on which each non-AP MLD, to which the presence of a queuing MSDU has been indicated by a TIM element, may receive the MSDU, and if indication of separate link-related information is not required for a non-AP MLD (if TID-to-link mapping negotiation is performed, in which a link is in the default TID-to-link mapping status or all TIDs are mapped in the DL direction to a link), no separate link-related information may be indicated in the multi-link TIM element. The non-AP MLD indicated with no separate link-related information via the multi-link TIM element needs to transmit a PS-Poll frame on the link, to which all TIDs are mapped in the DL direction, to receive a BU (queuing MSDUs). For a non-AP MLD using default TID-to-link mapping, it may be understood that, since all TIDs are mapped in the DL direction to all links, there is no separate restriction on selection of a PS-Poll frame transmission link.

<Multi-Link TIM Element>

In consideration of the transmission purpose and function of the multi-link TIM element described above, it may be seen that the multi-link TIM element can have variable sizes depending on the number of non-AP MLDs requiring indication of link-related information. In addition, it is possible that link-related information corresponding to each non-AP MLD is also indicated using variable sizes. This may be because an element format is applied to reduce overhead of link-related information corresponding to each non-AP MLD. In this case, a non-AP MLD requiring indication of link-related information may refer to a non-AP MLD to which the presence of a queuing MSDU has been indicated via a TIM element and which operates in a non-default TID-to-Link mapping mode. In this case, even in the non-default TID-to-link mapping mode, a non-AP MLD having a link, to which all TIDs are mapped in the DL direction, may not be included in the non-AP MLD requiring indication of link-related information.

As a simplest example, a case may be considered, in which information related to a link on which a queuing MSDU may be transmitted is indicated to each non-AP MLD by using a 15-bit or 16-bit link ID bitmap. In this case, bits of about 2-octets should be used for each non-AP MLD, and a size of a multi-link TIM element including link information for multiple non-AP MLDs may become very large, causing large overhead. This may indicate that, in consideration that the multi-link TIM element is included in a frame which is generally transmitted at a low data rate, such as a beacon frame, large overhead of the multi-link TIM element may act as a factor that reduces a network throughput rate. Therefore, the multi-link TIM element should be designed in a format having lowest overhead possible while achieving the purpose and function of the multi-link TIM element described above.

The embodiments of the disclosure described below provide various format embodiments of a multi-link TIM element, and multi-link TIM element formats considered in respective embodiments are multi-link TIM element formats that enable achievement of the same function with smaller overhead compared to the simplest example considered above.

FIG. 69 illustrates a first format of a multi-link TIM element according to an embodiment of the disclosure.

Referring to FIG. 69, a multi-link TIM element may include bitmap size, AID offset, type, per-MLD indication, and padding fields. A bitmap size field includes 4 bits and indicates the number of bits for a single MLD among bits included in a per-MLD indication field. For example, if the bitmap size field is indicated as 3, respective 3 or 4 (3+1) bits of the per-MLD indication field correspond to a single MLD. That is, if the bitmap size field is indicated as 3, first to third (or first to fourth) bits of the per-MLD indication field correspond to non-AP MLD #1, and fourth to sixth (or fifth to eighth) bits correspond to non-AP MLD #2.

A type field includes 1 bit and indicates whether LinkID bitmap or link Info is indicated in a per-MLD indication field. More specifically, when a type field is indicated as 0 (or 1), LinkID bitmap is included in the per-MLD indication field, and when the type field is indicated as 1 (or 0), link Info is included in the per-MLD indication field. Descriptions of the LinkID bitmap and link Info are provided via the embodiments of FIG. 70 and FIG. 71 described below.

An AID offset field indicates an AID of a non-AP MLD corresponding to a bit first indicated in the per-MLD indication field. As in the example above, if the first bit of the per-MLD indication field corresponds to non-AP MLD #1, a value indicated via the AID offset field is an association ID (AID) of non-AP MLD #1.

The per-MLD indication field is a field having a variable length, and a size thereof is determined by the number of MLDs, to which link-related information is indicated via the per-MLD indication, and a value indicated via the bitmap size field. The per-MLD indication field includes at least one LinkID bitmap or link Info, and each LinkID bitmap/link Info corresponds to an AID of each MLD, to which link-related information should be indicated, among MLDs to which the presence of a queuing MSDU has been indicated via a TIM element. More specifically, the size of the per-MLD indication field is determined to be (the number of MLDs to which link information is indicated via the per-MLD indication field)×(a value indicated via the bitmap size field (or the indicated value+1)). A non-AP MLD having received the per-MLD indication field may use bits (LinkID bitmap or link Info corresponding to its own AID), which correspond to the non-AP MLD itself (corresponding to its own AID) among bits included in the per-MLD indication field, to identify a link on which the non-AP MLD needs to receive a queuing MSDU. A more specific indication/interpretation method will be described via an embodiment described below.

A padding field is a field that may appear to adjust the size of the multi-link TIM element to an octet unit. In more detail, if the sum of the sizes of other fields (bitmap size, AID offset, reserved, per-MLD indication, etc.) excluding the padding field is not a multiple of 8 bits, the padding field may be included to adjust the size of the multi-link TIM element to be a nearest multiple of 8. For example, if the sum of the sizes of other fields excluding the padding field is 50 bits, the padding field with a 6-bit size is included to determine the size of the multi-link TIM element to be 7 octets (56 bits). Therefore, the padding field may be omitted or have a size of 7 bits or less. In this case, an AP MLD cannot not configure a value of the bitmap size field to be 15 (indicating that per-MLD indications corresponding to LinkID 0 to LinkID are indicated), and this may be because a largest index of link IDs is limited to 14. That is, the AP MLD should not configure a value of the bitmap size field to be 15. In addition, since the purpose of performing per-MLD indication is to indicate one link or more than one link among multiple links, per-MLD indication cannot be performed with a 1-bit size, and therefore the AP MLD cannot indicate the bitmap size field as 0. That is, the AP MLD transmitting the multi-link TIM element should not configure a value of the bitmap size field to be 0 or 15.

Figure 70:
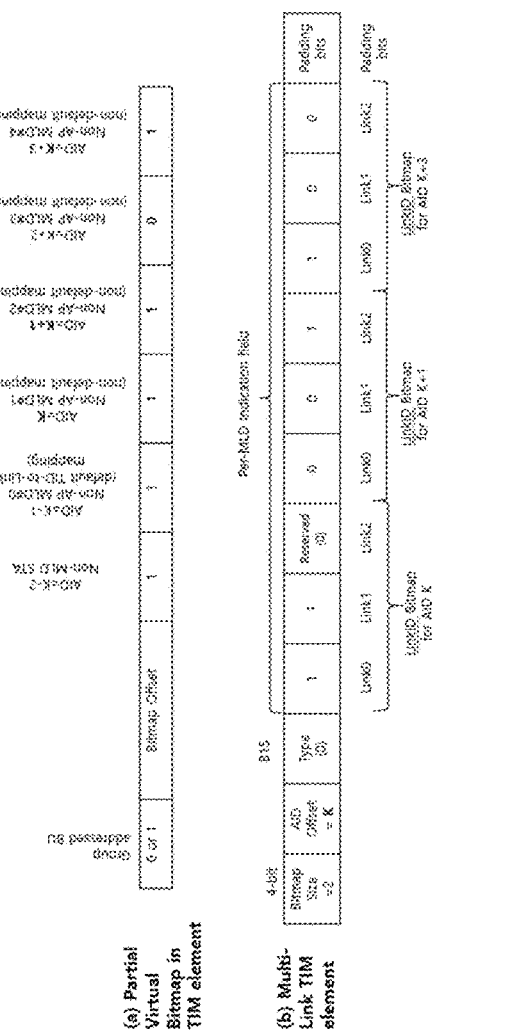
FIG. 70 illustrates a multi-link TIM element indication/interpretation method using a first format of a multi-link TIM element according to an embodiment of the disclosure.

FIG. 70 illustrates a multi-link TIM element indication/interpretation method using a first format of a multi-link TIM element according to an embodiment of the disclosure.

In an embodiment of FIG. 70, a partial virtual bitmap of a TIM element indicates bits corresponding to AIDs of K-2 to K+3. A non-AP STA having an AID of K-2 is a non-MLD STA (e.g., HE STA), and AID K-1 is an AID corresponding to non-AP MLD #0 which is a non-MLD. AIDs K, K+1, K+2, and K+3 are AIDs corresponding to non-AP MLD #1, non-AP MLD #2, non-AP MLD #3, and non-AP MLD #4, which are non-AP MLDs, respectively.

The non-MLD STA having AID K-2 is associated with an AP only via a single link, and therefore, there is no need to indicate separate link-related information by using the multi-link TIM element. In addition, non-AP MLD #0 having the AID of K-1 maintains a default TID-to-link mapping status with the AP MLD, so that, similarly, there is no need to indicate separate link-related information. Therefore, an AID offset field of the multi-link TIM element is configured to be K, and link-related information is indicated in a per-MLD indication field starting from link-related information for the MLD (non-AP MLD #1) corresponding to AID K. (see (b) of FIG. 70)

In this case, since the absence of a queuing MSDU is indicated to non-AP MLD #3 having the AID of K+2 by the TIM element (TIM element bit corresponding to the AID is indicated as 0), there is no need to indicate link-related information via the multi-link TIM element, and therefore, link-related information corresponding to AID K+2 does not need to be included in the multi-link element.

Therefore, the AP MLD needs to indicate link-related information for non-AP MLD #1, non-AP MLD #2, and non-AP MLD #4 in the per-MLD indication field of the multi-link TIM element, and the link-related information may be indicated using LinkID bitmaps. In the embodiment, since a type subfield (B15 in (b) of FIG. 70) of 0 is considered, the per-MLD indication field includes LinkID bitmaps for indication. The size of each LinkID bitmap included in the per-MLD indication field may be determined based on a largest LinkID among links associated with the non-AP MLDs requiring indication of link-related information, and the determined value is indicated via a bitmap size field. Respective bits of a LinkID bitmap have a structure of sequentially corresponding to a link with a lower index to a link with a higher index, and therefore, a LinkID bitmap with a 3-bit size in the embodiment has respective bits corresponding to links in order of link 0, link 1, and link 2. If a size of a LinkID bitmap is 5, a first bit of the LinkID bitmap corresponds to link 0, a second bit corresponds to link 1, a third bit corresponds to link 2, a fourth bit corresponds to link 3, and a fifth bit corresponds to link 4. In this case, a non-AP MLD requiring indication of link-related information may refer to a non-AP MLD to which the presence of a queuing MSDU has been indicated via a TIM element and which operates in a non-default TID-to-Link mapping mode. In this case, even in the non-default TID-to-link mapping mode, a non-AP MLD having a link, to which all TIDs are mapped in the DL direction, may not be included in the non-AP MLD requiring indication of link-related information.

In the embodiment, since a value of the bitmap size field is 2 (considering interpretation by adding 1), a 3-bit size of LinkID bitmap indicating LinkID 0 to LinkID 2 is indicated for each non-AP MLD (see (b) of FIG. 70). This may be because an ID of a link having a largest index among links associated with non-AP MLD #1, non-AP MLD #2, and non-AP MLD #4, which are indicated with link-related information via the per-MLD indication field, is 2. If non-AP MLD #1 (AID=K) is associated with the AP MLD only on link 0 and link 1, a bit corresponding to link 2 in the LinkID bitmap indicated for AID K is reserved (0) as illustrated in (b) of FIG. 70.

In this way, when respective bits of the LinkID bitmap correspond to and are sequentially interpreted in order of link 0, link 1, and link 2, if there is a non-AP MLD associated with a link having a high index (e.g., link 14, etc.) among the non-AP MLDs to which the AP MLD needs to indicate link-related information, the size of the LinkID bitmap corresponding to each non-AP MLD is determined to be a large value (that is, a large value is indicated via the bitmap size field). In this case, as in the simplest example described above, overhead due to the LinkID bitmaps may be increased, which may have a negative effect on a network throughput rate. Therefore, when indicating link-related information to the non-AP MLDs, a more effective link information indication method should be considered instead of using LinkID bitmaps sequentially corresponding to link 0 to link 14.

According to an embodiment of the disclosure, in the multi-link TIM element, the link-related information indicated to respective non-AP MLDs may be interpreted based on links on which the respective non-AP MLDs are associated with the AP MLD. In this case, B15 (type field) of the multi-link TIM element may be configured to be 1 (see FIG. 69). In more detail, the link-related information indicated to respective non-AP MLDs may be interpreted in correspondence with only links on which the respective non-AP MLDs are associated with the AP MLD. For example, if non-AP MLD #1 is associated with the AP MLD only via link 1 and link 3, link-related information of 2 bits indicated to correspond to non-AP MLD #1 may be interpreted in correspondence with link 1 and link 3, respectively. On the other hand, if non-AP MLD #2 is associated with the AP MLD only via link 2 and link 3, link-related information of 2 bits indicated to correspond to non-AP MLD #2 may be interpreted in correspondence with link 2 and link 3, respectively. That is, even if link-related information including 2 bits is indicated to each non-AP MLD in the same manner, a non-AP MLD may interpret that the 2 bits correspond to different links. In this case, a method by which each non-AP MLD interprets link-related information corresponding to its own AID may include interpreting each bit of the link-related information (link Info of FIG. 27) in correspondence with a link on which a non-AP MLD itself is associated with the AP MLD. For example, when the link-related information includes 3 bits, a first bit of the link-related information may be interpreted as corresponding to a link having a smallest index among links on which the non-AP MLD itself is associated with the AP MLD, a second bit of the link-related information may be interpreted as corresponding to a link having a second smallest index among the links on which the non-AP MLD itself is associated with the AP MLD, and a third bit of the link-related information may be interpreted as corresponding to a link having a third largest index among the links on which the non-AP MLD itself is associated with the AP MLD. If the bit size of the link-related information corresponding to the AID of the non-AP MLD is larger than the number of links on which the non-AP MLD itself is associated with the AP MLD, bits exceeding the number of associated links may be interpreted as "reserved". For example, for a non-AP MLD, in which link-related information of 5 bits is indicated in correspondence with its own AID, and there are only three links on which the non-AP MLD is associated with the AP MLD, the non-AP MLD may recognize that fourth and fifth bits of the link-related information are reserved. In this case, when determining the size of the link-related information corresponding to each AID, the AP MLD needs to determine the size of the link-related information, based on the number of links of a non-AP MLD that is associated on the largest number of links among the non-AP MLDs requiring indication of information. In other words, the bitmap size field is determined based on the number of associated links of the non-AP MLD that is associated on the largest number of links. In this case, a non-AP MLD requiring indication of link-related information may refer to a non-AP MLD to which the presence of a queuing MSDU has been indicated via a TIM element and which operates in a non-default TID-to-Link mapping mode. In this case, even in the non-default TID-to-link mapping mode, a non-AP MLD having a link, to which all TIDS are mapped in the DL direction, may not be included in the non-AP MLD requiring indication of link-related information.

In this way, a method of indicating/interpreting link-related information by considering a link on which association is performed between a non-AP MLD and an AP MLD has the effect of reducing overhead of the link-related information when the number of links on which each non-AP MLD performs association with the AP MLD is less than the number of links operated by the AP MLD.

Figure 71:
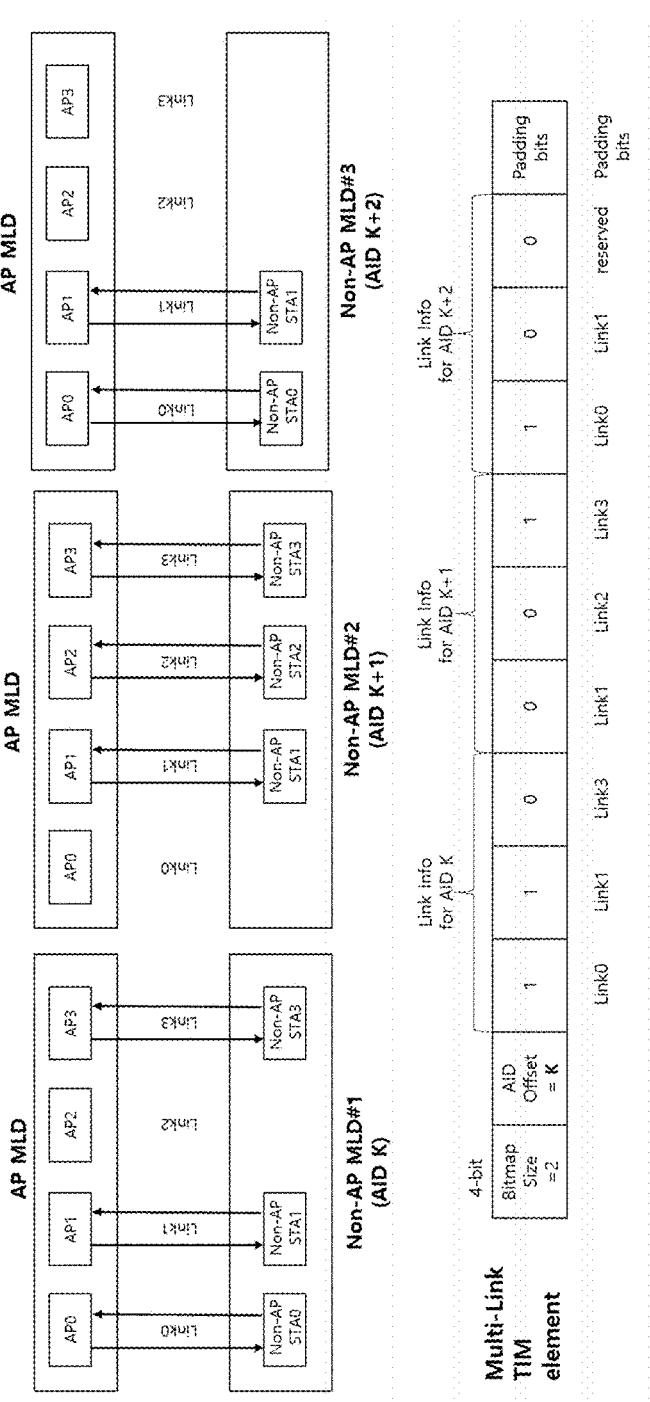
FIG. 71 illustrates another multi-link TIM element indication/interpretation method using a first format of a multi-link TIM element according to an embodiment of the disclosure.

FIG. 71 illustrates another multi-link TIM element indication/interpretation method using a first format of a multi-link TIM element according to an embodiment of the disclosure.

In FIG. 71, it is assumed that bits corresponding to AID K, AID K+1, and AID K+2 are indicated as 1 (indicating the presence of a queuing MSDU) via a TIM element, respectively.

Referring to FIG. 71, non-AP MLD #1, non-AP MLD #2, and non-AP MLD #3 are associated with an AP MLD via different link sets, respectively. Non-AP MLD #1 is associated with the AP MLD via link 0, link 1, and link 3, non-AP MLD #2 is associated with the AP MLD via link 1, link 2, and link 3, and non-AP MLD #3 is associated only on link 0 and link 1. In the embodiment, since the type subfield (B15 in (b) of FIG. 70) of 0 is considered, a per-MLD indication field includes link Info of each AID (of an MLD requiring indication of link-related information) for indication. In this case, the AP MLD indicates a bitmap size field as 2, based on that the number of associated links of non-AP MLD #1 and/or non-AP MLD #2 is 3, wherein non-AP MLD #1 and/or non-AP MLD #2 are associated via the most links among non-AP MLD #1, non-AP MLD #2, and non-AP MLD #3 to which link-related information should be indicated. That is, a bit size of link Info corresponding to each AID is determined to be 3 bits (the value indicated in the bitmap size field+1). 3 bits of link Info corresponding to AID K is interpreted as corresponding to link 0, link 1, and link 3 respectively according to non-AP MLD #1, and since 3 bits of the link Info are indicated as 110, non-AP MLD #1 needs to transmit a PS-Poll frame on link 0 or link 1 to receive a queuing MSDU. 3 bits of link Info corresponding to AID K+1 is interpreted as corresponding to link 1, link 2, and link 3 respectively according to non-AP MLD #2, and since 3 bits of the link Info are indicated as 001, non-AP MLD #2 needs to transmit a PS-Poll frame on link 3 to receive a queuing MSDU. First 2 bits among 3 bits of link Info corresponding to AID K+2 are interpreted as corresponding to link 0 and link 1 respectively according to non-AP MLD #3, and a third bit is interpreted as being reserved. Since 3 bits of the link Info are indicated as 100, non-AP MLD #3 needs to transmit a PS-Poll frame on link 0 to receive a queuing MSDU. In this case, the AP MLD cannot configure a value of the bitmap size field to be 15 (referring to link Info having a 16-bit size), and this may be because the number of links operated by the AP is limited to 15. In addition, since the purpose of indicating link Info for each non-AP MLD is to indicate one link or more than one link among multiple links, link Info corresponding to each non-AP MLD (each AID) has a size exceeding 1 bit, and therefore the AP MLD cannot indicate the bitmap size field as 0. That is, the AP MLD transmitting the multi-link TIM element should not configure a value of the bitmap size field to be 0 or 15.

In summary, the aforementioned indication/interpretation methods using the first multi-link TIM element format have a scheme of directly indicating an ID of a link on which a queuing MSDU may be transmitted to each non-AP MLD.

In this case, when a type indicated in the multi-link TIM element is 0, link-related information is indicated using LinkID bitmap, and when the type is 1, link-related information is indicated using link Info. Therefore, the non-AP MLDs need to identify a type field of the received multi-link TIM element, and then interpret information (bits of LinkID bitmap or bits of link Info) indicated in correspondence with AIDs of the non-AP MLDs.

As such, the scheme of directly indicating an ID of a link may be effective in reducing overhead by limiting the size of per-MLD indication or link Info corresponding to each AID when all non-AP MLDs, to which link-related information should be indicated via the multi-link TIM element, are associated only via low-index links or are associated with the AP MLD only via a small number of links. However, if at least one of the non-AP MLDs, to which link information should be indicated, is associated with a high index link, or at least one non-AP MLD is associated with the AP MLD via multiple links, the aforementioned indication/interpretation methods using the first multi-link TIM element format may still cause large overhead.

Therefore, as an alternative method, when indicating link-related information via the multi-link TIM element, indicating TID information corresponding to a queuing MSDU, instead of directly indicating information related to a link ID, may be considered. In this case, the non-AP MLDs need to receive TID information via the multi-link TIM element, and additionally use TID-to-link mapping information negotiated with the AP MLD to identify information of a link on which a queuing MSDU may be received. In more detail, the AP MLD may indicate TID information of a queuing MSDU via the multi-link TIM element, and the non-AP MLD may receive the MSDU from the AP MLD by transmitting a PS-Poll frame on a link to which a TID of the MSDU, which the non-AP MLD itself needs to receive, is mapped. In this case, the link to which the TID is mapped refers to a link to which the TID is mapped in the DL direction. If the TID indicated by the multi-link TIM element is mapped to multiple links among the links on which the non-AP MLD is associated with the AP MLD, the non-AP MLD may transmit a PS-Poll frame on one of the multiple links. In addition, when one or more TIDs are indicated via the multi-link TIM element, the non-AP MLD may need to respond with a PS-Poll frame via a link to which all of the indicated one or more TIDs are mapped. If there is no link to which all of the indicated one or more TIDs are mapped, the non-AP MLD may need to transmit a PS-Poll frame on one or more links. In this case, each of the indicated one or more TIDs should be mapped to at least one of the one or more links on which the non-AP MLD transmits a PS-Poll frame. That is, the non-AP MLD transmits a PS-Poll frame at least once on a link to which each of the TIDs indicated via the multi-link TIM element is mapped, and receives queuing MSDUs for all the indicated TIDs. In this way, even if the AP MLD indicates TID information via the multi-link TIM element, since the AP MLD can determine a link on which the non-AP MLD needs to transmits a PS-Poll frame to receive a queuing MSDU, it may be understood that link-related information is indicated by the AP MLD.

The AP MLD may include TID bitmap corresponding to each AID in the multi-link TIM element for the purpose of indicating TID information corresponding to a queuing MSDU to each of the non-AP MLDs requiring indication of link-related information. The TID bitmap corresponding to each AID includes 8 bits corresponding to TID0 to TID7, and a first bit of the TID bitmap corresponds to TID0, a second bit corresponds to TID1, and an eighth bit corresponds to TID7 in sequence.

In this way, when link-related information is indicated via TID bitmap, the link-related information corresponding to each AID is fixed to an 8-bit size, and therefore, when a highest link index is small or the number of links is small, this results in larger overhead than the aforementioned indication/interpretation method using the first multi-link TIM element. Therefore, it is preferable to selectively use the method of indicating link-related information via TID bitmap when the number of associated links of non-AP MLDs requiring indication of link-related information is large or when a link index is large.

A second multi-link TIM element format provided in the disclosure has a configuration of including a 3-bit bitmap size field, and only when the bitmap size field is indicated as 0 or 7, TID bitmap corresponding to each AID is indicated. When the bitmap size field is neither 0 nor 7, per-MLD indication or link Info corresponding to each AID is indicated as described in the aforementioned embodiments of FIG. 70 and FIG. 71. Therefore, when interpreting link-related information indicated in a received multi-link TIM element, non-AP MLDs need to interpret the link-related information, based on information indicated in a bitmap size subfield. More specifically, when the bitmap size field is indicated as 0 or 7 in the received multi-link TIM element, the non-AP MLDs should interpret that link-related information corresponding to respective AIDs (or their own AIDs) is based on TID bitmap, and when the bitmap size field is neither 0 nor 7, the non-AP MLDs should interpret that a link indication method (i.e., per-MLD indication or link Info) is based on a form other than TID bitmap.

FIG. 72 illustrates a second format of a multi-link TIM element according to an embodiment of the disclosure.

Referring to FIG. 72, a multi-link TIM element may include bitmap size, AID offset, per-MLD indication, and padding fields. A bitmap size field includes 3 bits or 4 bits, and indicates the number of bits for a single MLD among bits included in a per-MLD indication field. For example, if the bitmap size field is indicated as 3, respective 3 or 4 (3+1) bits of the per-MLD indication field correspond to a single MLD. That is, if the bitmap size field is indicated as 3, first to third (or first to fourth) bits of the per-MLD indication field correspond to non-AP MLD #1, and fourth to sixth (or fifth to eighth) bits correspond to non-AP MLD #2. In addition, information indicated in the per-MLD indication field is determined according to a value indicated in the bitmap size field. More specifically, when a value indicated in the bitmap size field is 1 to 6, bits corresponding to LinkID are indicated in the per-MLD indication field, and when the bitmap size field is 0 or 7, bits corresponding to TID (TID bitmap) are indicated in the per-MLD indication field. In this case, the bits corresponding to TID correspond to each AID and are indicated in groups of 8. In this case, a type field located in B15 is configured to be I only when the bitmap size is 0 or 7, and therefore, when the type field is indicated as 1, a non-AP MLD may recognize that the bits corresponding to TID are indicated in the per-MLD indication field.

In addition, since the type field is indicated in B15 in the same manner as the first multi-link TIM element format considered in the disclosure, it is distinguishable that, when the type field is indicated as 0, the multi-link TIM element format is configured to include LinkID in the per-MLD indication field as in the aforementioned embodiments of FIG. 26 and FIG. 27, and when the type field is indicated as 1, the multi-link TIM element format is configured to include a TID bitmap in the per-MLD indication field. That is, when the type field is 0, the non-AP MLD may recognize that information indicated in the per-MLD indication is LinkID-related information, and when the type field is 1, the non-AP MLD may recognize that information indicated in the per-MLD indication is TID-related information.

An AID offset field indicates an AID of a non-AP MLD corresponding to a bit first indicated in the per-MLD indication field. As in the example above, if the first bit of the per-MLD indication field corresponds to non-AP MLD #1, a value indicated via the AID offset field is an association ID (AID) of non-AP MLD #1.

The per-MLD indication field is a field having a variable length, and a size thereof is determined by the number of MLDs, to which link-related information is indicated via the per-MLD indication, and a value indicated via the bitmap size field. More specifically, the size of the per-MLD indication field is determined to be (the number of MLDs to which link-related information is indicated via the per-MLD indication field)×(a value indicated via the bitmap size field (or the indicated value+1)). In this case, the size of the per-MLD indication field is determined as described above only when the value of the bitmap size field is indicated as 1 to 6, and if the value of the bitmap size field is 0 or 7, the size of the per-MLD indication field is determined to be (the number of MLDs to which link-related information is indicated via the per-MLD indication field)×8. A non-AP MLD having received the per-MLD indication field may use LinkID-related bits, which correspond to the non-AP MLD itself (corresponding to its own AID) among bits included in the per-MLD indication field, to identify a link on which the non-AP MLD needs to receive a queuing MSDU. Alternatively, the non-AP MLD may match TID-to-link mapping information and a TID bitmap, which corresponds to the non-AP MLD itself (corresponding to its own AID) among bits included in the per-MLD indication field, thereby identifying a link on which the non-AP MLD needs to receive a queuing MSDU. A more specific indication/interpretation method will be described via an embodiment described below. A padding field is a field that may appear to adjust the size of the multi-link TIM element to an octet unit. In more detail, if the sum of the sizes of other fields (bitmap size, AID offset, reserved, per-MLD indication, etc.) excluding the padding field is not a multiple of 8 bits, the padding field may be included to adjust the size of the multi-link TIM element to be a nearest multiple of 8. For example, if the sum of the sizes of other fields excluding the padding field is 50 bits, the padding field with a 6-bit size is included to determine the size of the multi-link TIM element to be 7 octets (56 bits). Therefore, the padding field may be omitted or have a size of 7 bits or less.

Figure 73:
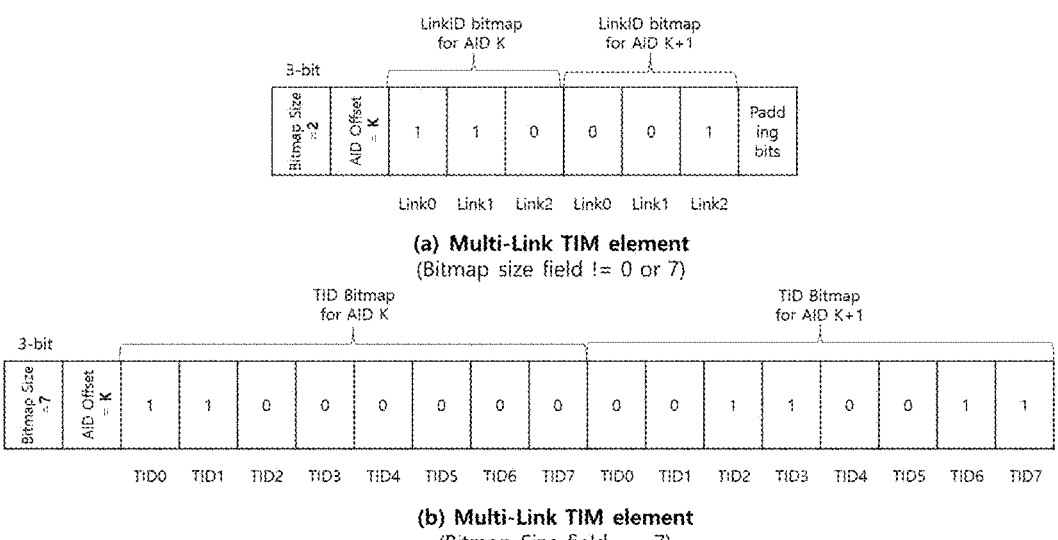
FIG. 73 illustrates a multi-link TIM element indication/interpretation method using a second format of a multi-link TIM element according to an embodiment of the disclosure.

FIG. 73 illustrates a multi-link TIM element indication/interpretation method using a second format of a multi-link TIM element according to an embodiment of the disclosure.

In FIG. 73, it is assumed that bits corresponding to AID K and AID K+1 are indicated as 1 (indicating the presence of a queuing MSDU) via a TIM element.

Referring to (a) of FIG. 73, a bitmap size field of a multi-link TIM element is indicated as 2, and accordingly, a 3-bit LinkID bitmap is indicated for each AID. A LinkID bitmap corresponding to AID K is indicated as 110, and therefore a non-AP MLD having an AID of K needs to transmit a PS-Poll frame on link 0 or link 1 to receive a queuing MSDU buffered on an AP MLD side. A LinkID bitmap corresponding to AID K+1 is indicated as 001, and therefore a non-AP MLD having an AID of K+1 needs to transmit a PS-Poll frame on link 2 to receive a queuing MSDU buffered on the AP MLD side. In this example, LinkID bitmaps are considered to correspond sequentially from link 0 to link 2, but as in the example of FIG. 27 described above, each bit of a LinkID bitmap may be interpreted in correspondence to a link on which a non-AP MLD of a corresponding AID is associated with the AP MLD. That is, if the non-AP MLD having the AID of K+1 is associated with the AP MLD via link 1, link 3, and link 5, since the corresponding LinkID bitmap is indicated as 001, the non-AP MLD needs to transmit a PS-Poll frame on link 5.

Referring to (b) of FIG. 73, the bitmap size field of the multi-link TIM element is indicated as 7, and accordingly, a TID bitmap is indicated for each AID. The TID bitmap indicated for each AID includes 8 bits that sequentially correspond to TID0 to TID7. Since a TID bitmap corresponding to AID K is indicated as 1100 0000, the non-AP MLD having the AID of K recognizes that MSDUs corresponding to TID0 and TID1 are queued. In this case, the non-AP MLD having the AID of K needs to transmit a PS-Poll frame via a link to which TID0 and TID1 are mapped in the DL direction, thereby receiving queuing MSDUs from the AP MLD. Since a TID bitmap corresponding to AID K+ is indicated as 0011 0011, the non-AP MLD having the AID of K+1 recognizes that MSDUs corresponding to TID2, TID3, TID6, and TID7 are queued. In this case, the non-AP MLD having the AID of K+1 needs to transmit a PS-Poll frame via a link to which TID2, TID3, TID6, and TID7 are mapped in the DL direction, thereby receiving queuing MSDUs from the AP MLD. If the non-AP MLD having the AID of K+1 has two different links, in which TID2 and TID3 are mapped on one of the two links and TID6 and TID7 are mapped in the remaining one link, the non-AP MLD needs to transmit PS-Poll frames on both the two links, respectively.

By using the aforementioned first and second multi-link TIM element formats in the disclosure, an AP MLD may indicate link-related information to each non-AP MLD. However, the method of indicating/interpreting link Info (see FIG. 71) in the indication/interpretation method of the first multi-link TIM element format, since the multi-link TIM element should be configured by considering a link on which each non-AP MLD is associated, there is a possibility that the operation of the AP MLD becomes somewhat complicated. Therefore, it may be considered to reduce the operational complexity of the AP MLD by indicating bit-maps related to LinkIDs via the multi-link TIM element, wherein LinkID bitmaps corresponding to links in the same subset are indicated to respective non-AP MLDs. In this case, the AP MLD may include the LinkID bitmap corresponding to each AID in the multi-link TIM element, wherein LinkID corresponding to each bit of the LinkID bitmap may be separately indicated. The method of indicating LinkID corresponding to each bit of the LinkID bitmap will be described in more detail via the embodiment of FIG. 74 described below.

FIG. 74 illustrates a third format of a multi-link TIM element according to an embodiment of the disclosure.

Referring to FIG. 74, a multi-link TIM element may be configured to include link indication, AID offset, LinkID bitmaps, and padding fields. A link indication bitmap includes 15 bits or 16 bits, and respective bits of the link indication bitmap sequentially correspond to link 0 to link 14. When a 16-bit link indication bitmap is used, the last bit (a 16th bit) is reserved. When each bit of the link indication bitmap is indicated as 1, this means that a LinkID bit matching a corresponding bit is included in a LinkID bitmaps field, and that a LinkID bit matching a bit indicated as 0 is not included in the LinkID bitmaps fields. For example, when the link indication field is indicated as 1110 0000 0000 0000, the LinkID bitmaps field includes only bits for link 0, link 1, and link 2. That is, bits indicated in the LinkID bitmaps field may correspond to only link, link 1, and link 2, respectively. Since an AID offset field has the same function as that in the first and second multi-link TIM element formats of the disclosure, a description thereof is omitted. The LinkID bitmaps field includes at least one LinkID bitmap corresponding to each AID, and a size of the LinkID bitmap corresponding to each AID is determined by the number of bits indicated as 1 in the link indication field. That is, if the link indication field is indicated as 1110 0000 0000 0000 (three bits are indicated as 1), each of LinkID bitmaps included in the LinkID bitmaps field has a size of 3 bits. Since a padding field has the same function and configuration method as those in the first and second multi-link TIM element formats of the disclosure described above, a description thereof is omitted.

A non-AP MLD should parse and interpret the LinkID bitmaps field, based on the number of bits indicated as 1 in the bitmap size field and LinkIDs corresponding to the bits indicated as 1. In more detail, the non-AP MLD parses the LinkID bitmaps field into LinkID bitmaps corresponding to respective AIDs by using the number of bits indicated as 1 in the bitmap size field, and then interprets respective bits of a LinkID bitmap corresponding to an AID of the non-AP MLD itself by sequentially matching the same and LinkIDs of the bits indicated as 1 in the bitmap size field. A method by which the non-AP MLD acquires link-related information after receiving the multi-link TIM element can be easily understood via the embodiment of FIG. 75 described below, so that a more detailed description is omitted.

When using a third multi-link TIM element format, since a LinkID bitmap corresponding to links of the same subset is indicated to each non-AP MLD, there is no need for an AP MLD to consider links associated with each non-AP MLD, and therefore, overhead of a multi-link TIM element can be reduced while operational complexity of the AP MLD can be kept low.

Figure 75:
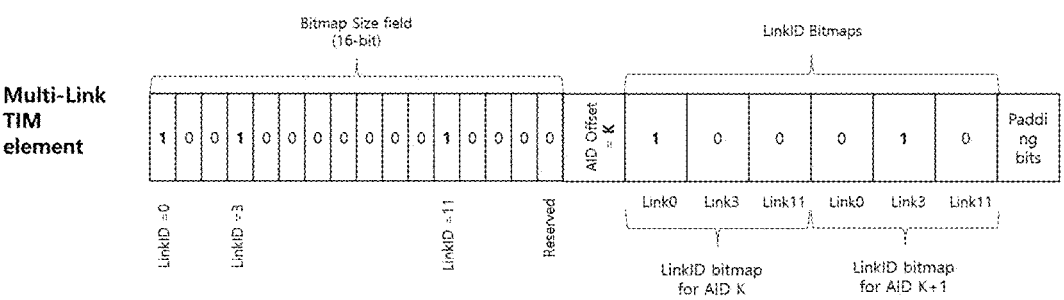
FIG. 75 illustrates a multi-link TIM element indication/interpretation method using a third format of a multi-link TIM element according to an embodiment of the disclosure.

FIG. 75 illustrates a multi-link TIM element indication/ interpretation method using a third format of a multi-link TIM element according to an embodiment of the disclosure.

Referring to FIG. 75, among bits of a bitmap size field, respective bits corresponding to link 0, link 3, and link 11 are indicated as 1, and therefore a LinkID bitmaps field indicates bitmaps corresponding to link 0, link 3, and link 11. In addition, since the number of bits indicated as I among the bits of the bitmap size field is 3, the LinkID bitmaps field includes LinkID bitmaps corresponding to different AIDs for each 3 bits. A first LinkID bitmap included in the LinkID bitmaps field corresponds to K that is an AID indicated via an AID offset field, and a second LinkID bitmap corresponds to AID K+1. That is, a non-AP MLD having an AID of K acquires link-related information via the first LinkID bit-map, and a non-AP MLD having an AID of K+1 acquires link-related information via the second LinkID bitmap. In this case, since the bit corresponding to AID K+1 in the TIM element is indicated as 1, the second LinkID bitmap may correspond to AID K+1.

Since each non-AP MLD interprets that respective bits of a LinkID bitmap corresponding to an AID of a non-AP MLD itself sequentially correspond to LinkIDs corresponding to the bits indicated as 1 in the bitmap size field, each non-AP MLD interprets that a first bit of the LinkID bitmap corresponds to link 0, a second bit corresponds to link 3, and a third bit corresponds to link 11. Therefore, the non-AP MLD having the AID of K needs to transmit a PS-Poll frame via link 0 and then receive a queuing MSDU, and the non-AP MLD having the AID of K+1 needs to transmit a PS-Poll frame via link 3 and then receive a queuing MSDU.

An AP MLD can selectively use various multi-link TIM element formats considered in the disclosure, rather than using only one format. In other words, when transmitting a corresponding multi-link TIM element, the AP MLD may appropriately use various multi-link TIM element formats to indicate link-related information to non-AP MLDs in the most efficient way (in terms of overhead or processing). Therefore, various multi-link TIM elements considered in the disclosure can be defined as different elements, respectively. That is, the first multi-link TIM element format and the second multi-link TIM element format may be distinguished by different element IDs and/or different element ID extension values, respectively. Similarly, the third multi-link TIM element format may also be distinguished from the first and second multi-link TIM element formats by using element IDs and/or element ID extension values. That is, a non-AP MLD may need to identify a multi-link TIM element format and interpret link-related information, based on an element ID and an element ID extension value of the received multi-link TIM element.

<Transmission/Configuration Restrictions on TIM Element and Multi-Link TIM Element>

When transmitting a multi-link TIM element to indicate link-related information to at least one non-AP MLD, an AP MLD needs to transmit the multi-link TIM element together with a TIM element. This is because, after receiving the TIM element, the non-AP MLD may attempt to identify whether a BU that should be transmitted to the non-AP MLD itself exists on the AP MLD side, and then acquire link-related information.

Therefore, the AP MLD may need to include the TIM element in a frame including the multi-link TIM element. In this case, the TIM element is included immediately before the multi-link TIM element. In other words, the TIM element and the multi-link TIM element included in a specific frame, for example, a beacon frame, are included consecutively, and the TIM element is located before the multi-link TIM element. That is, the multi-link TIM element may be included (indicated) only after the TIM element.

However, if the TIM element is included at the end of a specific fragmented frame, the multi-link TIM element may be included as a first element of a subsequent fragmented frame. In this case, the fragmented frame may refer to a frame (MSDU, A-MSDU, etc.) that is divided into more than one container and transmitted due to a size restriction on a container (MPDU, etc.). Even in this case, if defragmentation is performed, the TIM element is included (indicated) immediately before the multi-link TIM element.

Figure 76:
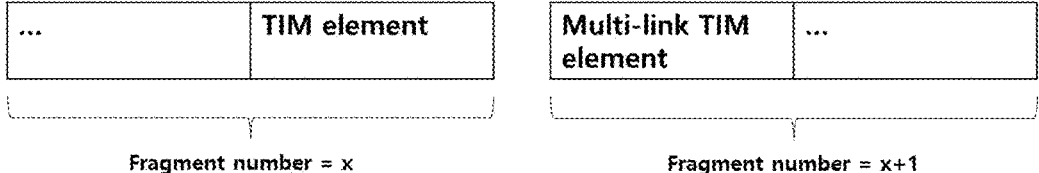
FIG. 76 illustrates a TIM element and a multi-link TIM element which are transmitted via an MSDU according to an embodiment of the disclosure.

FIG. 76 illustrates a TIM element and a multi-link TIM element which are transmitted via an MSDU according to an embodiment of the disclosure.

Referring to (a) of FIG. 76, when a TIM element and a multi-link TIM element are included in a specific frame (e.g., a beacon frame), the TIM element is indicated before the multi-link TIM element. That is, the multi-link TIM element may be included (indicated) only after the TIM element.

Referring to (b) of FIG. 76, a frame including a TIM element and a multi-link TIM element may include two or more fragmented frames. In this case, when the TIM element is included as the last element of a previous fragmented frame (a fragmented frame having a fragment number of x in (b) of FIG. 32), the multi-link TIM element is included as the first element of the next fragmented frame (a fragmented frame having a fragment number of x+1 in (b) of FIG. 76).

In addition, for an AID of a non-AP MLD to which link-related information is indicated via the multi-link TIM element, a corresponding bit should be indicated in a partial virtual bitmap of the TIM element transmitted together. That is, only AIDs corresponding to bits indicated via the partial virtual bitmap included in the TIM element may be AIDs of non-AP MLDs to which link-related information is indicated via the multi-link TIM element. That is, the range of AIDs to which the presence of a BU is indicated by the TIM element includes the range of the AIDs to which link-related information is indicated via the ML-TIM element.

Therefore, an AID indicated in a bitmap offset subfield (see FIG. 24) of the TIM element included in the same frame should indicate a smaller value than an AID offset (see FIG. 25 and FIG. 28) of the multi-link TIM element. In other words, the AID offset subfield of the multi-link TIM element needs to indicate an AID having a larger value than the AID indicated by the bitmap offset subfield of the TIM element transmitted together. For example, if the value of the bitmap offset subfield of the TIM element is N/2 (in the partial virtual bitmap of the TIM element, indication starts from a bit corresponding to AID N×8), the AID offset subfield of the multi-link TIM element should be indicated with a value equal to or greater than N×8.

In addition, since a target requiring indication of link-related information via the multi-link TIM element is an individual non-AP MLD, there exists an AID that cannot be indicated via the AID offset subfield of the multi-link TIM element. For example, in a TIM frame, an AID value of 0 is used to indicate whether a buffered group addressed frame exists (see FIG. 24), and AID0 is an AID that is not assigned to a non-AP MLD, so that the AID offset subfield of the multi-link TIM element should not indicate AID0. In addition, since specific AID values are used as BSSIDs, the specific AID values should not be indicated in the AID offset subfield of the multi-link TIM element.

In summary, the AID offset subfield of the multi-link TIM element should be configured to indicate one of AIDs which may be assigned to non-AP MLDs. In this case, the AIDs which may be assigned to the non-AP MLDs may be AIDs remaining after excluding AIDs having the range (e.g., 1 to a specific value) used as BSSIDs from among 1 to 2006.

In addition, it is possible that an AID which may be indicated via the AID offset subfield of the multi-link TIM element is further restricted to an AID of a non-AP MLD that requires link-related information. That is, the non-AP MLD of the AID indicated via the AID offset subfield of the multi-link TIM element may need to be a non-AP MLD having a non-default TID-to-link mapping status for the DL direction and bi-directions. That is, an AP MLD needs to configure the AID offset subfield of the multi-link TIM element to indicate an AID assigned to a non-AP MLD, wherein the non-AP MLD has a non-default TID-to-link mapping status for the DL direction and bi-directions (i.e., the non-AP MLD has successfully performed TID-to-link mapping negotiation for the DL direction and bi-directions). In this case, an additional condition that may be considered together may be that a buffered bufferable unit (BU) which should be transmitted to the non-AP MLD of the AID indicated via the AID offset subfield of the multi-link TIM element is not traffic that is transmittable on all enabled links of the non-AP MLD. (See the embodiment of FIG. 78 described below)

In summary, the AID which may be indicated via the AID offset subfield of the multi-link TIM element should be configured to be an AID of a non-AP MLD requiring indication of link-related information for BU reception. In this case, the non-AP MLD requiring indication of link-related information for BU reception is a non-AP MLD having a non-default TID-to-link mapping status for the DL direction and bi-directions, and is a non-AP MLD in which not all enabled links are available for BU reception. In this case, the fact that not all enabled links are available for BU reception indicates that, among the enabled links, there exists a link in which a TID corresponding to a BU is not mapped for the DL direction (or bi-directions).

Figure 77:
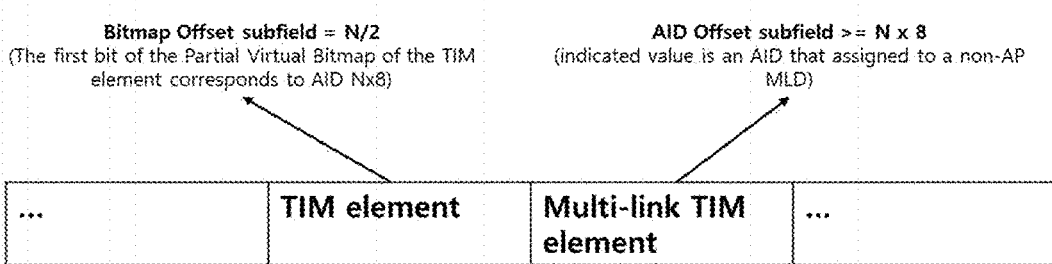
FIG. 77 illustrates an AID-related information indication/configuration method for a TIM element and a multi-link TIM element according to an embodiment of the disclosure.

FIG. 77 illustrates an AID-related information indication/ configuration method for a TIM element and a multi-link TIM element according to an embodiment of the disclosure.

Referring to FIG. 77, a bitmap offset subfield included in a TIM element is configured to be N/2.

When the bitmap offset subfield included in the TIM element is configured to be N/2, a first bit of a partial virtual bitmap included in the TIM element corresponds to an AID having an AID value of N×8.

An AID offset subfield of a multi-link TIM element transmitted together with the TIM element indicates a value equal to or greater than the AID (AID corresponding to the first bit of the partial virtual bitmap included in the TIM element) indicated via the bitmap offset subfield of the TIM element. In this case, the value indicated in the AID offset subfield of the multi-link TIM element is one of AID values assigned to non-AP MLDs by an AP MLD that transmits the corresponding element.

<Conditions for AP MLD to Transmit (Indicate) Multi-Link TIM>

A reason for considering various multi-link TIM element formats in the aforementioned embodiments of the disclosure is to minimize overhead of a multi-link TIM element. That is, by defining/using various multi-link TIM element formats, an AP MLD can select/use a multi-link TIM element format having smallest overhead in consideration of the number of links, indexes of connected links, etc. of a non-AP MLD to which link indication should be performed via a multi-link TIM element.

However, if the number of target non-AP MLDs requiring indication of link-related information via a multi-link TIM element gradually increases, the number of links of each non-AP MLD, indexes of links (for which ML setup has been performed) on which each non-AP MLD is connected to an AP MLD, etc. are likely to become diverse, and in this case, it becomes difficult to reduce overhead of the multi-link TIM element to a certain level or higher regardless of a multi-link TIM element format that is used. That is, even if the AP MLD selects an optimal multi-link TIM element format, if the number of target non-AP MLDs requiring indication of link-related information via a multi-link TIM element increases, it is difficult to keep overhead, which is due to the multi-link TIM element, small.

Therefore, it is necessary to ensure, as much as possible, that a multi-link TIM element is not included even in a TIM frame transmitted to MLDs, by more strictly considering conditions under which link-related information should be indicated via a multi-link TIM element. The conditions considered in the aforementioned embodiments of the disclosure have been considered in this context, wherein the conditions include: 1. non-AP MLD that is using default TID-to-link mapping (for the DL direction and/or bi-directions); and/or 2. not indicating link-related information via an ML-TIM element to a non-AP MLD that is in a state where all TIDs are mapped to at least one link.

In embodiments of the disclosure in the following provide descriptions of a method of, when determining whether it is required to indicate link-related information to a specific non-AP MLD, considering a TID of a BU for the specific non-AP MLD in addition to whether the specific non-AP MLD is applying non-default TID-to-link mapping for the DL direction and/or bi-directions.

According to an embodiment of the disclosure, when determining whether it is necessary to indicate link-related information to a specific non-AP MLD, a TID of a BU for the specific non-AP MLD may be considered together with whether the specific non-AP MLD is applying non-default TID-to-link mapping for the DL direction and/or bi-directions. In this case, the applying non-default TID-to-link mapping for the DL direction indicates that not all respective (enabled) links have all TIDs mapped for the DL direction. That is, when not all TIDs (0 to 7) are mapped for the DL direction of the enabled links of the non-AP MLD, respectively, the non-AP MLD is in a non-default TID-to-link mapping status for the DL direction. The bi-directions being associated with non-default TID-to-link mapping is the same as the aforementioned description of the non-default TID-to-link mapping for the DL direction (when changing the DL direction to bi-directions), so that the corresponding description is omitted.

More specifically, whether it is required to indicate, to a specific non-AP MLD, information related to a link on which a BU is to be transmitted may be determined be necessary only when the followings are satisfied simultaneously: 1. the specific non-AP MLD is not in a default TID-to-link mapping status for the DL direction or bi-directions; and 2. a buffered BU for the specific non-AP MLD is not traffic (TID) that is transmittable on all enabled links of the specific non-AP MLD.

That is, if the buffered BU for the non-AP MLD is traffic that is transmittable on all enabled links connected between the AP MLD and the non-AP MLD, it is possible for the AP MLD not to indicate the information related to the link on which the AP MLD is to transmit the BU to the non-AP MLD. This is because, even if the non-AP MLD, which has been indicated with the presence of the buffered BU, transmits a PS-Poll frame on a certain enabled link, the AP MLD may transmit the buffered BU on the link on which the PS-Poll frame has been received. Therefore, when a specific TID is mapped in the DL direction (or bi-directions) to all enabled links of the non-AP MLD, the AP MLD may consider this as similar to the non-AP MLD having a default TID-to-link mapping status for the specific TID.

Therefore, when there is a buffered BU for the specific non-AP MLD, the AP MLD may determine whether to indicate link-related information to the specific non-AP MLD, by considering whether the specific non-AP MLD has (successfully) performed TID-to-link mapping for the DL direction (or bi-directions) and whether the buffered BU is transmittable on all enabled links of the specific non-AP MLD.

In this case, it is possible for the AP MLD to determine whether to indicate link-related information to the non-AP MLD, by considering only whether the BU required to be transmitted to the non-AP MLD is transmittable on all enabled links of the non-AP MLD. This may be because a reason that the BU required to be transmitted to the non-AP MLD is not transmittable on a specific enabled link indicates that a TID-to-link mapping status for the DL direction of the non-AP MLD is not a default mapping status. That is, a situation where the BU is not transmittable on all enabled links of the non-AP MLD is a situation occurring when not all TIDS are mapped in the DL direction to the respective enabled links in the non-AP MLD.

If there is no non-AP MLD requiring indication of link-related information among non-AP MLDs for which a buffered BU exists on the AP MLD side, the AP MLD may reduce overhead due to a multi-link TIM element by not including the multi-link TIM (traffic indication) element in a beacon frame (and TIM frame) transmitted by the AP MLD.

Specifically, when transmitting and receiving frames between a non-AP MLD including multiple non-AP STAs operating on multiple links, respectively, and an MLD including multiple AP STAs, the AP MLD may transmit a multi-link traffic indication element, which indicates mapping between at least one TID for a BU(s) of an AP and multiple links, by including the same in a beacon frame. In this case, the multi-link traffic indication element may be included depending on whether the mapping relationship between multiple TIDs including the at least one TID and the multiple links is a default mapping relationship for downlink or bi-directions (uplink and downlink). In this case, the default mapping relationship refers to a state in which the multiple TIDs are individually mapped to the multiple links, respectively. For example, when TID 1 to TID 7 exist, the default mapping relationship refers to a state in which all TIDs to TID 7 are mapped to the multiple links, respectively. That is, the default mapping relationship refers to a mapping state in which traffic of all TIDs may be received or transmitted/received on any link of the multiple links. In this case, if mapping between the multiple TIDs and the multiple links is not default mapping for downlink or bi-directions, the beacon frame may include a multi-link traffic indication element. However, if the mapping between the multiple TIDs and the multiple links is default mapping, the beacon frame may not include a multi-link traffic indication element.

That is, if at least one associated non-AP MLD successfully negotiates TID-to-link mapping with the AP MLDAP MLD having a BU(s) to be transmitted to at least one non-AP MLD, and not all TIDs are mapped to all enable links for downlink or bi-directions, the AP affiliated with the AP MLD may transmit a multi-link traffic indication element, which indicates the mapping relationship between links and TID(s) of the BU(s), by including the same in a beacon frame.

In other words, when the AP MLD has buffered BU(s) to be transmitted to the non-AP MLD(s), and if at least one associated non-AP MLD successfully negotiates TID-to-link mapping with the AP MLD, and not all TIDs are mapped to all enable links for downlink or bi-directions, the AP affiliated with the AP MLD may transmit a multi-link traffic indication element, which indicates the mapping relationship between links and TIDs, by including the same in a beacon frame so that the non-AP MLD recognizes the links for reception of the buffered BU(s) for the TIDs.

In summary, the AP MLD needs to transmit a multi-link TIM element in a beacon frame only when at least one non-AP MLD among the associated non-AP MLDs is in the non-default TID-to-link mapping status for the DL direction (or bi-directions) (i.e., TID-to-link mapping has been successfully performed), and TID(s) of the buffered BU(s) for the non-AP MLD are not mapped (in the DL direction or bi-directions) to all respective enabled links.

Alternatively, the AP MLD may determine whether to include a multi-link TIM element in a beacon frame, by considering whether TID(s) of the buffered BU(s) for at least one non-AP MLD among the associated non-AP MLDs are not mapped to all respective enabled links of the non-AP MLD (in the DL direction or bi-directions). In other words, the AP MLD needs to transmit a multi-link TIM element by including the same in a beacon frame only when TID(s) of the buffered BU(s) for at least one non-AP MLD among the associated non-AP MLDs are not mapped to all respective enabled links of the non-AP MLD (in the DL direction or bi-directions).

However, even if conditions of transmitting a ML-TIM element are not necessarily met, the AP MLD may transmit the ML-TIM element as needed. In this case, the purpose of the AP MLD transmitting the ML-TIM element may be to recommend the non-AP MLD to receive the BU on a specific link.

In summary, when at least one non-AP MLD among the associated non-AP MLDs is in the non-default TID-to-link mapping status for the DL direction (or bi-directions) (i.e., TID-to-link mapping has been successfully performed), and TID(s) of the buffered BU(s) for the non-AP MLD are not mapped (in the DL direction or bi-directions) to all respective enabled links, the AP MLD may need to transmit a multi-link TIM element in a beacon frame, and may be able to transmit, as necessary, a ML-TIM element even in a situation where not all the aforementioned conditions are satisfied.

Alternatively, when TID(s) of the buffered BU(s) for at least one non-AP MLD among the associated non-AP MLDs are not mapped to all respective enabled links of the non-AP MLD (in the DL direction or bi-directions), the AP MLD may need to transmit a multi-link TIM element in a beacon frame, and may be able to transmit, as necessary, an ML-TIM element even in a situation where not all the aforementioned conditions are satisfied.

To summarize, in other words, the AP MLD may not be allowed to transmit a multi-link TIM element unless a case where at least one non-AP MLD among the associated non-AP MLDs having buffered BUs is in the non-default TID-to-link mapping status for the DL direction or bi-directions, and TIDs corresponding to the buffered BUs of the at least one non-AP MLD are not mapped to all enabled links of the at least one non-AP MLD.

To summarize, in other words, the AP MLD may not be allowed to transmit a multi-link TIM element unless a case where TIDs of buffered BU(s) for at least one non-AP MLD among the associated non-AP MLDs having the buffered BUs are not mapped to all respective enabled links of the at least one non-AP MLD (in the DL direction or bi-directions).

When no separate link-related (BU-related) information is indicated from the AP MLD even if the TID-to-link mapping status of the non-AP MLD itself is non-default for the DL direction or bi-directions, that is, when no ML-TIM element has been received from the AP MLD or no separate link-related information for the non-AP MLD itself is indicated in a received ML-TIM element (when a bit corresponding to an AID of the non-AP MLD itself is not indicated in the ML-TIM element), the non-AP MLD may receive a BU by transmitting a PS-Poll frame via one of enabled links. In this case, the non-AP MLD may not receive any separate restrictions when determining a link to transmit a PS-Poll frame, and freely select a link to receive a BU. This may be an operation of the non-AP MLD in consideration that a reason for the AP MLD not performing separate link-related indication to the non-AP MLD is that the buffered BU on the AP MLD side is considered to be traffic which is not subject to separate restrictions (restrictions related to TID-to-link mapping, i.e., restrictions that transmission is not possible on a specific link due to TID) when transmitted in the DL direction.

The mapping relationship between TIDs and links between the AP MLD and the non-AP MLD may be a mapping relationship other than a default mapping relationship for downlink or bi-directions (downlink and uplink, bi-directions). In this case, although there is a BU(s) to be transmitted via a TIM element from the AP, if a beacon frame does not include a multi-link traffic indication element indicating the mapping relationship between links and at least one TID of the BU(s) for APs of the AP MLD, the non-AP MLD may receive the BU(s) by transmitting a PS-Poll frame to the AP MLD having the BU(s) via an enabled link (e.g., a link mapped to the TID). That is, in this case, the BU(s) may be received via the enabled link on which the PS-Poll has been transmitted.

That is, when the non-AP MLD has been indicated with the presence of a BU for the non-AP MLD itself via the TIM element, and has not been indicated with link-related information via the ML-TIM element, the non-AP MLD needs to transmit a PS-Poll frame via one of enabled links and then receive the BU. In this case, only constraint that the link on which the PS-Poll frame is transmitted should be an enabled link is applied, and a specific selection may be selection (implementation) of the non-AP MLD. Additionally, in this case, the non-AP MLD may recognize that the buffered BU on the AP MLD side is traffic of a TID mapped in the DL direction (or bi-directions) for all enabled links of the non-AP MLD itself.

Figure 78:
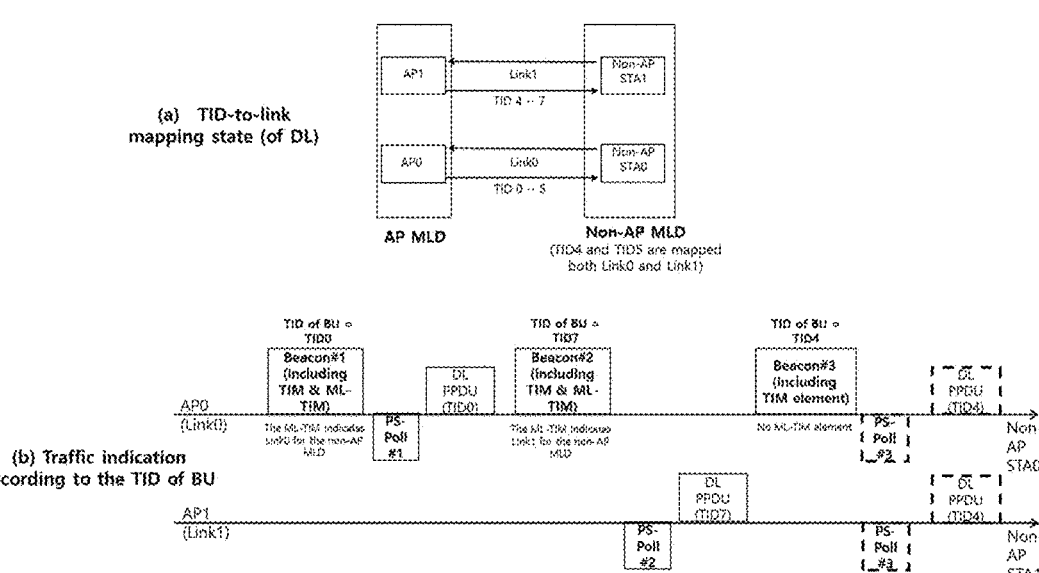
FIG. 78 illustrates a method by which an AP MLD transmits a multi-link TIM (traffic indication) element to a non-AP MLD according to an embodiment of the disclosure.

FIG. 78 illustrates a method by which an AP MLD transmits a multi-link TIM (traffic indication) element to a non-AP MLD according to an embodiment of the disclosure.

(a) of FIG. 78 illustrates TID-to-link mapping negotiation established between an AP MLD and a non-AP MLD. For the DL direction that is a direction in which the AP MLD performs transmission to the non-AP MLD, TID0 to TIDS are mapped to link 0, and TID4 to TID7 are mapped to link 1. Therefore, when the AP MLD transmits traffic (MSDU, A-MSDU, etc.) corresponding to TID0 to TID5, the AP MLD may transmit the traffic to the non-AP MLD via link 0. Since TID4 to TID7 are mapped to link 1, traffic corresponding to TID4 to TID7 may be transmitted from the AP MLD to the non-AP MLD via link 1. In this case, since both TID4 and TID5 are mapped to both links (link 0 and link 1) of the non-AP MLD, the AP MLD may randomly use either link 0 or link 1 to transmit traffic corresponding to TID4 and/or TID5 to the non-AP MLD.

When a buffered BU (bufferable unit, i.e., MSDU, A-MSDU, etc.), which should be transmitted to the non-AP MLD having such the TID-to-link mapping status, exists on the AP MLD side, the AP MLD may indicate the presence of the BU, which should be transmitted by the AP MLD, to the non-AP MLD in the method as shown in (b) of the FIG. 34.

(b) of the FIG. 78 illustrates a method by which an AP MLD indicates the presence of BUs to a non-AP MLD via beacon frames (beacon #1, beacon #2, and beacon #3 in (b) of the FIG. 78) transmitted by the AP MLD, and the non-AP MLD transmits a PS-Poll frame based on information indicated to the non-AP MLD, and then receives a DL PPDU. First, in (b) of the FIG. 78, a beacon frame transmitted by AP0, which is an AP of the AP MLD, is illustrated.

At a point in time when the AP MLD transmits beacon frame #1 via AP0, the AP MLD has a BU that should be transmitted to the non-AP MLD, and the BU is traffic corresponding to TID0. The BU corresponding to TID0 may be transmitted to the non-AP MLD only via link 0 based on TID-to-link mapping, and therefore, the AP MLD needs to indicate, to the non-AP MLD, information related to the link on which the BU is to be transmitted. Therefore, the AP MLD transmits a TIM element and an ML-TIM element by including the same in beacon frame #1 transmitted via AP0, wherein, in the TIM element, a bit of an AID corresponding to the non-AP MLD is configured to be 1 to indicate the presence of the BU of the non-AP MLD, and the ML-TIM element includes information indicating link0. Therefore, the non-AP MLD, which has been indicated with (has obtained) link-related information via the ML-TIM element received from the AP MLD, receives a DL PPDU by transmitting a PS-Poll frame (PS-Poll #1 in (b) of the FIG. 78) via link 0 that is the indicated link.

At a point in time when the AP MLD transmits beacon frame #2 via AP0, the AP MLD has a BU that should be transmitted to the non-AP MLD, and the BU is traffic corresponding to TID7. The BU corresponding to TID7 may be transmitted to the non-AP MLD only via link 1 based on TID-to-link mapping, and therefore, the AP MLD needs to indicate, to the non-AP MLD, information related to the link on which the BU is to be transmitted. Therefore, the AP MLD transmits a TIM element and an ML-TIM element by including the same in beacon frame #2 transmitted via AP0, wherein, in the TIM element, a bit of an AID corresponding to the non-AP MLD is configured to be 1 to indicate the presence of the BU of the non-AP MLD, and the ML-TIM element includes information indicating link1. Therefore, the non-AP MLD, which has been indicated with (has obtained) link-related information via the ML-TIM element received from the AP MLD, receives a DL PPDU by transmitting a PS-Poll frame (PS-Poll #2 in (b) of the FIG. 78) via link 1 that is the indicated link.

At a point in time when the AP MLD transmits beacon frame #3 via AP0, the AP MLD has a BU that should be transmitted to the non-AP MLD, and the BU is traffic corresponding to TID4. The BU corresponding to TID4 may be transmitted via both links (link0 and link1) of the non-AP MLD based on TID-to-link mapping, and therefore, the AP MLD does not indicate, to the non-AP MLD, information related to the link on which the BU is to be transmitted. Therefore, the AP MLD transmits only a TIM element by including the same in beacon frame #3 transmitted via AP0, wherein, in the TIM element, a bit of an AI corresponding to the non-AP MLD is configured to be 1 to indicate the presence of the BU of the non-AP MLD. In this case, since an ML-TIM element is not included, only the presence of the BU to be transmitted to the non-AP MLD is indicated, and no link-related information is indicated. Therefore, the non-AP MLD transmits a PS-Poll frame (PS-Poll #3 in (b) of the FIG. 78) via link 0 or link 1, and receives a DL PPDU including the BU via the link on which the PS-Poll frame has been transmitted.

FIG. 79 illustrates an embodiment of an operation method of an MLD according to an embodiment of the disclosure.

Referring to FIG. 79, a first multi-link device (MLD) including multiple stations operating on multiple links, respectively, may receive S79010 a beacon frame from a second MLD including multiple access points (APs) operating on multiple links, respectively, and may transmit and receive S79020 a data unit based on the beacon frame.

In this case, the beacon frame may include a multi-link traffic indication element indicating mapping between the multiple links and one or more traffic identifiers (TIDs) for buffered units (BUs) of the multiple APs from among multiple TIDs according to whether mapping between the multiple links and the multiple TIDs is default mapping for downlink or bi-directions.

In this case, the default mapping indicates a state in which the multiple TIDS are all mapped to the multiple links, respectively.

If the mapping between the multiple TIDs and the multiple links is not the default mapping, the beacon frame may include the multi-link traffic indication element, but if the mapping between the multiple TIDs and the multiple links is the default mapping, the beacon frame may not include the multi-link traffic indication element.

If the mapping between the multiple TIDs and the multiple links is not the default mapping, and the beacon frame does not include the multi-link traffic indication element, the MLD may transmit a PS-Poll frame for reception of the data unit to the second MLD via a link among the multiple links, the link corresponding to a specific TID among the one or more TIDs.

When at least one link among the multiple links constitutes an enhanced multi-link single radio (EMLSR) link set in an EMLSR mode which supports transmission and reception only on a single link, if a specific link among the at least one link is removed, the specific link may be removed from the EMLSR link set.

When the specific link among the at least one link is removed, if the number of links remaining after excluding the specific link from among the at least one link is 1 or 0, the EMLSR mode is terminated, wherein the EMLSR mode is terminated at a point in time when the specific link is removed.

Only one or more links mapped to the one or more TIDs among the multiple links may perform listening operation with the second MLD.

If a mapping relationship between the multiple TIDs and the multiple links is not a default mapping relationship, and the one or more TIDs is mapped to all the respective multiple links, the beacon frame does not include the multi-link traffic indication element.

The aforementioned descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The invention claimed is:

1. A first multi-link device (MLD) comprising multiple stations, the device comprising:
   a transceiver; and
   a processor,
   wherein the processor is configured to:
   receive a beacon frame from a second MLD comprising multiple access points (APs),
      the second MLD associated with one or more other MLDs,
      the one or more other MLDs comprising the first MLD; and decode the received beacon frame,
   wherein the beacon frame includes i) a multi-link traffic indication element based on both a first condition and a second condition being satisfied and ii) a traffic indication map (TIM) element related to whether a first bufferable unit (BU) for the first MLD exists,
      wherein the first condition is that for at least one of the one or more other MLDs, there is a first link between the second MLD and the at least one of the one or more other MLDs to which a first traffic identifier (TID) is mapped but to which a second TID is not mapped; and
      wherein the second condition is that the second MLD has a buffered second BU with the second TID, the buffered second BU being for the at least one of the one or more other MLDs.

2. The device of claim 1, when an existence of the first BU for the first MLD is indicated by the TIM element, wherein the processor is configured to,
   transmit a PS-Poll frame for reception of the first BU to the second MLD through an enabled link of the first MLD when i) the multi-link traffic indication element is not present in the beacon frame, or ii) the multi-link traffic indication element is present in the beacon frame and the multi-link traffic indication element does not include link information for the first MLD.

3. The device of claim 2, wherein the processor is configured to receive, from the second MLD, a frame for the first BU based on the PS-Poll frame.

4. The device of claim 1, wherein the first BU and the second BU are the same BU.

5. A frame transmission and reception method performed by a first multi-link device (MLD) comprising multiple stations, the method comprising:
   receiving a beacon frame from a second MLD comprising multiple access points (APs), the second MLD associated with one or more other MLDs, the one or more other MLDs comprising the first MLD; and
   decoding the received beacon frame,
   wherein the beacon frame includes i) a multi-link traffic indication element based on both a first condition and a second condition being satisfied and ii) a traffic indication map (TIM) element related to whether a first bufferable unit (BU) for the first MLD exists,
      wherein the first condition is that for at least one of the one or more other MLDs, there is a first link between the second MLD and the at least one of the one or more other MLDs to which a first traffic identifier (TID) is mapped but to which a second TID is not mapped; and
      wherein the second condition is that the second MLD has a buffered second BU with the second TID, the buffered second BU being for the at least one of the one or more other MLDs.

6. The method of claim 5, when an existence of the first BU for the first MLD is indicated by the TIM element, the method further comprising,
   transmitting a PS-Poll frame for reception of the first BU to the second MLD through an enabled link of the first MLD when i) the multi-link traffic indication element is not present in the beacon frame, or ii) the multi-link traffic indication element is present in the beacon frame and the multi-link traffic indication element does not include link information for the first MLD.

7. The method of claim 6, the method further comprising, receiving, from the second MLD, a frame for the first BU based on the PS-Poll frame.

8. The method of claim 5, wherein the first BU and the second BU are the same BU.

* * * * *